US007778916B2

(12) United States Patent
Burkhardt et al.

(10) Patent No.: US 7,778,916 B2
(45) Date of Patent: Aug. 17, 2010

(54) SYSTEM AND METHOD FOR ORDER SWEEP IN A HYBRID AUCTION MARKET

(75) Inventors: Roger Burkhardt, Irvington, NY (US); Anne E. Allen, Cranford, NJ (US); Robert J. McSweeney, Merrick, NY (US); Louis G. Pastina, Belle Harbor, NY (US)

(73) Assignee: New York Stock Exchange, New York, NY (US)

( * ) Notice: Subject to any disclaimer, the term of this patent is extended or adjusted under 35 U.S.C. 154(b) by 1093 days.

(21) Appl. No.: 11/183,279

(22) Filed: Jul. 15, 2005

(65) Prior Publication Data

US 2006/0015447 A1 Jan. 19, 2006

Related U.S. Application Data

(60) Provisional application No. 60/588,625, filed on Jul. 15, 2004, provisional application No. 60/592,510, filed on Jul. 30, 2004, provisional application No. 60/621,127, filed on Oct. 22, 2004, provisional application No. 60/625,645, filed on Nov. 5, 2004, provisional application No. 60/626,309, filed on Nov. 8, 2004, provisional application No. 60/651,547, filed on Feb. 9, 2005, provisional application No. 60/672,673, filed on Apr. 19, 2005, provisional application No. 60/684,274, filed on May 25, 2005.

(51) Int. Cl.
*G06Q 40/00* (2006.01)

(52) U.S. Cl. .......................................... 705/37; 705/38

(58) Field of Classification Search .............. 705/37–38
See application file for complete search history.

(56) References Cited

U.S. PATENT DOCUMENTS

| | | | |
|---|---|---|---|
| 4,412,287 | A | 10/1983 | Braddock, III |
| 4,674,044 | A | 6/1987 | Kalmus et al. |
| 4,903,201 | A | 2/1990 | Wagner |

(Continued)

OTHER PUBLICATIONS

CNBC News Transcripts, "Special Committee Addresses Market Structure Issues at the New York Stock Exchange's Quarterly Meeting" Apr. 6, 2000.

New York Stock Exchange NYSE Fully Implements Automatic Order Execution Service NYSE Direct + Apr. 11, 2001.

Boom. Com Reveals U.S. Trading & New Look Website—www.internetnews.com, pp. 1-2.

(Continued)

*Primary Examiner*—Thu Thao Havan
(74) *Attorney, Agent, or Firm*—Milbank, Tweed, Hadley & McCloy

(57) ABSTRACT

A first price and first size of a published offer to sell shares of a security are determined, and a second price and second size of orders to sell shares of the security are determined. A third price and third size of orders to sell shares of the security are determined, wherein the second price is greater than the published offer and the third price is greater than the second price. A market order to buy shares of the security is received with a buy size greater than a sum of the first size and the second size. A first portion of the market order that is equal to the first size is executed at a first price, and a second portion of the market order is executed at the third price. The sum of the size of the first portion and the size of the second portion equals the buy size. Market orders to sell are handled in a similar fashion.

23 Claims, 191 Drawing Sheets

U.S. PATENT DOCUMENTS

| | | | | |
|---|---|---|---|---|
| 5,101,353 | A | 3/1992 | Lupien et al. | |
| 5,297,031 | A | 3/1994 | Gutterman et al. | |
| 5,375,055 | A | 12/1994 | Togher et al. | |
| 5,557,517 | A | 9/1996 | Daughterty, III | |
| 5,649,116 | A | 7/1997 | McCoy et al. | |
| 5,671,363 | A | 9/1997 | Cristofich et al. | |
| 5,689,652 | A | 11/1997 | Lupien et al. | |
| 5,717,989 | A | 2/1998 | Tozzoli et al. | |
| 5,732,400 | A | 3/1998 | Mandler et al. | |
| 5,802,499 | A | 9/1998 | Sampson et al. | |
| 5,809,483 | A | 9/1998 | Broka et al. | |
| 5,829,747 | A | 11/1998 | Nebel | |
| 5,873,071 | A | 2/1999 | Ferstenberg et al. | |
| 5,890,138 | A | 3/1999 | Godin et al. | |
| 5,915,209 | A | 6/1999 | Lawrence | |
| 5,950,176 | A | 9/1999 | Keiser et al. | |
| 5,987,419 | A | 11/1999 | Hachino et al. | |
| 6,014,627 | A | 1/2000 | Togher et al. | |
| 6,014,643 | A | 1/2000 | Minton | |
| 6,016,483 | A | 1/2000 | Rickard et al. | |
| 6,018,721 | A | 1/2000 | Aziz et al. | |
| 6,029,146 | A | 2/2000 | Hawkins et al. | |
| 6,058,378 | A | 5/2000 | Clark et al. | |
| 6,088,685 | A | 7/2000 | Kiron et al. | |
| 6,112,189 | A | 8/2000 | Rickard et al. | |
| 6,195,647 | B1 | 2/2001 | Martyn et al. | |
| 6,216,114 | B1 | 4/2001 | Alaia et al. | |
| 6,278,982 | B1 | 8/2001 | Korhammer et al. | |
| 6,317,727 | B1 | 11/2001 | May | |
| 6,321,212 | B1 | 11/2001 | Lange | |
| 6,336,105 | B1 | 1/2002 | Conklin et al. | |
| 6,338,050 | B1 | 1/2002 | Conklin et al. | |
| 6,343,278 | B1 | 1/2002 | Jain et al. | |
| 6,405,180 | B2 | 6/2002 | Tilfors et al. | |
| 6,408,282 | B1 | 6/2002 | Buist | |
| 6,421,653 | B1 | 7/2002 | May | |
| 6,557,029 | B2 | 4/2003 | Szymansky | |
| 6,598,026 | B1 | 7/2003 | Ojha et al. | |
| 7,162,447 | B1 | 1/2007 | Cushing | |
| 2001/0042040 | A1 | 11/2001 | Keith | |
| 2001/0044767 | A1 | 11/2001 | Madoff et al. | |
| 2001/0044770 | A1 | 11/2001 | Keith | |
| 2001/0051909 | A1 | 12/2001 | Keith | |
| 2002/0019795 | A1 | 2/2002 | Madoff et al. | |
| 2002/0035534 | A1 | 3/2002 | Buist et al. | |
| 2002/0038275 | A1 | 3/2002 | Brixius | |
| 2002/0046125 | A1 | 4/2002 | Speicher et al. | |
| 2002/0046152 | A1 | 4/2002 | Kinney et al. | |
| 2002/0091617 | A1 | 7/2002 | Keith | |
| 2002/0128955 | A1 | 9/2002 | Brady et al. | |
| 2002/0138401 | A1 | 9/2002 | Allen et al. | |
| 2002/0194105 | A1 | 12/2002 | Klein | |
| 2003/0014354 | A1 | 1/2003 | Madoff et al. | |
| 2003/0139998 | A1 | 7/2003 | Gilbert et al. | |
| 2003/0140005 | A1 | 7/2003 | Cole | |
| 2004/0078317 | A1 | 4/2004 | Allen et al. | |
| 2004/0088242 | A1 | 5/2004 | Ascher et al. | |
| 2004/0177024 | A1* | 9/2004 | Bok et al. | 705/37 |
| 2004/0215538 | A1 | 10/2004 | Smith et al. | |
| 2005/0234806 | A1 | 10/2005 | Findlay et al. | |

OTHER PUBLICATIONS

North American Institutional Brokers-Professional Order Execution Website—www.naib.com: "About Us", pp. 1-2; "Total Trading Support", pp. 1-2.

Self-Regulatory Organizations; Notice of Filing of Proposed Rule Change and Amendment No. 1 Thereto by the New York Stock Exchange, Inc. Relating to NYSE Liquidity Quote$^{SM}$ Exhibit C; Jul. 20, 2004; (Release No. 34-50040; File No. ST-NYSE-2004-32).

Self-Regulatory Organization; Order Approving Proposed Rule Change and Amendment No. 1 Thereto by the New York Stock Exchange, Inc. to Amend Exchange Rule 124 to Change the Way Odd-Lott Orders are Priced and Executed Systemically; May 20, 2004; (Release No. 34-49745; File No. SR-NYSE-2003-37).

Self-Regulatory Organizations; Notice of Filing of Proposed Rule Change and Amendment No. 1 Thereto by the New York Stock Exchange, Inc. to Amend Exchange Rule 124 to Change the Way Odd-Lot Orders are Priced and Executed Systemically (Release No. 34-49536; File No. SR-NYSE-2003-37).

Self-Regulatory Organizations; Notice of Filing of Proposed Rule Change and Amendment No. 1 Thereto by the New York Stock Exchange, Inc. to Amend its Rules 13, 72, 76 and 91 to Establish a Six-Month Pilot Program in Selected Stocks to Provide That Institutional XPress® Orders Be Executed Immediately Against an Institutional XPress® Eligible NYSE LiquidityQuote$^{SM}$ Bid or Offer and Not Be Exposed for Price Improvement; Mar. 10, 2004 (Release No. 34-49391; File No. SR-NYSE-2003-42).

Self-Regulatory Organizations; Order Approving a Proposed Rule Change and Amendment Nos. 1 and 2 Thereto by the New York Stock Exchange, Inc. Regarding the Dissemination of Liquidity Quotations; Apr. 2, 2004 (Release Nos. 34-47614; File No. ST-NYSE-2002-55).

Self-Regulatory Organizations; Notice of Filing of a Proposed Rule Change New York Stock Exchange, Inc. Relating to the Dissemination of Liquidity Quotations; Dec. 23, 2002 (Release No. 34-47091; File No. ST-NYSE-2002-55).

Self-Regulatory Organizations; Notice of Filing of Proposed Rule Change to Amend Rule 13 on XPress Quote Parameters; Jul. 11, 2001 (Release No. 34-44539; No. SR-NYSE-2001-14).

Form 19b-4 Proposed Rule Change by New York Stock Exchange, Inc.; May 1, 2000.

Self-Regulatory Organizations; Notice of Filing of a Proposed Rule Change by the New York Stock Exchange, Inc. Relating to Specialists' Entry of Bids and Offers in Electronic Communications Networks and Other Market Centers; May 13, 1999 (Release No. 34-41397; File No. SR-NYSE-97-18).

Self-Regulatory Organizations; Notice of Filing of Proposed Rule Change by the New York Stock Exchange, Inc., and Amendment No. 1 thereto, to Amend Exchange Rule 115 Regarding Disclosure of Specialists' Orders; Jun. 30, 1998 (Release No. 34-40146; File No. SR-NYSE-98-10).

Primex Trading And Nasdaq Agree To Move Forward; Industry Trends; Nov. 27, 2000.

Commentary: It's Time to Shine a Light on Brokers—Do your trades happen at the fastest speed and the best price?; BusinessWeek Online: Nov. 22, 1999 Issue.

Proposed Rule: Disclosure of Order Routing and Execution Practices; (Release No. 34-43084; File No. S7-16-00), Nov. 27, 2000.

What order do I use when? Nov. 27, 2000, http://www.choicepicks.com/public/education/pcp3eduonlorder.htm.

Global Online Trading, ECNs and Alternative Trading Systems; Apr. 20, 2000, heep://www.gtlaw.com/au/pubs/globalonlinetrading.html.

Does the Limit Order Routing Decision Matter?; Nov. 27, 2000, http://www.kelley.ie.edu/finweb/limit13.html.

Some observations on the microstructure of the New York Stock Exchange by Jamal Munshi Sonoma State University. Nov. 27, 2000, http://munshi.sonoma.edu/working/nysenotes.html Testimony Before the House Subcommittee on Finance and Hazardous Materials; Summary of Richard A. Grasso Testimony; Jun. 13, 2000, http://www.nyse.com/speech/NT0005F146.html.

Report Concerning Display of Customer Limit Orders; May 4, 2000; http://www.sec.gov/news/studies/limitorm.htm.

Information Memo: Amendment of Odd-Lot Pricing Procedures; Aug. 19, 1997; No. 97-43.

Market Structure Report of the New York Stock Exchange Special Committee on Market Structure, Governance and Ownership, Copyright 2000.

Order Execution Obligations: Securities and Exchange Commission—Final Rules; (Release No. 34-37619A; File No. S7-30-95).

NYSE Launches Competitive Initiatives, Jul. 13, 2000, http://www.nyse.com/content/articles/NT00024A5A.html.

Reinventing the New York Stock Exchange, The Exchange, Dec. 1999 vol. 6, No. 12.
NYSE Launches Competitive Initiatives, The Exchange, Oct. 1999; vol. 6, No. 10.
Self- Regulatory Organization; Order Granting Approval to Proposed Rule Change and Amendment No. 3 and Notice of Filing and Order Granting Accelerated Approval to Amendment No. 4 Thereto by the Boston Stock Exchange, Inc. Establishing Trading Rules for the Boston Options Exchange Facility; (Release No. 34-49068; File No. SR-BSE-2002-15).
Self-Regulatory Organizations; Order Approving Proposed Rule Change and Amendment No, 1 Thereto and Notice of Filing and Order Granting Accelerated Approval to Amendments No. 2 and 3 to the Proposed Rule Change by the Pacific Exchange, Inc. Relating to the Exchange's New Trading Platform for Options, PCX Plus (Release No. 34-47838; File No. SR-PCX-2002-36).
Search Report, dated Feb. 8, 2006 for PCT/US05/25102.
Market Access Subcommittee Interim Report, Nov. 27, 2001.
Best Practices for Organized Electronic Markets, Apr. 24, 2002.
Ameritrade, Re: Regulation NMS, File No. S7-10-04, SEA Rel. No. 49325 (Feb. 26, 2004 and 49749 (May 20, 2004)), Jun. 30, 2004 http://www.sec.gov.rules/proposed/s71004/amer063004.pdf.
U.S. Appl. No. 11/183,259 Jun. 25, 2008 Office Action.
U.S. Appl. No. 11/183,259 Sep. 19, 2008 Response.
U.S. Appl. No. 11/183,259 Jan. 8, 2009 Office Action.
U.S. Appl. No. 11/183,259 Apr. 14, 2009 Response.
U.S. Appl. No. 11/183,259 Jul. 9, 2009 Allowance.
U.S. Appl. No. 11/183,285 Jun. 11, 2008 Office Action.
U.S. Appl. No. 11/183,285 Sep. 4, 2008 Response.
U.S. Appl. No. 11/183,285 Jan. 6, 2009 Office Action.
U.S. Appl. No. 11/183,285 Apr. 16, 2009 Response.
U.S. Appl. No. 11/183,285 May 19, 2009 Allowance.
U.S. Appl. No. 11/183,155 Jun. 25, 2008 Office Action.
U.S. Appl. No. 11/183,155 Sep. 19, 2008 Response.
U.S. Appl. No. 11/183,155 Jan. 6, 2009 Office Action.
U.S. Appl. No. 11/183,155 Apr. 10, 2009 Response.
U.S. Appl. No. 11/183,155 Aug. 6, 2009 Office Action.
U.S. Appl. No. 11/183,043 Aug. 6, 2008 Office Action.
U.S. Appl. No. 11/183,043 Dec. 2, 2008 Response.
U.S. Appl. No. 11/183,043 Mar. 4, 2009 Office Action.
U.S. Appl. No. 11/183,043 May 4, 2009 Response.
U.S. Appl. No. 11/183,043 Jun. 9, 2009 Office Action.
U.S. Appl. No. 11/183,043 Sep. 4, 2009 Response.
U.S. Appl. No. 11/183,106 Oct. 18, 2007 Office Action.
U.S. Appl. No. 11/183,106 Mar. 12, 2008 Response.
U.S. Appl. No. 11/183,106 May 12, 2008 Office Action.
U.S. Appl. No. 11/183,106 Sep. 2, 2008 Response.
U.S. Appl. No. 11/183,106 Dec. 22, 2008 Office Action.
U.S. Appl. No. 11/183,106 Mar. 11, 2009 Response.
U.S. Appl. No. 11/183,106 Jul. 13, 2009 Office Action.
U.S. Appl. No. 11/183,106 Sep. 24, 2009 Response.
U.S. Appl. No. 11/183,123 Oct. 1, 2008 Office Action.
U.S. Appl. No. 11/183,123 Feb. 11, 2009 Response.
U.S. Appl. No. 11/183,123 Jun. 24, 2009 Office Action.
U.S. Appl. No. 11/183,123 Sep. 22, 2009 Response.
U.S. Appl. No. 11/182,982 Nov. 26, 2008 Office Action.
U.S. Appl. No. 11/182,982 Feb. 23, 2009 Response.
A Taxonomy of Automated Trade Execution Systems, Ian Domowitz, Journal of International Money and Finance, (1993), 12, pp. 607-631.

* cited by examiner eQUOTE ARRIVAL
SELL 10,000 @ 20.36
(W/1,000 EXPOSED)

20.31 | 20.36
15 | 30

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| | 20.36 | 20 | 10 | 90 |
| 15 | 20.31 | | | |
| | MKT | | | |

ADD DISPLAYED SIZE TO THE INSIDE QUOTE,
RESERVE QUANTITY STAYS HIDDEN

ORDER ARRIVAL:
BUY 29,000 @ 20.45

20.31 | 20.36
15 | 30

| LMT | 100ths | LMT | BRK INT | BRK RES |
|---|---|---|---|---|
| | 20.46 | 140 | | |
| 290 | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| | 20.36 | 20 | 10 | 90 |
| 15 | 20.31 | | | |
| | MKT | | | |

KEY
BEST BOOK INTEREST
BROKER INTEREST

FIG.45

KEY

BEST BOOK INTEREST (hatched)

BROKER INTEREST (stippled)

AUTO EX:
12,000 @ 20.36

| 20.31 | 20.36 |
|---|---|
| 15 | 30 |

| LMT | 100ths | LMT | BRK INT | BRK RES |
|---|---|---|---|---|
| | 20.46 | 140 | | |
| 290 | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| | 20.36 | 20 | 10 | 90 |
| 15 | 20.31 | | | |
| | MKT | | | |

RESERVE QUANTITY TRADES AT THE INSIDE QUOTE AND DOES NOT RECEIVE PRICE IMPROVEMENT. THE TRADE WILL GO ON THE TAPE AS 2 PRINTS

EXECUTIONS

1) LMT/BOOK 2,000 @ 20.36
2) LMT/eQUOTE 1,000 @ 20.36 ← FIRST PRINT
3) LMT/RES 9,000 @ 20.36 ← SECOND PRINT

RESIDUAL SWEEP:
17,000 @ 20.43

| 20.31 | 20.36 |
|---|---|
| 15 | 30 |

| LMT | 100ths | LMT | BRK INT | BRK RES |
|---|---|---|---|---|
| | 20.46 | 140 | | |
| 170 | 20.45 | 30 | | |
| | 20.44 | 30 | | |
| | 20.43 | 80 | (7) | |
| | 20.42 | 20 | (6) | |
| | 20.41 | 5 | (5) | |
| | 20.40 | 50 | (4) | |
| | 20.39 | 15 | (3) | |
| | 20.38 | 40 | (2) | |
| | 20.37 | 10 | (1) | |
| | 20.36 | | | |
| 15 | 20.31 | | | |
| | MKT | | | |

DBK CALCULATES THE MAXIMUM SWEEP PRICE FOR AN ORDER BASED ON ALL DISCLOSED AND UNDISCLOSED INTEREST, INCLUDING RESERVE QUANTITY, IN THE BOOK WITHIN THE ORDER'S PRICE RANGE.

EXECUTIONS

1) LMT/BOOK 2,000 @ 20.36
2) LMT/eQUOTE 1,000 @ 20.36
3) LMT/RES 9,000 @ 20.36
4) LMT/BOOK 17,000 @ 20.43

| LMT | 100ths | LMT | SPEC INT |
|---|---|---|---|
| | 20.46 | 140 | |
| | 20.45 | 30 | |
| | 20.44 | 30 | |
| | 20.43 | 80 | |
| | 20.42 | 20 | |
| | 20.41 | 5 | |
| | 20.40 | 50 | |
| | 20.39 | 15 | |
| | 20.38 | 40 | |
| | 20.37 | 10 | |
| | 20.36 | 20 | |
| 15 | 20.30 | | |
| | MKT | | |

SPECIALIST ALGORITHM

ORDER ARRIVAL (AT ALGO)
BUY 29,000 @ 20.45
TA# ABCD77

DAMPEN VOLATILITY–
Y OR NO ?

ALGORITHM DECIDES TO ENTER INTEREST AT 20.37 TO PARTICIPATE IN THE SWEEP AND DAMPEN VOLATILITY

SPECIALIST INTEREST ARRIVAL
(DIRECTED LAYERED INTEREST)
SELL 29,000 @ 20.37
LAST TA# ABCD77

20.30 | 20.36
15 | 20

| LMT | 100ths | LMT | SPEC INT |
|---|---|---|---|
| | 20.46 | 140 | |
| | 20.45 | 30 | |
| | 20.44 | 30 | |
| | 20.43 | 80 | |
| | 20.42 | 20 | |
| | 20.41 | 5 | |
| | 20.40 | 50 | |
| | 20.39 | 15 | |
| | 20.38 | 40 | |
| | 20.37 | 10 | 290 |
| | 20.36 | 20 | |
| 15 | 20.30 | | |
| | MKT | | |

KEY
BEST BOOK INTEREST
SPECIALIST INTEREST

| LMT | 100ths | LMT | SPEC INT |
|---|---|---|---|
| | 20.41 | 5 | |
| | 20.40 | 50 | |
| | 20.39 | 15 | |
| | 20.38 | 40 | |
| | 20.37 | 10 | |
| | 20.36 | 20 | 10 |
| 15 | 20.31 | | |
| 10 | 20.30 | | |
| 10 | 20.29 | | |
| 10 | 20.28 | | |
| 10 | 20.27 | | |
| 10 | 20.26 | | |
| | MKT | | |

20.36 OFFER CONSISTS OF 2,000 BOOK AND 1,000 SPECIALIST

SPECIALIST ALGORITHM 20.31 | 20.36
15 | 30

ORDER ARRIVAL (AT ALGO)
BUY 2,000 @ 20.36
TA# ABCD77

PRICE IMPROVE-
Y OR NO ?

THE ALGORITHM DECIDES TO PROVIDE PRICE IMPROVEMENT @ 20.34

| PRICE IMPROVEMENT PARAMETERS | | |
|---|---|---|
| MIN SPREAD | MAX SPREAD | MIN PI |
| 0.01 | 0.02 | n/a |
| 0.03 | 0.05 | 0.02 |
| 0.06 | 0.10 | 0.03 |
| 0.11 | 0.20 | 0.04 |
| 0.21 | n/a | 0.05 |

SPECIALIST INTEREST ARRIVAL
(PRICE IMPROVEMENT)
SELL 2,000 @ 20.34
LAST TA# ABCD77

20.31 | 20.36
15 | 30

| LMT | 100ths | LMT | SPEC INT |
|---|---|---|---|
| | 20.41 | 5 | |
| | 20.40 | 50 | |
| | 20.39 | 15 | |
| | 20.38 | 40 | |
| | 20.37 | 10 | |
| | 20.36 | 20 | 10 |
| | 20.34 | | 20 |
| 15 | 20.31 | | |
| 10 | 20.30 | | |
| 10 | 20.29 | | |
| 10 | 20.28 | | |
| 10 | 20.27 | | |
| | MKT | | |

OFFER OF PRICE IMPROVEMENT IS NOT QUOTED

MINIMUM PRICE IMPROVEMENT IS CALCULATED OFF THE BEST OFFER

KEY

BEST BOOK INTEREST

SPECIALIST INTEREST

FIG.70

ORDER ARRIVAL
BUY 2,000 @ 20.36
LAST TA# ABCD77

20.31 | 20.36
15 | 30

| LMT | 100ths | LMT | SPEC INT |
|---|---|---|---|
| | 20.41 | 5 | |
| | 20.40 | 50 | |
| | 20.39 | 15 | |
| | 20.38 | 40 | |
| | 20.37 | 10 | |
| 20 | 20.36 | 20 | 10 |
| | 20.34 | | 20 |
| 15 | 20.31 | | |
| 10 | 20.30 | | |
| 10 | 20.29 | | |
| 10 | 20.28 | | |
| 10 | 20.27 | | |
| | MKT | | |

KEY
BEST BOOK INTEREST
SPECIALIST INTEREST

AUTO EX:
2,000 @ 20.34

20.31 | 20.36
15 | 30

| LMT | 100ths | LMT | SPEC INT |
|---|---|---|---|
| | 20.41 | 5 | |
| | 20.40 | 50 | |
| | 20.39 | 15 | |
| | 20.38 | 40 | |
| | 20.37 | 10 | |
| 20 | 20.36 | 20 | 10 |
| | 20.34 | | 20 |
| 15 | 20.31 | | |
| 10 | 20.30 | | |
| 10 | 20.29 | | |
| 10 | 20.28 | | |
| 10 | 20.27 | | |
| | MKT | | |

PRICE IMPROVEMENT MUST FILL THE ENTIRE INCOMING ORDER

EXECUTIONS
1) LMT/SPEC 2,000 @ 20.34

20.31 | 20.36
15 | 30

| LMT | 100ths | LMT | SPEC INT |
|---|---|---|---|
| | 20.41 | 5 | |
| | 20.40 | 50 | |
| | 20.39 | 15 | |
| | 20.38 | 40 | |
| | 20.37 | 10 | |
| | 20.36 | 20 | 10 |
| 15 | 20.31 | | |
| 10 | 20.30 | | |
| 10 | 20.29 | | |
| 10 | 20.28 | | |
| 10 | 20.27 | | |
| 10 | 20.26 | | |
| | MKT | | |

FIG.71

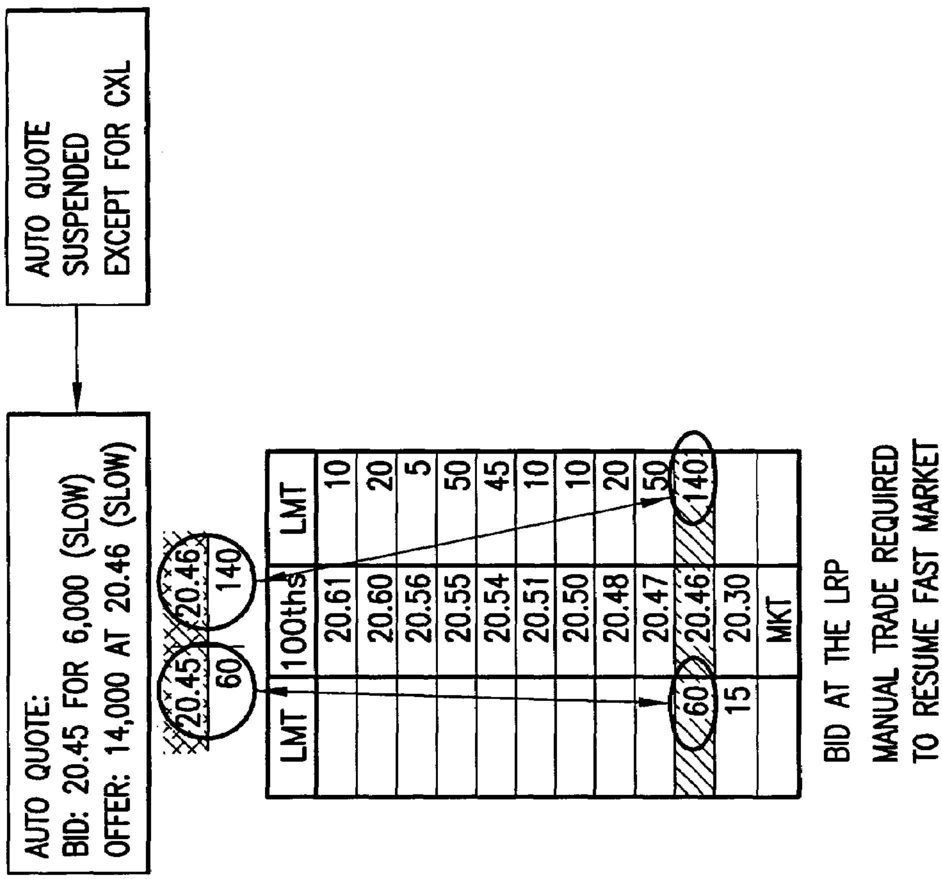
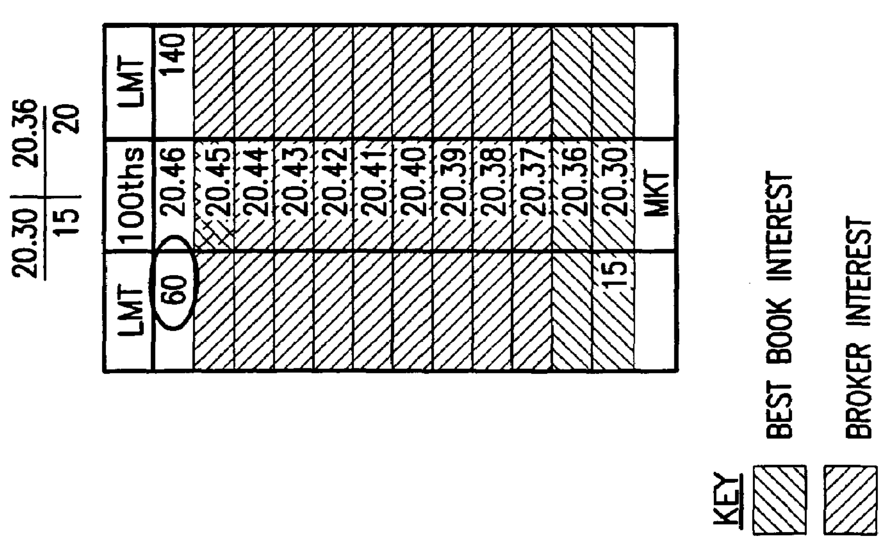
FIG.74

| TRADES | | 30 SEC. RANGE | MOMENTUM LRP | |
|---|---|---|---|---|
| | | | MIN | MAX |
| 10:04:45 | 19.85 | 19.85 – 19.85 | 19.60 | 20.10 |
| 10:04:50 | 19.87 | 19.85 – 19.87 | 19.62 | 20.10 |
| 10:04:54 | 19.90 | 19.85 – 19.90 | 19.65 | 20.10 |
| 10:05:06 | 19.92 | 19.85 – 19.92 | 19.67 | 20.10 |
| 10:05:11 | 19.95 | 19.85 – 19.95 | 19.70 | 20.10 |
| 10:05:17 | 20.00 | 19.87 – 20.00 | 19.75 | 20.12 |
| 10:05:22 | 20.08 | 19.90 – 20.08 | 19.83 | 20.15 |
| 10:05:25 | 20.15 | 19.92 – 20.15 | 19.90 | 20.17 |
| 10:05:31 | 20.13 | 19.92 – 20.15 | 19.90 | 20.17 |
| 10:05:35 | 20.09 | 19.92 – 20.15 | 19.90 | 20.17 |

30 SECOND WINDOW

THE MLRP RANGE IS CALCULATED USING THE GREATER OF 25 CENTS OR 1% OF THE LAST SALE PRICE

AUTOEX AT PRICES LOWER THAN 19.90 AND HIGHER THAN 20.17 WOULD TRIGGER A MLRP AND NOT BE ALLOWED

KEY

SPECIALIST INTEREST

FIG.90

RECEIVE MARKET CENTER B
REPORT:
BOT 1,000 @ 20.07

20.05 | 20.10
20 | 25

REGIONAL BEST B 20.01 2 | 20.11 5 P

| LMT | 100ths | LMT |
|---|---|---|
| | 20.13 | 50 |
| | 20.12 | 10 |
| | 20.11 | 10 |
| | 20.10 | 25 |
| 20 | 20.05 | |
| 20 | 20.04 | |
| 10 | 20.02 | |
| | MKT | |

OPEN COMMITMENTS
1) BUY 500 @ 20.08 (P)

EXECUTIONS
1) MKT/BOOK 1,000 @ 20.07
2) MKT/BOOK 2,500 @ 20.10
3) MKT/ITS-B 1,000 @ 20.07

KEY
BEST BOOK INTEREST

RECEIVE MARKET CENTER P
REPORT:
BOT 500 @ 20.08

20.05 | 20.10
20 | 25

REGIONAL BEST B 20.01 2 | 20.11 5 P

| LMT | 100ths | LMT |
|---|---|---|
| | 20.13 | 50 |
| | 20.12 | 10 |
| | 20.11 | 10 |
| | 20.10 | 25 |
| 20 | 20.05 | |
| 20 | 20.04 | |
| 10 | 20.02 | |
| | MKT | |

EXECUTIONS
1) MKT/BOOK 1,000 @ 20.07
2) MKT/BOOK 2,500 @ 20.10
3) MKT/ITS-B 1,000 @ 20.07
4) MKT/ITS-P 500 @ 20.08

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| | 20.36 | 20 | 10 | 90 |
| 15 | 20.31 | | | |
| | MKT | | | |

CAP ORDERS

➢ BUY 10,000 @ 20.40

ORDER ARRIVAL:
BUY 6,000 @ 20.36

20.31 | 20.36
15 | 30

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| 60 | 20.36 | 20 | 10 | 90 |
| 15 | 20.31 | | | |
| | MKT | | | |

KEY

BEST BOOK INTEREST

BROKER INTEREST

FIG. 134

AUTO EX:
3,000 @ 20.36

| 20.31 | 20.36 |
|---|---|
| 15 | 30 |

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| 60 | 20.36 | 20 | 10 | 90 |
| 15 | 20.31 | | | |
| | MKT | | | |

EXECUTIONS @ 20.36

1) LMT/BOOK 3,000

LMT VERSUS BOOK DISPLAYED SIZE
TRADES AND PRINTS FIRST

KEY

BEST BOOK INTEREST

BROKER INTEREST

ELECT CAP:
3,000 @ 20.36

| 20.31 | 20.36 |
|---|---|
| 15 | 30 |

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| 30 | 20.36 | | | 90 |
| 15 | 20.31 | | | |
| | MKT | | | |

CAP ORDERS

➤ BUY 7,000 @ 20.40
BUY 3,000 @ 20.36 (LMT)

FIG.135

AUTO EX:
3,000 @ 20.36

| 20.31 | 20.36 |
|---|---|
| 15 | 30 |

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| 30 | 20.36 | | | 90 |
| 15 | 20.31 | | | |
| | MKT | | | |

CAP ORDERS

➤ BUY 7,000 @ 20.40
BUY 3,000 @ 20.36 (LMT)

EXECUTIONS @ 20.36

1) LMT/BOOK 3,000
2) LMT/RES 3,000

ELECTED CAP CANNOT TRADE AHEAD OF THE BALANCE OF THE ORDER THAT IS PART OF THE ELECTING SALE, NOR CAN IT TRADE ALONG WITH THE UNEXECUTED PORTION OF THIS ORDER

UN-ELECT CAP:
3,000 @ 20.36

| 20.31 | 20.36 |
|---|---|
| 15 | 30 |

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| | 20.36 | | | 60 |
| 15 | 20.31 | | | |
| | MKT | | | |

CAP ORDERS

➤ BUY 10,000 @ 20.40

KEY

BEST BOOK INTEREST

BROKER INTEREST

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| | 20.36 | 20 | 10 | 90 |
| 15 | 20.31 | | | |
| | MKT | | | |

CAP ORDERS

➤ SELL 10,000 @ 20.30

ORDER ARRIVAL:
BUY 7,000 @ 20.36

20.31 | 20.36
15 | 30

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| 70 | 20.36 | 20 | 10 | 90 |
| 15 | 20.31 | | | |
| | MKT | | | |

KEY

- BEST BOOK INTEREST (hatched)
- BROKER INTEREST (stippled)

FIG. 138

AUTO EX:
4,000 @ 20.36

| 20.31 | 20.36 |
|---|---|
| 15 | 30 |

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| 40 | 20.36 | | | 90 |
| 15 | 20.31 | | | |
| | MKT | | | |

CAP ORDERS
- ➤ SELL 7,000 @ 20.30
  SELL 3,000 @ 20.36 (LMT)

EXECUTIONS @ 20.36
1) LMT/BOOK 3,000
2) LMT/RES 2,000
3) LMT/CAP 2,000

KEY
- BEST BOOK INTEREST
- BROKER INTEREST

UN-ELECT CAP:
1,000 @ 20.36

| 20.31 | 20.36 |
|---|---|
| 15 | 30 |

| LMT | 100ths | LMT | BRK INT | BRK RES |
|---|---|---|---|---|
| | 20.46 | 140 | | |
| | 20.45 | 30 | | |
| | 20.44 | 30 | | |
| | 20.43 | 80 | | |
| | 20.42 | 20 | | |
| | 20.41 | 5 | | |
| | 20.40 | 50 | | |
| | 20.39 | 15 | | |
| | 20.38 | 40 | | |
| | 20.37 | 10 | | |
| | 20.36 | | | 70 |
| 15 | 20.31 | | | |
| | MKT | | | |

CAP ORDERS
- ➤ SELL 8,000 @ 20.30

ELECTED CAP AND RESERVE QUANTITY
TRADE ON PARITY, 2,000 SHARES EACH

FIG.140

CAP ORDER, AUTOMATIC ELECTION UP TO SIZE OF LAST SALE

AUCTION LIMIT ORDER, BID/OFFER SEPARATED BY MIN VARIATION, IMMEDIATE EXECUTION

SYSTEM AND METHOD FOR ORDER SWEEP IN A HYBRID AUCTION MARKET

This application claims priority to U.S. Provisional patent application Ser. Nos. 60/588,625 filed Jul. 15, 2004, 60/592,510 filed Jul. 30, 2004, 60/621,127 filed Oct. 22, 2004, 60/625,645 filed Nov. 5, 2004, 60/626,309 filed Nov. 8, 2004, 60/651,547 filed Feb. 9, 2005, 60/672,673 filed Apr. 19, 2005, and 60/684,274 filed May 25, 2005, all entitled System and Method for Auction Limit Order, the disclosures of which are incorporated herein by reference.

The inventions relate to the field of securities trading, and more particularly to systems and methods for automatic order processing and execution in conjunction with a live floor auction market.

BACKGROUND

Live floor auction markets for securities, commodities, futures and other associated financial instruments have been known for many years. A few examples of these types of U.S. markets include NYSE, AMEX, CME, CBOT, CBOE, and NYMEX. More recently, computer automated markets such as NASDAQ, and other computer automated order matching systems have been introduced. Each of these market types have distinct advantages in certain areas. Systems and methods are needed to provide a greater integration of the live floor auction markets with computer automated markets and order matching systems.

The preceding description is not to be construed as an admission that any of the description is prior art relative to the present invention.

SUMMARY OF THE INVENTION

In one aspect, the invention provides a system and method for executing a securities order. The system and method comprise determining a first price and first size of a published offer to sell shares of a security, and determining a second price and second size of orders to sell shares of the security. The system and method also comprise determining a third price and third size of orders to sell shares of the security, wherein the second price is greater than the published offer and the third price is greater than the second price, and receiving a market order to buy shares of the security with a buy size greater than a sum of the first size and the second size. The system and method also comprise executing at the first price a first portion of the market order that is equal to the first size, and executing at the third price a second portion of the market order, wherein the sum of the size of the first portion and the size of the second portion equals the buy size.

In one aspect, the system and method further comprise after executing at the third price a second portion of the market order, determining whether any orders at the third price remain, and if orders at the third price remain, automatically quoting the third price as the published offer to sell. In one aspect, the system and method further comprise after executing at the third price a second portion of the market order, determining whether any orders at the third price remain, if orders at the third price remain, determining a new third size, and automatically quoting the new third size as a size of the published offer to sell.

In one aspect, the invention provides a system and method for executing a securities order. The system and method comprise determining a first price and first size of a published bid to buy shares of a security, determining a second price and second size of orders to buy shares of the security, determining a third price and third size of orders to buy shares of the security, wherein the second price is less than the published offer and the third price is less than the second price, receiving a market order to sell shares of the security with a sell size greater than a sum of the first size and the second size, executing at the first price a first portion of the market order that is equal to the first size, and executing at the third price a second portion of the market order, wherein the sum of the size of the first portion and the size of the second portion equals the buy size.

In one aspect, the system and method further comprise after executing at the third price a second portion of the market order, determining whether any orders at the third price remain, and if orders at the third price remain, automatically quoting the third price as the published bid to buy. In one aspect, the system and method further comprise after executing at the third price a second portion of the market order, determining whether any orders at the third price remain, if orders at the third price remain, determining a new third size, and automatically quoting the new third size as a size of the published bid to buy.

In one aspect, the invention provides a system and method for executing a securities order. The system and method comprise determining a first price and first size of a published offer to sell shares of a security, and determining a second price and second size of orders to sell shares of the security. The system and method also comprise determining a third price and third size of orders to sell shares of the security, wherein the second price is greater than the published offer and the third price is greater than the second price, and receiving a limit order to buy shares of the security with a limit price equal to the third price and a limit size greater than a sum of the first size and the second size. The system and method also comprise executing at the first price a first portion of the limit order that is equal to the first size, and executing at the third price a second portion of the limit order.

In one aspect of the system and method, the sum of the size of the first portion and the size of the second portion equals the limit size. In one aspect of the system and method, the sum of the size of the first portion and the size of the second portion is less than the limit size, and the system and method further comprise automatically quoting the limit price as a published bid to buy. In one aspect of the system and method, the sum of the size of the first portion and the size of the second portion is less than the limit size, and the system and method further comprise determining a new limit size by subtracting the size of the first portion and the size of the second portion from the limit size, and automatically quoting the new limit size as a published bid to buy.

In one aspect, the invention provides a system and method for executing a securities order. The system and method comprise determining a first price and first size of a published bid to buy shares of a security, and determining a second price and second size of orders to buy shares of the security. The system and method also comprise determining a third price and third size of orders to buy shares of the security, wherein the second price is less than the published offer and the third price is less than the second price, and receiving a limit order to sell shares of the security with a limit price equal to the third price and a limit size greater than a sum of the first size and the second size. The system and method also comprise executing at the first price a first portion of the limit order that is equal to the first size, and executing at the third price a second portion of the limit order.

In one aspect of the system and method, the sum of the size of the first portion and the size of the second portion equals the limit size. In one aspect of the system and method, the sum of the size of the first portion and the size of the second portion is less than the limit size, and the system and method further comprise automatically quoting the limit price as a published bid to buy. In one aspect of the system and method, the sum of the size of the first portion and the size of the second portion is less than the limit size, and the system and method further comprise determining a new limit size by subtracting the size of the first portion and the size of the second portion from the limit size, and automatically quoting the new limit size as a published offer to sell.

In one aspect, the invention provides a system and method for executing a securities order. The system and method comprise determining a first price and first size of a published offer to sell shares of a security, and receiving broker interest to sell the security at a second price and second size. The system and method also comprise determining a third price and third size of orders to sell shares of the security, wherein the second price is greater than the published offer and the third price is greater than the second price, and receiving a market order to buy shares of the security with a buy size greater than a sum of the first size and the second size. The system and method also comprise executing at the first price a first portion of the market order that is equal to the first size, and executing at the third price a second portion of the market order, wherein the broker interest is the contra party for at least some of the second portion.

In one aspect, the system and method further comprise after executing at the third price a second portion of the market order, determining whether any orders at the third price remain, and if orders at the third price remain, automatically quoting the third price as the published offer to sell. In one aspect, the system and method further comprise after executing at the third price a second portion of the market order, determining whether any orders at the third price remain, if orders at the third price remain, determining a new third size, and automatically quoting the new third size as a size of the published offer to sell.

In one aspect, the invention provides a system and method for executing a securities order. The system and method comprise determining a first price and first size of a published bid to buy shares of a security, and receiving broker interest to buy the security at a second price and second size. The system and method also comprise determining a third price and third size of orders to buy shares of the security, wherein the second price is less than the published bid and the third price is less than the second price, and receiving a market order to sell shares of the security with a sell size greater than a sum of the first size and the second size. The system and method also comprise executing at the first price a first portion of the market order that is equal to the first size, and executing at the third price a second portion of the market order, wherein the broker interest is the contra party for at least some of the second portion.

In one aspect, the system and method further comprise after executing at the third price a second portion of the market order, determining whether any orders at the third price remain, and if orders at the third price remain, automatically quoting the third price as the published bid to buy. In one aspect, the system and method further comprise after executing at the third price a second portion of the market order, determining whether any orders at the third price remain, if orders at the third price remain, determining a new third size, and automatically quoting the new third size as a size of the published bid to buy.

The foregoing specific aspects are illustrative of those which can be achieved and are not intended to be exhaustive or limiting of the possible advantages that can be realized. Thus, the objects and advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

Figure 1:
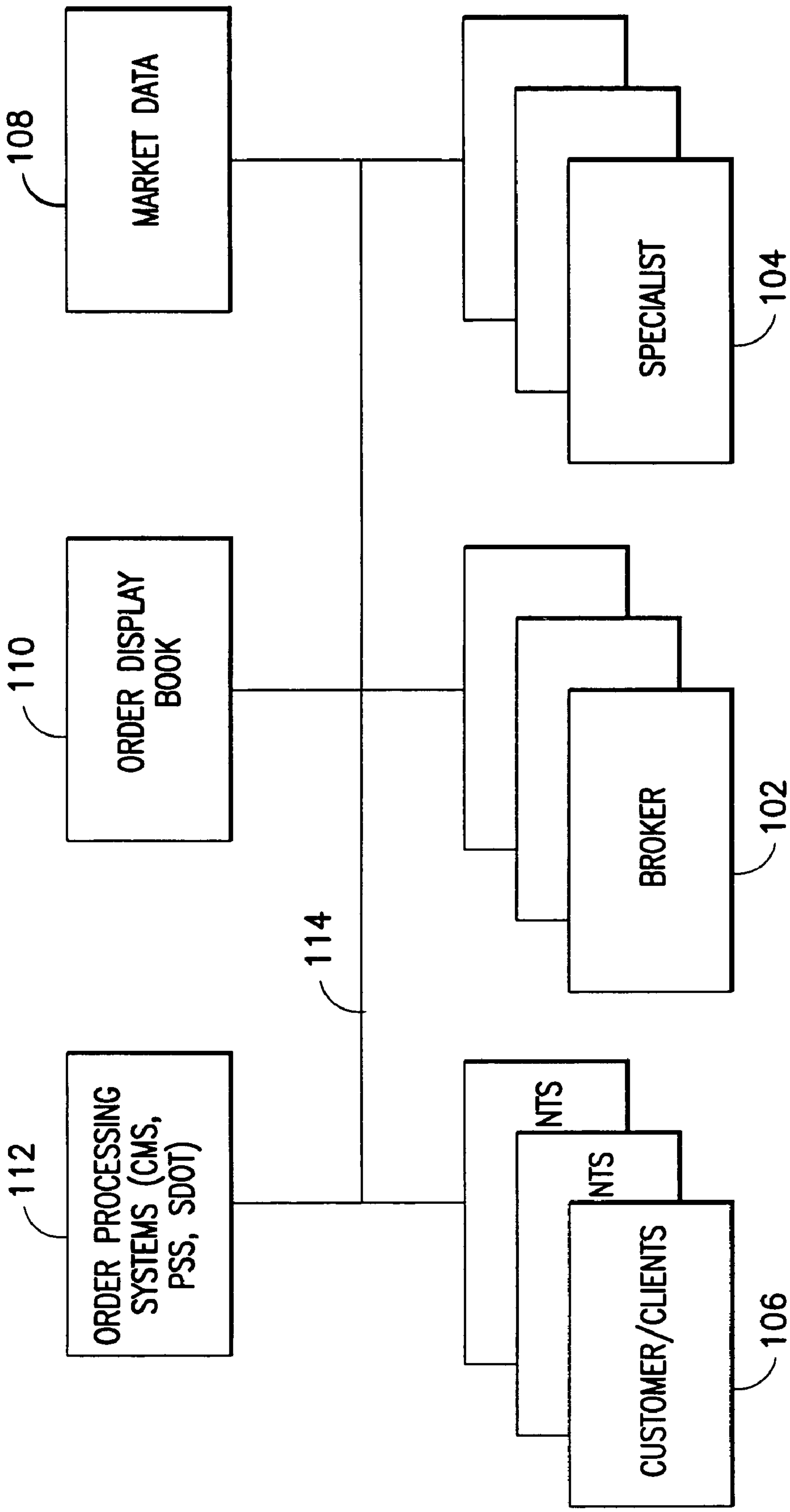
FIG. 1 illustrates an example system according to an embodiment of the inventions.

It is understood that the drawings are for illustration only and are not limiting.

DETAILED DESCRIPTION OF THE DRAWINGS

A number of embodiments and inventions are described below that generally related to securities auction markets incorporating automated order handling and execution in conjunction with a live floor auction. Some of these embodiments and inventions relate to an auction limit order and an auction market order, which are order types that provides opportunities for price improvement.

Other embodiments and inventions include methods for brokers and specialists to show or enter interest that is displayed and represented on an order display book as well as interest that is reserved and not displayed. In addition, embodiments include methods for determining priority and parity among orders and the broker and specialist interest.

Other embodiments and inventions include methods for sweeping market and limit orders against orders and interest from brokers and specialists as represented on an order display book.

Other embodiments and inventions include methods for a specialist to use algorithms to generate messages to quote or trade.

Other embodiments and inventions include methods for determining sweep and momentum liquidity replenishment prices or points, and trading or sweeping at or through those liquidity replenishment prices or points.

Auction Limit Orders

Auction Limit ("AL") orders provide an opportunity for price improvement, thereby preserving a very important choice for customers. The objective is for specialists to represent these orders in the auction market, where the crowd may offer an opportunity for execution at a price better than the bid or offer, while retaining as a backup the electronic functionality of automatic execution in case the specialist or crowd is unable to interact with the order immediately. Price improvement may also result from the order's participation in an automatic execution. AL orders may also provide price improvement to the contra-side of an execution.

AL orders are electronically and immediately executed when they arrive at the order display book if the Exchange quotation is the minimum variation (e.g., 20.45 bid, offered at 20.46).

Where the national best bid or offer is published by another market center, and it causes a minimum variation market when compared with the Exchange best offer or bid, an AL order (or the requisite portion thereof) is automatically routed to such other market center for execution unless the specialist matches the price of the better away offer or bid (e.g., AL order to buy arrives; the Exchange quotation is 20.45 bid, offered at 20.50; a 20.46 offer is published by another market center. The AL order is electronically routed to such other market center unless the specialist matches the away offer of 20.46).

If not automatically executed or routed away upon entry, AL orders to buy are autoquoted the minimum variation above the Exchange best bid and those to sell are autoquoted the minimum variation below the Exchange best offer, thereby becoming the Exchange best bid or offer (e.g., the quote is 20.45 bid, offered at 20.50. An AL buy order with a limit of 20.51 arrives. The new quote is 20.46 bid, offered at 20.50. Similarly, if the quote is 20.45 bid, offered at 20.50 and an AL sell order with a limit of 20.45 arrives, the new quote is 20.45 bid, offered at 20.49).

The fact that the bid or offer is on behalf of an AL order is not shown on the order display book. An AL order is shown in the quote at the price it is bidding or offering. An AL order's limit price is available to the specialist, who requires such information in order to properly represent the order.

The size associated with the bid or offer is the size of the AL order. The size of subsequent AL orders on the same side of the market is aggregated in the bid or offer and executed based on time priority, consistent with the AL orders' limit prices.

Although an AL order risks missing the market in its attempt to obtain price improvement, electronic representation limits that possibility. Once on the order display book, an AL order may participate in any execution, including automatic executions and sweeps (e.g., the quote is 20.46 bid, offered at 20.50, 2,500×2,000. The bid is an AL order. A market order designated for automatic execution (a "MKT NX" order) to sell 2,500 shares arrives. That order automatically executes against the AL order's bid at 20.46).

If an AL order is not executed within 15 seconds of being quoted, the order is automatically executed like any other order designated for automatic execution (buy orders execute against the displayed offer, and sell orders execute against the displayed bid), provided autoquote and automatic executions are available. In addition, any of three events will cause automatic execution of an AL order before 15 seconds has elapsed. The three events are: (i) the arrival of a subsequent order at a better price on the same side of the market as an AL order; (ii) the execution of an order on the same side of the market as an AL order that exhausts some or all of the displayed contra-side volume or the cancellation of some or all of the displayed contra-side volume; and (iii) the displayed contra-side price improves creating a minimum variation market or allowing execution of the AL order with price improvement. In these situations, the order causing the AL order to automatically execute will trade first. Where the limit of an AL order prevents it from automatically executing, it is placed on the order display book at its limit price and handled as a regular limit order.

AL orders may improve an execution price (consistent with the AL order's limit) to avoid trading through a better best bid or offer published by another market, where such better bid or offer is immediately accessible.

For example, the Exchange quote is 20.15 bid, offered at 20.20. Another market is posting the national best offer of 20.18. An AL order to sell, limited to a price of 20.10 arrives. This AL order is automatically offered at 20.19, one penny better than the Exchange best offer existing at the time the AL order arrived. The Exchange quote is now 20.15 bid, offered at 20.19. An order arrives on the Exchange to buy at a limit of 20.19. The order automatically executes against the AL order at a price of 20.18, providing price improvement to the limit order and avoiding trading through the better offer away.

In addition, when a trade causes an automatic execution of an AL order and also elects stop orders and CAP-DI (convert and parity percentage) orders. The AL order is executed first, followed by stop orders and CAP-DI orders. AL orders execute first because they are executable at the time of entry but seek an opportunity for price improvement. Unlike AL orders, CAP-DI and stop orders are contingent orders, not executable until elected. As such, AL orders not designated for automatic execution are executed first.

Auction Market Order

An Auction Market ("AM") order has some features that are similar to an Auction Limit order. In contrast to a MKT NX order, which is designated for automatic execution, an AM order is a market order that is not designated for automatic execution, and provides an opportunity for price improvement. The objective is for specialists to represent these orders in the auction market, where the crowd may offer an opportunity for execution at a price better than the Exchange bid or offer, while retaining as a backup the electronic functionality of automatic execution in case the specialist is unable to interact with the order immediately. Price improvement may also result from the order's participation in an automatic execution. As with AL orders, AM orders may provide price improvement to the contra-side of an execution.

AM orders are electronically executed when they arrive at the book if the Exchange quotation is the minimum variation (e.g., 20.45 bid, offered at 20.46).

Where the national best bid or offer is published by another market center, and it causes a minimum variation market when compared with the Exchange best offer or bid, an AM order (or the requisite portion thereof) is automatically routed to such other market center for execution unless the specialist matches the price of the better away offer or bid (e.g., AM order to buy arrives; the Exchange quotation is 20.45 bid, offered at 20.50; a 20.46 offer is published by another market center. The AM order is electronically routed to such other market center unless the specialist matches the away offer of 20.46).

If not automatically executed or routed away upon entry, AM orders to buy are autoquoted the minimum variation above the Exchange best bid and those to sell are autoquoted the minimum variation below the Exchange best offer, thereby becoming the Exchange best bid or offer (e.g., the quote is 20.45 bid, offered at 20.50. An AM order to buy arrives. The new quote is 20.46 bid, offered at 20.50. Similarly, if the quote is 20.45 bid, offered at 20.50 and an AM order to sell arrives, the new quote is 20.45 bid, offered at 20.49).

The fact that the bid or offer is on behalf of an AM order is not shown on the order display book. An AM order is shown in the quote at the price it is bidding or offering.

The size associated with the bid or offer is the size of the AM order. The size of subsequent AM orders on the same side of the market are aggregated in the bid or offer and executed based on time priority.

Although an AM order risks missing the market in its attempt to obtain price improvement, electronic representation limits that possibility. Once on the book, an AM order may participate in any execution, including automatic executions and sweeps (e.g., the quote is 20.46 bid, offered at 20.50, 2,500×2,000. The bid is an AM order. A MKT NX order (market order designated for automatic execution) to sell 2,500 shares arrives. That MKT NX order automatically executes against the AM order's bid at 20.46).

If an AM order is not executed within 15 seconds of being quoted, the AM order is automatically executed like any other order designated for automatic execution (buy orders will execute against the displayed offer, and sell orders will execute against the displayed bid), provided autoquote and automatic executions are available. In addition, three events will cause automatic execution of an AM order before 15 seconds has elapsed. The three events are: (i) The arrival of a subsequent order at a better price on the same side of the market as an AM order; (ii) The execution of an order on the same side of the market as an AM order that exhausts some or all of the displayed contra-side volume or the cancellation of some or all of the displayed contra-side volume; and (iii) the displayed contra-side price improves creating a minimum variation market or allowing execution of the AM order with price improvement. In these situations, the order causing the AM order to automatically execute will trade first.

Broker Interest (eQuotes)

Embodiments of the invention provide floor brokers with the ability to electronically represent customer interest at varying prices at or outside the quote with respect to the orders they are handling.

The broker agency interest file gives customers the benefit of floor broker knowledge and trading expertise in "working" their orders, while not precluding them from participating in electronic executions and sweeps.

Broker agency interest is not displayed publicly unless it is at or becomes the Exchange best bid or offer. When a broker's agency interest is at or becomes the Exchange best bid or offer, a minimum of 1,000 shares per broker is displayed for agency interest greater than or equal to 1,000 shares and is included in the quote. A broker has discretion to display more than 1,000 shares of his or her agency interest at the best bid or offer. The actual amount of a broker's agency interest, if less than 1,000 shares, is displayed and included in the quote. The displayed agency interest at the best bid or offer is entitled to parity with displayed orders at the bid or offer price other than an order or broker interest entitled to priority. Broker agency interest at the best bid or offer that is not displayed ("reserve interest") must yield to displayed interest in the best bid or offer, but does participate in automatic executions provided there is sufficient contra-side liquidity. An order designated for automatic execution trades against the displayed interest in the quote and any reserve at the bid or offer price before it sweeps the order display book.

After an execution, if there is less than 1,000 shares of broker agency interest displayed at the best bid/offer, but additional amount in the reserve, the displayed amount replenishes so that at least 1,000 shares of agency interest at the best bid/offer is displayed. (For example, if there are 1,000 shares of broker agency interest displayed at the best bid/offer, and 500 shares of reserve (undisplayed at that price), and a 500 share order executes against the 1,000 shares of displayed interest, the remaining 500 shares of reserve interest is added to the 500 shares of remaining broker agency interest at the best bid/offer to total 1,000 shares displayed interest at the best bid/offer.

If what is remaining in the displayed broker agency interest and the reserve at the best bid/offer do not equal 1,000 shares, all of the reserve and remaining displayed broker agency interest at that price is displayed. (For example, if there are 1,600 shares of broker agency interest displayed at the best bid/offer, and 300 shares of reserve interest (undisplayed at that price), and a 1,500 share order executes against the 1,600 shares of displayed broker agency interest, then the remaining 100 shares of broker agency interest plus the full amount of the reserve interest (300 shares), totaling 400 shares, is displayed at the best bid/offer).

Where there is reserve interest at the best bid or offer and an incoming contra-side order designated for automatic execution arrives to trade, there are two separate tape prints at the bid or offer price if the amount of the incoming order exceeds the displayed interest at the best bid or offer. In such case, the first print is at the best bid or offer price for the amount of the displayed interest. The second print, also at the best bid or offer price includes any contra-side CAP-DI orders elected by the first print and reserve interest. Any residual remaining on the incoming order will then sweep the book until executed, its limit price, if any, is reached or an LRP, which is described below, is reached. (For example, there are 5,000 shares of broker agency interest at the best bid or offer consisting of 1,000 shares of displayed interest that is the best bid, and 4,000 shares of reserve interest. The specialist has a CAP-DI order for 10,000 shares to buy with a limit price that allows it to trade at the best bid or offer. If an order designated for automatic execution arrives to sell 5,000 shares, it will be automatically executed as follows: 1,000 shares at the best bid prints first. This automatically elects 1,000 shares of the CAP-DI order and then 4,000 shares print at the best bid price. The 4,000 shares consist of 1,000 shares elected from the buy CAP-DI order and 3,000 shares of the reserve interest. The incoming order traded a total of 5,000 shares at the bid price. 1,000 shares would remain in the reserve interest.

Displayed agency interest in the broker file that establishes the Exchange best bid or offer is entitled to priority at that price for one trade, as is the case with any other bid or offer. Broker agency interest that is outside the quote participates on parity during sweeps, providing liquidity to the market.

Floor broker agency interest at the same price is on parity with each other unless the interest was entitled to priority, and no interest is able to invoke precedence based on size.

Generally, floor brokers with an agency interest file must be in the crowd, representing those orders. The agency interest file allows floor brokers to represent their customers much as they do in the auction market, negotiating execution prices without being required to disclose their intentions. Parity is the agency-auction principle designed as an incentive for crowd participation in the price discovery process, to deepen liquidity particularly as it relates to the working of orders with potential market impact.

The broker agency interest file is not publicly disseminated except for the amount of agency interest displayed at the best bid or offer. The only information concerning the broker agency interest file available to the specialist is the aggregate amount of agency interest at each price. This aggregate information, which includes any reserve interest at the Exchange best bid or offer unless excluded from the aggregate as described elsewhere, is included in a specialist's response to a member's market probe.

A floor broker has discretion to remove his or her agency interest, including any reserve interest at the best bid or offer, from the aggregate information available to the specialist. Broker agency interest removed from the aggregate is displayed when it becomes, or is at, the Exchange best bid or offer. If a better bid or offer is made on the Exchange, such interest is no longer displayed and is not included in the aggregate information unless the floor broker chooses otherwise. Broker agency interest removed from the aggregate information participates in automatic executions and sweeps. It is the responsibility of the broker representing interest not included in the aggregate information to ensure that such interest is properly represented with respect to any manual trade that may occur because the specialist does not have any knowledge of such interest.

Specialist Interest (sQuotes), Specialist API and Algorithms

Specialists provide significant value to the auction market, committing capital to narrow quotes, add liquidity and stabilize prices. Specialists' ability and commitment to absorb short-term fluctuations by bridging temporary gaps in supply and demand keeps the Exchange market fair and orderly and lowers volatility.

Similar to floor broker interest, embodiments of the inventions provide specialists with the ability to electronically represent interest at varying prices at or outside the quote. If the specialist interest is at the best bid or offer, it is displayed and the size of the specialist's interest is included in the best bid or offer. As with floor broker interest, specialist interest is not displayed if it is outside the best bid or offer, unless the specialist chooses to have the interest displayed.

In addition, specialists may, but are not required to, have non-displayed "reserve" interest at the best bid and offer. As with floor broker reserve interest, the specialist must have a minimum amount of interest displayed at the best bid or offer in order to have reserve interest on that side of the quote. In one embodiment, this minimum amount is 2,000 shares (the specialist algorithm may also be programmed to display more than 2,000 shares). Like broker reserve interest, specialist reserve interest yields to displayed interest. Similarly, after an execution, if specialist interest remains at the best bid or offer, the amount displayed is replenished by reserve interest, if any, so that at least a minimum of 2,000 shares of the specialist interest is displayed (or whatever specialist interest remains at the best bid or offer, if less than 2,000 shares).

Automatic executions trade first with all displayed interest at the best bid or offer. If not filled by the displayed interest, the order automatically executes against the non-displayed specialist and floor broker reserve interest, which participate on parity.

Specialists may also supply additional volume at the bid or offer price beyond the amount in the specialist's reserve, if any. This additional volume, which is not part of the reserve and which is not displayed, may complete an order, thereby providing a single-priced execution, or partially fill the remainder of the order. Additional specialist volume yields to displayed and reserve interest.

For example, if 5,000 shares of an automatically executing sell order remains unfilled after trading with the displayed volume at the Exchange published bid and any reserve at that price, the specialist can buy all or some of the 5,000 shares at the bid price. If the specialist buys less than the full size remaining on the executing order, it will sweep the orders on the order display book and floor broker agency and specialist layered interest files to the extent permitted, until filled, its limit, if any, is reached or a LRP is triggered, whichever comes first.

This additional specialist interest cannot trade until all displayed and reserve interest at the bid or offer is exhausted. As there is no other interest at that price available to trade other than the specialist's interest, the specialist is able to trade in any amount with the order.

Automatic executions involving reserve interest and any additional specialist volume will print to the tape separately from the automatic execution of displayed interest at the best bid or offer.

After a sweep, existing specialist interest below the sweep price, in the case of a buy sweep, or above the sweep price, in the case of a sell sweep, that was not included in the sweep due to yielding requirements, is immediately cancelled so that this interest is not autoquoted as the Exchange best bid or offer. The algorithms may send a separate message in order to bid or offer at a price inferior to the sweep price.

To assist specialists, embodiments of the inventions provide specialists with the ability to implement an external quote application interface (Quote API), which transmits messages generated by proprietary algorithms based on predetermined parameters to electronically quote or trade on behalf of their dealer accounts.

Based on predetermined parameters, the algorithms may (i) generate a bid or offer that improves the Exchange best bid or offer price; (ii) withdraw a previously made best bid or offer, provided the algorithmic decision to improve or withdraw a bid or offer is not based on a particular order entering the book; (iii) supplement the size of an existing best bid or offer; (iv) match better bids or offers published by other market centers; (v) facilitate a single-priced execution at the Exchange best bid or offer, provided the entire order is filled; (vi) layer specialist interest at prices outside the quote, enabling the specialist to participate in or price improve a sweep; and (vii) provide meaningful price improvement to orders.

Specialist algorithms send messages to the order display book via the API to quote or trade in reaction to specified types of information. Algorithms have access to the following information: specialist dealer position; quotes; information about orders on the order display book such as limit orders, percentage orders, stop orders, and auction limit and auction market orders ("state of the book"); any publicly available information the specialist firm chooses to supply to the algorithm, such as the Consolidated Quote stream; and incoming orders as they are entering Exchange systems.

In reaction to the information noted above, including an incoming order as it is entering Exchange systems, algorithms generate messages to quote or trade as follows.

Quoting messages: supplement the size of the existing Exchange published best bid or offer; place within the order display book specialist reserve interest at the Exchange published best bid and offer; layer within the order display book specialist interest at varying prices outside the published Exchange quotation; establish the Exchange best bid and offer; and withdraw previously established specialist interest at the Exchange best bid and offer.

Trading messages: provide additional specialist volume to partially or completely fill an order at the Exchange published best bid or offer; match better bids and offers published by other market centers where automatic executions are immediately available; provide price improvement to an order; and trade with the Exchange published quotation.

The order display book processes an algorithmic message after the order immediately preceding the generation of such message is processed. In addition, algorithmic messages include certain codes and identifiers for each permissible action.

To ensure that an algorithmic message to trade with the Exchange published quotation does not possess any advantage with respect to information about an incoming order before it is processed by the order display book, an algorithmic message to trade with the Exchange published bid or offer includes, among other things, information designated by the Exchange to indicate that such bid or offer has been publicly disseminated, as well as information identifying the order to which the message is reacting, if any and the order immediately preceding the generation of such algorithmic message.

To ensure that an algorithmic message to trade with the Exchange published quotation does not possess any time advantage in reaching the order display book, Exchange systems make certain that such messages are delivered to the book in such a manner that specialists and other market participants have a similar opportunity to trade with the Exchange's published quotation.

For example, a buy order arrives at the Exchange with a limit price that is better than the existing Exchange best bid, but is not auto-executable, as the limit is below the existing Exchange best offer. This becomes the Exchange's new published best bid. Based on its predetermined parameter, the specialist's algorithm generates a message to hit this bid. In order for this message to be processed by Exchange systems, the message includes a reason code (e.g. "trade with bid") the identifier for the buy order (e.g. the order to which the algorithm is reacting), the identifier of the order immediately preceding the algorithmic message (which may be the same as the buy order), and the identifier of the newly-quoted bid. In addition, the algorithmic message to trade with the new best bid is delayed from reaching the order display book until a period of time has elapsed to ensure that the specialist does not have a time advantage in the routing of its trading message to the order display book. The same scenario applies to an offer to sell where the limit is above the Exchange best bid.

Algorithmic messages delivered via the API include a code identifying the reason for the algorithmic action (e.g. "match ITS," "price improvement," "hit bid"), the unique identifiers of the order to which the algorithm is reacting and the order immediately preceding the generation of the algorithmic message. In addition, algorithmic actions to trade with the Exchange published bid or offer also include the unique identifier for the quote to which the algorithm is reacting.

Identification of a particular order or quote to which the algorithm is reacting when sending a message via the API does not guarantee that the specialist will trade with that order or quote or that the specialist has priority in trading with that order or quote.

The API does not transmit algorithmic messages during the time a block-size transaction involving orders on the order display book is being reported pursuant to manual reporting. Algorithms may generate a bid or offer that improves the Exchange best bid or offer or supplements the size of an existing best bid or offer in the infrequent situations when automatic executions are suspended, but autoquote is active. This benefits the market by permitting an opportunity for the specialist to provide liquidity and/or narrow the quote. These situations include: (i) when the Exchange published quote is such that a Momentum LRP is triggered by a trade at the bid or offer; or (ii) an order in a high-priced security arrives.

The algorithms enable the specialists on behalf of the dealer account to electronically provide price improvement to automatic executions, provided the following conditions are met: (i) the specialist is represented in the published bid or offer; and (ii) the price improvement provided by the specialist is (a) 0.01 when the quote spread is 0.02; (b) at least 0.02 where the quote spread is 0.03-0.05, and (c) at least 0.03 where the quote spread is 0.06 or more.

As examples:

(1) If the Exchange quotation is 20.10-20.15, and the specialist is represented in both the bid and offer, the algorithm can provide price improvement by buying at 20.12, and selling at 20.13.

(2) If the Exchange quotation is 20.10-20.16, and the specialist is represented in both the bid and the offer, the algorithm can buy at 20.13 and sell at 20.13.

(3) If the Exchange quotation is 20.10-20.12, and the specialist is represented in both the bid and the offer, the algorithm can buy at 20.11 and sell at 20.11.

Algorithms are designed to have access to public information as well as orders entering the system. An algorithmic message improving the Exchange best bid or offer or withdrawing a previously established best bid or offer is not based on an incoming order. Such new bid or offer may be the minimum variation or more than the previous best bid or offer. An algorithmic message to provide price improvement to an automatic execution generated in reaction to an incoming order must comply with the conditions noted, including price improvement of more than the minimum variation. Electronic messages are not generated by algorithms while a manual block-size trade is being reported or when autoquote and automatic executions are unavailable.

Algorithms generate messages only in reaction to one order at a time and only as that order is entering the system. Algorithms are required to identify the specific order to which they are reacting. The fact that algorithms have generated a message in response to a particular order does not guarantee the specialist interest will be able to interact with that order, nor does it give the specialist interest priority in trading with that order. Specialist interest that does not trade with the order identified by the algorithms, for example, because the specialist order did not arrive at the book in time, or the specialist has to yield to the book, are automatically cancelled.

Algorithms may provide price improvement to AL and AM orders by generating a message to trade with the order before it enters the order display book, or executing it at the quote once the AL or AM order has entered the order display book. Algorithms do not send messages via the API that will trigger the automatic execution of an AL or AM order or that will result in such orders trading with the specialist's existing contra-side bid or offer.

Liquidity Replenishment Prices

Liquidity Replenishment Prices ("LRPs") protect customers by moderating volatility resulting from electronic executions. Where specialists and floor brokers participate in the price discovery process, volatility moderators are not necessary and auction market transactions are not subject to them. LRP parameters were selected after careful evaluation and discussions with market participants. They are designed to impact automatic executions infrequently. An LRP is triggered by a sweep or electronic trading that results in rapid price movement over a short period. An LRP converts the Hybrid Market (fast quote) to an auction market (slow quote) only on a temporary basis, in order to moderate volatility by affording an opportunity for new orders and crowd and specialist interest to add liquidity.

When reached, LRPs allow buyers and sellers to react to fast changing market conditions and provide an opportunity for orders to interact with crowd interest not encompassed in the broker agency interest file and with specialist interest, enabling the auction market to supplement liquidity and lower volatility. IOC orders are cancelled automatically when automatic execution is suspended by a slow quote as a result of a LRP. This gives customers the opportunity to obtain an automatic execution in another market, even if that price is inferior to the Exchange best bid or offer.

Two LRPs are provided: Sweep Liquidity Replenishment Points or Prices ("Sweep LRPs") and Momentum Liquidity Replenishment Points or Prices ("Momentum LRPs"). The most restrictive of the Sweep LRP or Momentum LRP is disseminated to customers. Sweep LRPs and Momentum LRPs, are pre-determined price points at which the Hybrid Market briefly converts to auction market trading only (e.g., fast quote to slow quote).

Sweep Liquidity Replenishment Prices

The Sweep LRP is like a price distance and is set at the nearest five-cent increment outside the Exchange best bid and offer, that is at least five cents away from the Exchange best bid and offer (e.g., where the Exchange quote is 20.05 bid, offered at 20.10, the Sweep LRPs are 20.00 and 20.15. Where the Exchange quote is 20.04 bid, offered at 20.11, the Sweep LRPs are 19.95 and 20.20). When a Sweep LRP is reached, the sweeping order trades at that price to the extent of the volume available and then the market is autoquoted slow at the Sweep LRP if there is stock remaining on the order. If not, the next best bid or offer is autoquoted slow. Automatic executions and autoquote are suspended, but incoming orders and cancellations continue to be reflected automatically on the order display book. If the displayed bid or offer on the contra-side cancels, a new bid or offer is autoquoted, in effect overriding the suspension partial autoquote.

Automatic executions and autoquote resume (e.g., slow quote to fast quote) in no more than five seconds where the sweeping order is filled in its entirety (e.g., no residual exists), where the residual is cancelled (e.g., the sweeping order is IOC), or where the residual's limit price is the Sweep LRP price, unless the specialist manually trades or quotes the market before five seconds have elapsed.

Similarly, automatic executions and autoquote resume in no more than 10 seconds where a residual exists and its limit price is above the Sweep LRP price, but it does not create a locked or crossed market, unless the specialist has manually traded or quoted the market before 10 seconds have elapsed. It is expected that the specialist will quote or trade before 10 seconds have elapsed, unless an imbalance exists, a trade is being put together in the crowd, or market conditions otherwise prevent. In any event, automatic executions and autoquote resume (slow quote to fast quote) after 10 seconds.

Where a residual exists limited to a price above the Sweep LRP and the limit price creates a locked or crossed market or when a locked or crossed market results from the entry of orders and cancellations during the 5- and 10-second periods described above, automatic executions and autoquote resume with a manual trade. If the locking or crossing residual or order cancels, automatic executions and autoquote resume within the relevant 5- or 10-second timeframe described above, unless a manual trade or quote occurs before then.

Momentum Liquidity Replenishment Prices

A Momentum LRP is like a price velocity and it is reached when the price of a security has moved the greater of twenty-five cents or 1% of its price, within 30 seconds or less. The Momentum LRP range is calculated by adding the greater of twenty-five cents or 1% of a security's price, to its lowest price within a rolling 30-second period and subtracting that amount from its highest price within the same period. Where there are no trades within a 30-second period, the last sale price is used in calculating the Momentum LRP.

For example, a Momentum LRP is reached in a security that is trading at 18.00 when the price moves 0.25 in 30 seconds or less. A Momentum LRP is reached in a security that is trading at 81.00 when the price moves 0.81 in 30 seconds or less. Intraday price changes are taken into account and may widen or narrow the Momentum LRP range. (e.g., a security may start the day with a Momentum LRP range of twenty-five cents, with intraday price changes expanding the Momentum LRP range to 1% of its price).

Momentum LRP ranges are calculated using the high and low trades on the Exchange within the prior 30 seconds. The Momentum LRP range can change based on an event (e.g., a new trade) or the passage of time.

After an order designated for automatic execution reaches a Momentum LRP trades at that price to the extent possible, automatic executions and autoquote are suspended. The order display book is automatically updated by incoming orders and cancellations. Automatic executions and autoquote will resume in no more than 10 seconds unless the specialist has quoted or traded before then. As noted above, the specialist is expected to trade or requote the stock in less than 10 seconds unless conditions in the stock prevent this. Where incoming orders and cancellations cause a locked or crossed market, autoquote and automatic executions will resume with a trade.

A Momentum LRP may cause the suspension of automatic executions on the side of the market where the bid or offer is at a price beyond the Momentum LRP range, as an automatic execution could not occur at that price. For example, if the market is 20.05 bid, offered at 20.10, and the last sale is 20.08, and the Momentum LRP range is 19.80-20.09 based on high and low trades within the operative 30-second period, a trade could take place at the bid price because it falls within the Momentum LRP range, but a trade cannot take place at the offer price (20.10) because it falls outside the Momentum LRP range. As a result, automatic executions would be suspended on the offer side, but continue on the bid side. This is indicated systemically by a slow quote in the same way as any other time an automatic execution is unavailable. Autoquoting will continue and orders and cancellations will update the order display book. Automatic executions will resume when a bid or offer within the Momentum LRP range is autoquoted or the Momentum LRP range changes as a result of the moving 30-second timeframe.

Automatic executions may occur at prices at or within the Momentum LRP range. Automatic executions that could occur at prices outside the Momentum LRP range will cause the suspension of automatic execution.

An Example System

Referring to FIG. 1, an example system 100 according to various embodiments of the inventions includes Brokers 102, Specialists 104, and Customers or clients 106, who generate orders, or participate in the management and execution of orders. System 100 also includes source of market date or other information 108 that is relevant to decision making by Brokers 102, Specialists 104 and Customers or clients 106. Tools for a specialist to manage and view orders, such as an order display book 110 are also part of system 100. Other order processing systems 112, such as a Common Message Switch (CMS), Post Support System (PSS), and Designated Order Turnaround (SDOT) as well as network(s) 114 connecting the various elements are part of system 100. Although not illustrated in the figure, elements of system 100 that are used by the brokers, specialists and customers include general purpose computers, as well as special purpose computers, such as handheld devices. The computers generally include a central processor (CPU), memory for processing software instructions that is stored on fixed and removable media, as well as input/output devices such as keyboards, monitors, printers, pointing devices, and system busses. All of these systems use information signal to communicate as needed. Network 114 may be a LAN, WAN, the Ethernet, the PSTN, or any form of wireless or wired network.

Examples of the Methods

Figure 2:
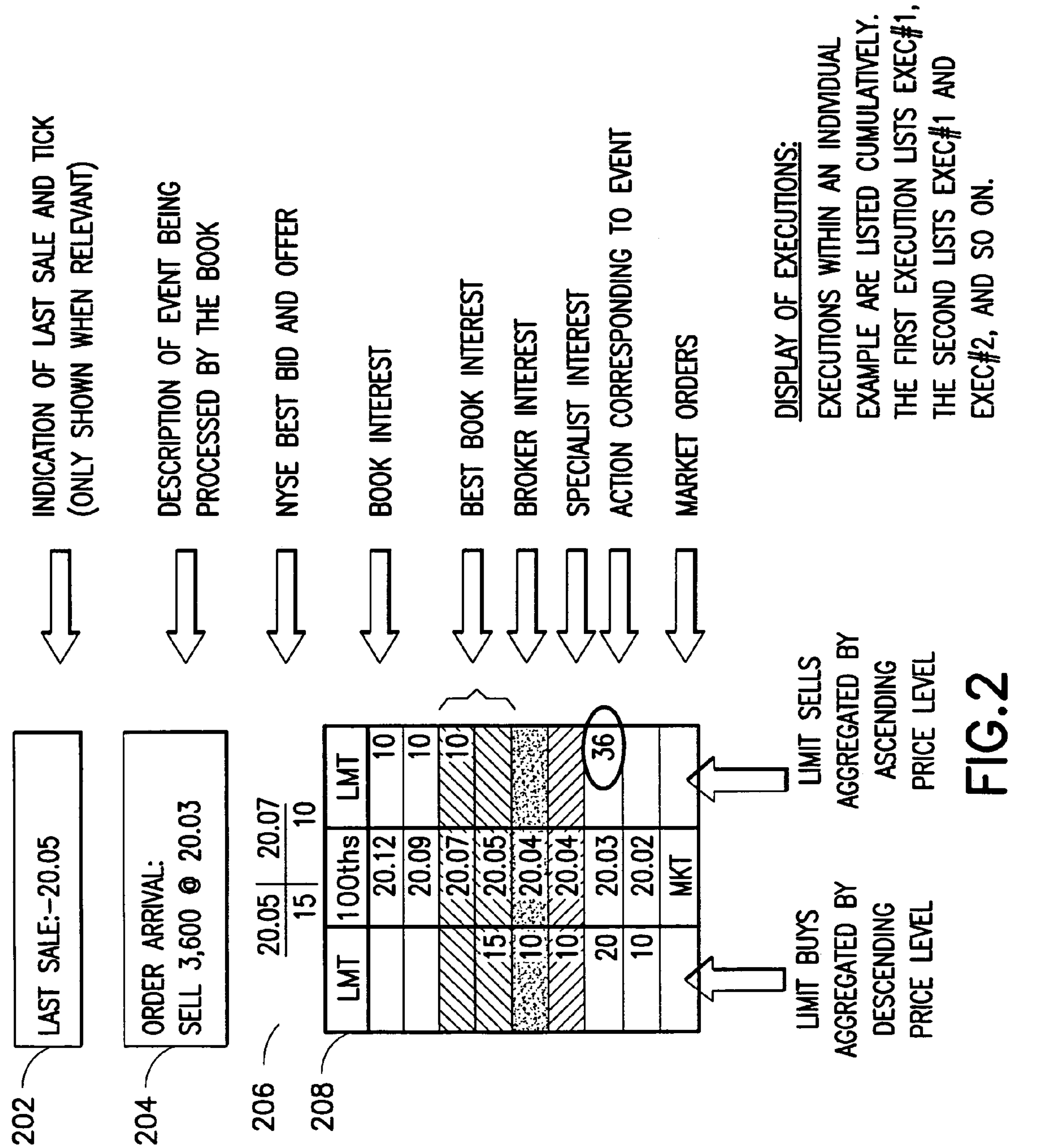
FIG. 2 illustrates a legend for use with FIGS. 3-42 and 44-156.

The description above explains the various embodiments of the inventions. Examples of those embodiments are provide in the figures and described below. In figures used to describe the examples, an example order display is provided to show progress as an order is handled and executed. FIG. 2 provides a legend of sorts for FIGS. 3-42 and 44-156, and is a pictorial representation of the state of the market (i.e., last sale/tick, Exchange best bid or offer) order arrivals and executions. As is customary, quantities are in round lots (100's) and the illustrations show an action on an order display book after an event happens. The displays are illustrative to show the methods and are not limiting.

Figure 3:
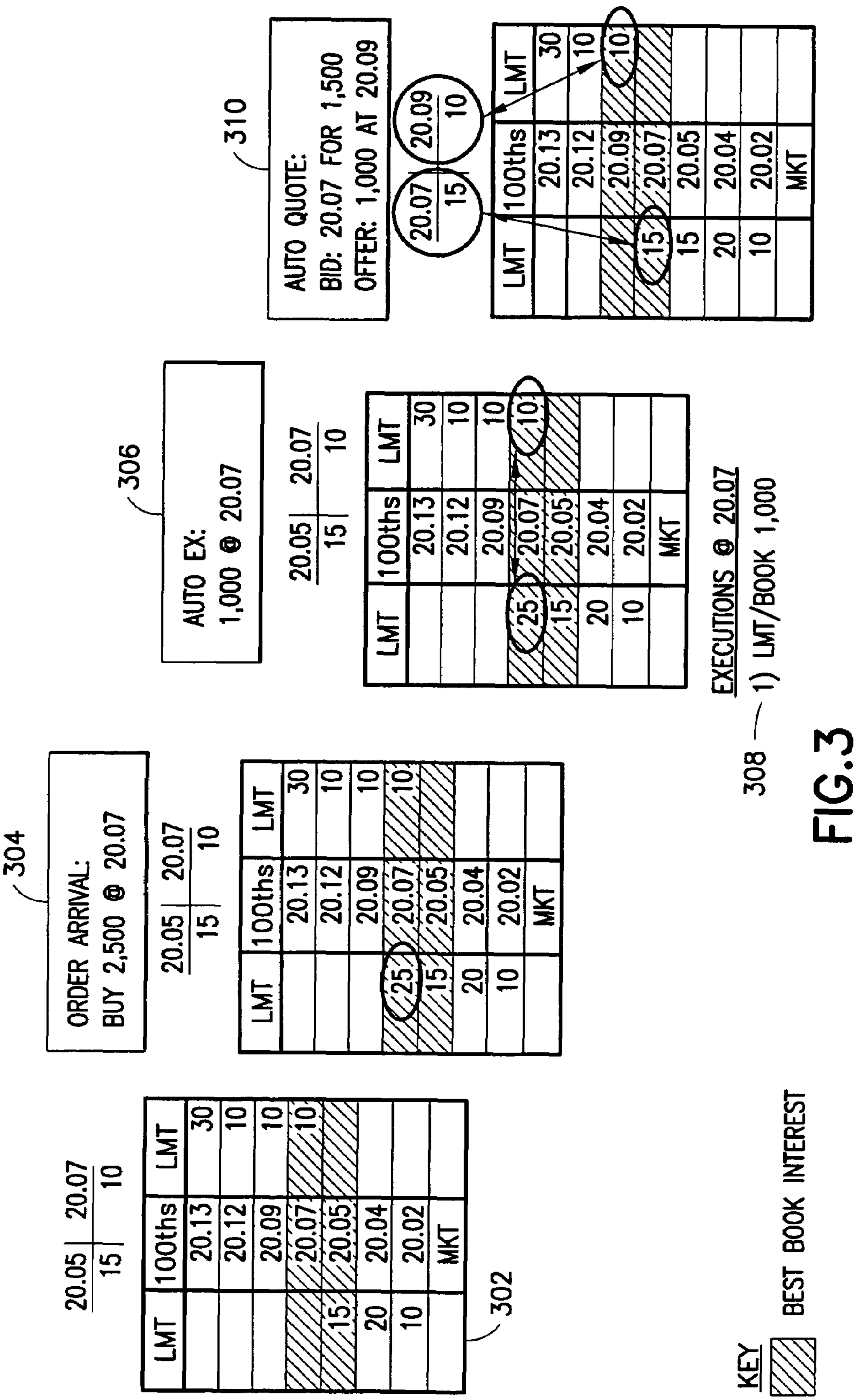
FIGS. 3-42 and 44-156 illustrate orders transactions in various embodiments of the inventions (there is no FIG. 43)

In FIG. 2, a box 202 at the top indicates the last sale and tick, where it is relevant to the example. Below that, a box 204 provides a description of an event being processed by the order display book. Below box 204 is an indication 206 of the Exchange best bid and best offer. The best bid is the highest price that someone is willing to pay to buy the security, while the best offer is the lowest price to sell the security. The numbers above the cross are the prices of the best bid and best offer, while the numbers below the cross are the size or number of shares at the respective best bid and best offer. As noted, the size is in round lots of 100, so as illustrated in FIG. 2, the best bid is $20.05 and the number of shares bid at $20.05 is 1,500. The best offer is $20.07 and the number of shares offered at $20.07 is 1000. The spread is the difference between the bid and offer, and in FIG. 2 the spread is two cents ($0.02). Immediately below the best bid and best offer, is a table 208 that shows orders and interest on an order display book. The columns on the left and right (labeled LMT) include a number of shares (again in round lots of 100 shares) at the price in the center column. The prices are arranged in order with highest prices at the top and lowest prices at the bottom. The order display book shows limit orders, as well as broker interest and specialist interest. Book interest that is not at the best bid or offer is in white without any texture or cross-hatching. Book interest that is at the best bid or offer has diagonal cross-hatching from upper right to lower left, while specialist interest has diagonal cross-hatching from upper left to lower right. Broker interest has a dot texture. An action corresponding to an event is circled, and market orders are identified at the bottom of the table FIG. 3 illustrates automatic execution of a limit order at the inside quote price up to the displayed size, followed by autoquote of the unexecuted balance of the order. The state of the order display book before receipt of the limit order is at 302. The best bid and offer is $20.05 bid for 1,500 shares and $20.07 offered for 1,000 shares. A limit order arrives (304) to buy 2,500 shares at $20.07, which happens to be the best offer price, so system 100 automatically executes 1000 shares of the limit order at $20.07 (306, 308). The automatic execution leaves 1,500 shares of the limit order unexecuted, so system 100 automatically quotes the unexecuted 1,500 shares at $20.07 as the best bid, and updates the best offer to $20.09 for 1,000 shares from orders that were previously on the order display book (310).

Figure 4:
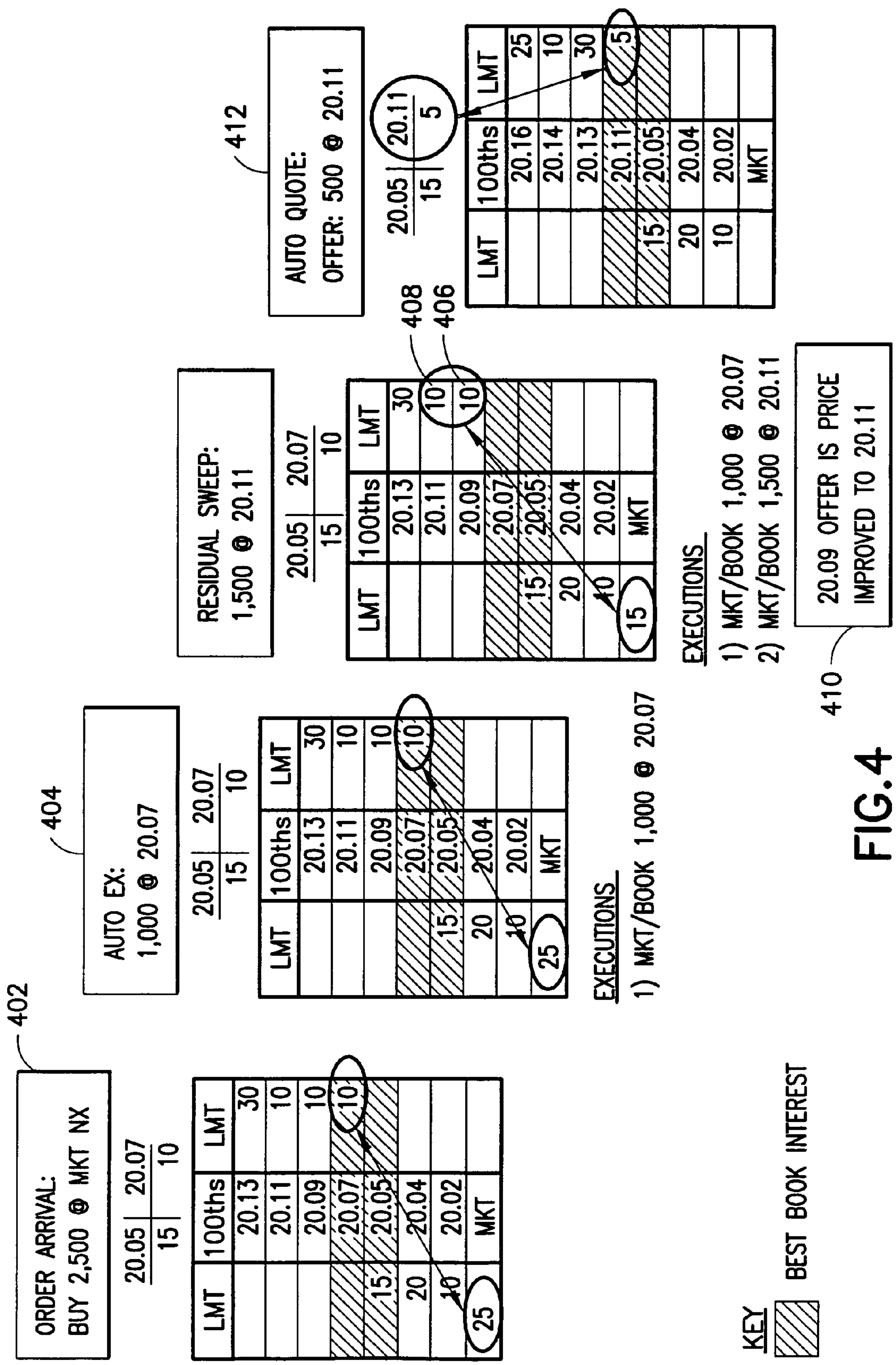

FIG. 4 illustrates automatic execution of a market order to by 2,500 shares (402) that is identified for automatic execution (MKT NX). A market order identified for automatic execution (MKT NX) is different from an Auction Market (AM) order. The MKT NX order is immediately executed and does not receive price improvement, as an AM order may. In this example, the execution is at the inside price of $20.07 up to the displayed size of 1,000 (404), followed by a sweep of the residual 1,500 shares to fill the rest of the market order. On the order display book 1,000 shares are offered at $20.09 and 1,000 shares are offered at $20.11. In order for system 100 to fill the 1,500 residual shares from the market order, all 1,000 shares at $20.09 (406) are required, and 500 of the shares at $20.11 (408) are required. As provided in embodiments of the invention, the execution price of the sweep for 1,500 shares is $20.11. This means that the 1,000 shares on the order display book at $20.09 were price improved to $20.11 (410). After the auto execution, 500 shares to sell remain on the order display book at $20.11, so the best offer is automatically quoted at $20.11 for 500 shares (412).

Figure 5:
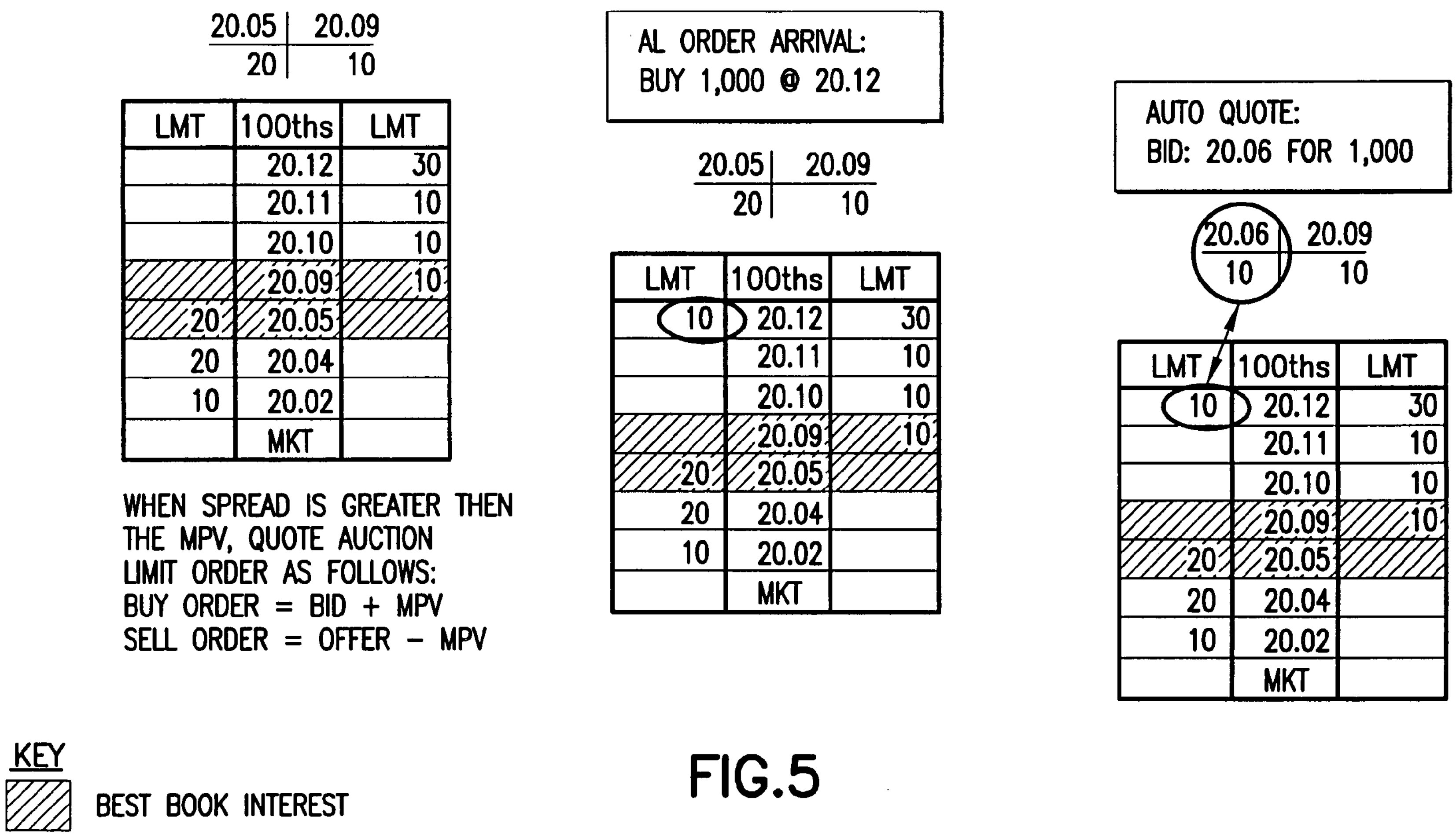

FIG. 5 illustrates arrival of a marketable AL order. The bid is $20.05 and the offer is $20.09. To be marketable, the spread must be more than the minimum price variation (MPV) which in one embodiment is one cent ($0.01), and an AL buy order must be priced at the bid plus the MPV or higher, while an AL sell order must be priced at the offer minus the MPV or lower. In the illustrated example, the spread is four cents, and the AL order is an order to buy with a price of $20.12, which is equal to or more than the offer plus 0.01 ($20.09+0.01=$20.10). Thus, the AL buy order is marketable. Immediately upon receipt, the size of the AL order is autoquoted as the best bid with a price that is the previous bid plus the MPV ($20.05+0.01=$20.06).

Figure 6:
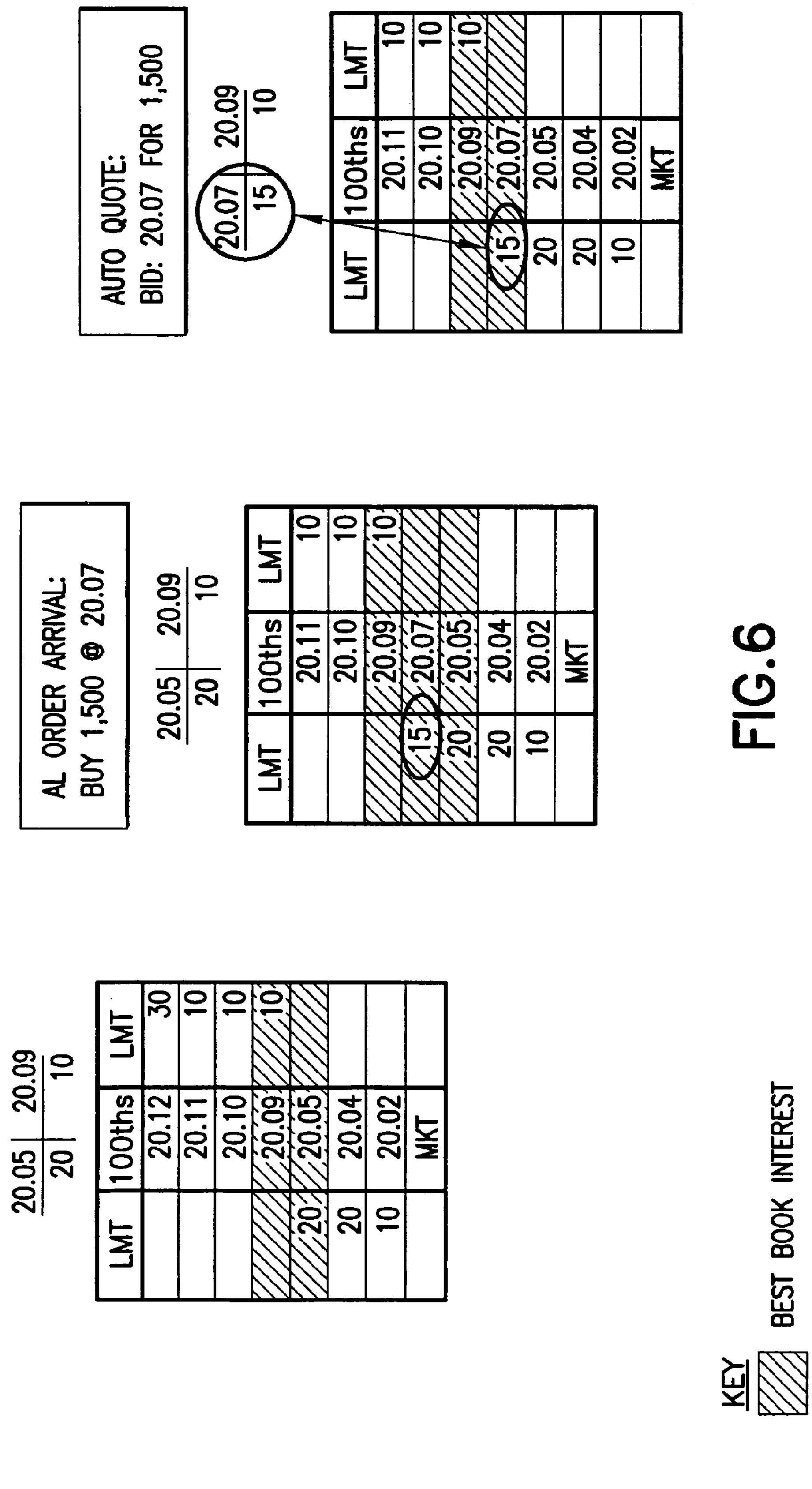

FIG. 6 illustrates arrival of an AL order that is not marketable. As in the previous example, the bid is $20.05 and the offer is $20.09. System 100 receives an AL order to buy 1,500 shares at $20.07. Because the AL price is not equal to or more than the offer plus 0.01 ($20.09+0.01=$20.10), the AL order is not marketable. In this case, the AL order is converted to a regular limit order on the order display book and it becomes the new bid for 1,500 shares at $20.07.

Figure 7:
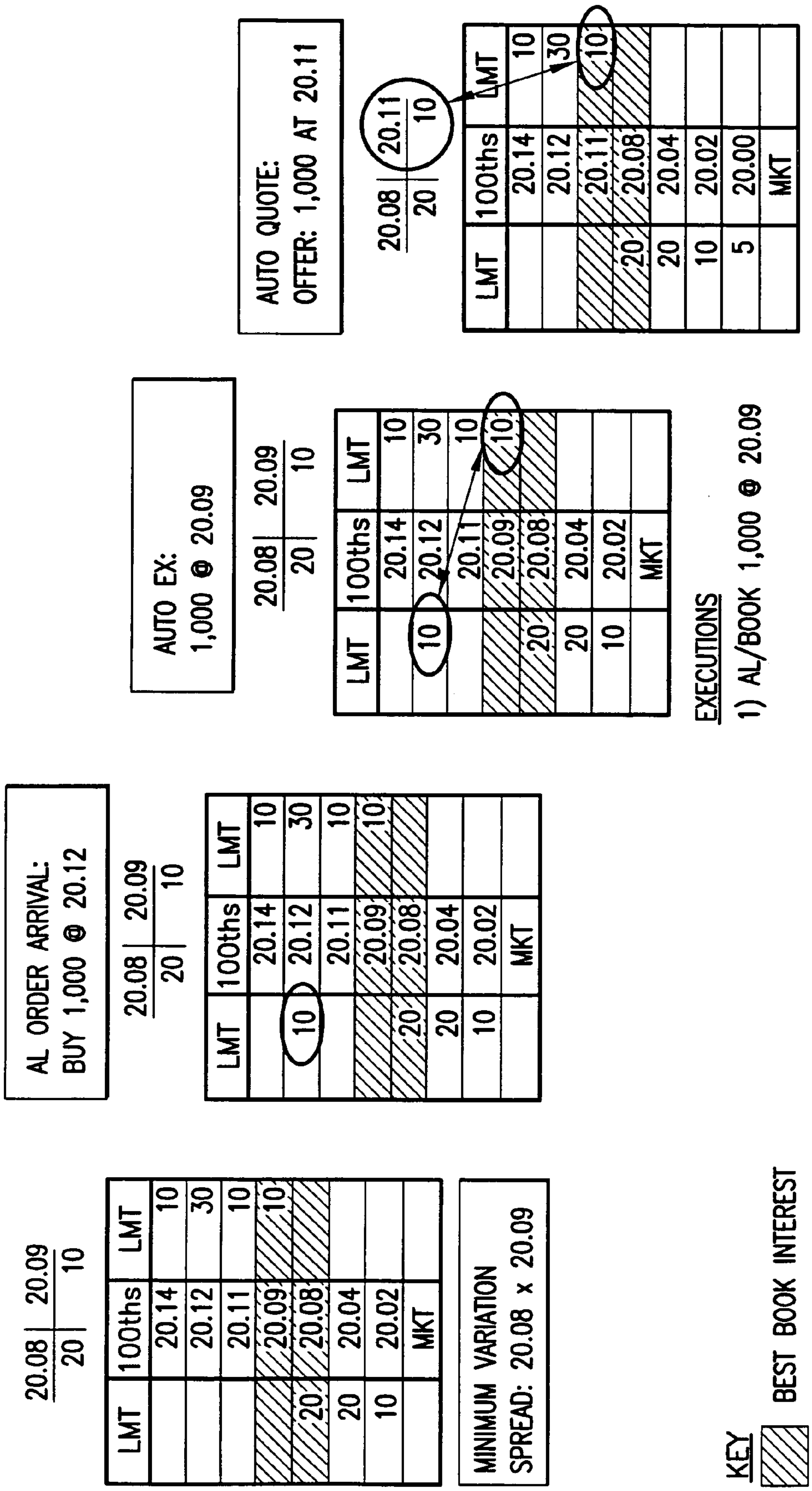

FIG. 7 illustrates arrival of a marketable AL order with the spread at the minimum price variation. Here, the bid is $20.08 and the offer is $20.09, and the spread is thus one cent, which is the minimum price variation. The AL order arrives to buy 1,000 shares at $20.12 which is a marketable AL order, but because the spread is the minimum price variation, the AL order is immediately executed at the offer price of $20.09, instead of being autoquoted. In this example the size of the offer is 1,000 and the AL order is for 1,000 shares, so the execution takes all of the offer size. After execution, system autoquotes the next highest sell order ($20.11) that is on the order display book.

Figure 8:
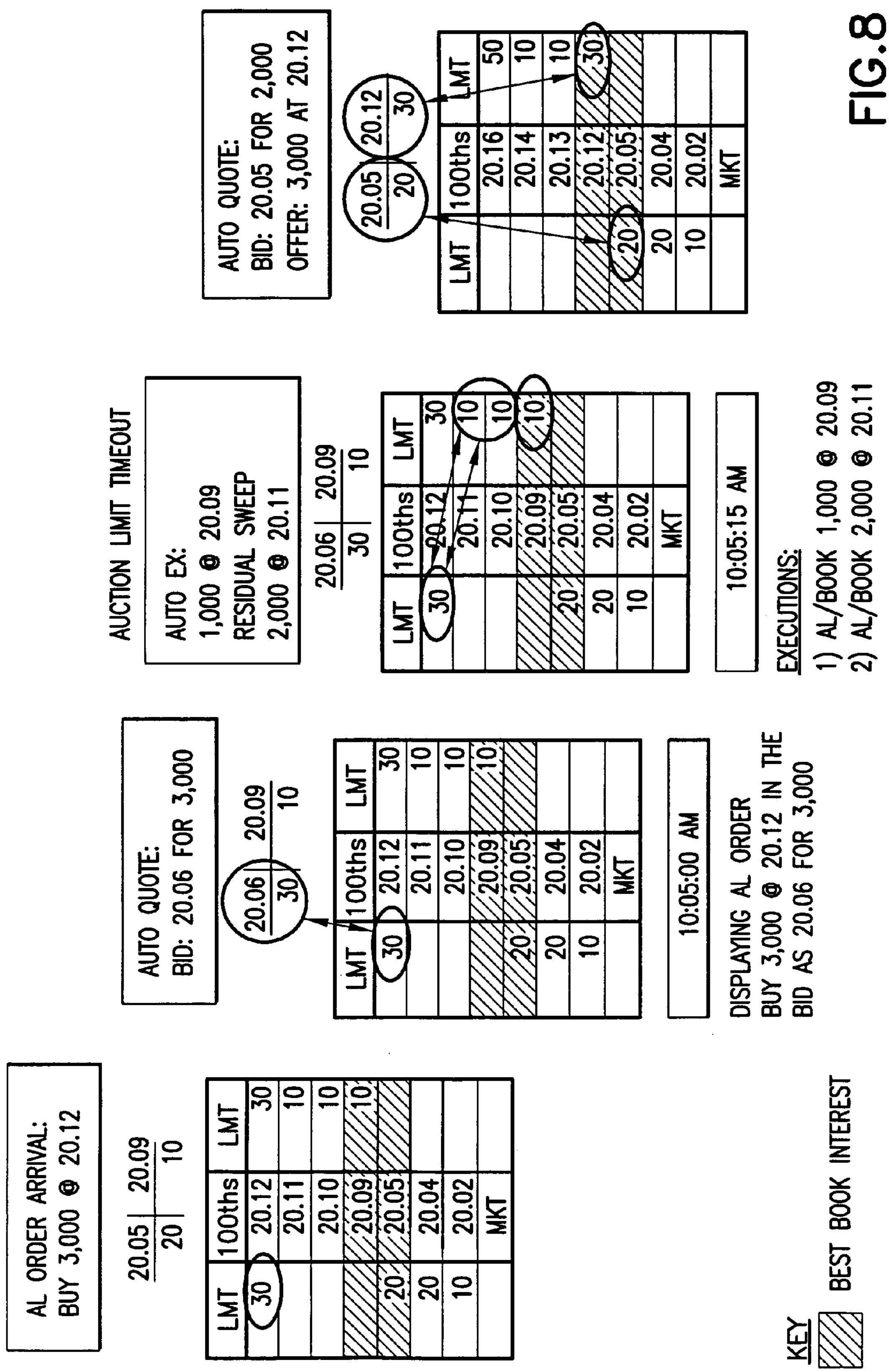

FIG. 8 illustrates a marketable AL order that is autoquoted and then automatically executed after a timeout expires. Here, the bid is $20.05 and the offer is $20.09. An AL order to buy 3,000 shares at $20.12 arrives, and is autoquoted at $20.06. This starts a timer, which in one embodiment runs for 15 seconds. When the timer expires and the AL order has not executed, it is automatically executed against the published offer and if any size remains in the AL order, that size is swept against orders on the order display book. In the example, the size of the offer is 1,000 shares and the AL order size is 3,000 shares. This means that 1,000 shares of the AL order execute at the price of the offer ($20.09) and the remaining 2,000 shares sweep the order display book. On the order display book there are 1,000 shares at $20.10 and 1,000 shares at $20.11. This means that the AL order needs all of the shares at $20.10 and $20.11. So, the 2,000 shares are executed at $20.11, providing price improvement to the 1,000 shares on the order display book at $20.10. Because the AL order sweep took all of the size at $20.11, the next offer on the order display book (3,000 shares at $20.12) is autoquoted.

Figure 9:
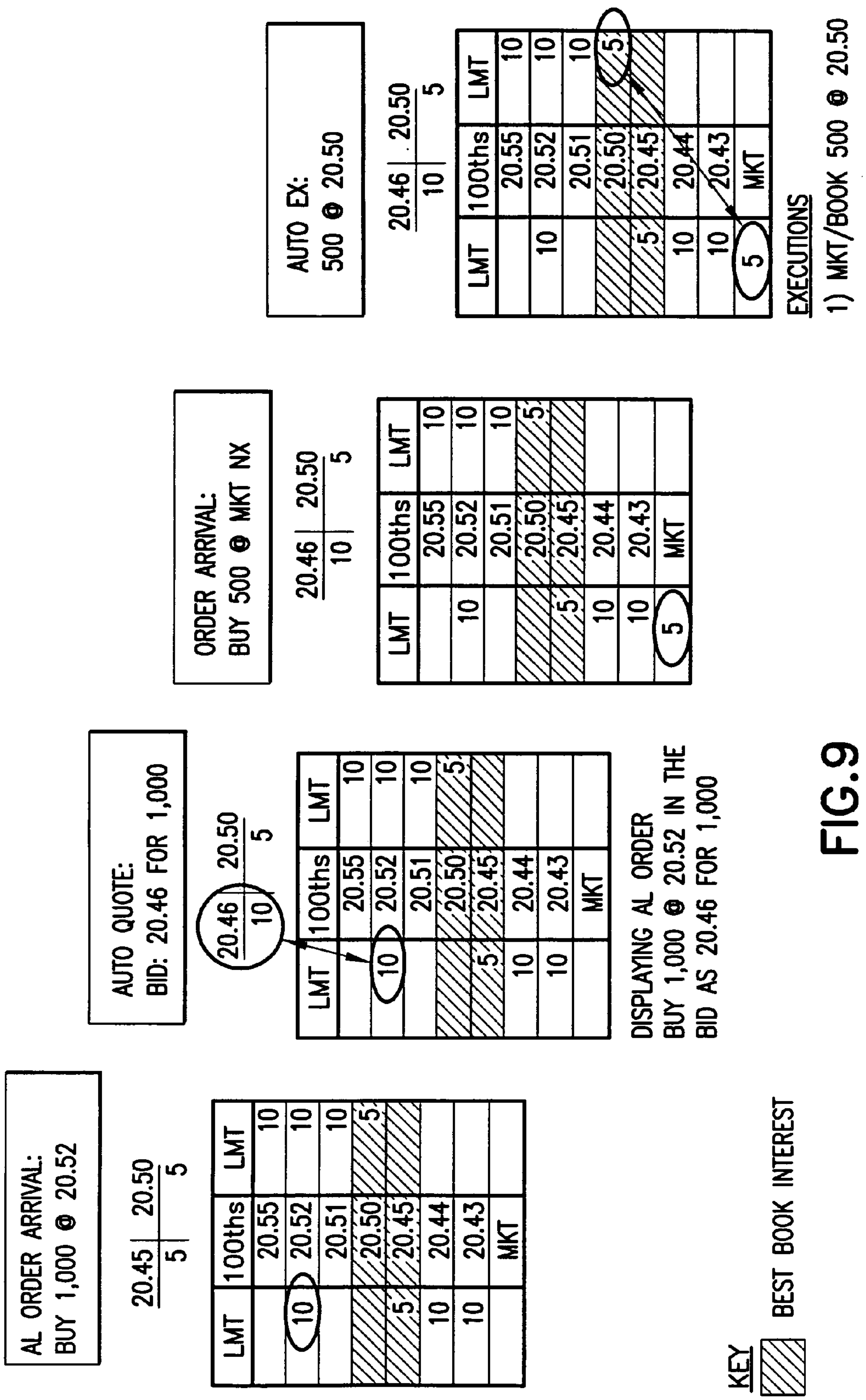
Figure 10:
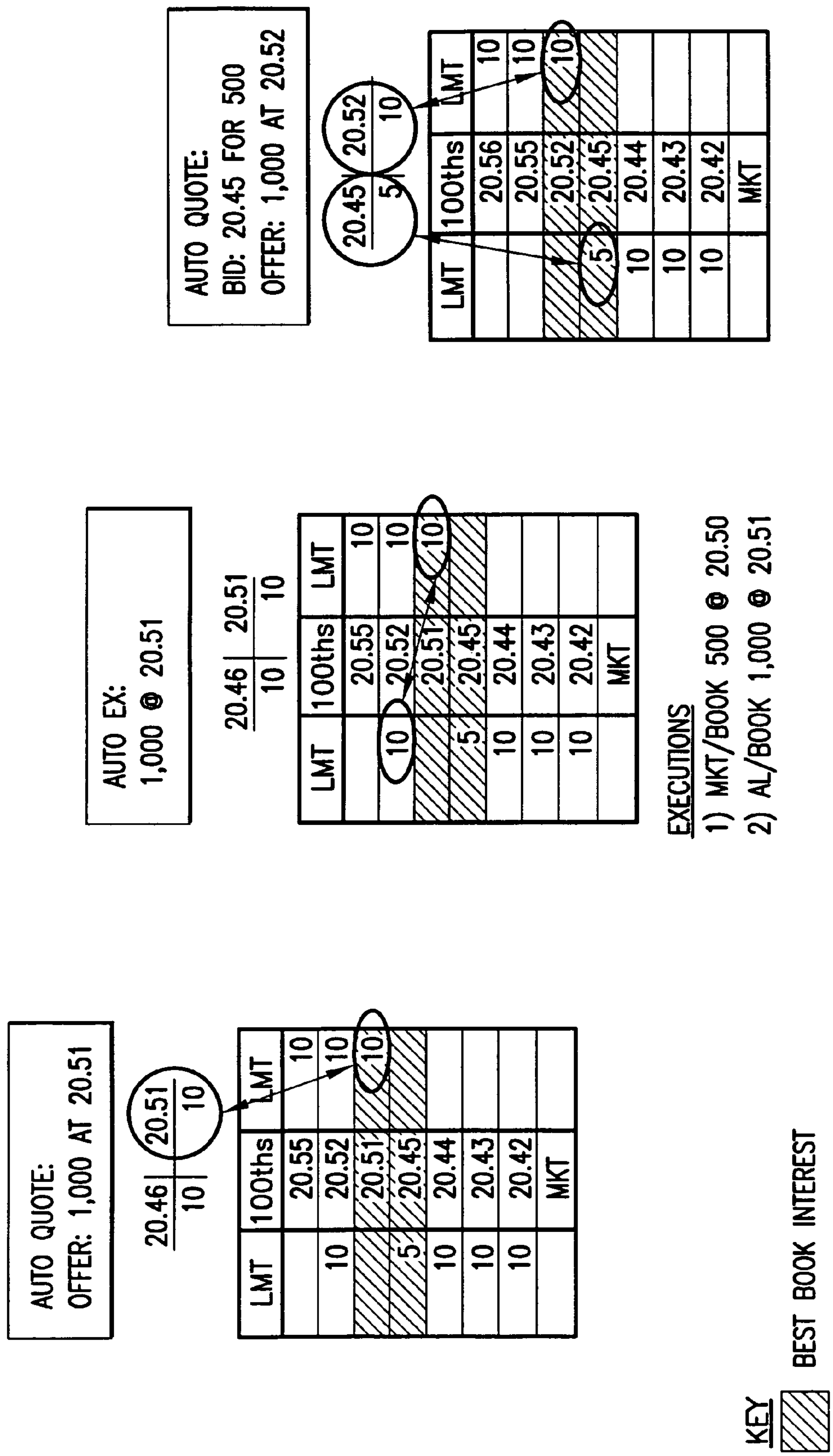

FIGS. 9 and 10 illustrate receipt of a marketable AL order, autoquoting the AL order, receipt of an automatically executed market order, and automatic execution of the AL order. The bid and offer are $20.45 and $20.50, and an AL order is received to buy 1,000 shares at $20.52, making the AL order marketable. The AL order size is autoquoted at the bid plus one cent ($20.46). A MKT NX order to buy 500 shares arrives, and is automatically executed against the offer ($20.50) taking all of the size of the offer. Because all of the size of the offer is executed, the order display book is autoquoted at the next highest price order to sell ($20.51), and the AL order is immediately executed against the offer. In the example, the AL order is 1,000 shares and the offer size is also 1,000 shares, and after execution there is no size remaining at $20.51, so system 100 autoquotes the order display at the next highest order to sell ($20.52).

Figure 11:
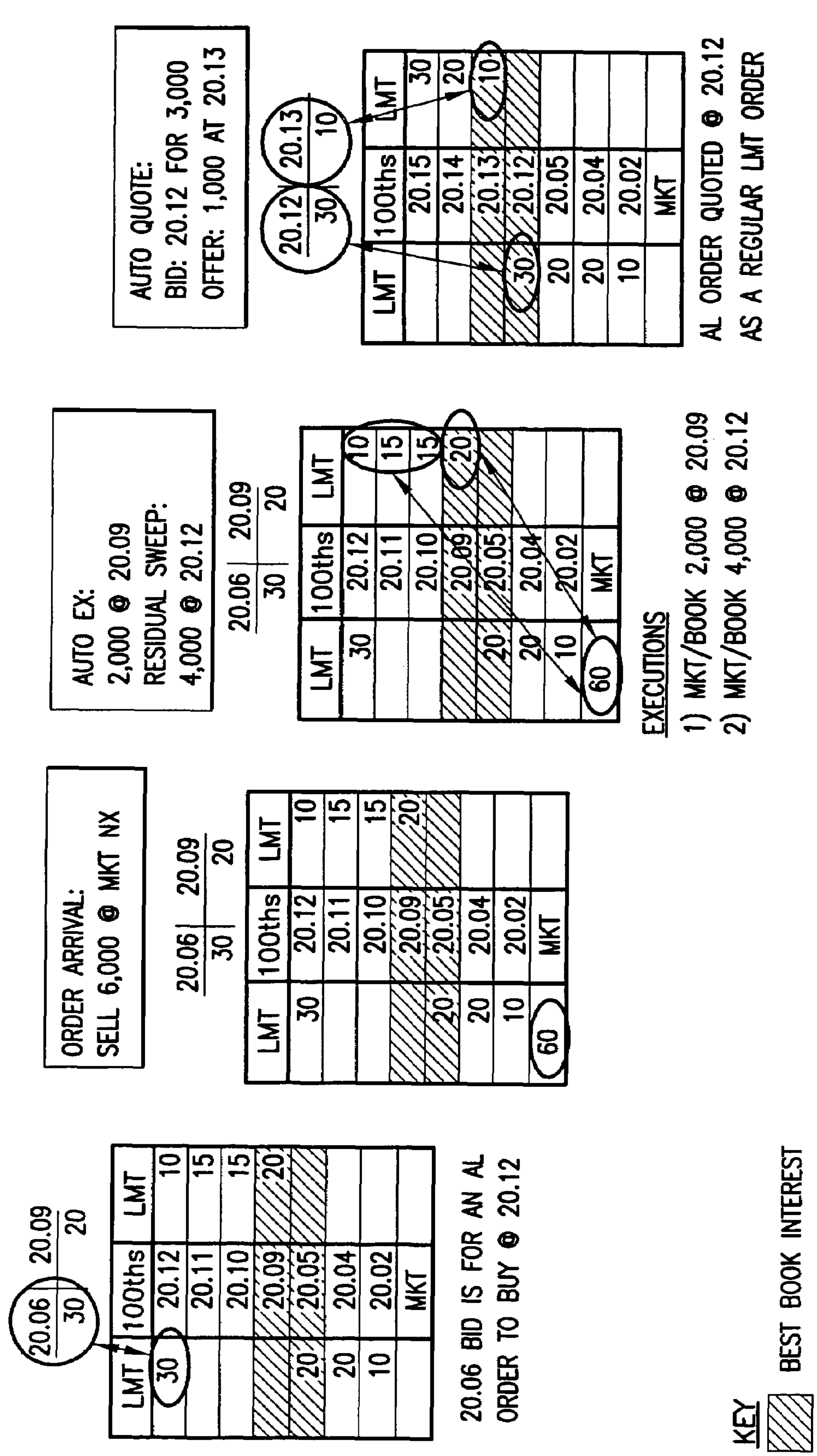

FIG. 11 illustrates receipt of a marketable AL order, autoquoting the AL order, receipt of an automatically executed market order, with sweep, and conversion of the AL order to a regular limit order because the AL order is no longer marketable. The best bid and offer are $20.05 and $20.09, and a marketable AL order is received to buy 3,000 shares at $20.12, so the AL order is autoquoted at $20.06. A MKT NX order to buy 6,000 shares arrives, and is automatically executed against the offer size of 2,000 shares. The remaining 4,000 shares are swept on the order display book at $20.12. Execution of the MKT NX order pushes the AL order to trade, however it can not trade above the limit price of $20.12 and there is no size left at $20.12, so this leaves the AL order as the best bid. It is converted to a regular limit order and autoquoted at the limit price of $20.12.

Figure 12:
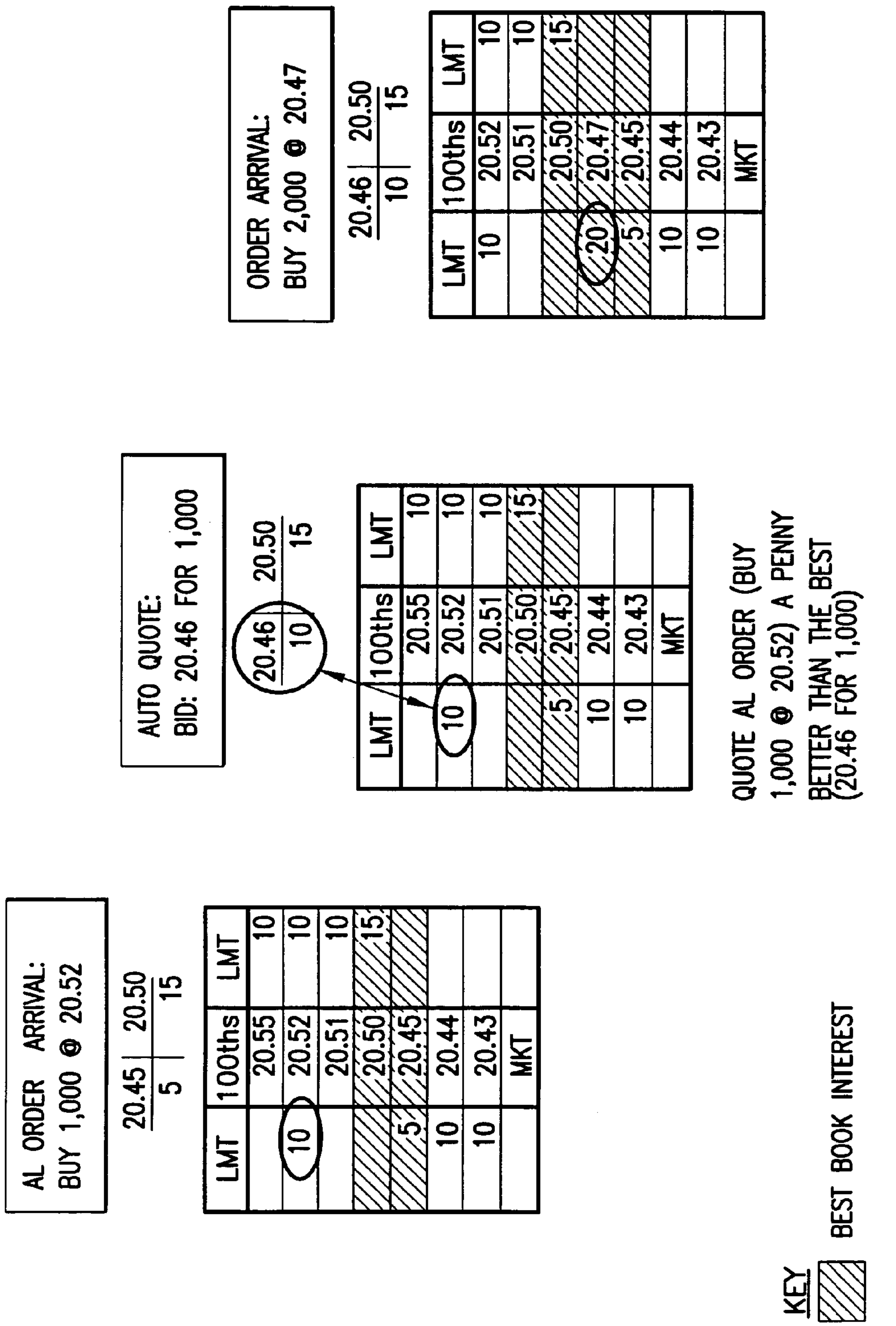
Figure 13:
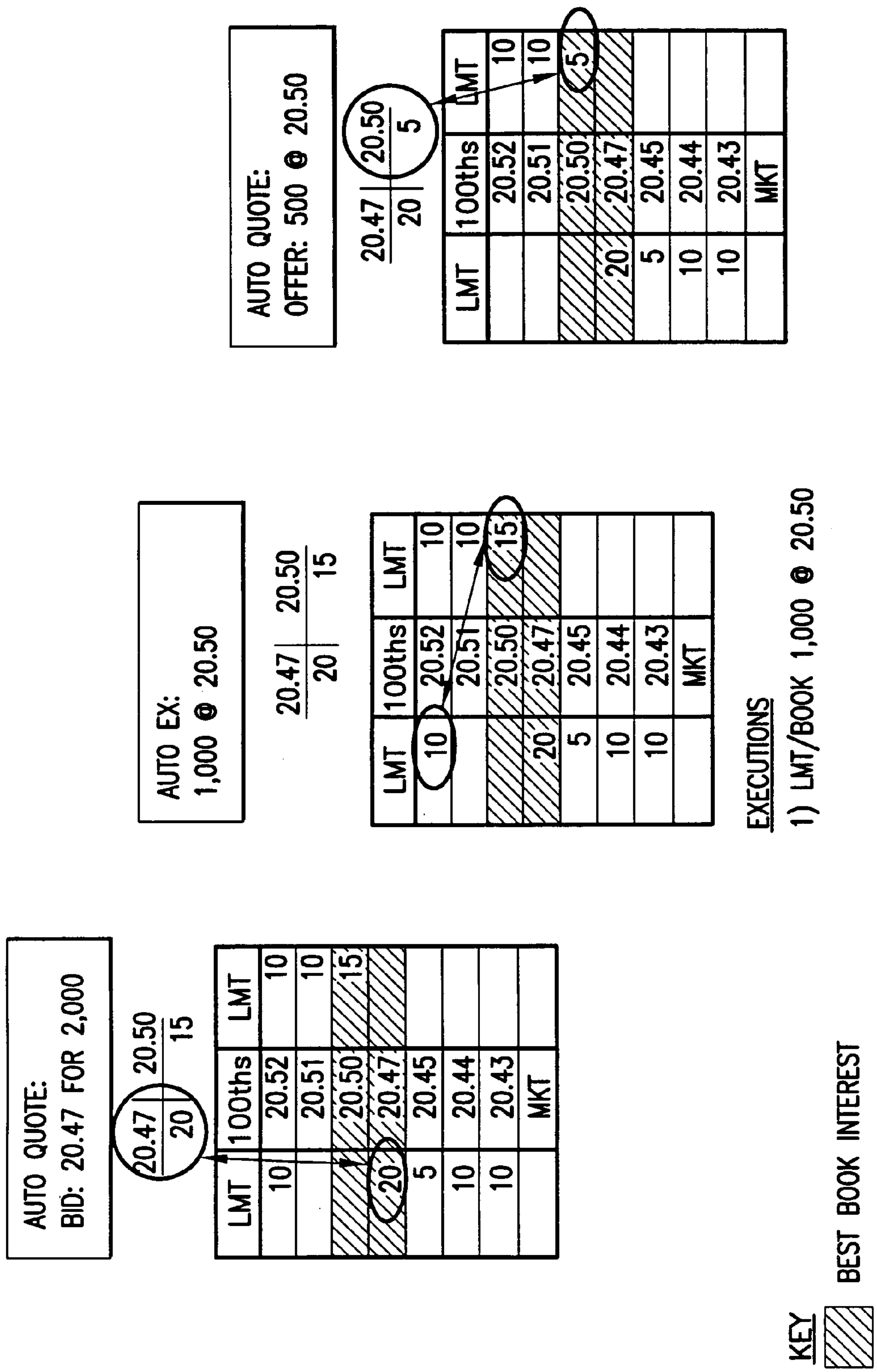

FIGS. 12 and 13 illustrate receipt of a marketable AL order, autoquoting the AL order, receipt of a limit order that improves the AL order price and automatic execution of the AL order. The best bid and offer are $20.45 and $20.50 and a marketable AL order is received to buy 1,000 shares at $20.52, so the AL order is autoquoted at $20.46. A regular limit order to buy 2,000 shares at $20.47 arrives and because it is better priced that the quoted AL order, the limit order is autoquoted. This causes the AL order to be immediately executed against the offer at $20.50, leaving 500 shares on the offer, which size is re-quoted.

Figure 14:
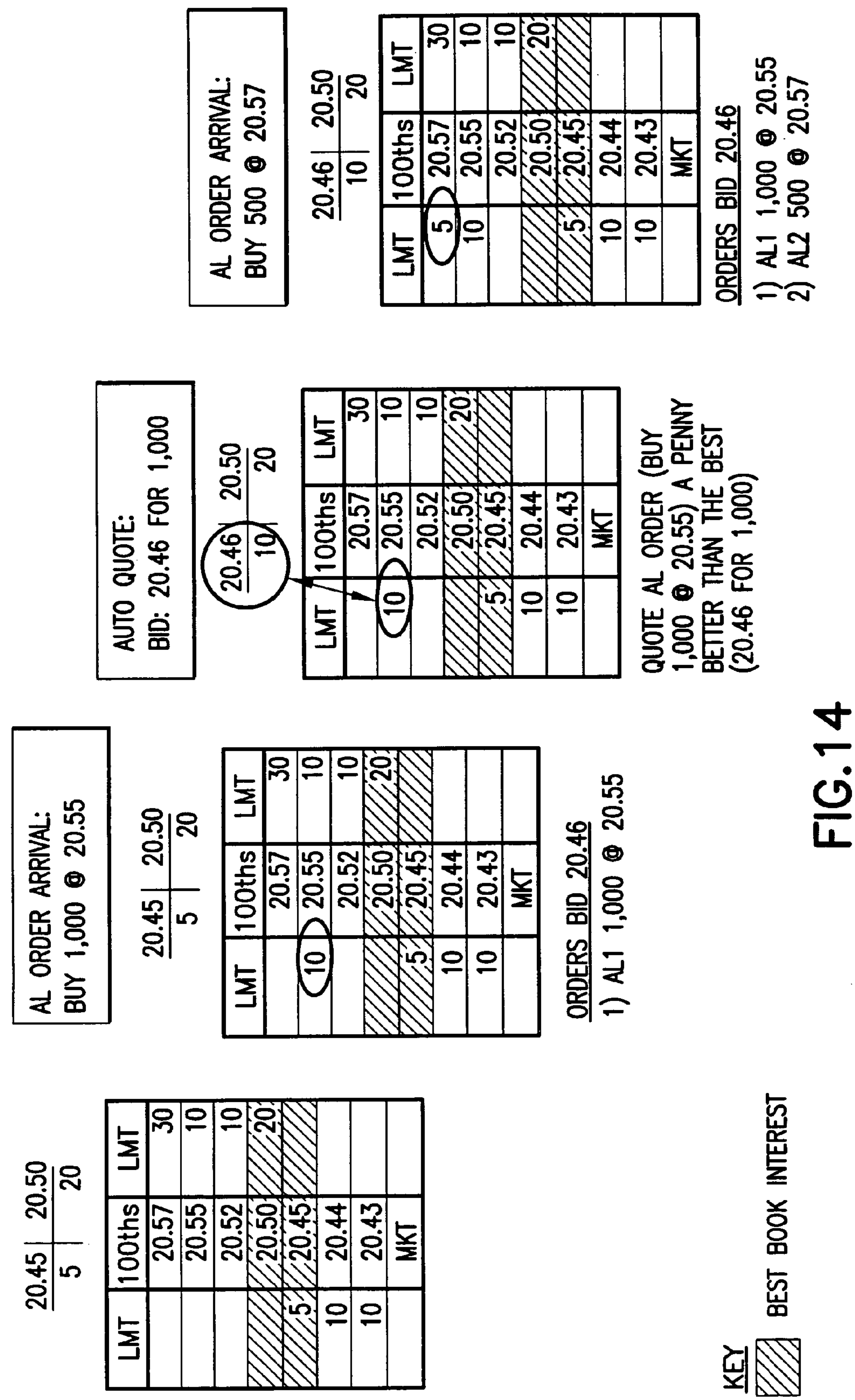
Figure 15:
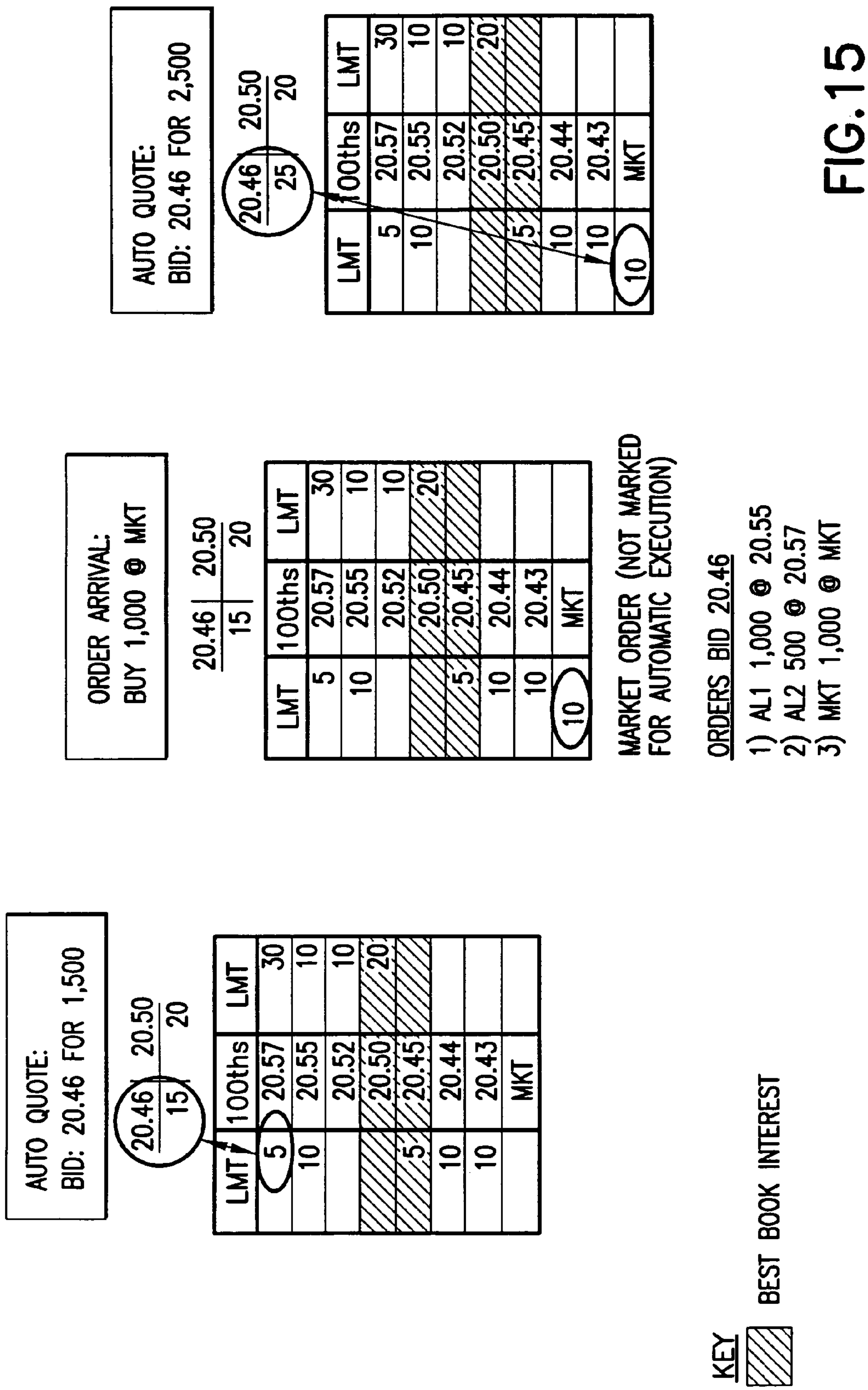
Figure 16:
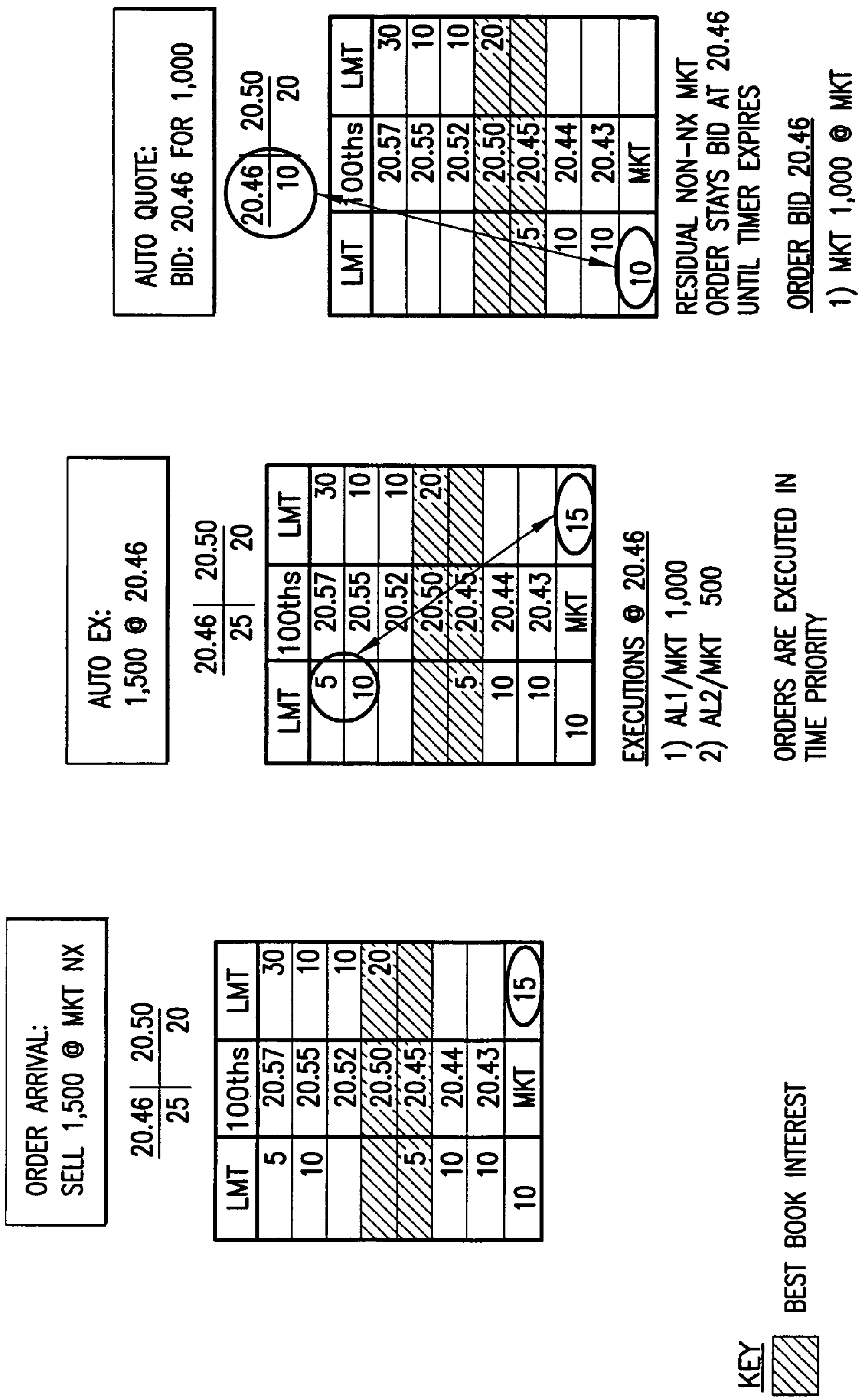

FIGS. 14, 15 and 16 illustrate receipt of a marketable AL order, autoquoting the AL order, receipt of another marketable AL order, aggregating the size of the two AL orders in the quote, receipt of an Auction Market (AM) order, aggregating the size of the AL and AM orders in the quote, receipt and immediate execution of a MKT NX order against some of the aggregated size in the quote in time priority, and requoting the AM order. The best bid and offer are $20.45 and $20.50 and a marketable AL order is received to buy 1,000 shares at $20.55, so the AL order is autoquoted at $20.46. Another marketable AL order is received to buy 500 shares at $20.57. The size of both marketable AL orders is aggregated and autoquoted. An AM order to buy 1,000 shares is received, and the size of the AM order is aggregated with the size of the AL orders and autoquoted. A MKT NX order is received to sell 1,500 shares, which is automatically executed against the two AL orders in time priority. The AM order is autoquoted at $20.46 until the 15 second timer expires, at which time it will be automatically executed if not executed earlier.

Figure 17:
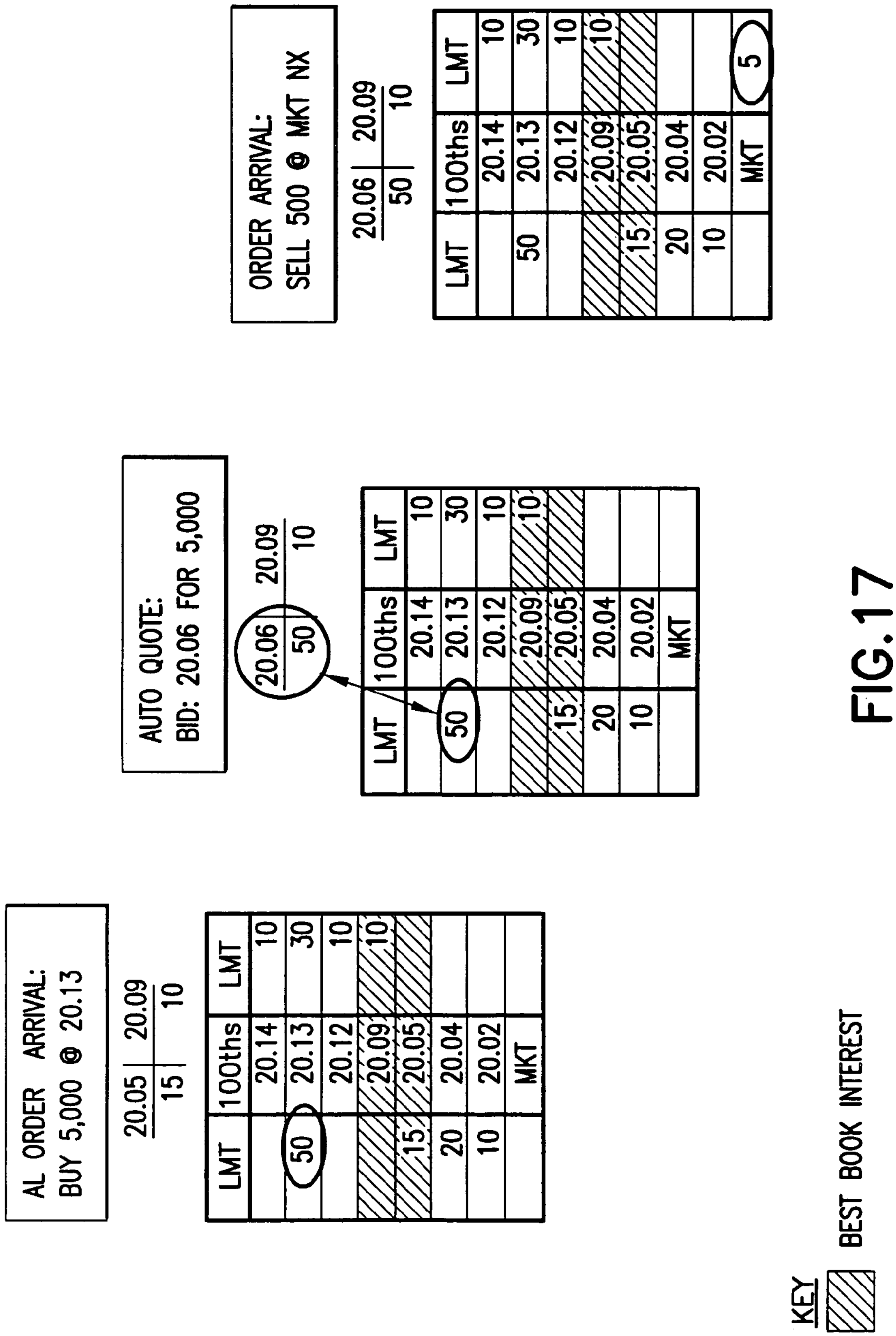
Figure 18:
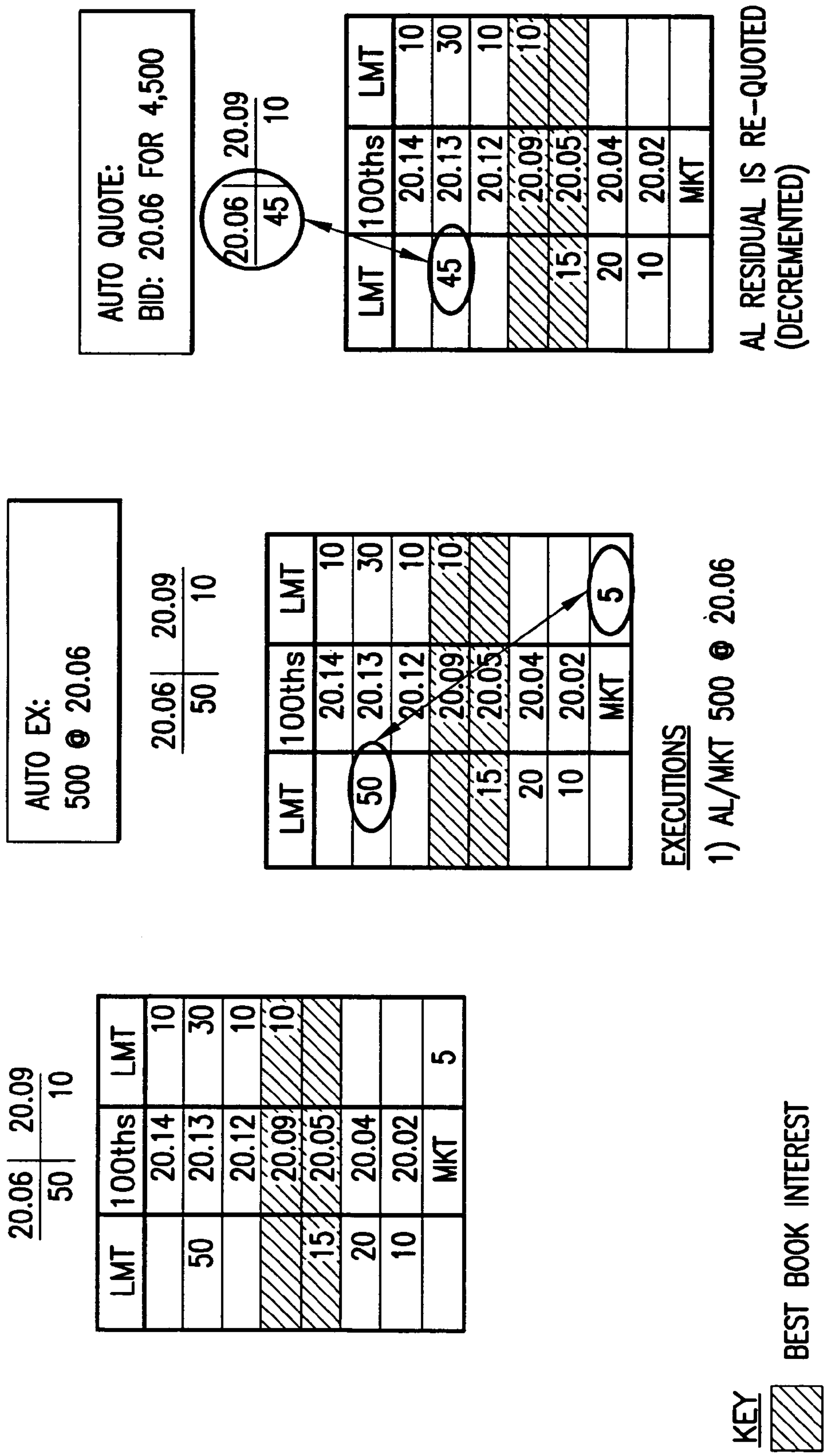

FIGS. 17 and 18 illustrate receipt and autoquoting of a marketable AL order, receipt of a MKT NX order, automatic execution of the MKT NX order against some of the AL order size, and requoting of the remaining AL size. The best bid and offer are $20.05 and $20.09 and a marketable AL order is received to buy 5,000 shares at $20.13, so the AL order is autoquoted at $20.06. A MKT NX order is received to sell 500 shares, which is automatically executed against a portion of the AL order. 15 seconds has not elapsed since the AL order arrived, so the remaining portion 4,500 shares of the AL order is requoted at $20.06.

Figure 19:
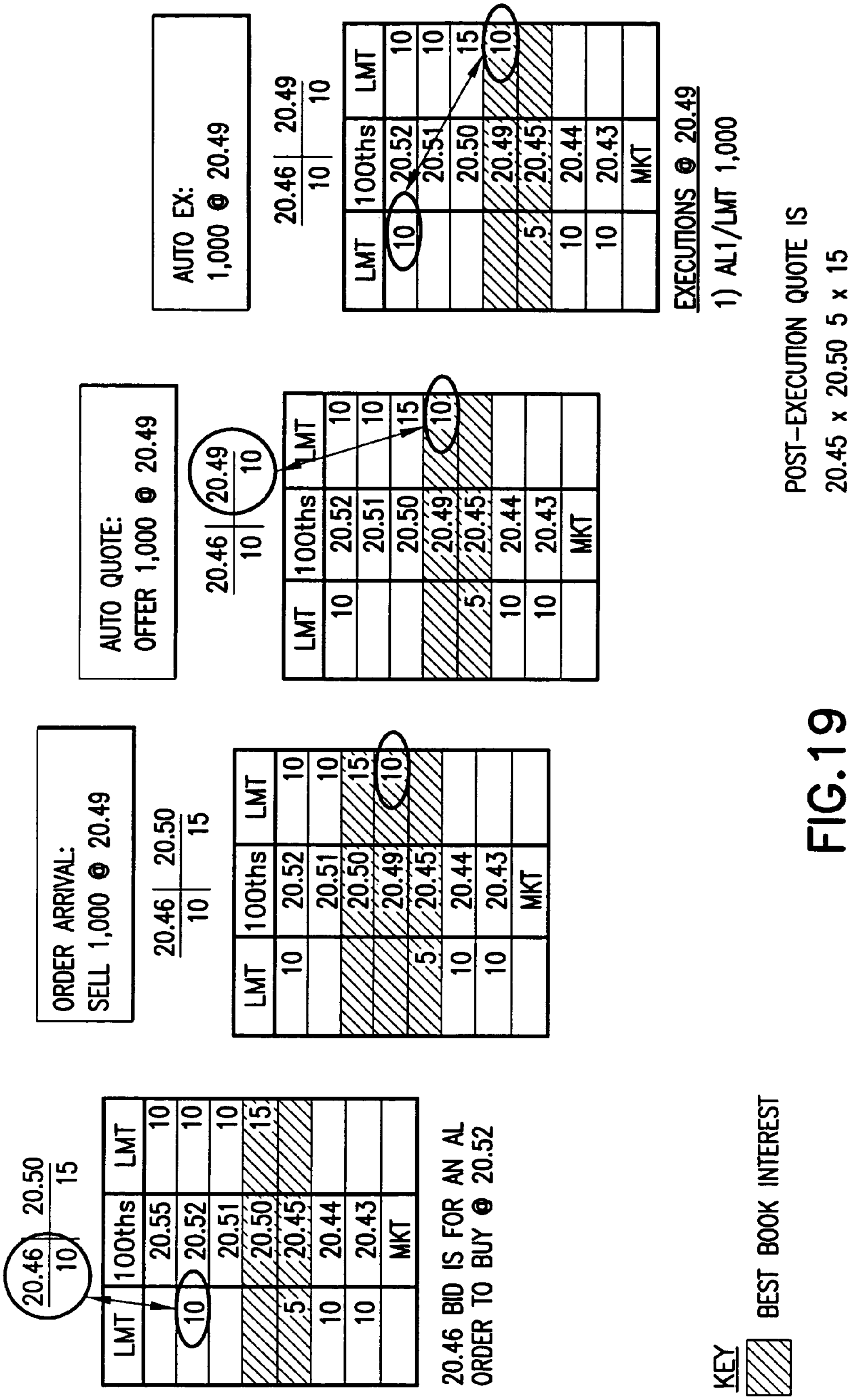

FIG. 19 illustrates receipt and autoquoting of a marketable AL order, receipt of a regular limit order that narrows the quoted market and triggers an automatic execution of the AL order. The best bid and offer are $20.45 and $20.50 and a marketable AL order is received to buy 1,000 shares at $20.52, so the AL order is autoquoted at $20.46. A regular limit order to sell 1,000 shares at $20.49 arrives, which is priced between the best bid and best offer, thus narrowing the market. The best bid and offer are autoquoted to reflect the new offer price, and the AL order automatically executes against the offer. Because the execution takes all of the new offer size, the best bid and offer after execution are $20.45 and $20.50.

Figure 20:
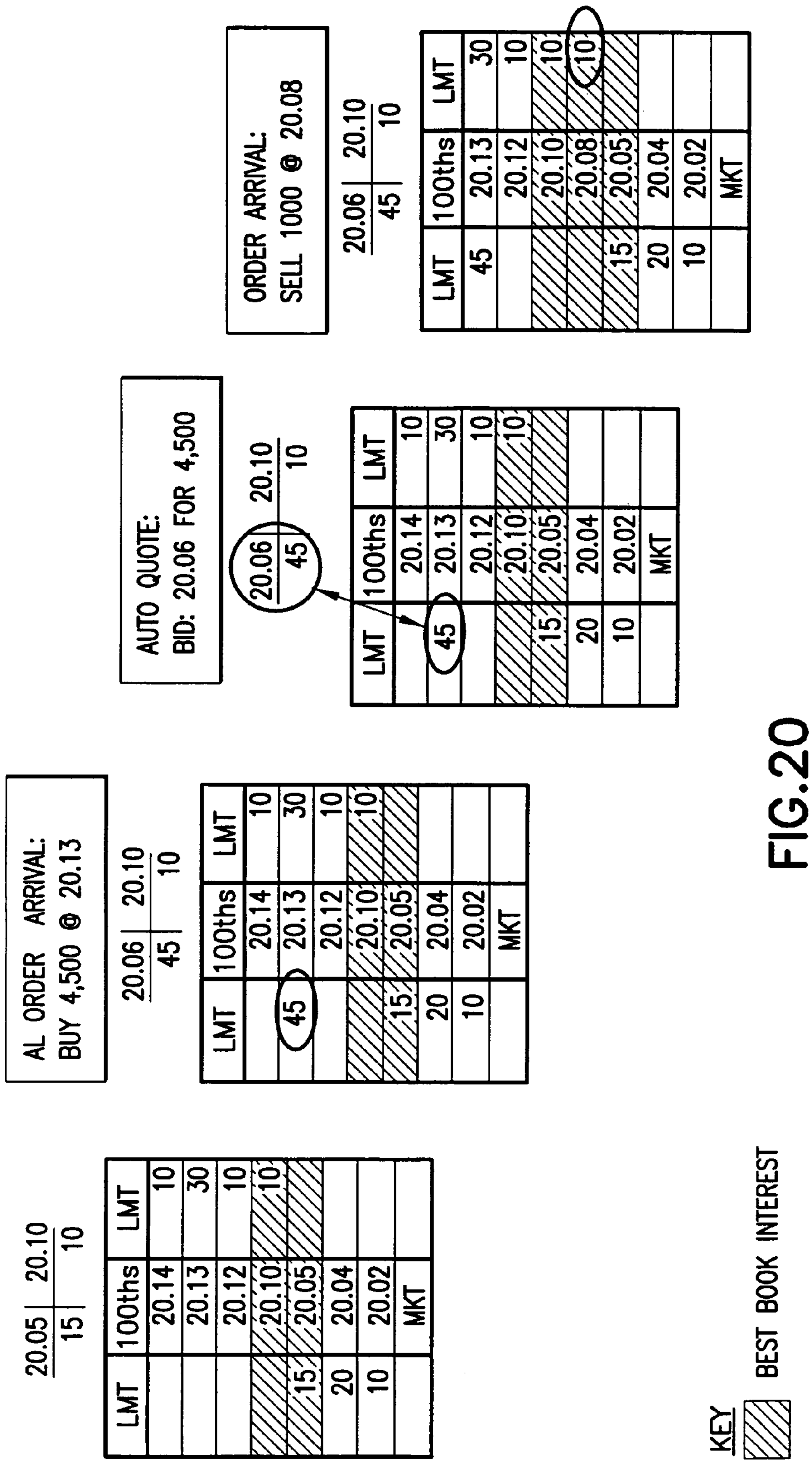
Figure 21:
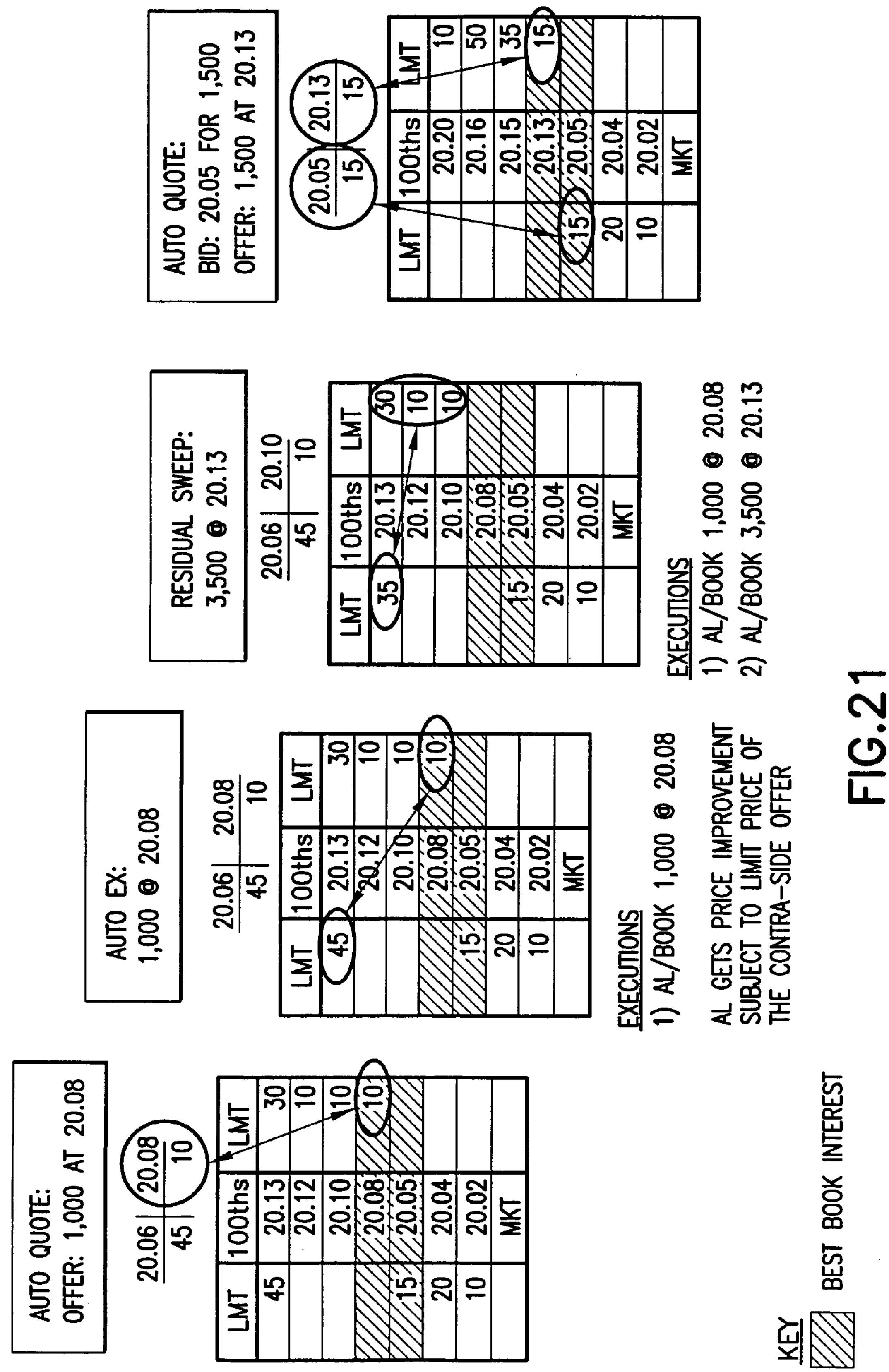

FIGS. 20 and 21 illustrate receipt and autoquoting of a marketable AL order, receipt of a regular limit order that narrows the quoted market and triggers an automatic execution of the AL order against the offer with a sweep. The best bid and offer are $20.05 and $20.10 and a marketable AL order is received to buy 4,500 shares at $20.13, so the AL order is autoquoted at $20.06. A regular limit order to sell 1,000 shares at $20.08 arrives, which is priced between the best bid and best offer, thus narrowing the market. The best bid and offer are autoquoted to reflect the new offer price, and part of the AL order automatically executes against the offer at $20.08, sweeping the order display book for the remainder of the AL order at $20.13. The sweep leaves some size on the order display book at $20.13, so that remaining size is autoquoted, leaving the best bid and offer $20.05 and $20.13.

Figure 22:
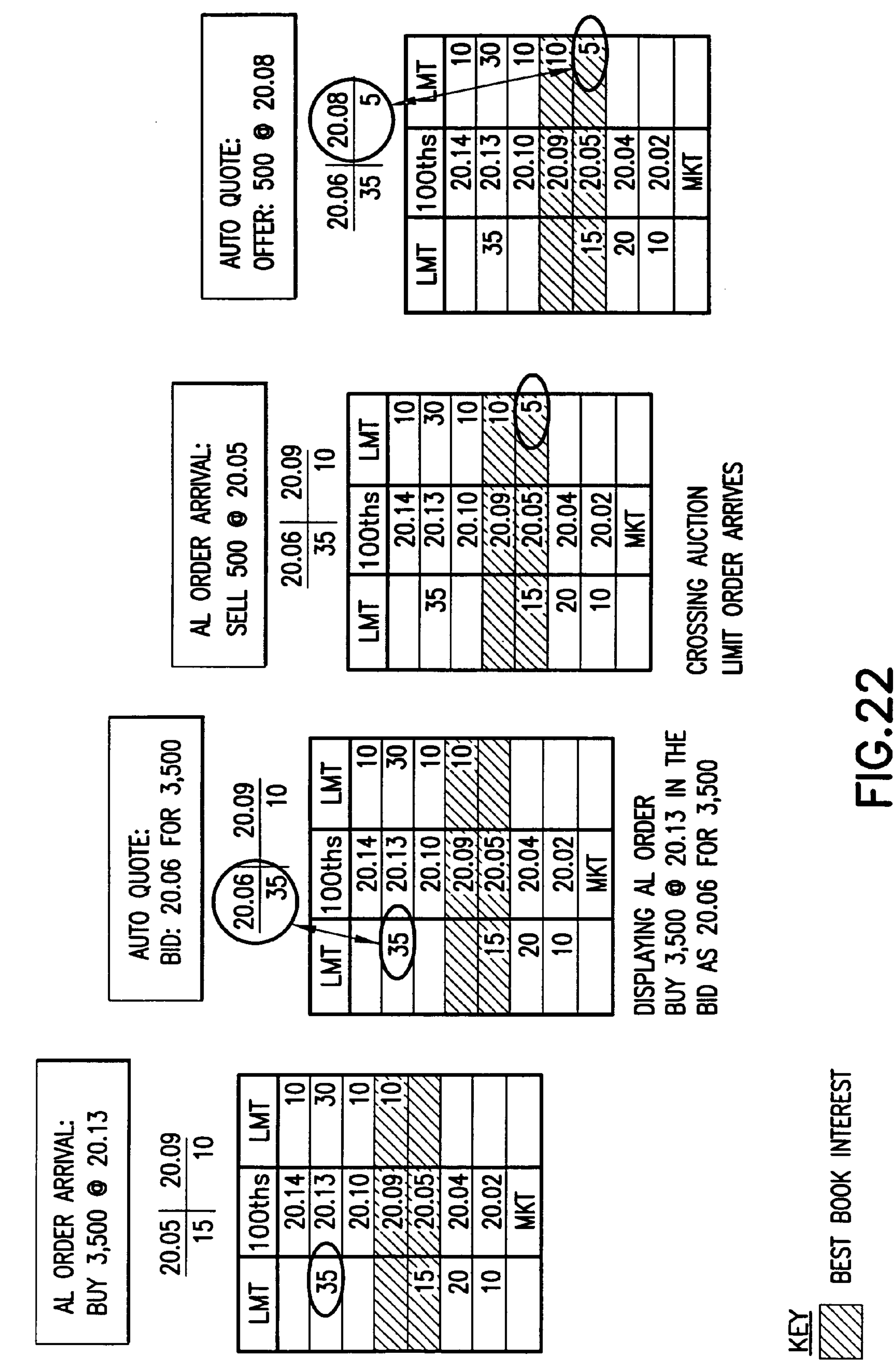
Figure 23:
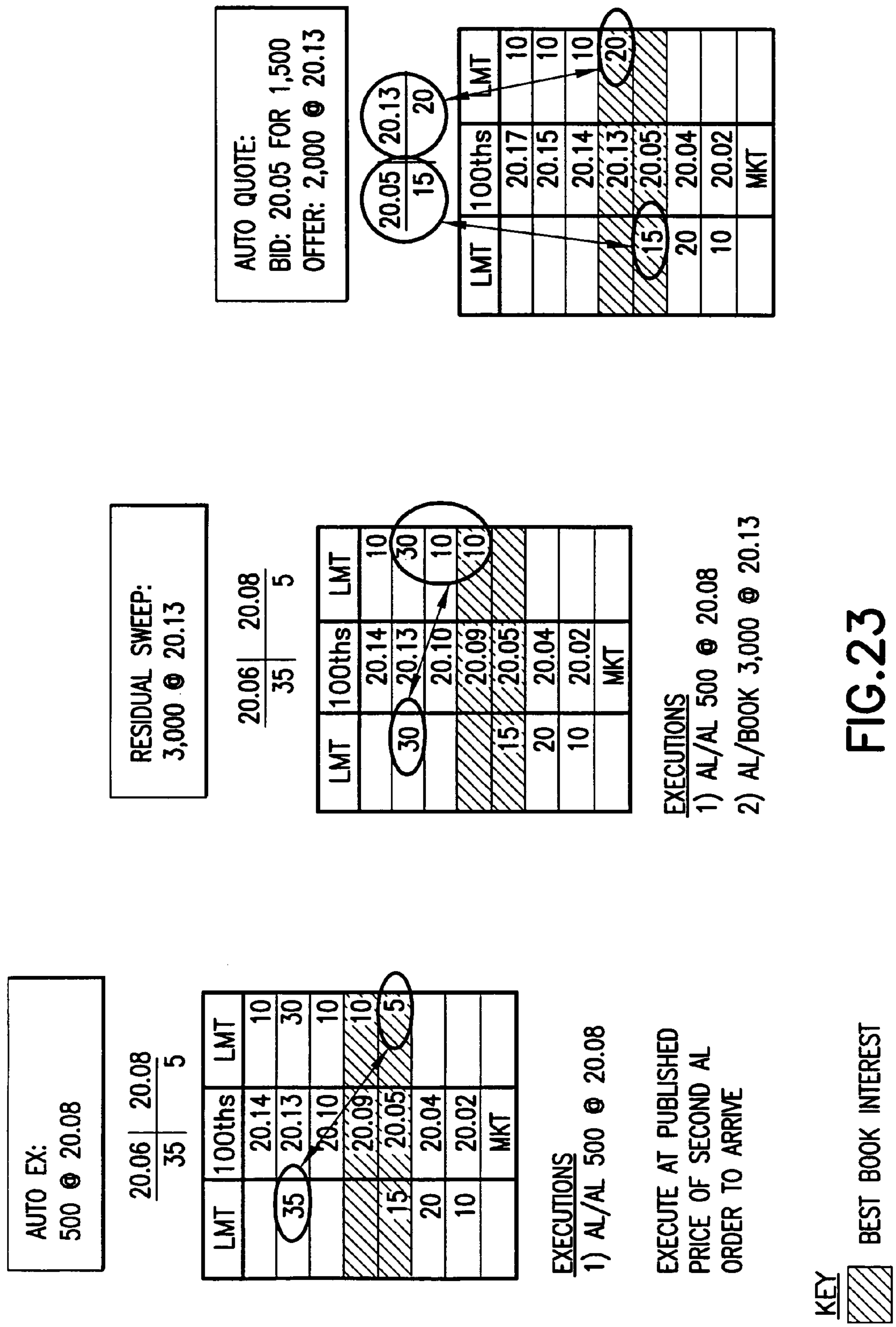

FIGS. 22 and 23 illustrate receipt and autoquoting of a marketable AL order to buy followed by an AL order to sell, with automatic execution as soon as the AL order to sell is autoquoted. The best bid and offer are $20.05 and $20.09 and a marketable AL order is received to buy 3,500 shares at $20.13, so the AL order is autoquoted at $20.06. A marketable AL order to sell 500 shares at $20.05 arrives, which is autoquoted at $20.08. Immediately after autoquoting the AL order to sell, the first AL order to buy is automatically executed against the AL order to sell, at the published offer price of $20.08, thereby taking all of the size at the offer and then sweeping the order display book at $20.13. After execution, the order display book is autoquoted to show the remaining size.

Figure 24:
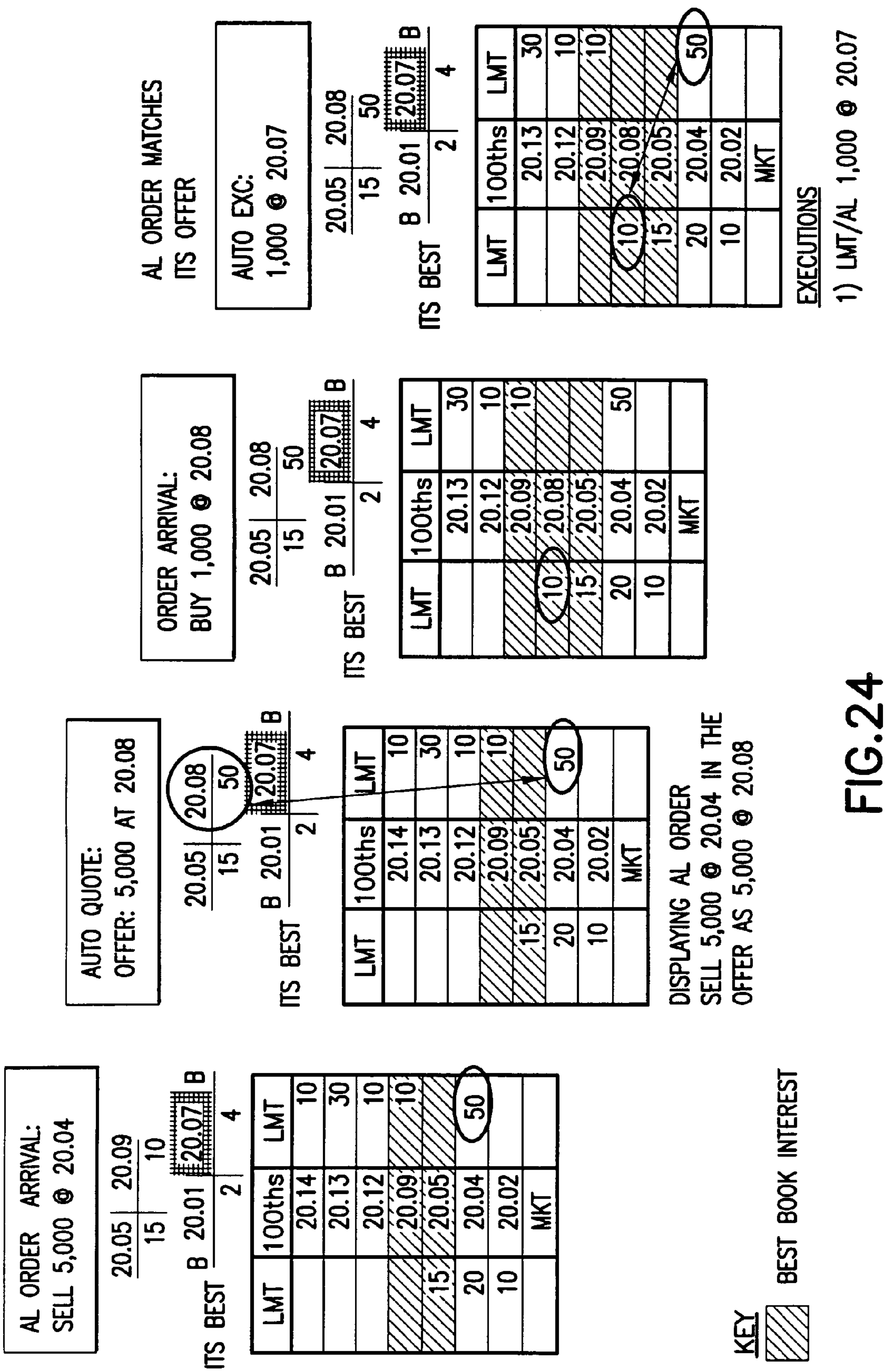

FIG. 24 illustrates receipt and autoquoting of a marketable AL order to sell, receipt of a regular limit order to buy at the quote, a better offer to sell at a regional market, and automatic execution of the limit order to buy against the AL order to sell at the offer price of the regional market. The best Exchange bid and offer are $20.05 and $20.09 and a marketable AL order is received to sell 5,000 shares at $20.04, so the AL order is autoquoted at $20.08. A regional exchange has published a best bid and offer of $20.01 and $20.07, making the regional offer at $20.07 the best offer. A regular limit order to buy 1,000 shares at $20.08 arrives, which is automatically executed against the AL order to sell at the regional exchange published offer price of $20.07. This provided price improvement to the AL order to sell as well as the regular limit order. Although not illustrated, after the execution, the AL order to sell will be requoted to reflect the remaining 4,000 shares. Execution of the AL order to sell at a price other than where it is quoting does not cause the AL order to immediately convert to a regular limit order.

Figure 25:
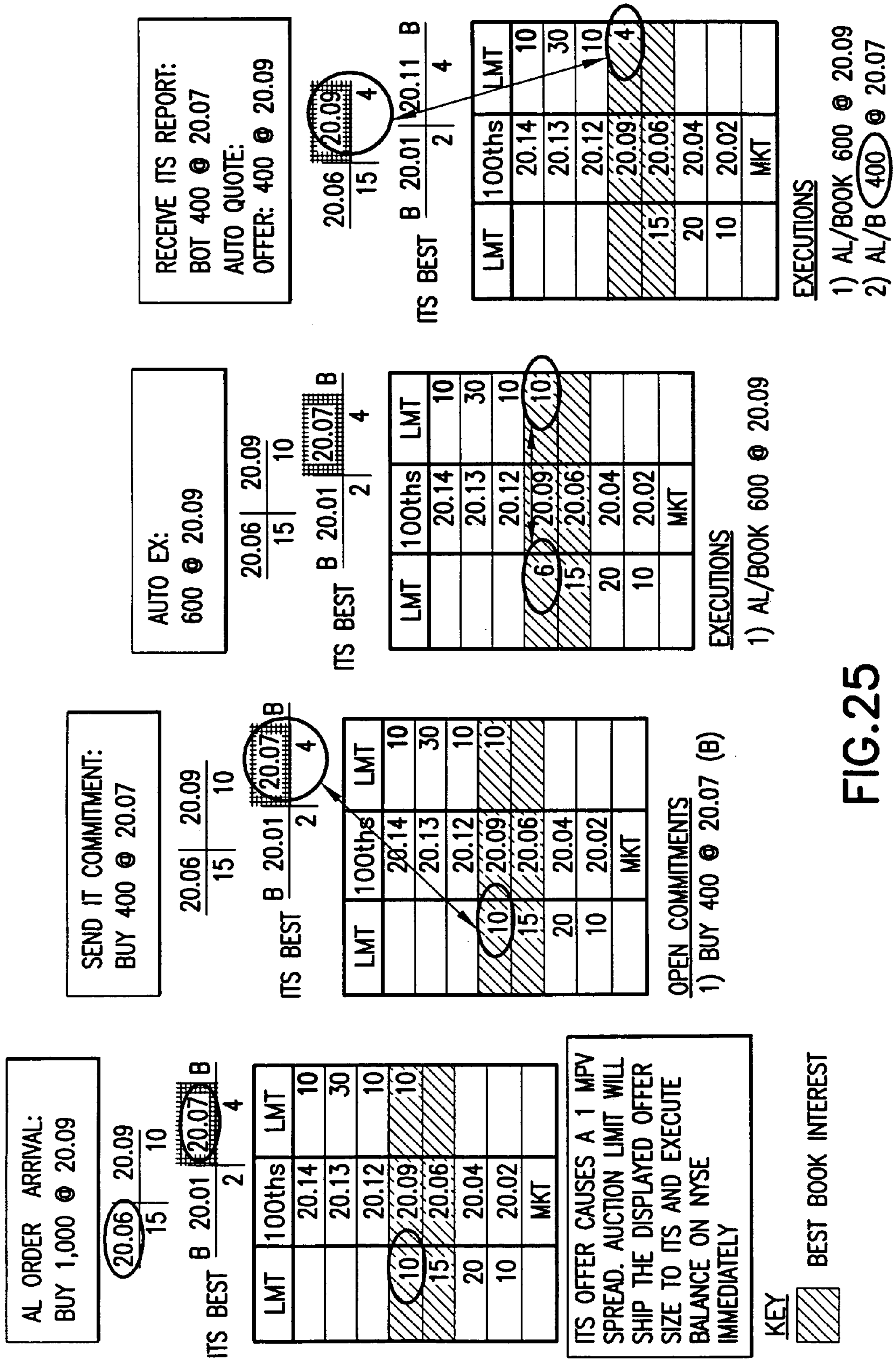

FIG. 25 illustrates receipt of an AL order to buy, an ITS offer from another exchange that causes the spread of the best bid and offer to be the minimum price variation, immediate shipment of the displayed ITS offer side and automatic execution of the balance of the AL order. The best Exchange bid and offer are $20.06 and $20.09 and a marketable AL order is received to buy 1,000 shares at $20.09. A regional exchange has published a best bid and offer of $20.01 and $20.07, making the regional offer at $20.07 the best offer. In addition the spread between the best bid ($20.06) and best offer ($20.07) is one cent, which is the minimum price variation.

This causes the system to automatically ship the displayed offer size of the ITS (400 shares) and execute the remaining balance (600 shares) of the AL order against the Exchange offer, leaving 400 shares at $20.09, which is autoquoted.

Figure 26:
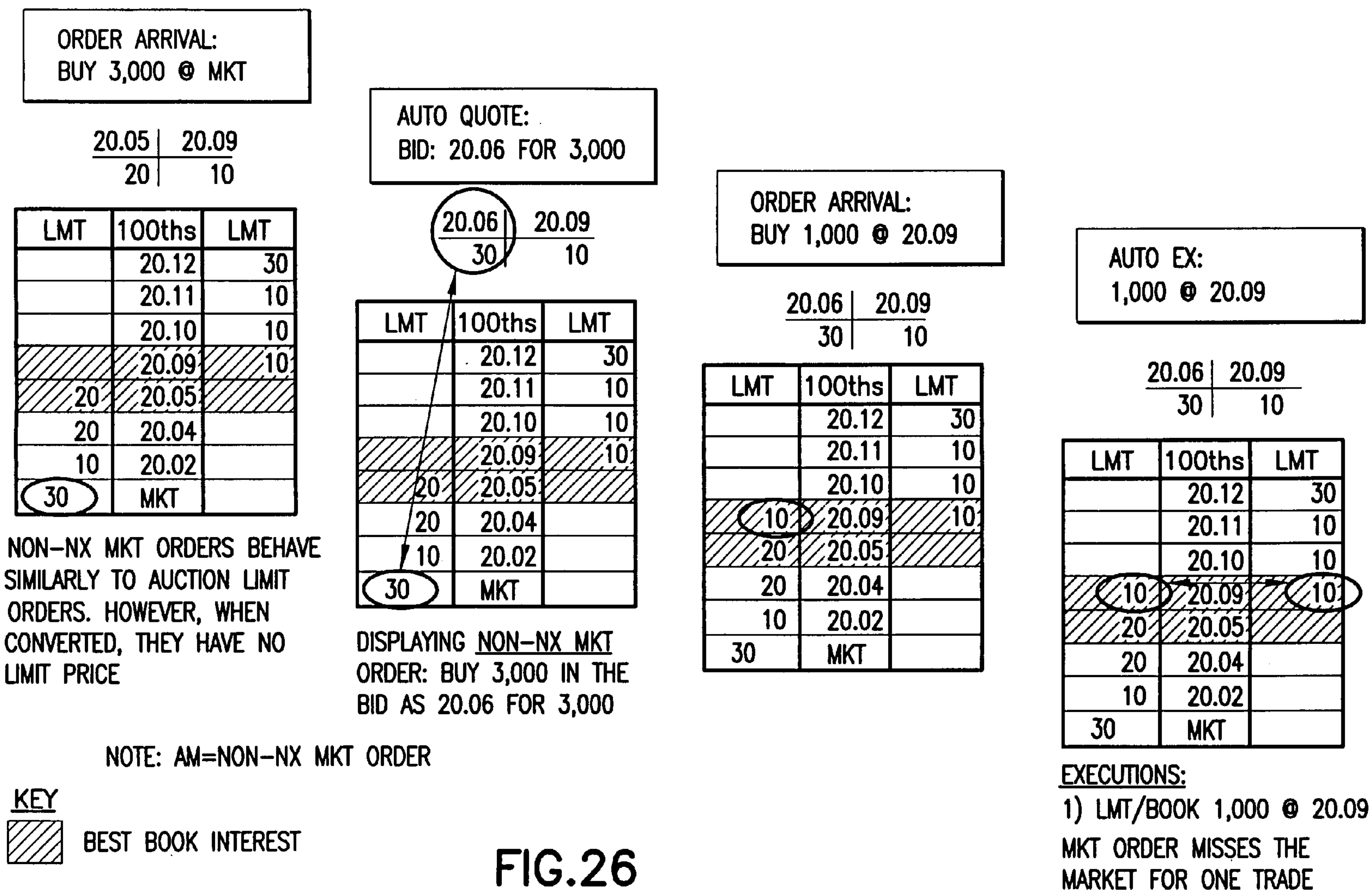
Figure 27:
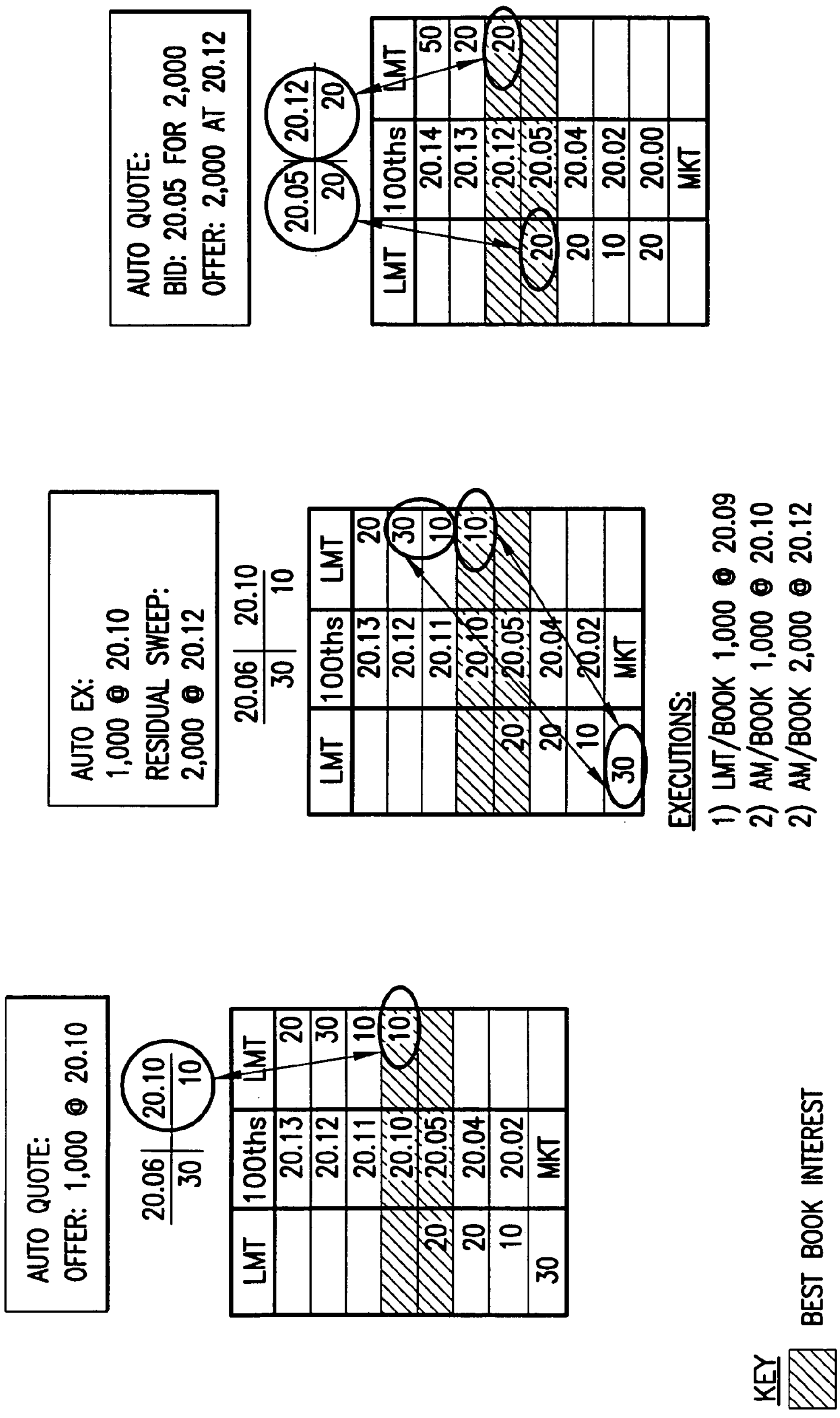

FIGS. 26 and 27 illustrate receipt and autoquoting of an AM order to buy, receipt of a regular limit order to buy priced at the offer with automatic execution of the limit order against the offer causing the AM order to miss the market for one trade, autoquoting the order display book, and automatic execution of the AM order against the offer and sweeping the balance on the order display book. The best bid and offer are $20.05 and $20.09 and an AM order is received to buy 3,000 shares, so the AM order is autoquoted at $20.06. A regular limit order to buy 1,000 shares at the offer price of $20.09 arrives, which is automatically executed against the offer size, taking all of the offer size. The order display book is autoquoted at the next offer price ($20.10) and the AM order is automatically executed against the Offer taking the offer size (1,000 shares) and then sweeping the order display book at $20.12 to fill the remaining 2,000 shares. The order display book is then autoquoted.

Figure 28:
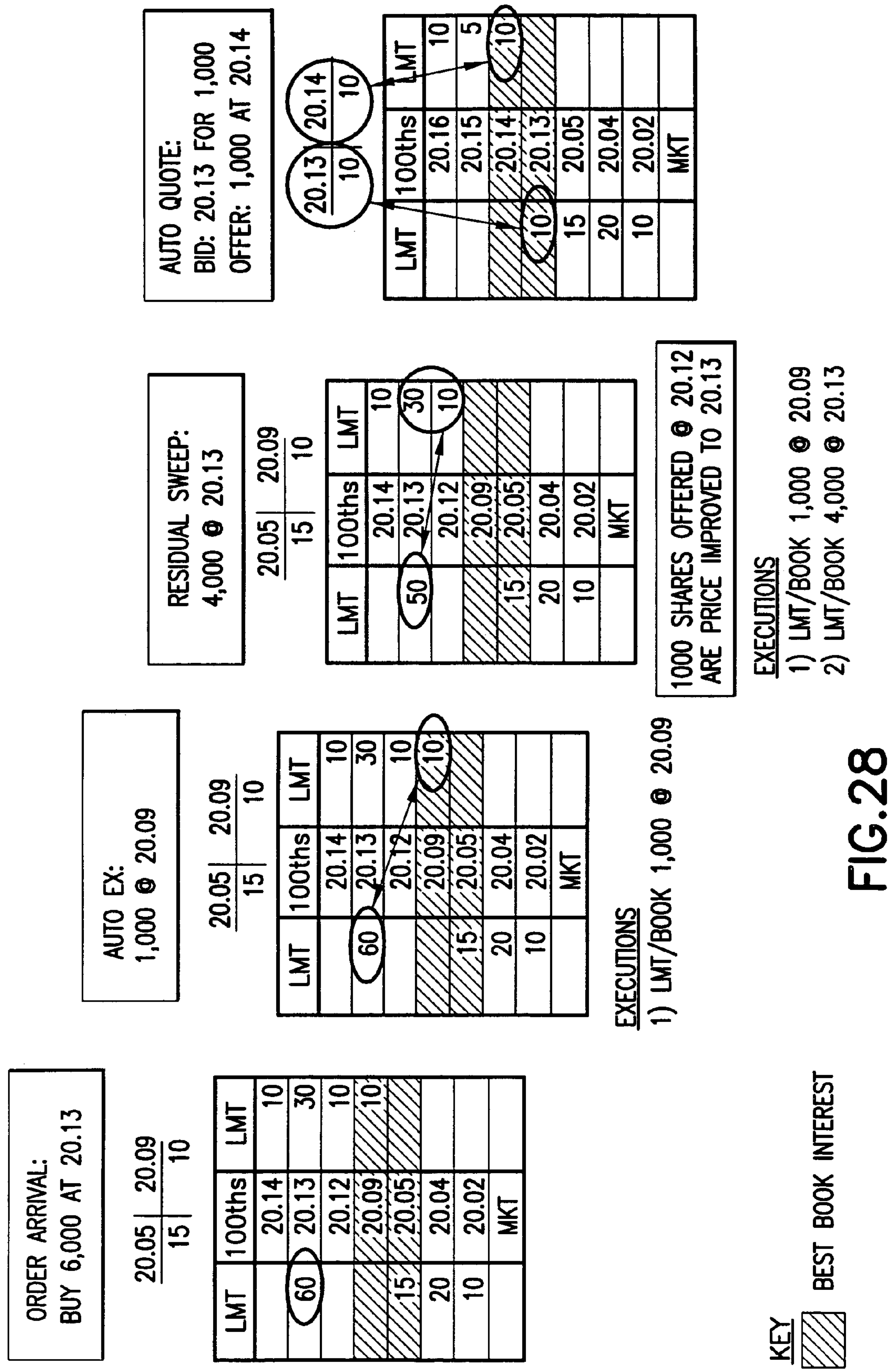

FIG. 28 illustrates receipt of a crossing limit order to buy that is automatically executed at the best offer price and the residual is swept against the order display book. The best bid and offer are $20.05 and $20.09, and a limit order is received to buy 6,000 shares at $20.13. Because the limit order to buy is above the offer, it is a crossing limit order and is automatically executed against 1,000 shares at the offer price and 4,000 shares of the residual are swept against the order display book, taking all of the size on the order display book through the limit order price, leaving 1,000 share of the limit order unexecuted. The order display book is autoquoted to reflect the 1,000 shares of the limit order at $20.13 as a new best bid.

Figure 29:
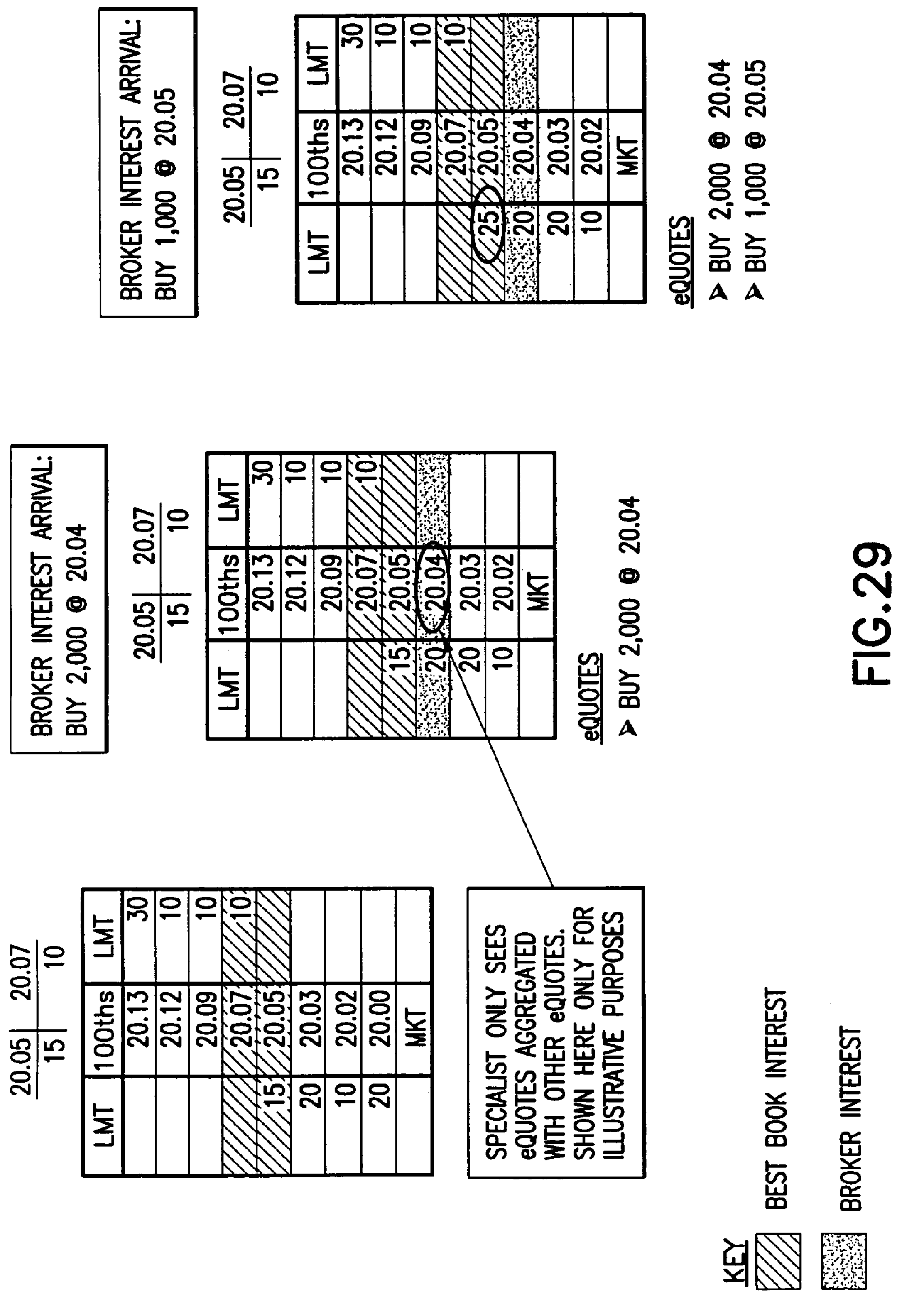
Figure 30:
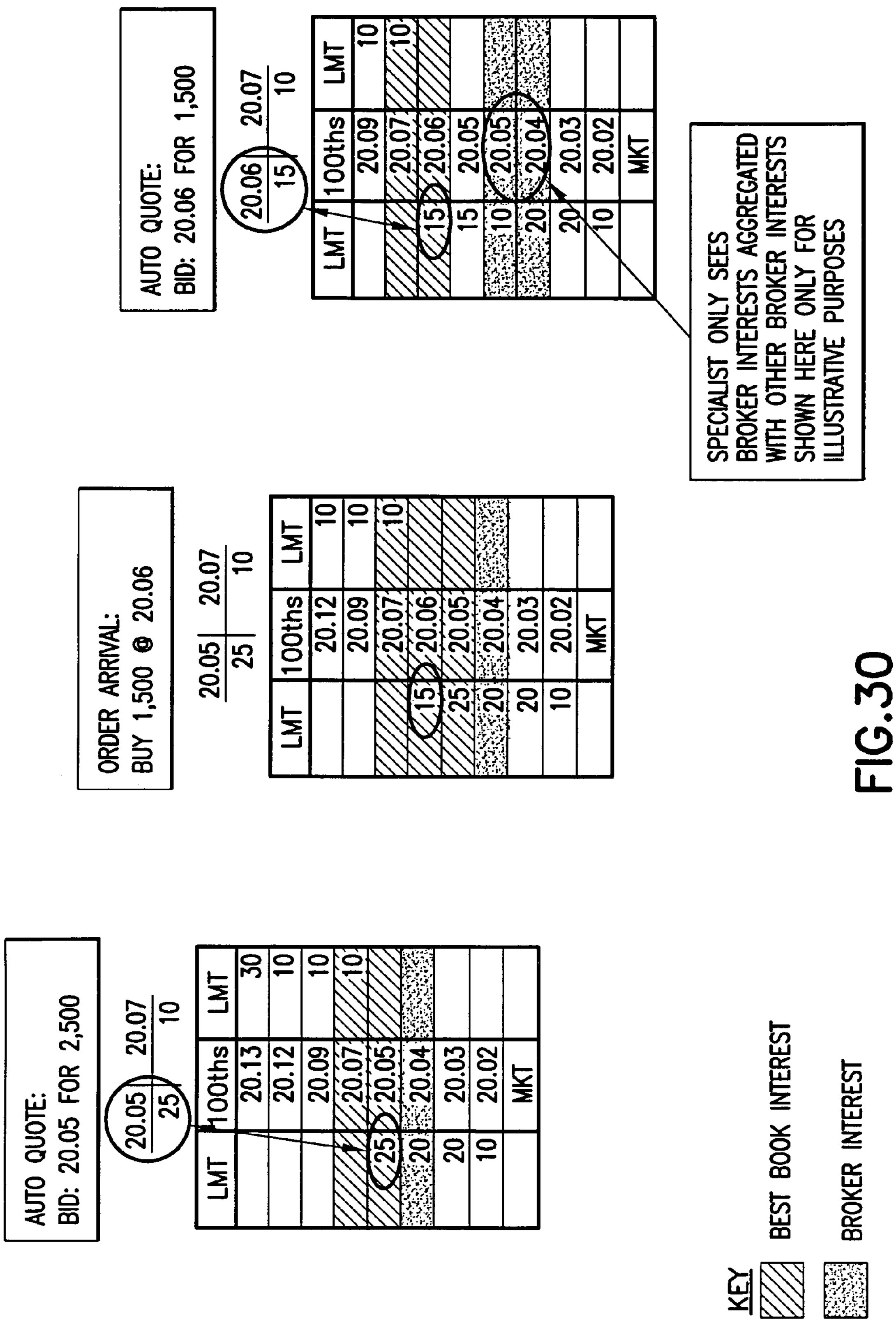

FIGS. 29 and 30 illustrate receipt and autoquoting of broker interest at the inside quote. The best bid and offer are $20.05 and $20.07, and broker interest is received to buy 2,000 shares at $20.04. This is reflected on the order display book. Broker interest is received to buy 1,000 shares at $20.05 and because this is at the best bid, it is added to the existing bid size and autoquoted. A limit order is received to buy 1,500 shares at $20.06, which is autoquoted as the best bid. Because the broker interest at $20.04 and $20.05 is no longer at the best bid, it is no longer reflected in the quote, and it is also aggregated with any other broker interest. Brokers can elect to exclude their interest from the aggregate information that is available to the specialist when their interest is not at the best bid or offer.

Figure 31:
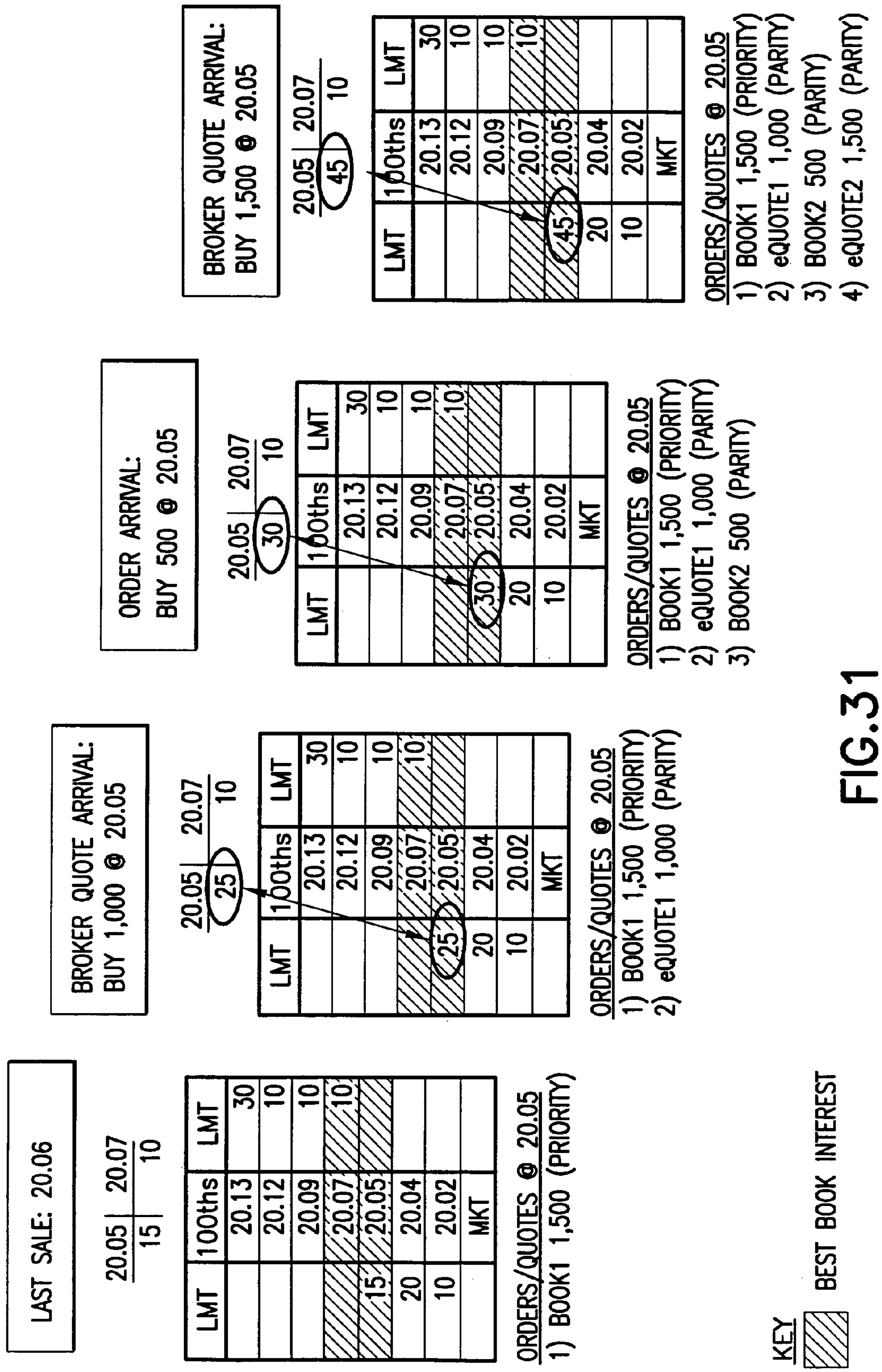
Figure 32:
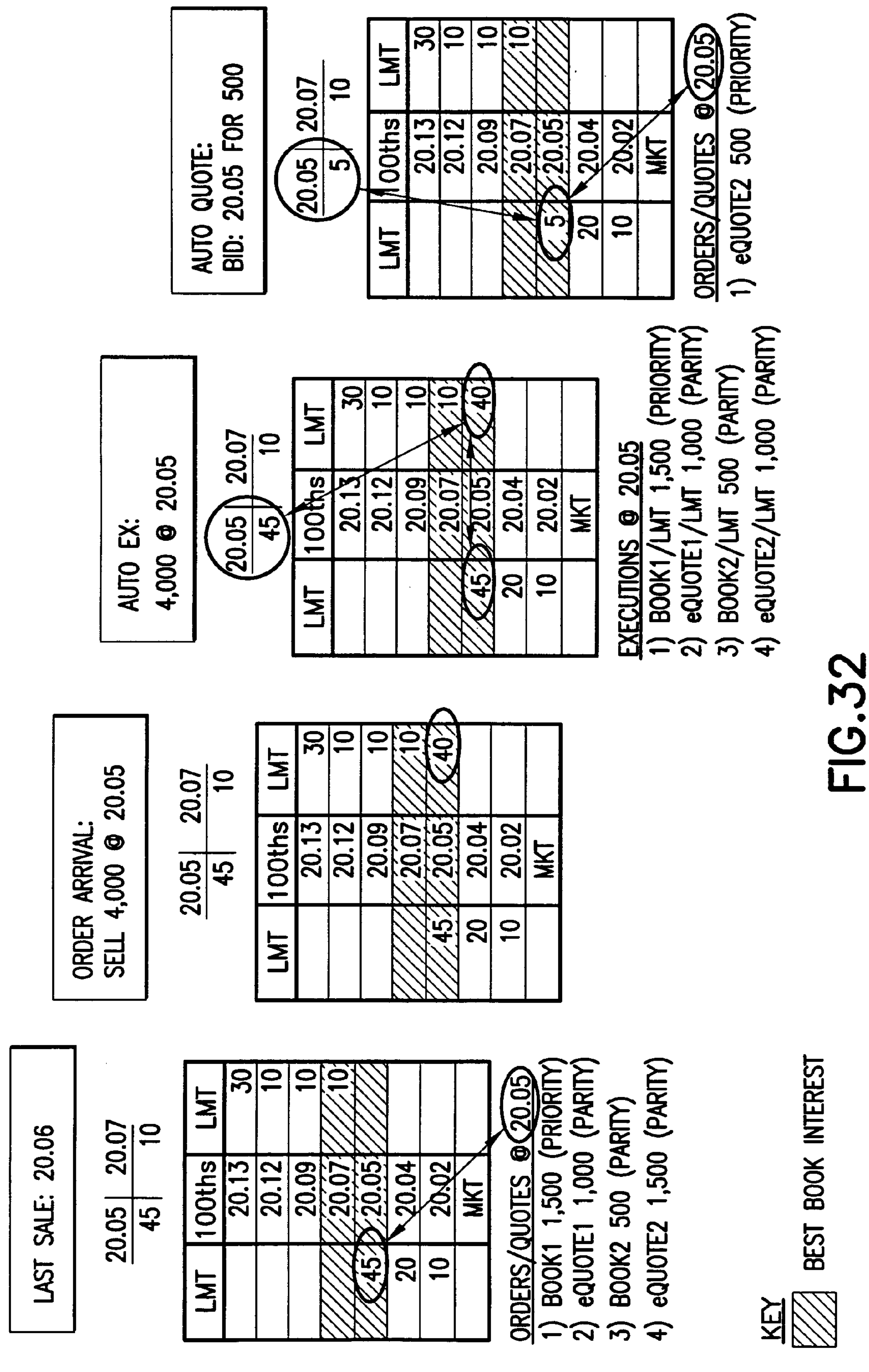

FIGS. 31 and 32 illustrate receipt and autoquoting of broker interest at the inside quote with priority and parity examples. The best bid and offer are $20.05 and $20.07, and broker interest is received to buy 1,000 shares at $20.05, and because this is at the best bid, it is added to the existing bid size and autoquoted. A limit order is received to buy 500 shares at $20.05, which is also added to the existing bid size and autoquoted. Additional broker interest is received to buy 1,500 shares at $20.05, and because this is also at the best bid, it is added to the existing bid size and autoquoted. The 1,500 limit order shares that were quoted before any of the broker interest arrived has priority, while all of the broker interest and the limit order has parity. A limit order is received to sell 4,000 shares at $20.05, which is automatically executed. 1,500 shares go to the limit order that had priority, while the remaining 2,500 shares are divided on parity among the broker interest and the limit order. After execution, 500 shares of broker interest remain, which is autoquoted as the best bid. Those 500 shares have priority for one trade.

Figure 33:
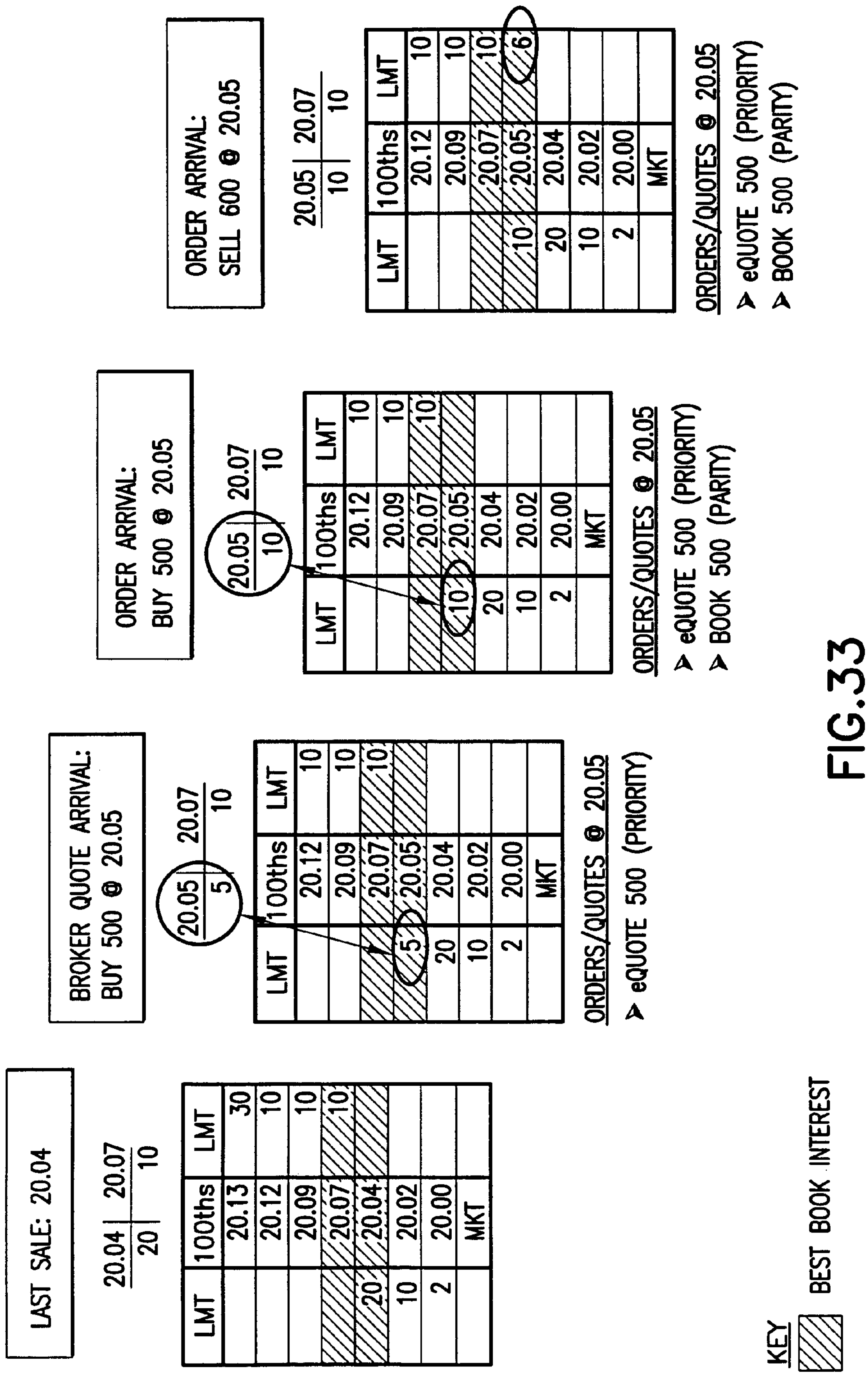
Figure 34:
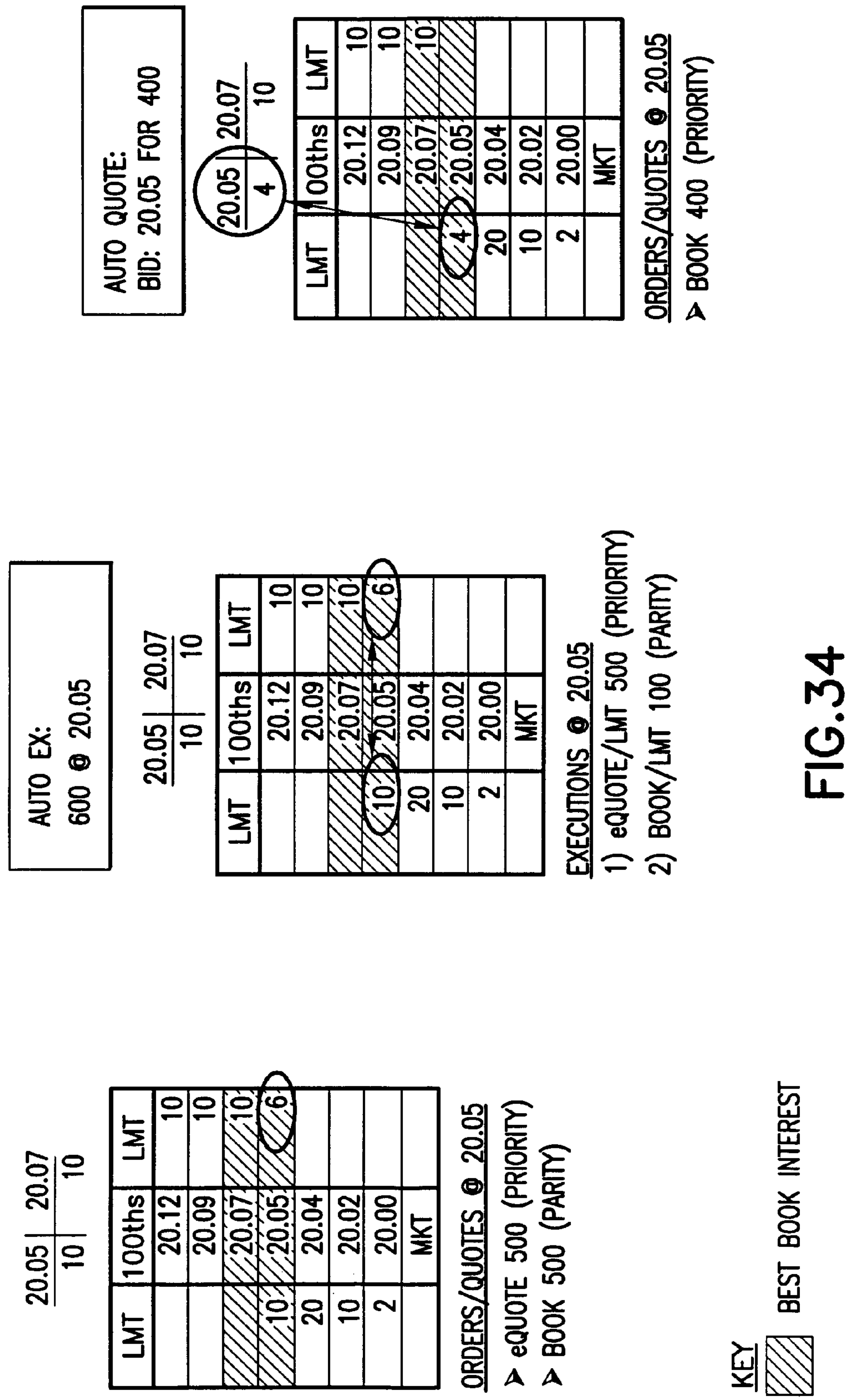

FIGS. 33 and 34 illustrate broker interest and execution priority when the interest is at a new price. The best bid and offer are $20.04 and $20.07, and broker interest is received to buy 500 shares at $20.05. Because this interest is at a new bid price, it becomes the bid and is autoquoted. A limit order is received to buy 500 shares at $20.05, and because this is also at the best bid, it is added to the existing bid size and autoquoted. The broker interest at the new price of $20.05, which became the best bid, has priority over the limit order. A limit order is received to sell 600 shares at $20.05, and it is automatically executed. 500 shares go to the broker interest that had priority and the remaining 100 shares go to the limit order. This leaves 400 shares from the limit order at $20.05, which is autoquoted and will have priority for one trade.

Figure 35:
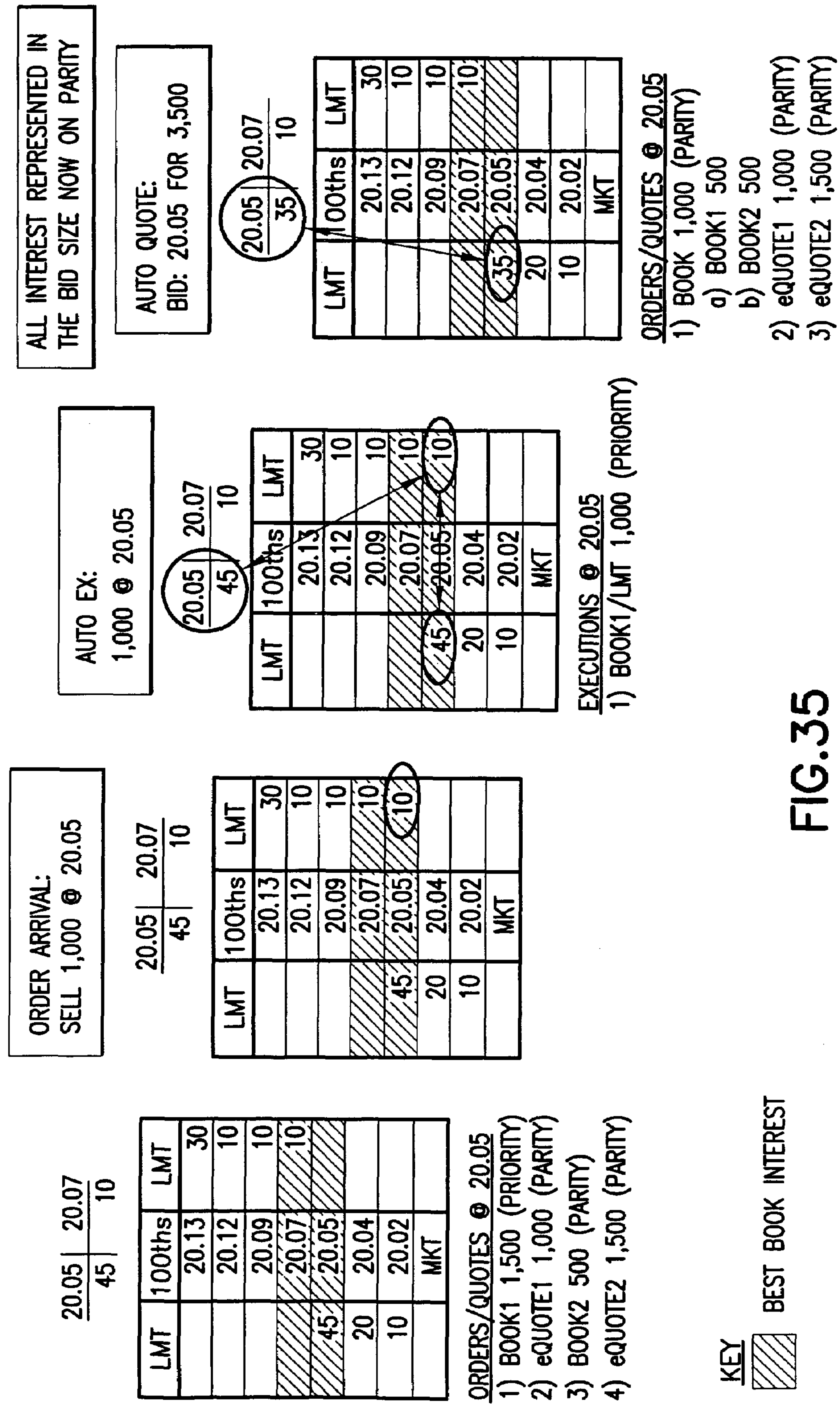
Figure 36:
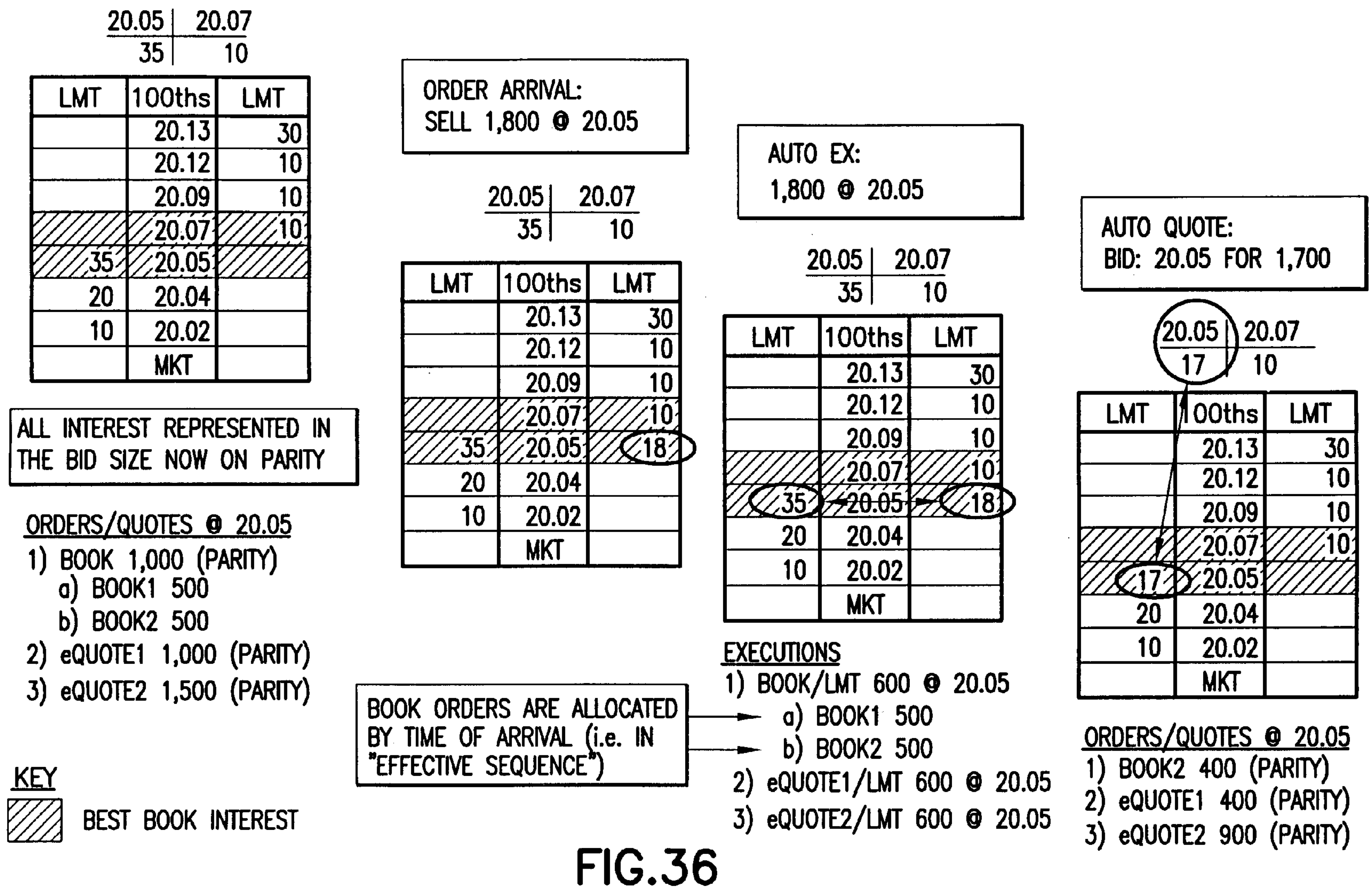

FIGS. 35 and 36 illustrate broker interest and execution priority after a trade. The best bid and offer are $20.05 and $20.07. The 4,500 shares at the bid include 1,500 shares from the order display book, which have priority, and 2,500 shares on parity made of 1,000 shares broker interest, 500 shares book and 1,500 shares broker interest. A limit order is received to sell 1,000 shares at $20.05, which is automatically executed against the bid, going to the priority bid. The order display book is autoquoted, and now the book orders and broker interest is on parity, even though 500 shares remain from the order that had priority. Of note, the book orders are aggregated for parity, while the broker interest is not. A limit order is received to sell 1,800 shares at $20.05, which is automatically executed. There are three groups of orders on parity, the book orders and the two broker interest, each of which get ⅓ or 600 shares of the 1,800. Among the book orders, the 600 shares are allocated by time of arrival with the earliest order for 500 getting 500 shares and the remaining 100 shares going to the newest book order. After the execution the order display book is autoquoted, again with all of the orders and broker interest on parity.

Figure 37:
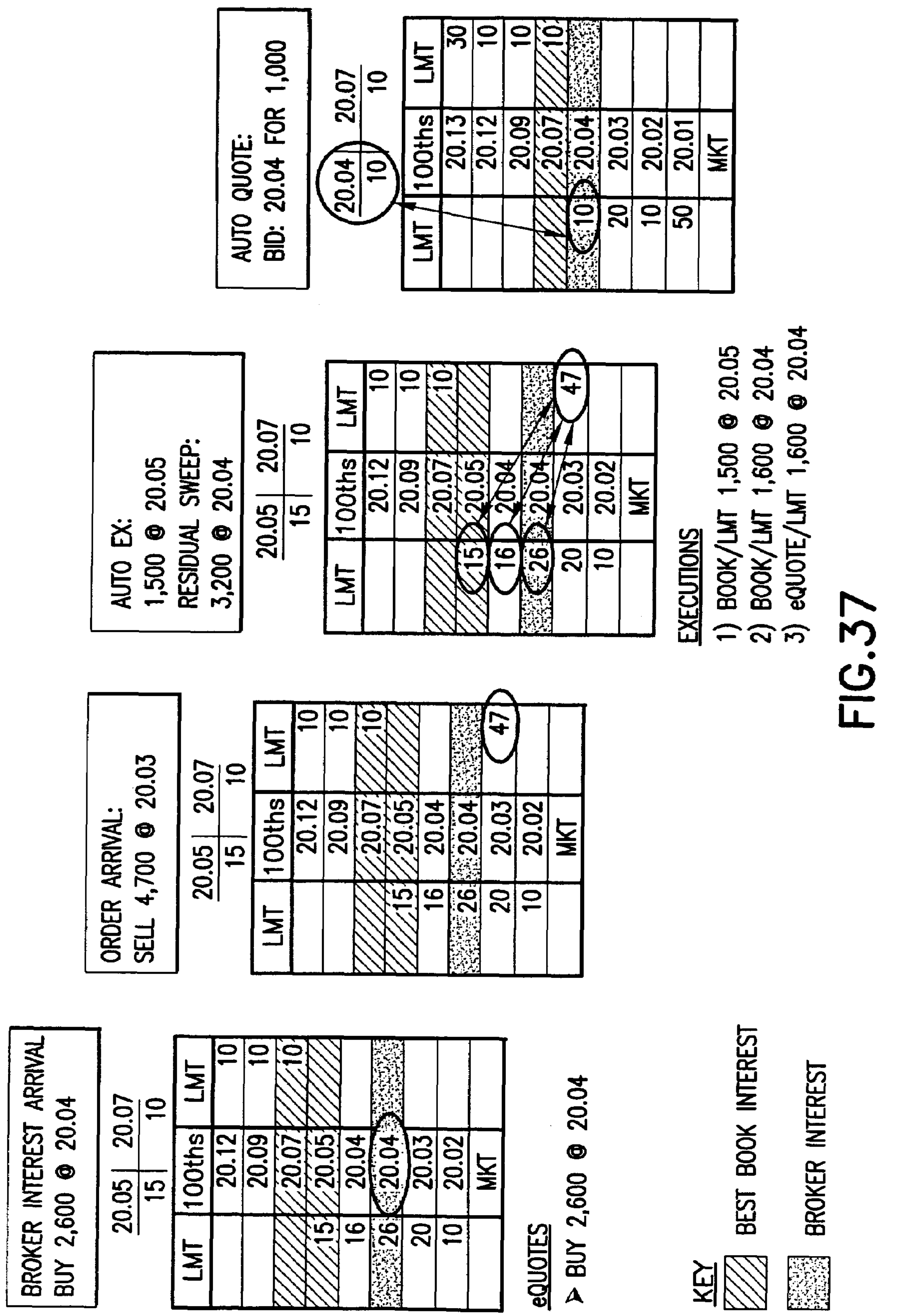

FIG. 37 illustrates trading of broker interest on parity with interest on the book at the sweep price. The best bid and offer are $20.05 and $20.07. Broker interest is received to buy 2,600 shares at $20.04. Because the interest is not at the best bid, it is not autoquoted. A limit order is received to sell 4,700 shares at $20.03, which is automatically executed. 1,500 shares trade at the bid price of $20.05, taking all of the size at the bid, and the remaining 3,200 shares sweep the order display book at $20.04. The 1,600 book shares are on parity with the 2,600 shares of broker interest at $20.04. After the execution, the remaining broker interest of 1,000 shares becomes the best bid and it is autoquoted.

Figure 38:
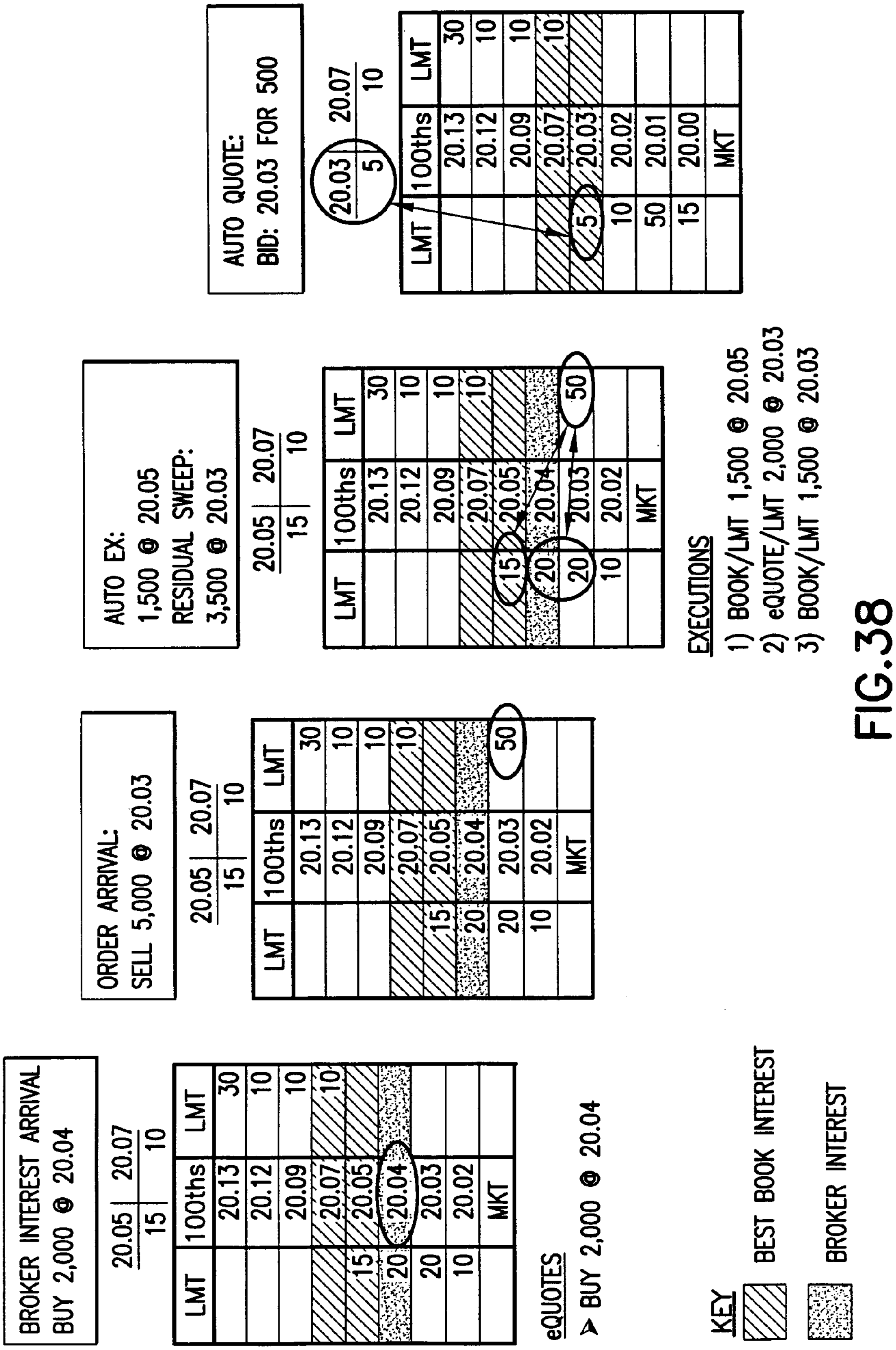

FIG. 38 illustrates broker interest and trade of the interest with the order display book in a sweep. The best bid and offer are $20.05 and $20.07. Broker interest is received to buy 2,000 shares at $20.04. A limit order is received to sell 5,000 shares at $20.03, which is automatically executed. 1,500 shares trade at the bid price of $20.05, taking all of the size at the bid, and the remaining 3,500 shares sweep the order display book at $20.03, providing price improvement to the broker interest.

Figure 39:
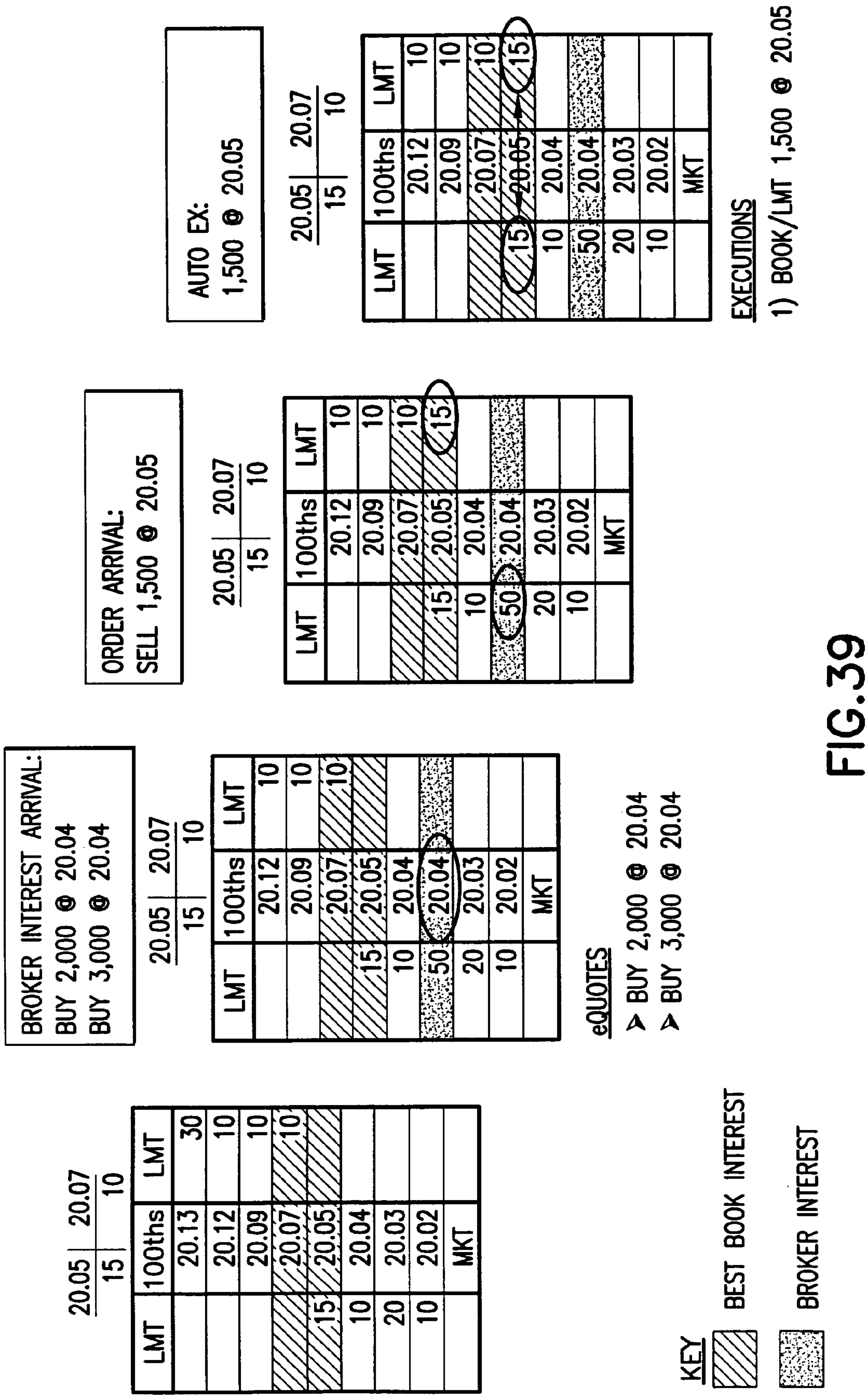
Figure 40:
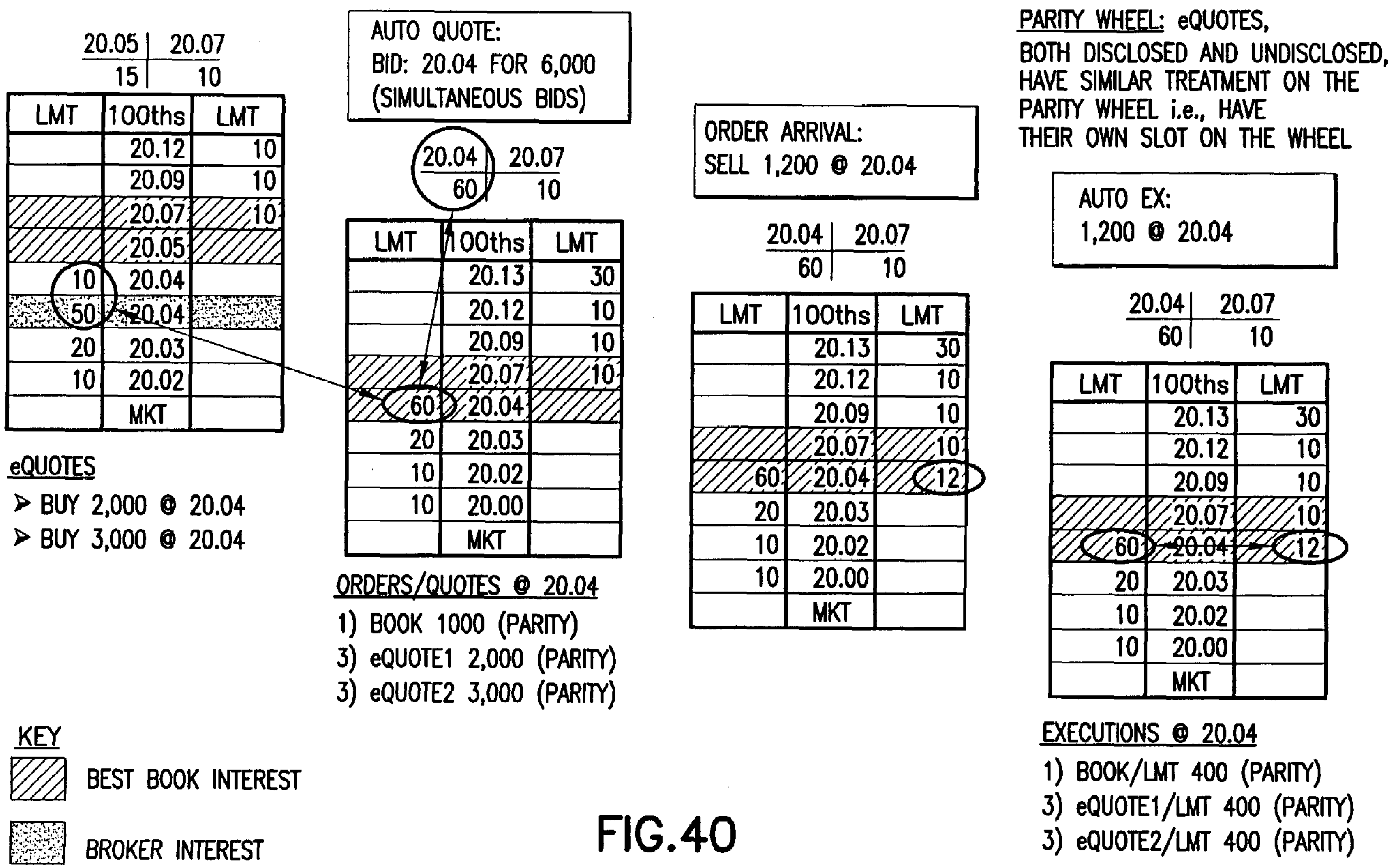

FIGS. 39 and 40 illustrate broker interest that becomes the best bid or offer, which trade on parity along with limit orders from the order display book. The best bid and offer are $20.05 and $20.07. Broker interest is received to buy 2,000 shares at $20.04. Additional broker interest is received to buy 3,000 shares at $20.04. A limit order is received to sell 1,500 shares at $20.05, which is automatically executed, taking all of the size at the bid. The best bid is now $20.04, so the broker interest is autoquoted along with the limit orders at $20.04 from the order display book. The orders and broker interest at the bid are on parity. A limit order is received to sell 1,200 shares at $20.04, which is automatically executed. This means that 400 shares are allocated to the order display book limit order and 400 shares each to the broker interests.

Figure 41:
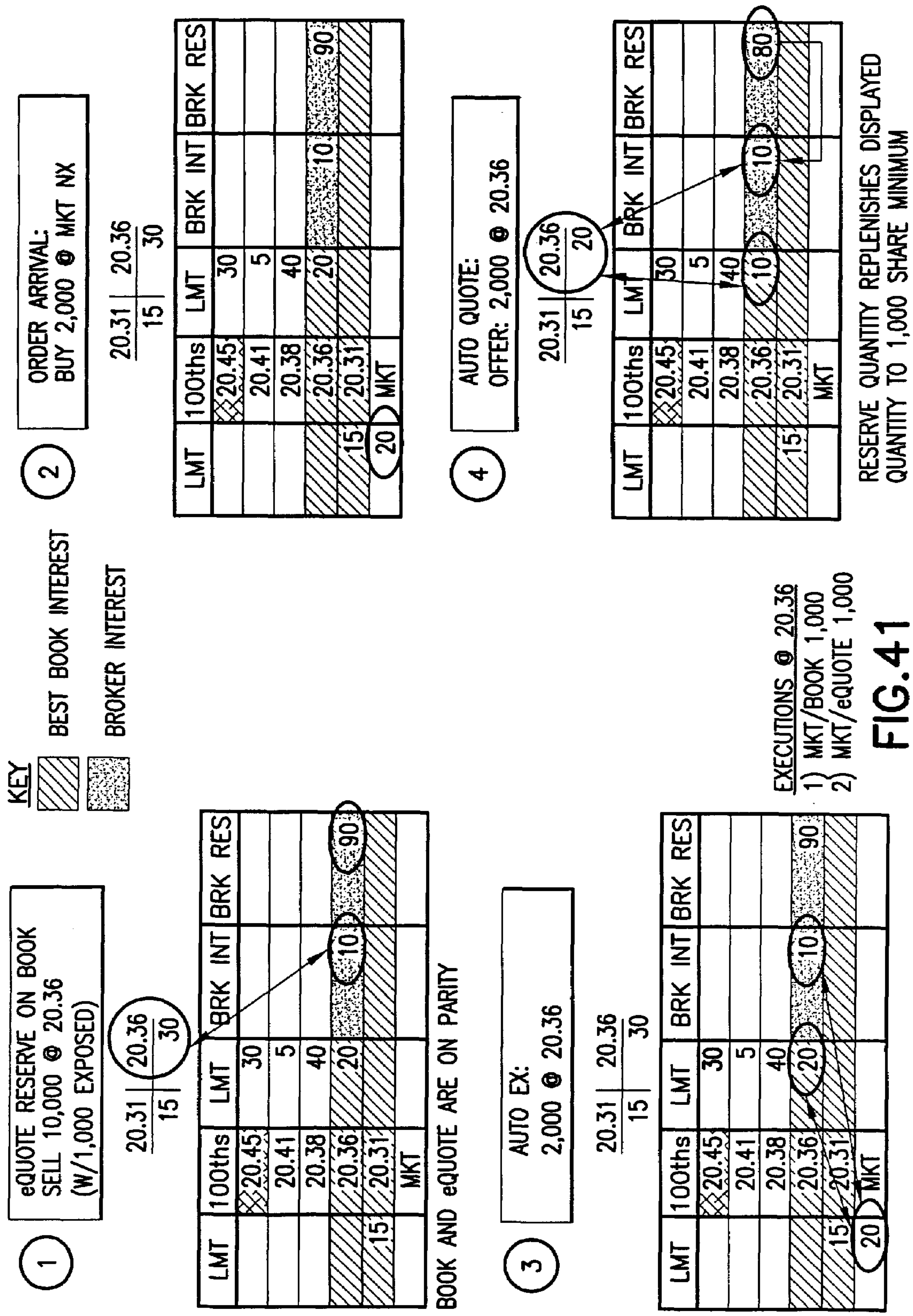

FIG. 41 illustrates displayed and reserve broker interest and replenishment of displayed interest from the reserve. The best bid and offer are $20.31 and $20.36. Broker reserve interest is received to sell 10,000 shares at $20.36, with 1,000 shares exposed. There are 2,000 shares already offered on the order display book at $20.36, which are added to the 1,000 shares exposed to make the offer 3,000 shares. The book and broker interest is on parity. A MKT NX order is received to buy 2,000 shares, which is automatically executed, 1,000 shares goes to the book and 1,000 shares goes to broker interest. This execution depletes the exposed broker interest, which is replenished from the reserve, leaving 8,000 shares hidden. 1,000 shares of exposed broker interest and 1,000 shares from the order display book are autoquoted at $20.36.

Figure 42:
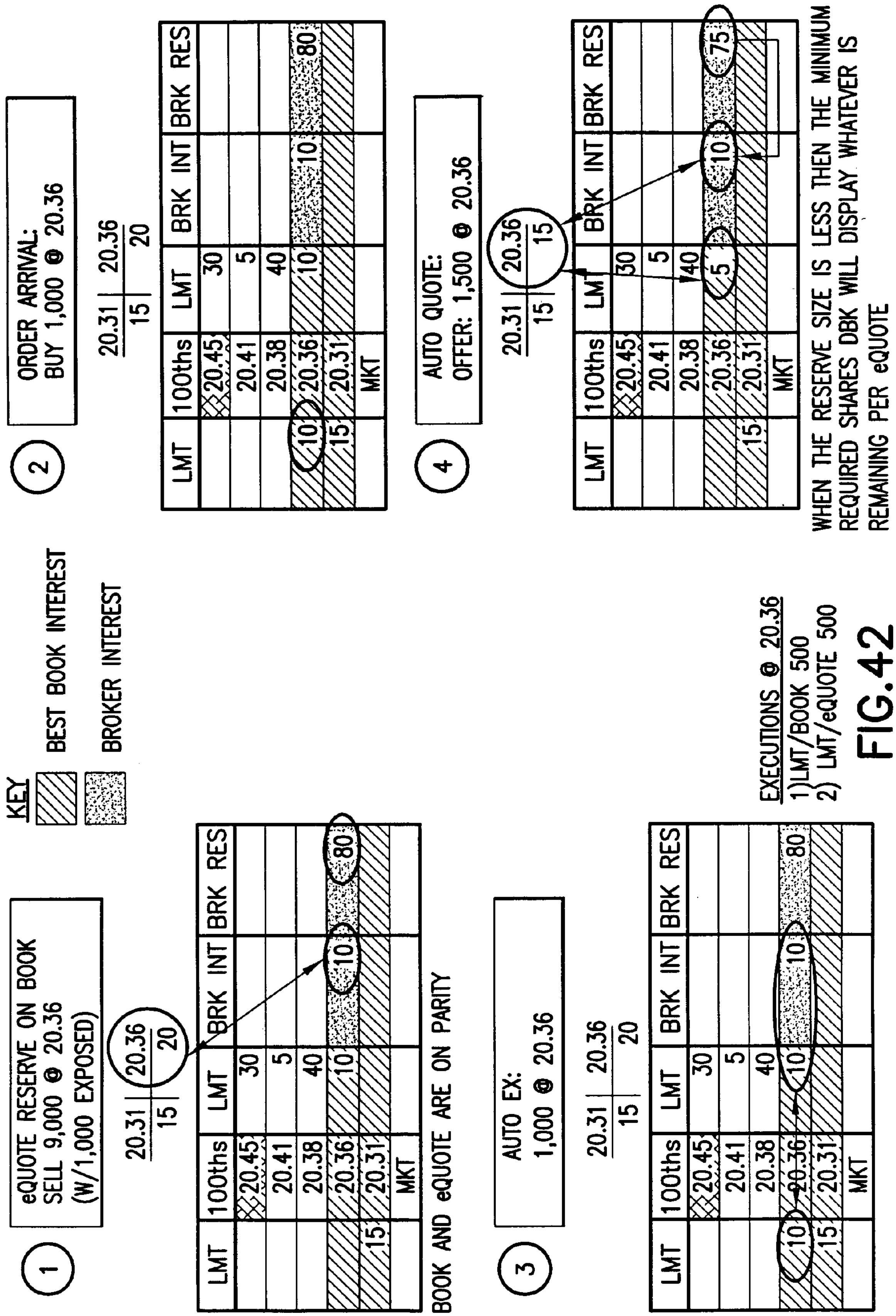

FIG. 42 illustrates displayed and reserve broker interest and replenishment of displayed interest from the reserve when the displayed interest falls below the minimum. The best bid and offer are $20.31 and $20.36. Broker reserve interest is received to sell 9,000 shares at $20.36, with 1,000 shares exposed. There are 1,000 shares already offered on the order display book at $20.36, which are added to the 1,000 shares exposed to make the offer 2,000 shares. The book and broker interest is on parity. A limit order is received to buy 1,000 shares at $20.36, which is automatically executed, 500 shares go to the book and 500 shares go to broker interest. This execution depletes 500 shares of the exposed broker interest, which is replenished from the reserve, leaving 7,500 shares hidden. 1,000 shares of exposed broker interest and 500 shares from the order display book are autoquoted at $20.36.

Figure 44:
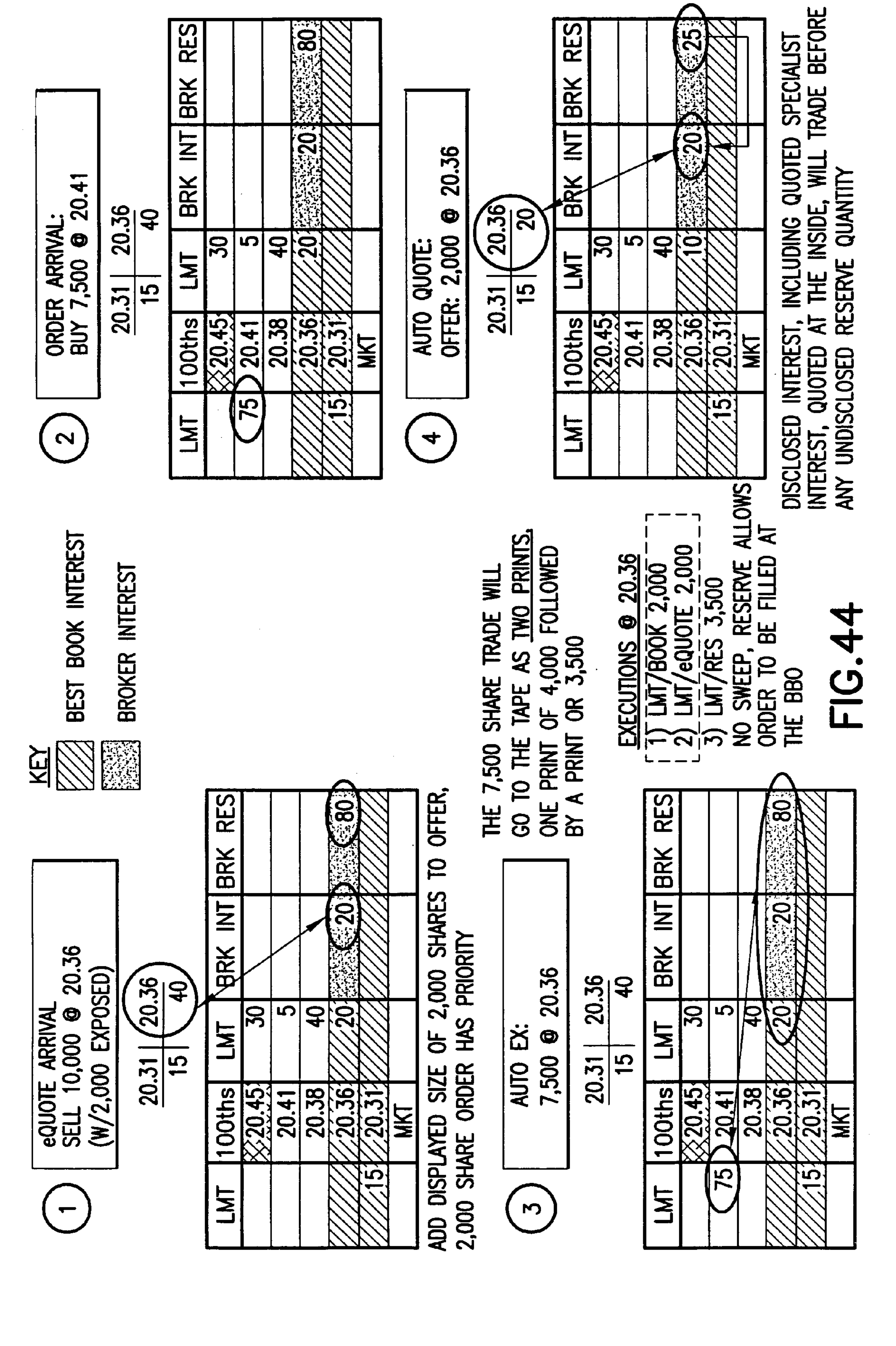

There is no FIG. 43. FIG. 44 illustrates broker reserve interest and dampening volatility at the best bid or offer. The best bid and offer are $20.31 and $20.36. Broker reserve interest is received to sell 10,000 shares at $20.36, with 2,000 shares exposed. There are 2,000 shares already offered on the order display book at $20.36, which are added to the 2,000 shares exposed to Make the offer 4,000 shares. The 2,000 share order on the order display book has priority. A limit order is received to buy 7,500 shares at $20.41, which is automatically executed at $20.36. This execution will be two prints. One is the 4,000 shares at the offer, and the other print is 3,500 shares from the broker reserve interest. These executions deplete all of the exposed broker interest, which is replenished from the reserve, leaving 2,500 shares hidden. 2,000 shares of exposed broker interest are autoquoted at $20.36.

Figure 47:
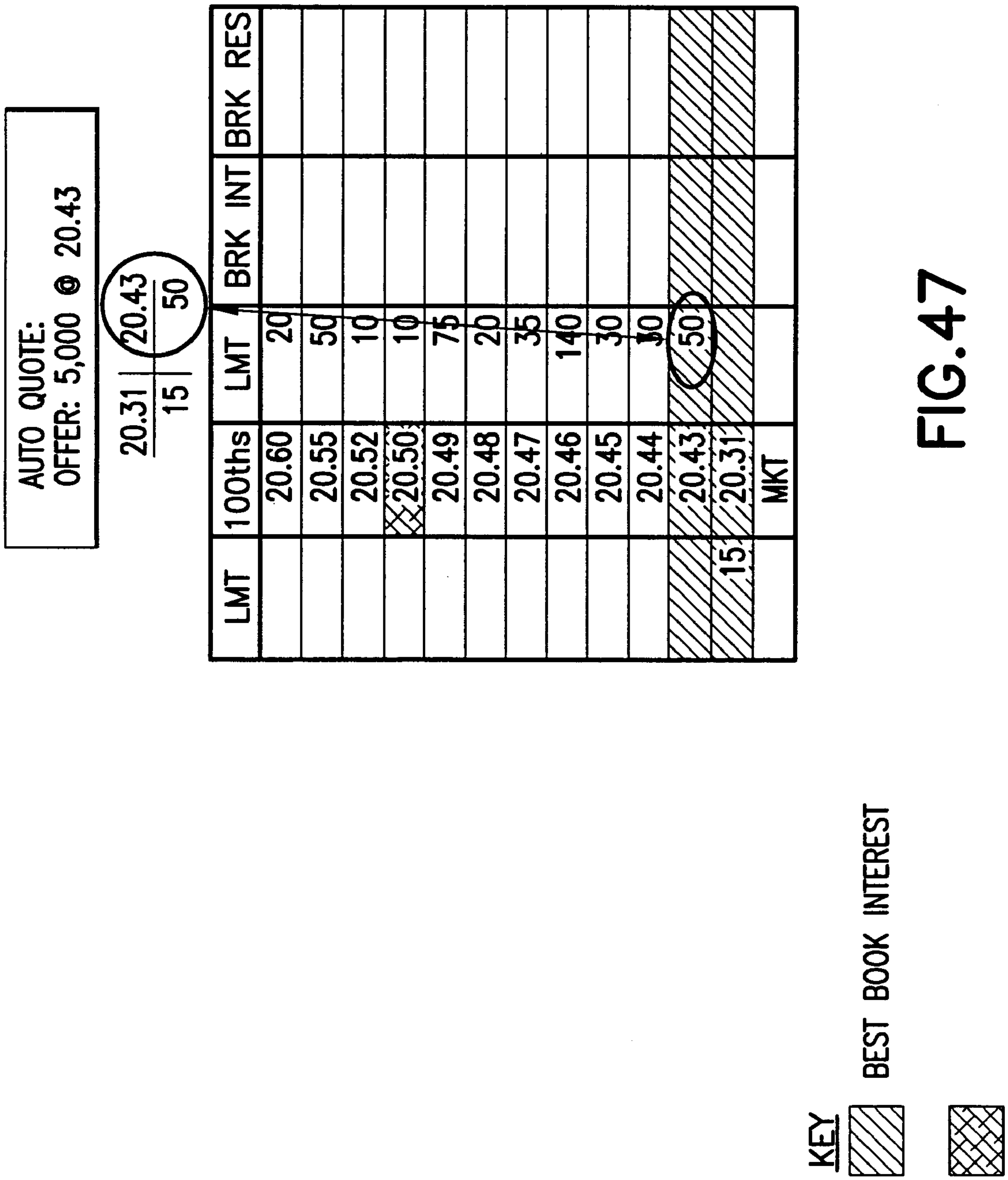

FIGS. 45, 46 and 47 illustrate trading reserve at the inside before any residual sweep. The best bid and offer are $20.31 and $20.36. Broker reserve interest is received to sell 10,000 shares at $20.36, with 1,000 shares exposed. There are 2,000 shares already offered on the order display book at $20.36, which are added to the 1,000 shares of exposed broker interest to make the offer 3,000 shares. A limit order is received to buy 29,000 shares at $20.45, which is automatically executed. The first print is 3,000 shares at $20.36, representing the shares in the offer. The second print is 9,000 shares at $20.36, representing the undisclosed reserve broker interest. The next is 17,000 shares at $20.43, representing the sweep to fill the order. When finished, 5,000 shares remain on the order display book at $20.43, which is autoquoted as the offer.

Figure 48:
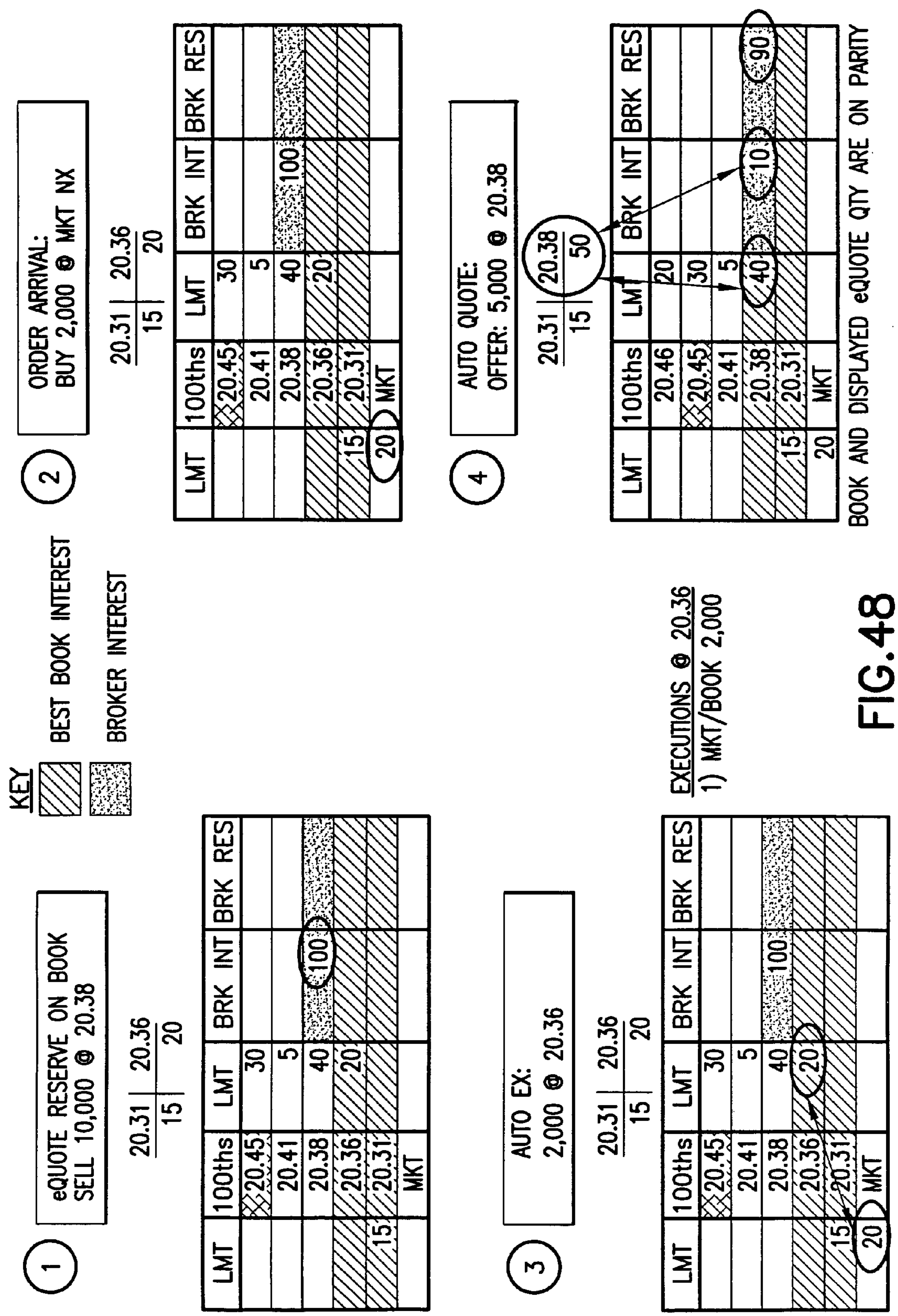

FIG. 48 illustrates reserve broker interest away from the market and then at the market. The best bid and offer are $20.31 and $20.36. Broker reserve interest is received to sell 10,000 shares at $20.38. There is no broker interest at the offer. The default exposure size of 1,000 shares applies. However, at this time the broker interest is away from the market so none of the broker interest is reflected in the quote. A MKT NX order is received to buy 2,000 shares, which is automatically executed against the 2,000 shares on the order display book. This takes all of the size at the offer, so the best offer is now $20.38, which is autoquoted and includes 4,000 shares from the order display book and 1,000 shares of exposed broker interest.

Figure 49:
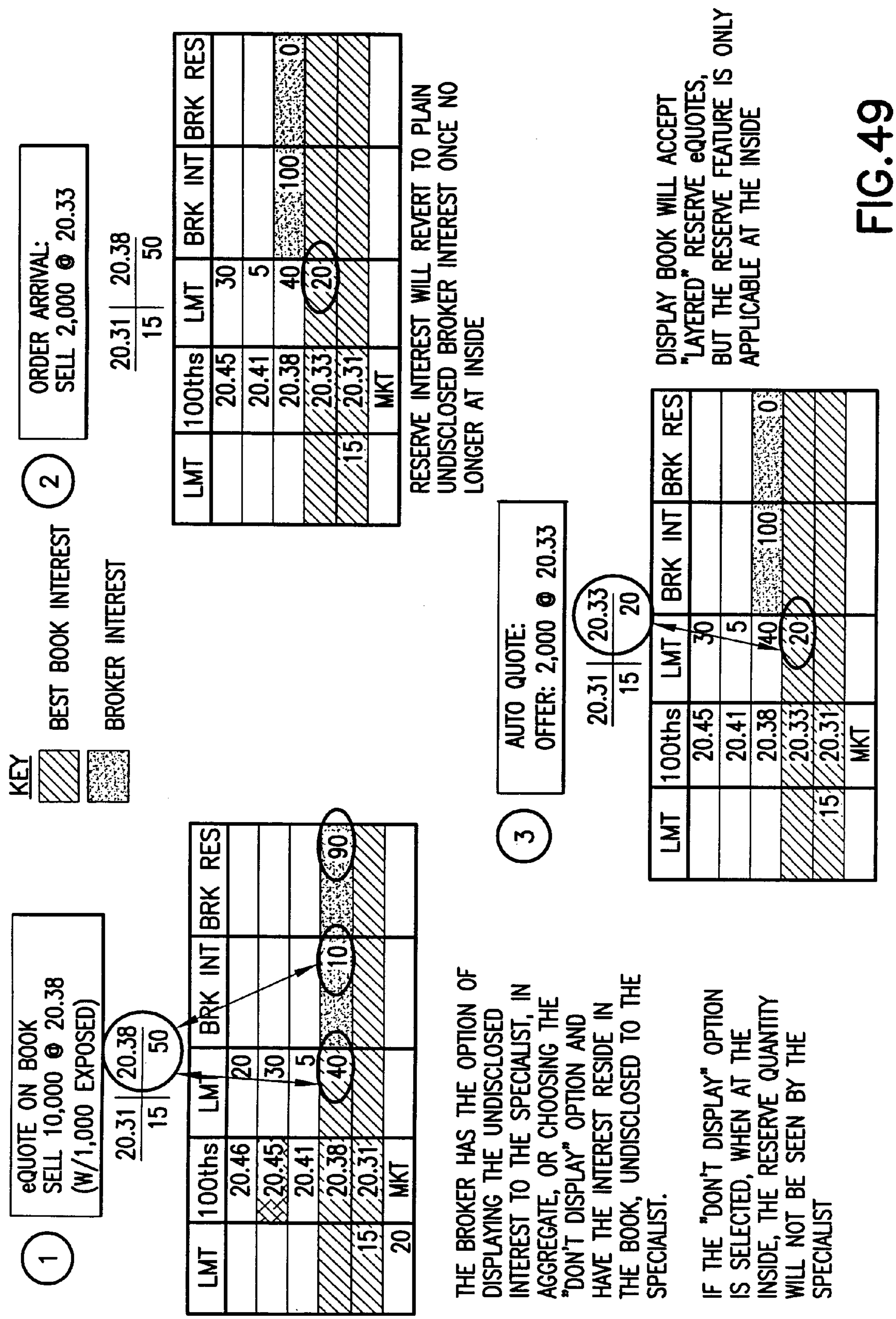

FIG. 49 illustrates exposed and reserve broker interest at the inside and away from the market. The best bid and offer are $20.31 and $20.38. Broker reserve interest is received to sell 10,000 shares at $20.38, with 1,000 shares disclosed. A limit order is received to sell 2,000 shares at $20.33, which is autoquoted as the best offer. Because the reserve interest is no longer at the inside market, it reverts to plain undisclosed broker interest. The broker may elect to display the undisclosed interest to the Specialist, in aggregate, or have the reserve interest reside in the order display book undisclosed to the specialist. When at the inside, if the broker elected "don't display" the broker reserve, it will not be seen by the specialist.

Figure 50:
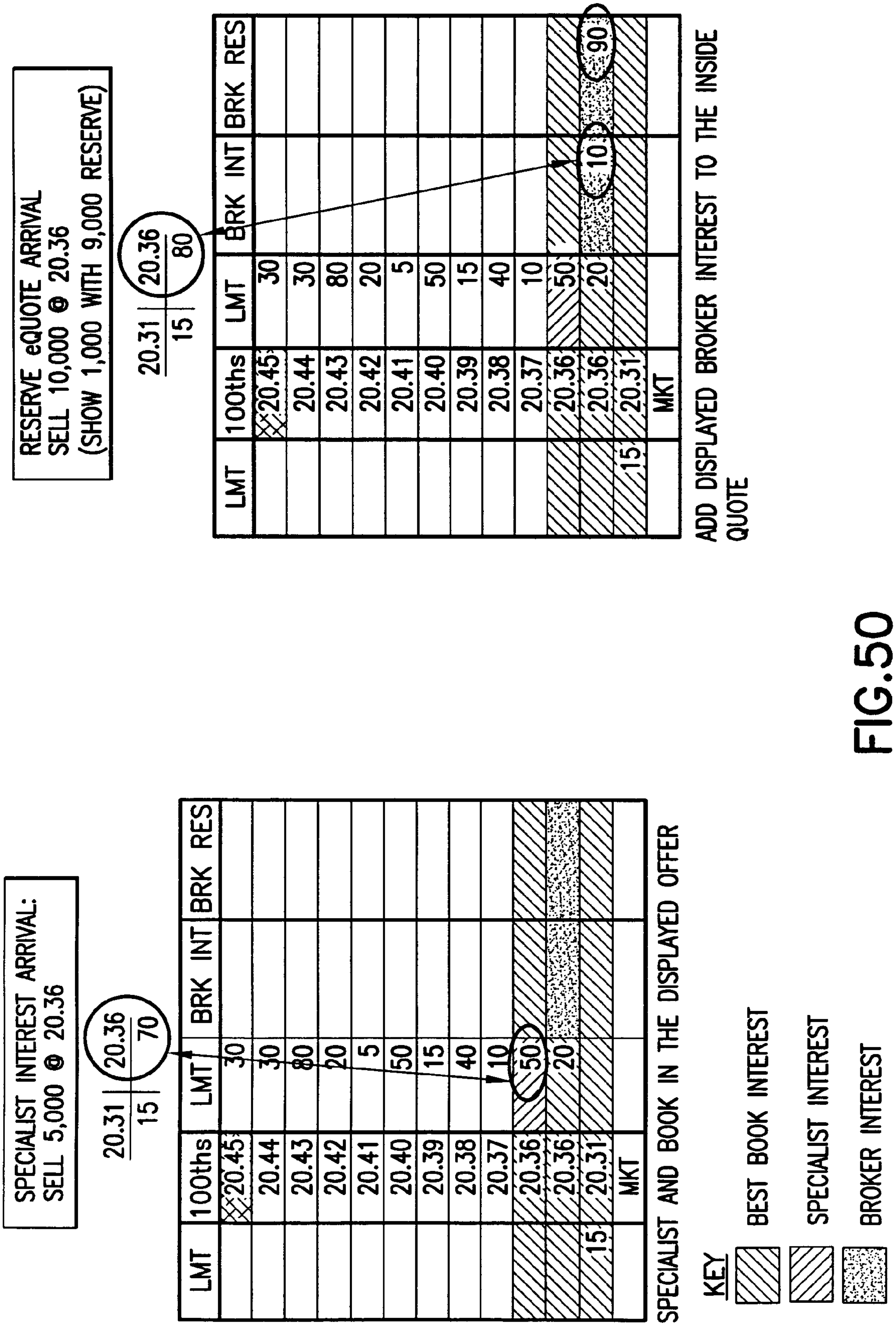
Figure 51:
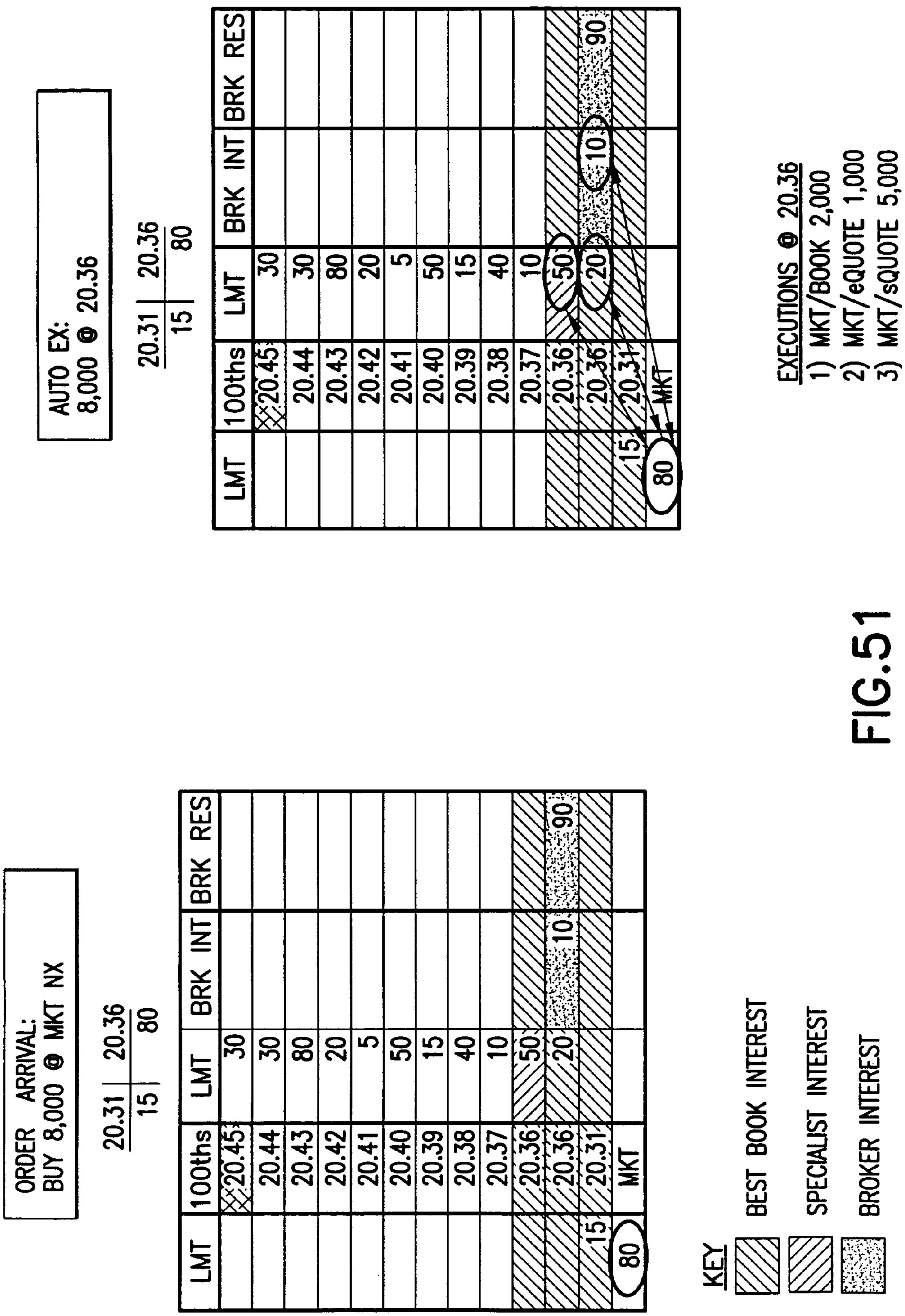

FIGS. 50 and 51 illustrate trading of disclosed interest, including specialist interest, before any reserve quantity. The best bid and offer are $20.31 and $20.36. Specialist interest is received to sell 5,000 shares at $20.36, which is autoquoted, making the offer size 7,000 shares. Broker interest is received to sell 10,000 shares at $20.36, with 1,000 shares disclosed and 9,000 shares reserve. The broker interest is autoquoted, making the offer size 8,000 shares. A MKT NX order is received to buy 8,000 shares, which is automatically executed. 2,000 shares go to the order limit book, 1,000 shares go to the broker disclosed interest, and 5,000 shares go to the specialist interest. This completely fills the MKT NX order, so no broker reserve interest trades.

Figure 52:
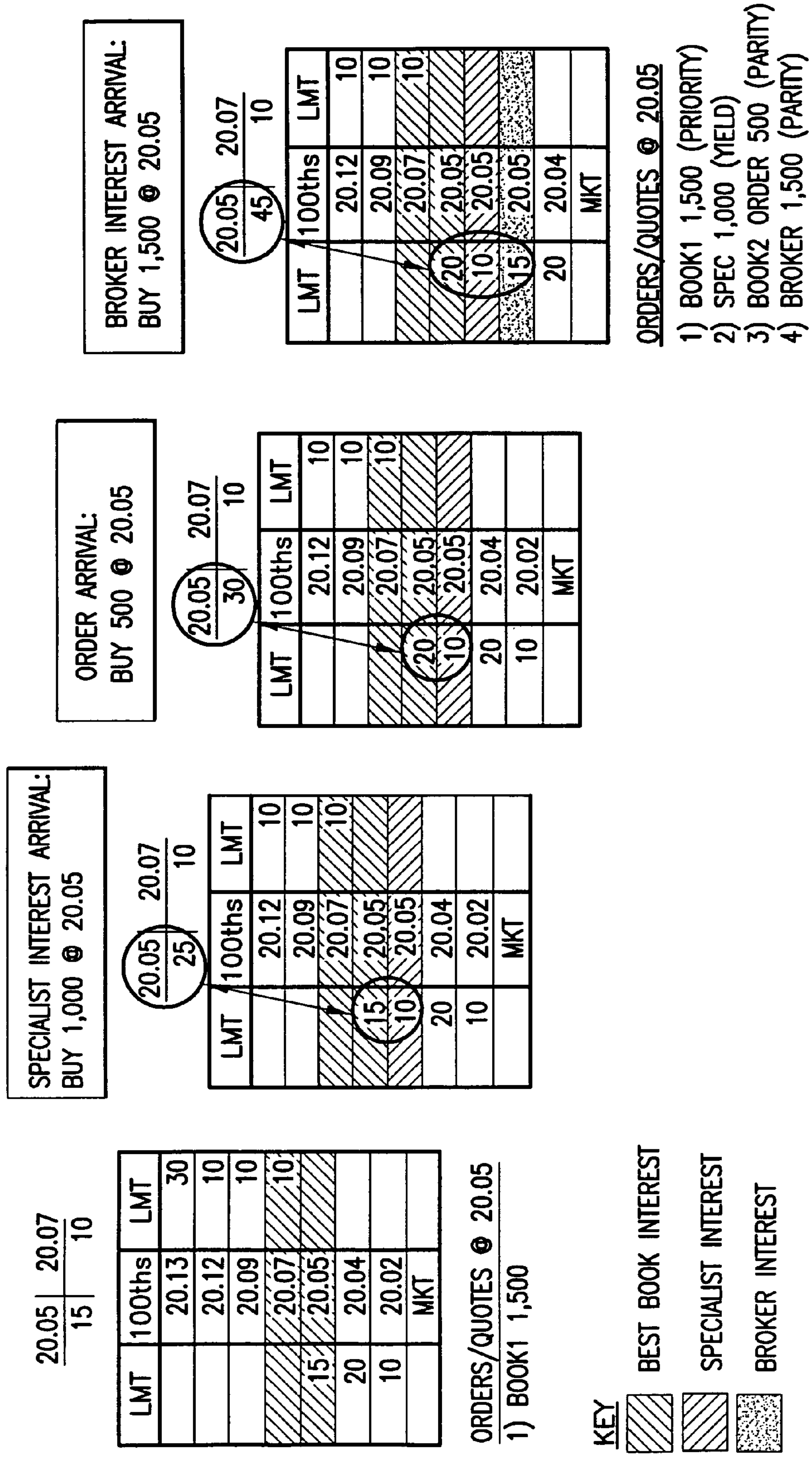
Figure 53:
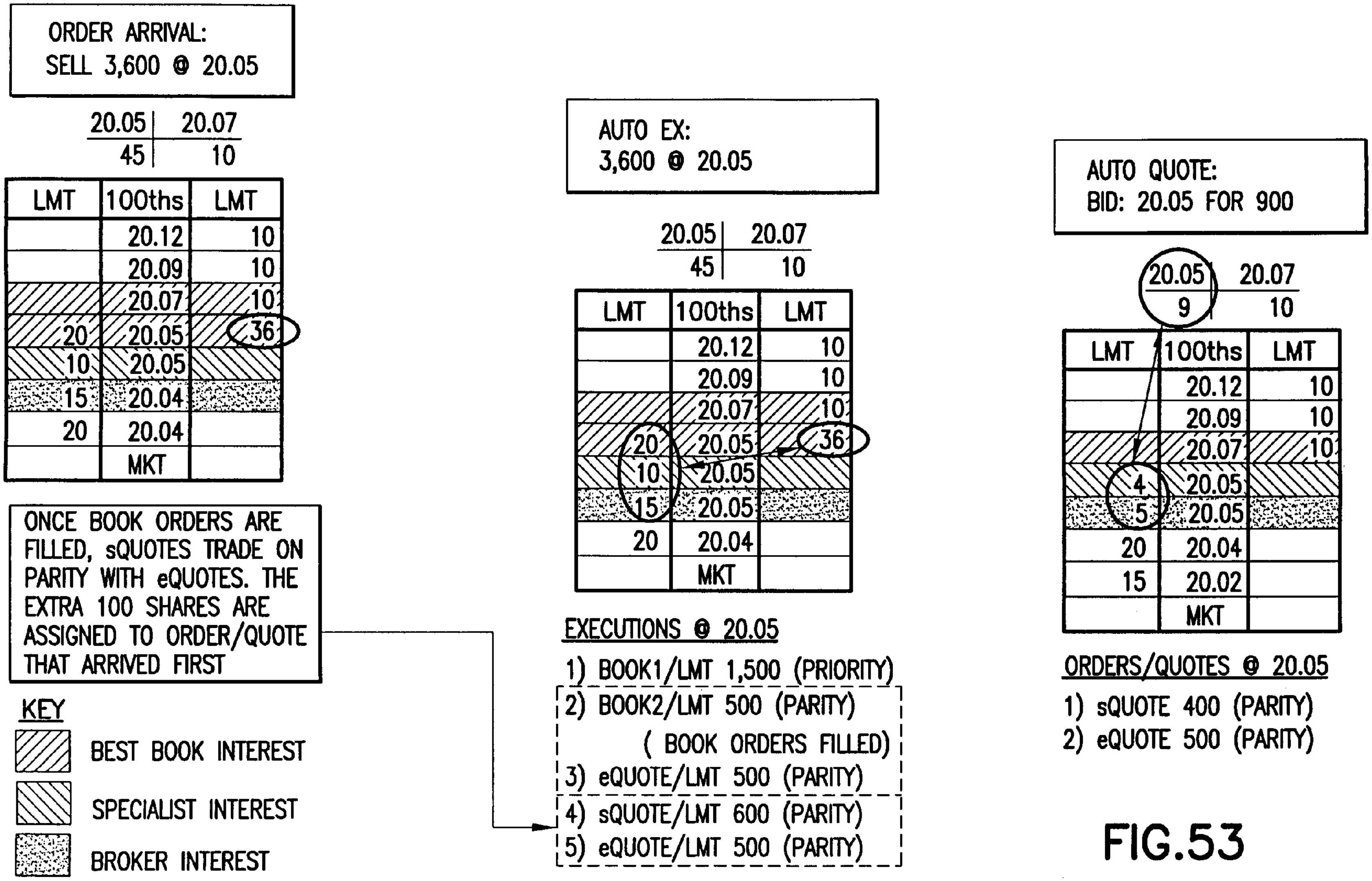

FIGS. 52 and 53 illustrate specialist interest participating in the quote along with orders on the order display book. The best bid and offer are $20.05 and $20.07. The 1,500 shares bid at $20.05 from the book have priority. Specialist interest is received to buy 1,000 shares at @20.05, which is autoquoted. The specialist interest must yield to the book. A limit order is received to buy 500 shares at $20.05, which is autoquoted. Now, the original 1,500 shares still has priority, the specialist interest must yield and the limit order is on parity. Broker interest is received to buy 1,500 shares at $20.05, which is autoquoted. Now, the original 1,500 shares from the book still have priority, the specialist interest must yield and the limit order and broker interest are on parity. A limit order is received to sell 3,600 shares at $20.05, which is automatically executed. The first 1,500 shares go to the original 1,500 shares from the book with priority. The next 1,000 shares go 500 to the limit order that was on parity and 500 to the broker interest that was on parity. This exhausts the remaining book orders, and the specialist interest no longer needs to yield. The remaining 1,100 shares are allocated between the specialist interest and broker interest, with the extra 100 shares going to the specialist interest because it was received first. When the executions are finished, 900 shares remain at $20.05, and include 400 from the specialist interest and 500 from the broker interest, which are autoquoted.

Figure 54:
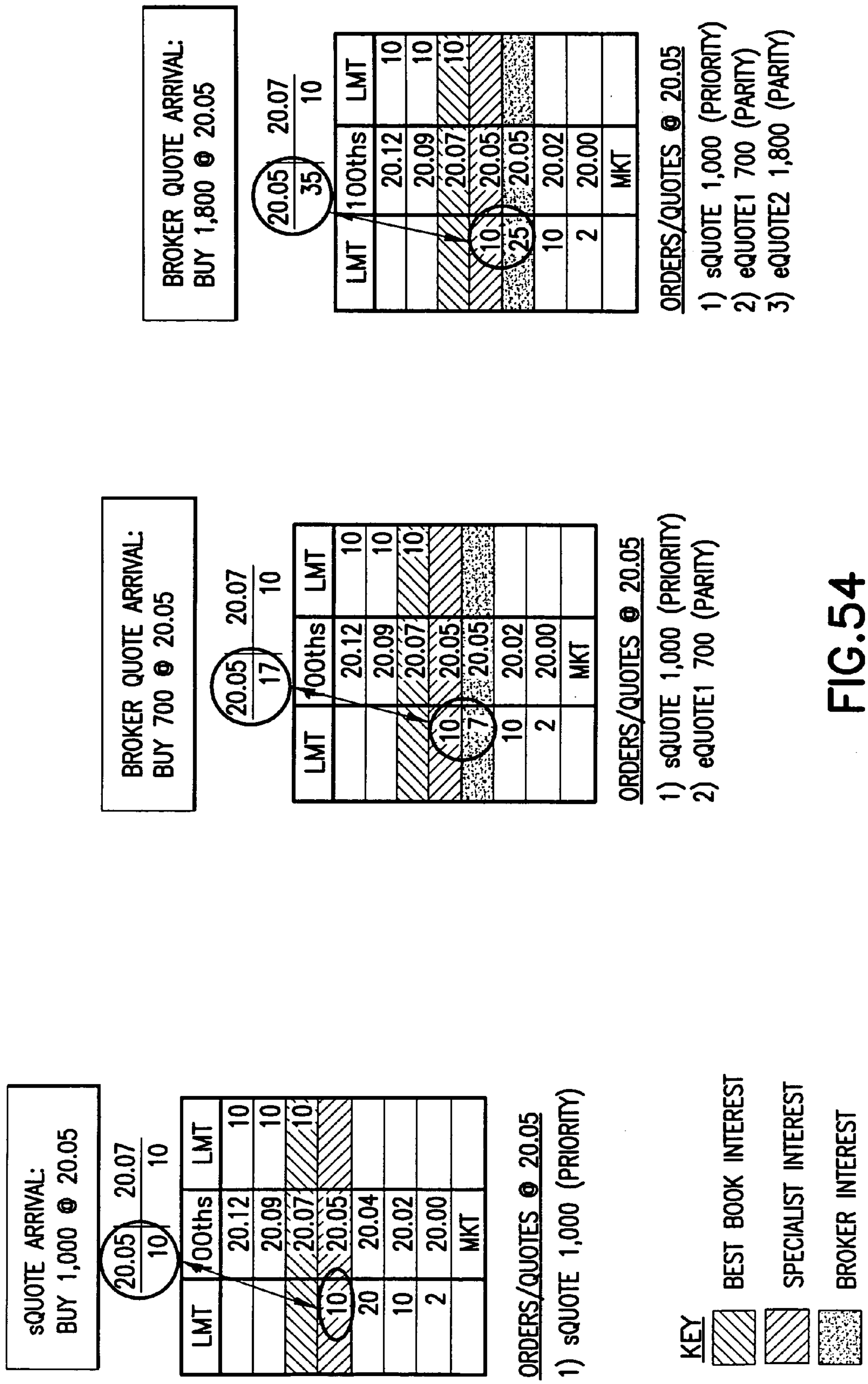
Figure 55:
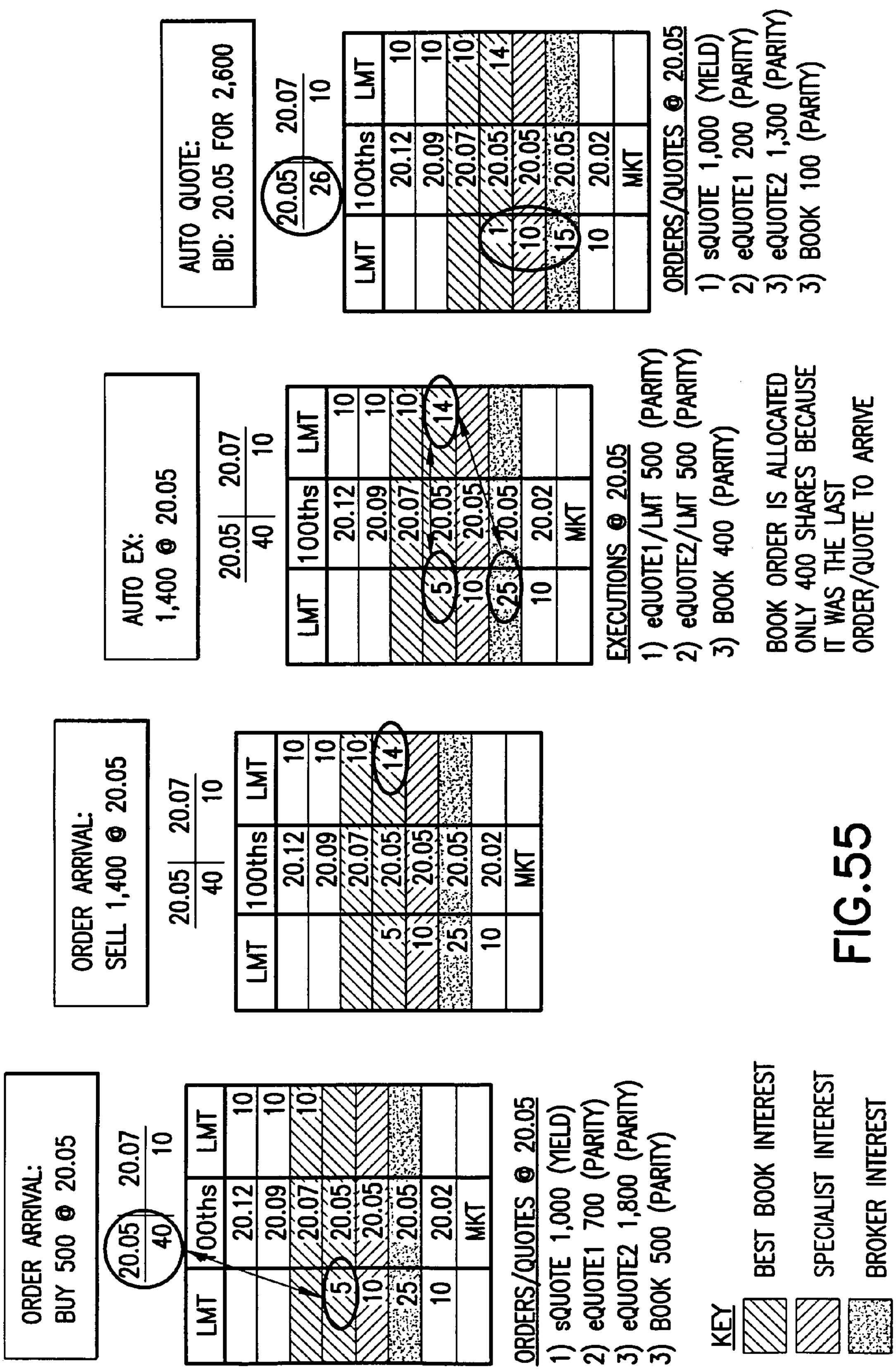

FIGS. 54 and 55 illustrate specialist interest and priority over crowd and broker interest for one trade, but not over orders on the order display book. Specialist interest is received to buy 1,000 shares at $20.05, which is the best bid and it is autoquoted. The best bid and offer are $20.05 and $20.07. Broker interest is received to buy 700 shares at $20.05, which is autoquoted. The specialist interest has priority. Broker interest is received to buy 1,800 shares at $20.05, which is autoquoted. The specialist interest still has priority and the two broker interests are on parity. A limit order is received to buy 500 shares at $20.05, which is autoquoted. The specialist interest no longer has priority and must yield, making the other orders and broker interest at $20.05 on parity. A limit order is received to sell 1,400 shares at $20.05, which is automatically executed. Each of the broker interests are allocated 500 shares and the book order is allocated 400 shares because it was received last. The orders and interest are autoquoted and because 100 shares remain from the limit order, the specialist must still yield. However if that 100 share book order cancels, then the specialist interest is back on parity.

Figure 56:
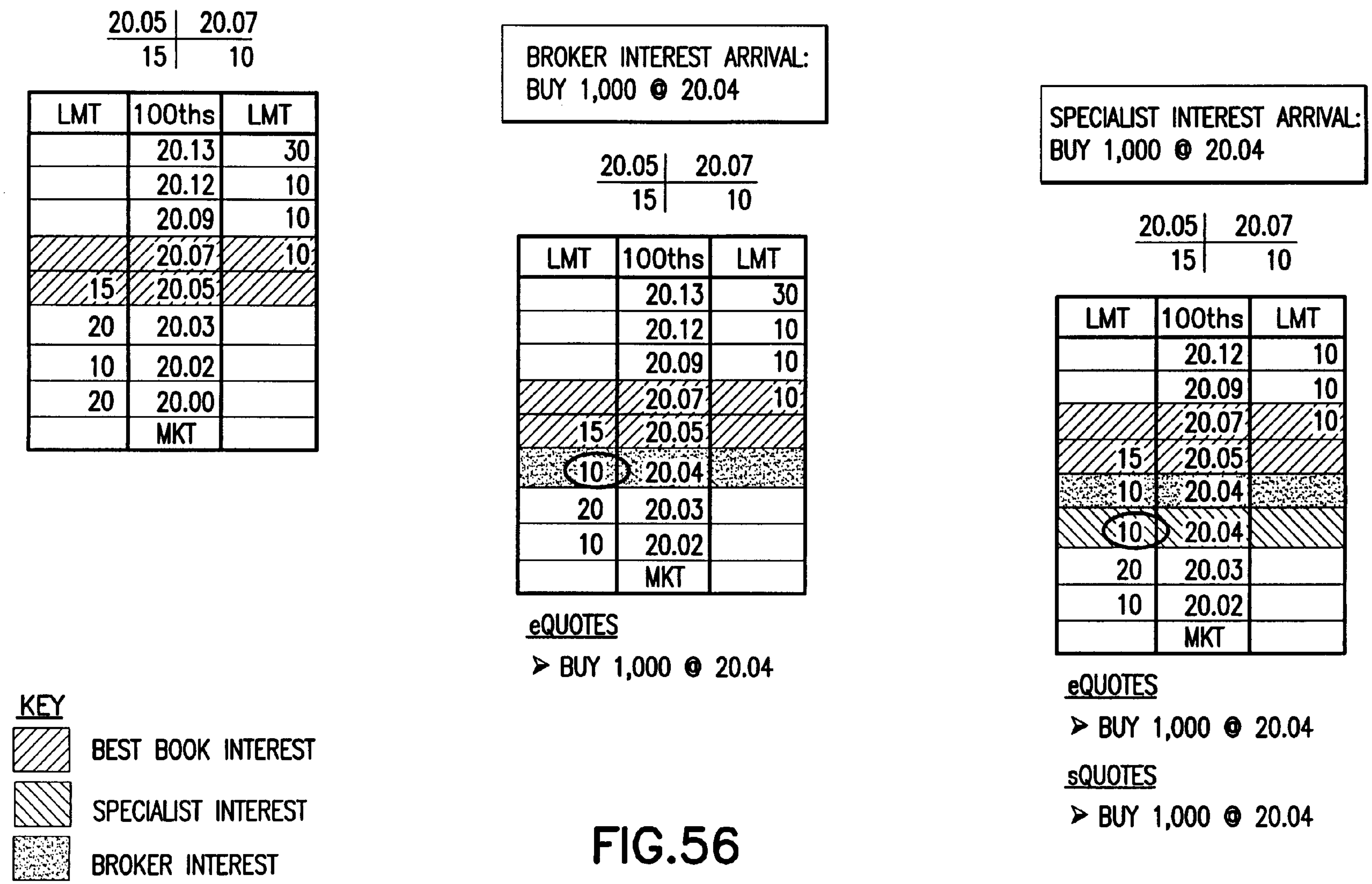
Figure 57:
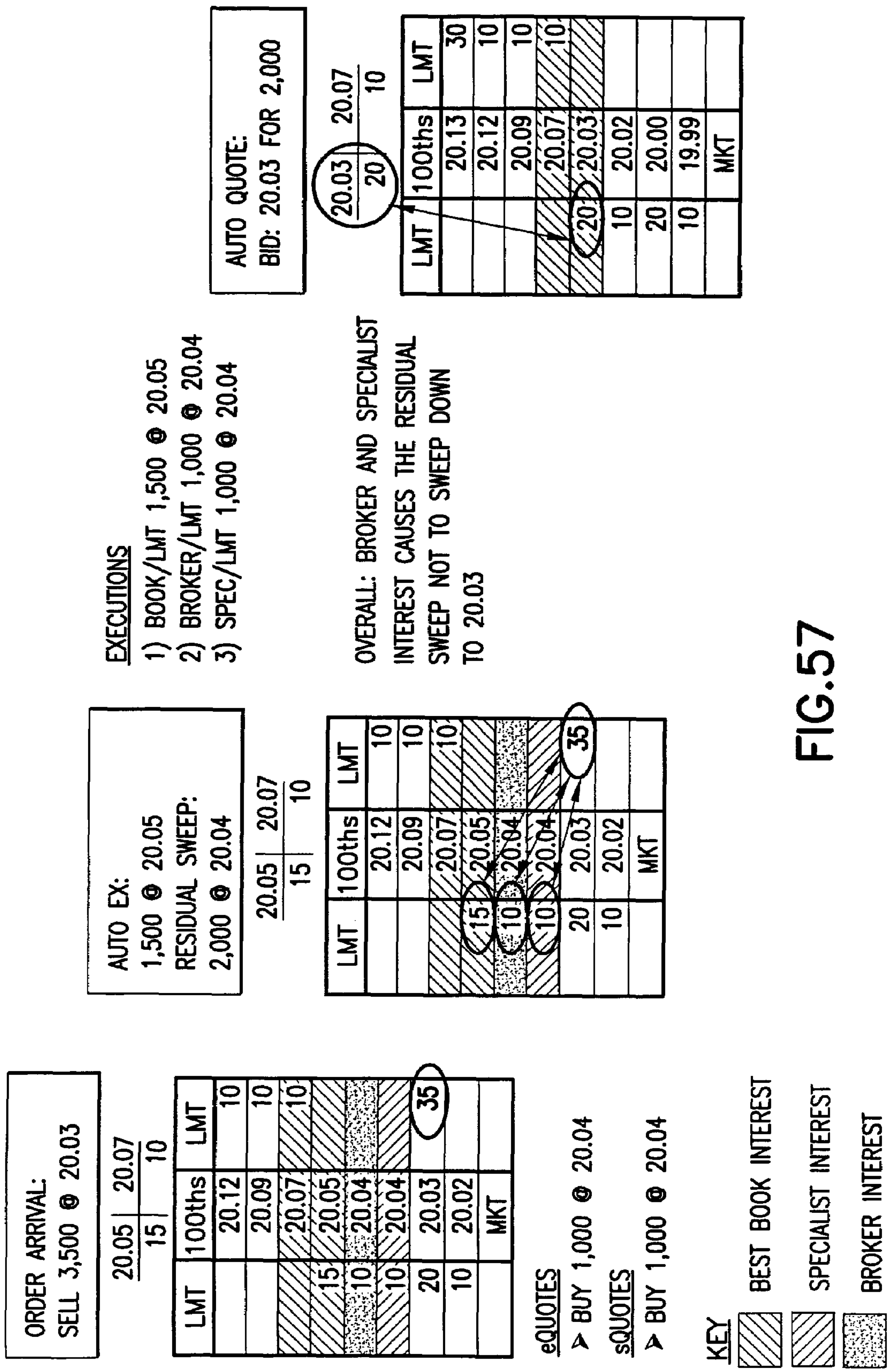

FIGS. 56 and 57 illustrate specialist interest trading during a sweep, adding liquidity and improving a sweep price. The best bid and offer are $20.05 and $20.07. Broker interest is received to buy 1,000 shares at $20.04. Specialist interest is received to buy 1,000 shares at $20.04. A limit order is received to sell 3,500 shares at $20.03, which is automatically executed. 1,500 shares trade at the bid of $20.05, and 2,000 shares trade in a sweep against the broker and specialist interest at $20.04. The broker and specialist interest allows the trade to sweep to $20.04 instead of down to $20.03. After the execution, the order display book is autoquoted.

Figure 58:
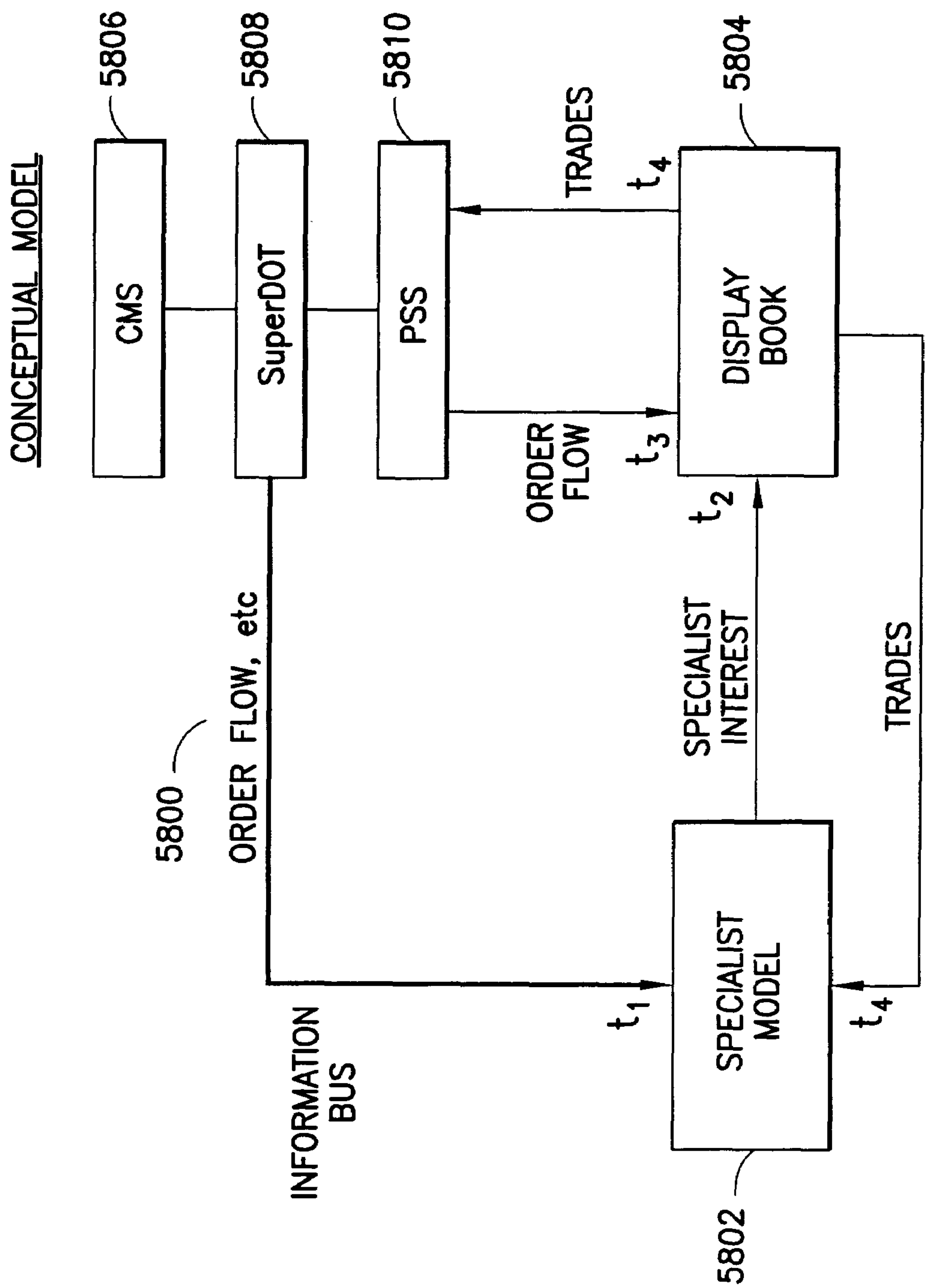

One way for specialists to enter their interest is by manually entering the parameters. Another way is through the use of an API and algorithms. In some embodiments, specialists have advance knowledge of order flow in their algorithms, which is illustrated at 5800 in FIG. 58. In these embodiments, the specialist algorithm (5802) receives order flow information prior to the order display book (5804). This allows the specialist algorithm to decide whether to send specialist interest to the order display book, which could interact with that incoming order. As illustrated, orders are received by the Common Message Switch ("CMS") (5806), and they are passed to SuperDOT (5808). At SuperDOT, the order information splits, with order flow information going to the specialist algorithms (5802), where the algorithm can decide whether to send specialist interest to the order display book (5804). The order information is also sent from SuperDOT to the Post Support System ("PSS") (5810) and then to the order display book. Following a trade, the trade information is sent back to PSS and the specialist algorithms. In these embodiments, the specialist algorithms are allowed to send specialist interest to the order display book based on the knowledge of the order flow only if certain conditions are met. The specialist also has the option of sending quotes without knowledge of order flow.

Figure 59:
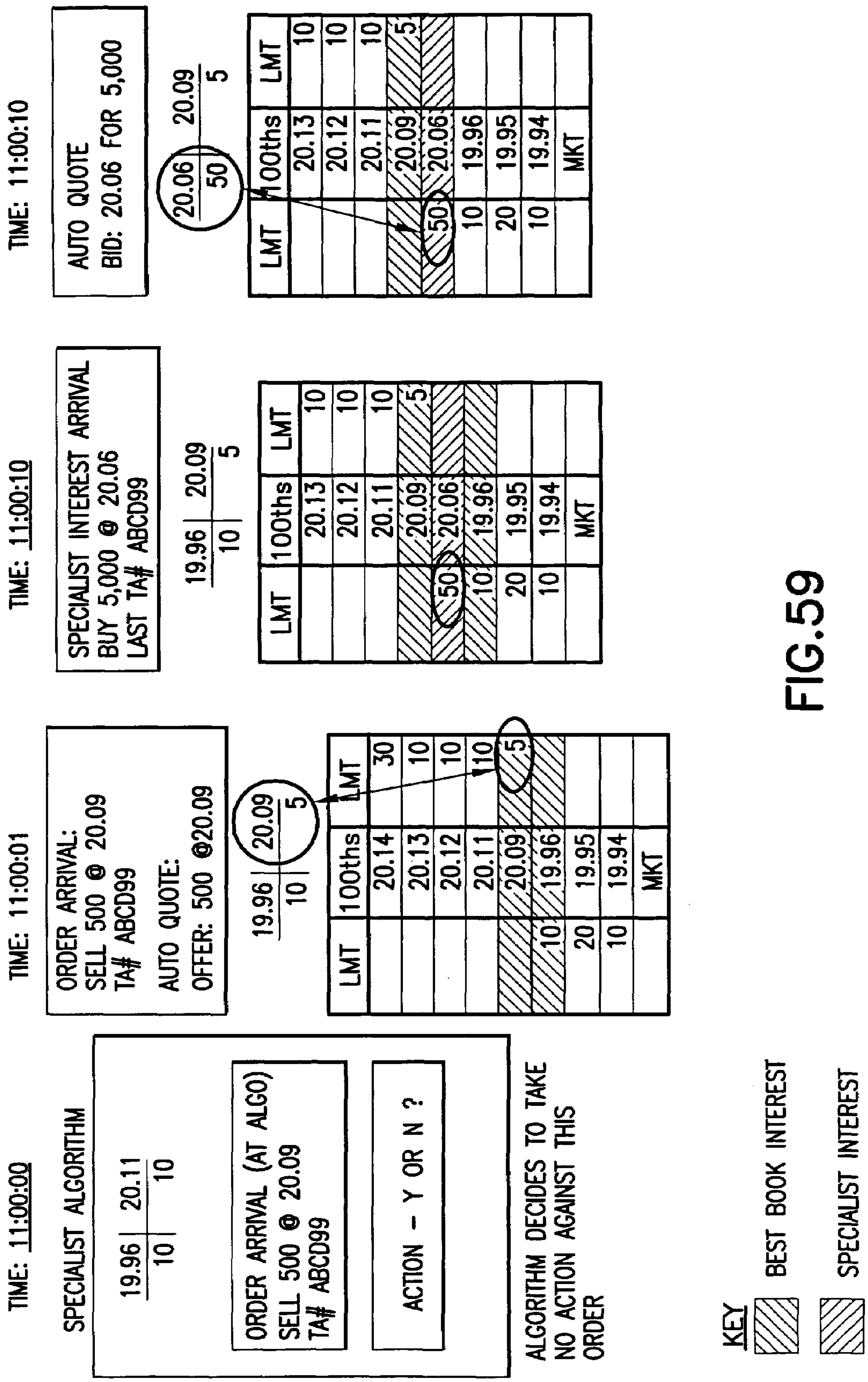

FIG. 59 illustrates how an specialist algorithm can establish a new best bid or offer if it is not in reaction to order flow information. The best bid and offer are $19.96 and $20.11. After routing through CMS and SuperDOT, an order is received by the specialist algorithm to sell 500 shares at $20.09, and the specialist algorithm decides to take no action against this order. The order arrives at the order display book where it is autoquoted as the best offer. Shortly after, specialist interest is received by the order display book to buy 5,000 shares at $20.06. This interest includes an identifier of the turn around number (TA#) of the last order seen by the specialist algorithm. Because the specialist interest is now the best bid, it is autoquoted.

Figure 60:
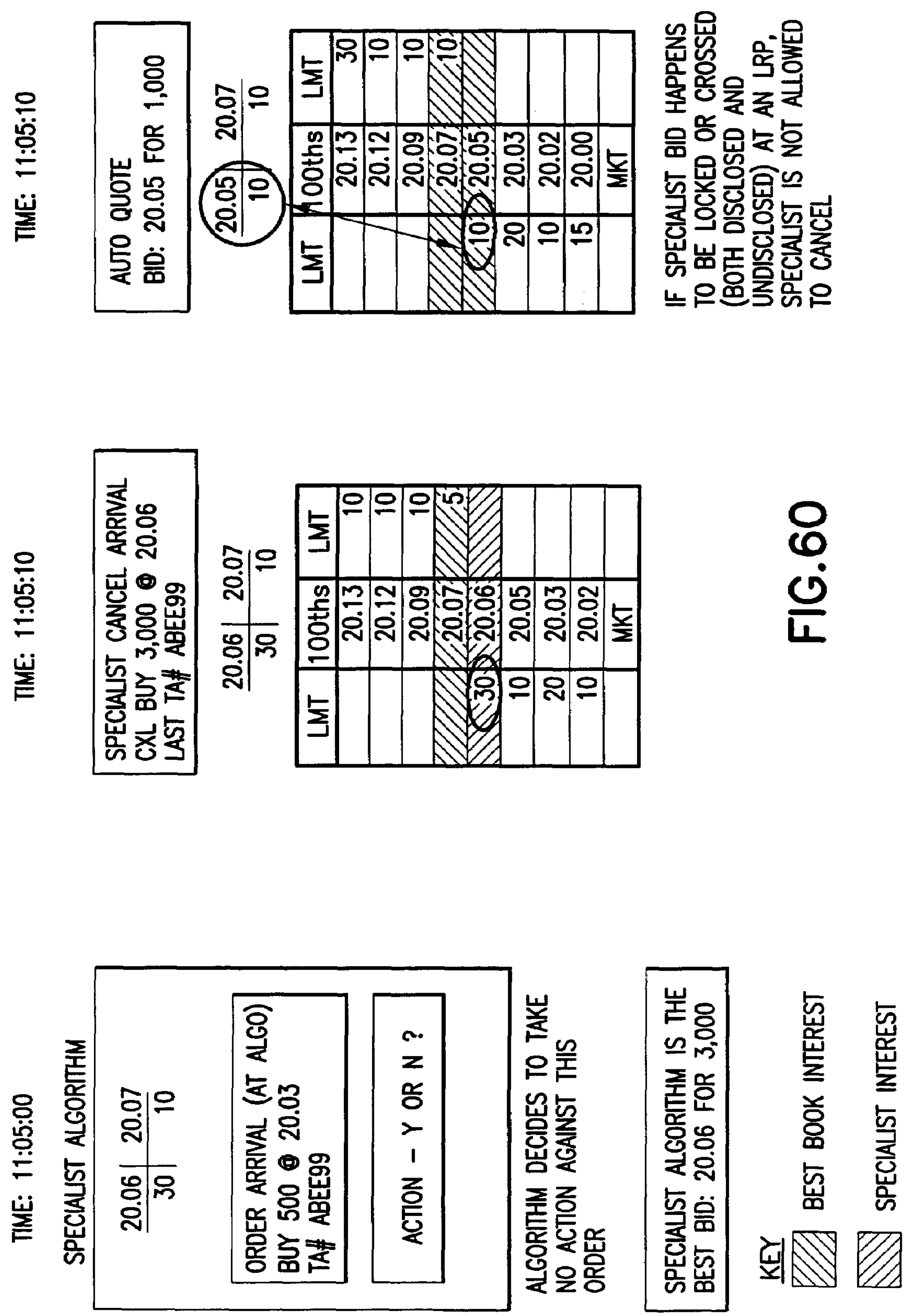

FIG. 60 illustrates how the specialist algorithm can withdraw the specialist interest when it is the best bid or offer. The best bid and offer are $20.06 and $20.07. The specialist interest is the best bid of $20.06 for 3,000 shares. An order is received by the specialist algorithm to buy 500 shares at $20.03, and the specialist algorithm decides to take no action. The specialist algorithm sends a message to cancel the specialist interest to buy 3,000 shares at $20.06, with an identifier of the last order seen by the specialist algorithm. The order display book is autoquoted, to show the next best offer.

Figure 61:
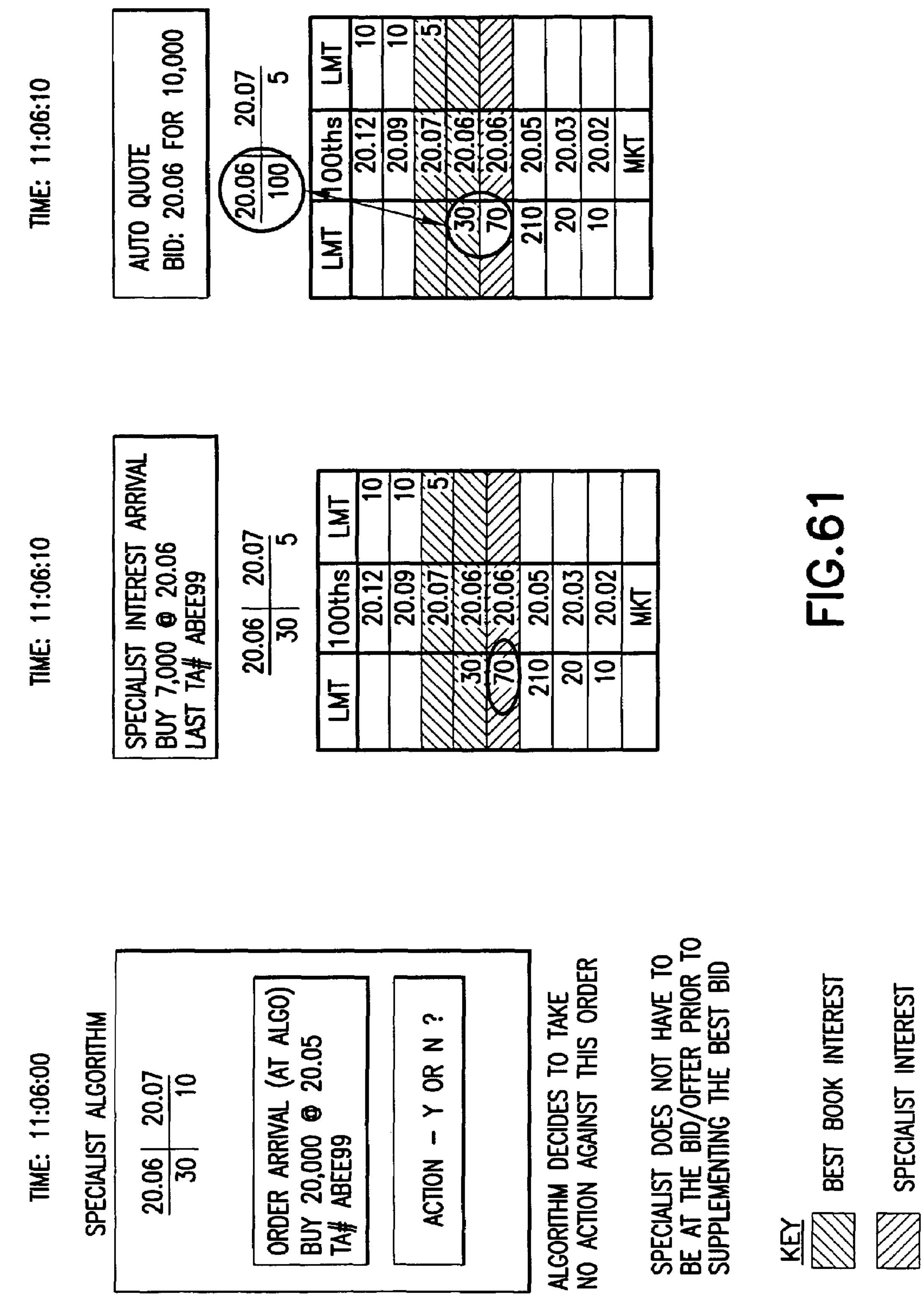

FIG. 61 illustrates a specialist algorithm supplementing the best bid or offer. The best bid and offer are $20.06 and $20.07. An order is received by the specialist algorithm to buy 20,000 shares at $20.05, and the specialist algorithm decides to take no action. Because this order is not at the bid or offer, it is not autoquoted. Specialist interest is received to buy 7,000 shares at $20.06, with an identifier of the last order seen by the specialist algorithm. Because the specialist interest is at the bid, the size of the specialist interest is added to the bid and it is autoquoted.

Figure 62:
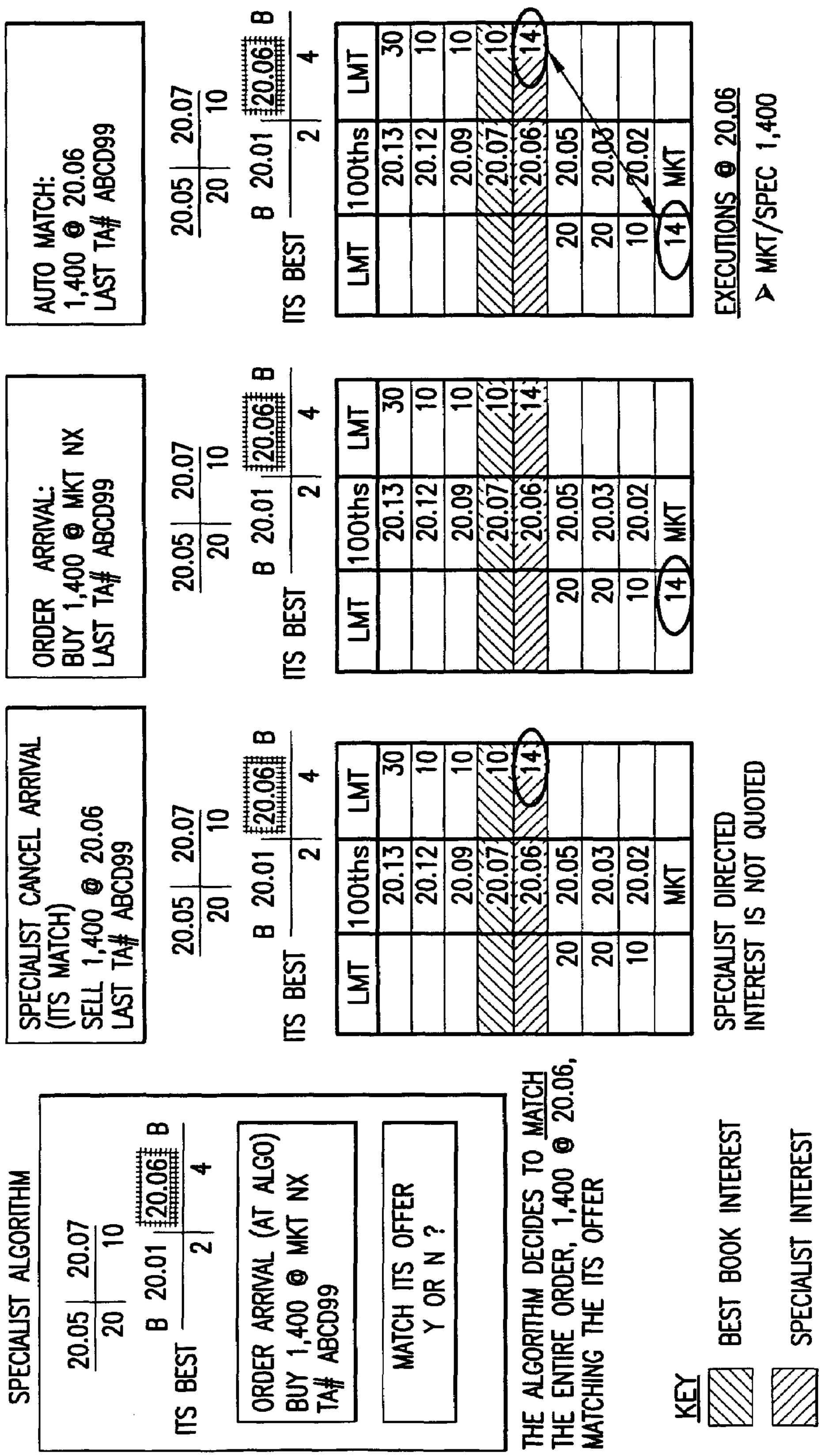

FIG. 62 illustrates a specialist algorithm matching the best offer or bid on a regional exchange. The Exchange best bid and offer are $20.05 and $20.07. A regional exchange best bid and offer are $20.01 and $20.06, making the regional offer the best offer. An order is received by the specialist algorithm to buy 1,400 shares at the market with immediate execution (MKT NX), and the specialist algorithm decides to match the regional offer of $20.06 for the entire order of 1,400 shares at $20.06. The specialist algorithm sends specialist interest to sell 1,400 shares at $20.06 with an identifier of the last order seen. The specialist interest is not autoquoted. The MK NX order to buy 1,400 shares is received at the order display book and it is automatically executed against the specialist interest. If instead the specialist algorithm had taken no action, the order display book would perform the default action, which is to ship a share commitment for the size of the regional best offer or best bid, and automatically execute the balance of the order against orders on the order display book. It is also possible that the specialist algorithm only partially matches, in which case the entire order is filled at $20.06, with the specialist filling 1,000 shares and 400 shares is routed to the away market that offered 400 shares at $20.06.

Figure 63:
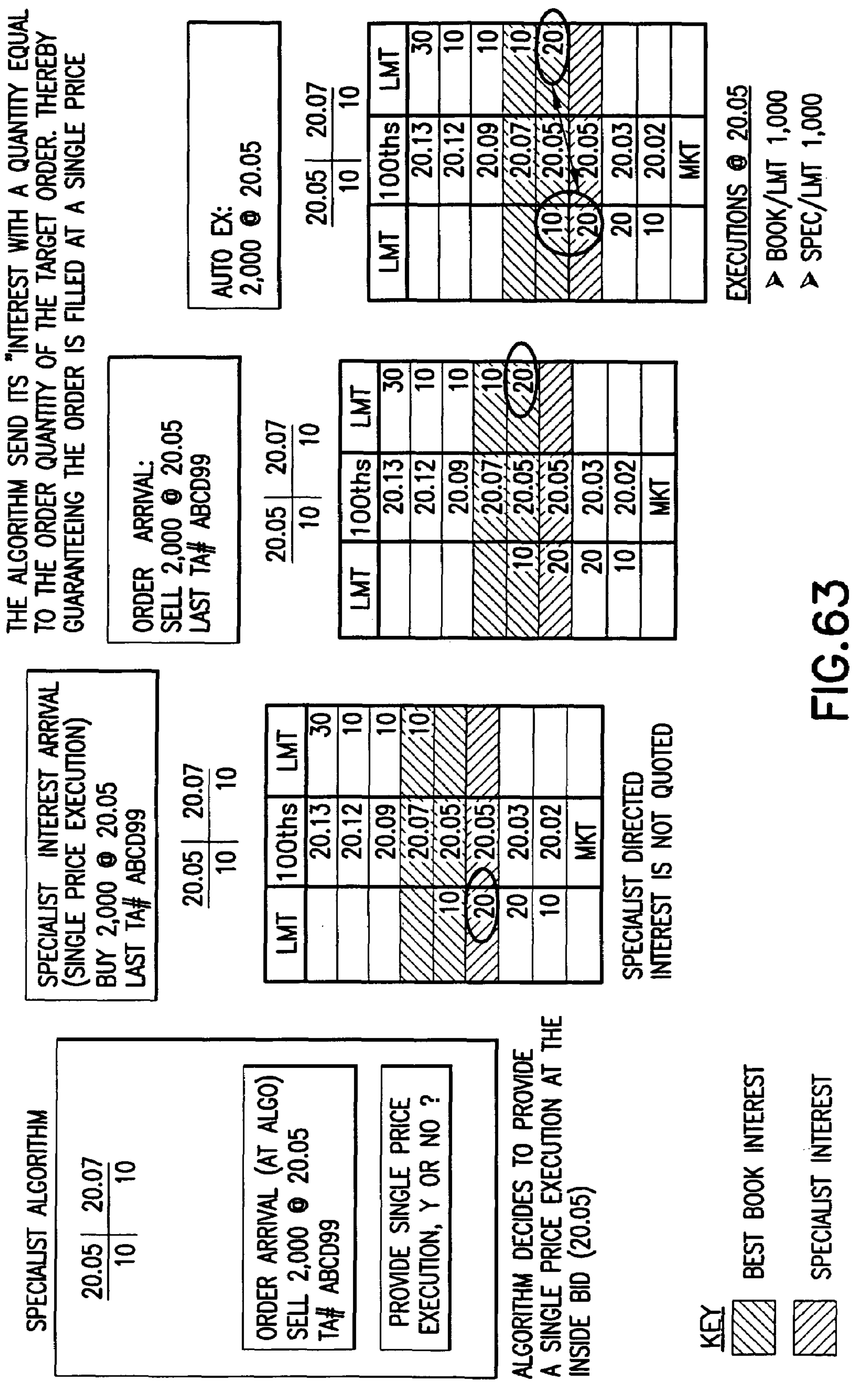
Figure 64:
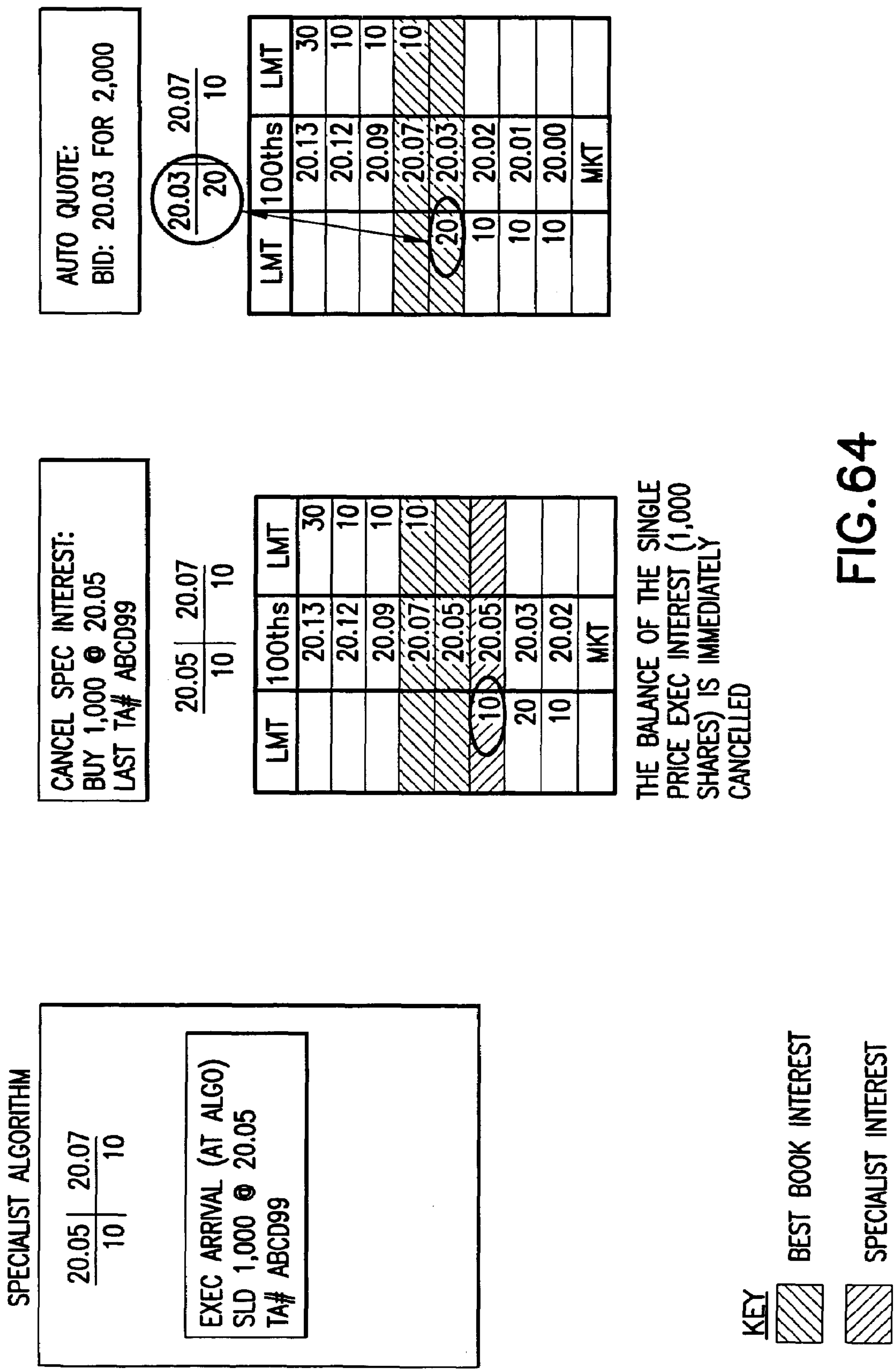

FIGS. 63 and 64 illustrate how the specialist algorithm can automatically facilitate a single price execution at the best bid or offer by directing specialist interest to a specific order by using the unique order identifier. The best bid and offer are $20.05 and $20.07, with 1,000 shares bid at $20.05. An order is received by the specialist algorithm to sell 2,000 shares at $20.05, and the specialist algorithm decides to provide a single price execution at the inside bid of $20.05. Specialist interest is received at the order display book to buy 2,000 shares at $20.05 with an identifier of the order that the interest is responding to. The specialist interest is not autoquoted and the order to sell arrives at the order display book where it is automatically executed. The execution is 1,000 shares to the order display book and 1,000 shares to the specialist. The specialist algorithm adds interest, which is undisclosed, at the best bid or offer in order to provide a single price execution for a specific incoming order. This specialist interest is not autoquoted, nor will it interact with the order display book or any incoming order except the order for which is was specifically sent. The specialist will sell or buy all of the quantity remaining on the order that is being facilitated. The specialist algorithm sends interest with a quantity that is equal to the size of the target order, thereby guaranteeing that the order is filled at a single price. The specialist algorithm receives a report that the order was executed at $20.05 and that the specialist got 1,000 shares. The specialist algorithm sends a cancel of the remaining interest to buy 1,000 shares at $20.05 with an identifier of the original order, and the remaining balance of the specialist interest is cancelled. The order display book is then autoquoted.

Figure 66:
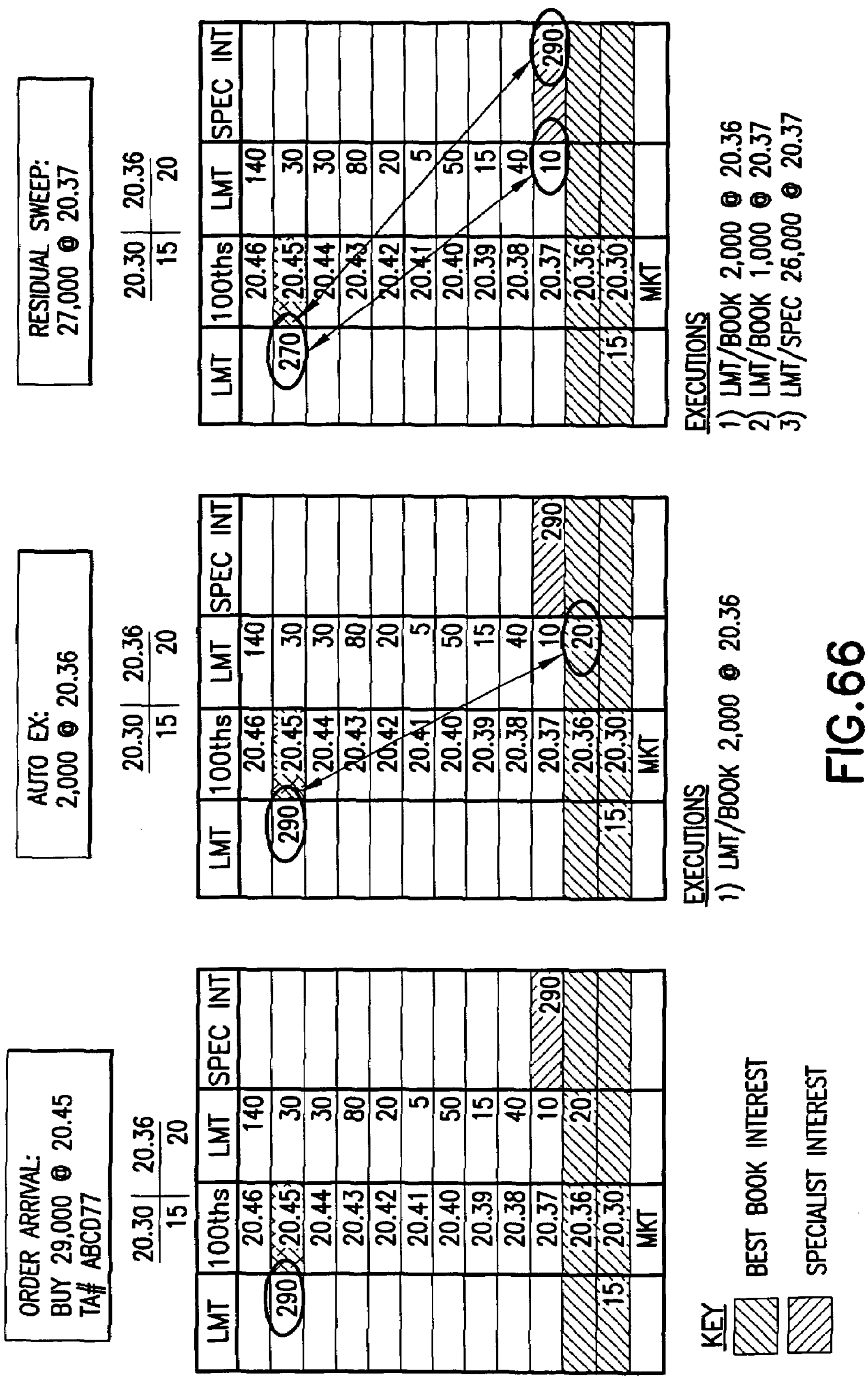
Figure 67:
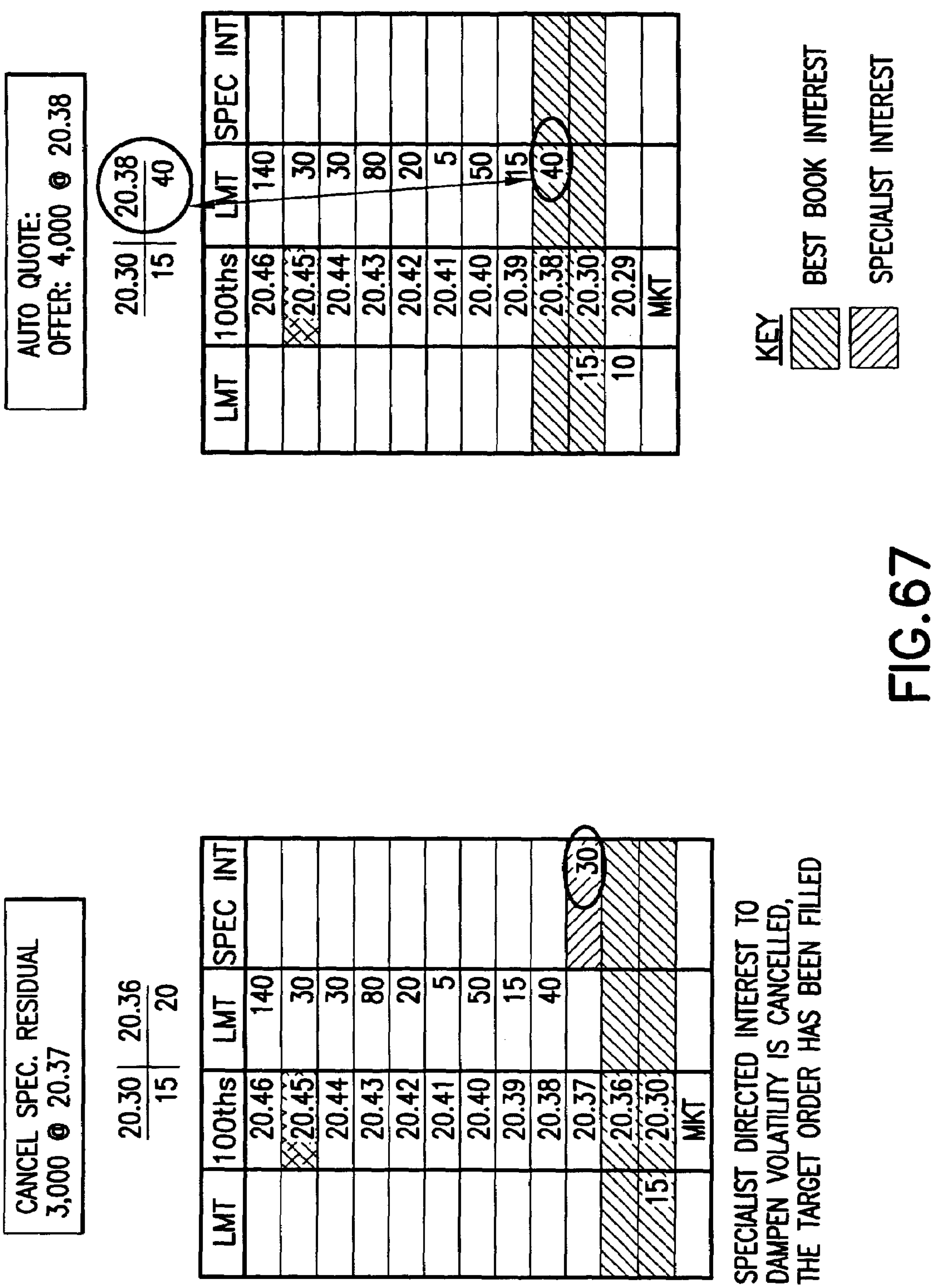

FIGS. 65, 66 and 67 illustrate how specialist interest can dampen volatility during a sweep. The best bid and offer are $20.30 and $20.36. A limit order is received by the specialist algorithm to buy 29,000 shares at $20.45. The specialist algorithm decides to enter interest at $20.37 to participate in the sweep and dampen volatility. Specialist interest arrives at the order display book to sell 29,000 shares at $20.37 with an identifier of the last order seen (the order to buy 29,000 shares). The limit order to buy 29,000 shares arrives at the order display book and is automatically executed. The first 2,000 shares are executed against the best offer at $20.36 and the remaining 27,000 shares sweep the book at $20.37. Because there were 30,000 shares on the order display book at 20.37, the balance is to the order display book (1,000 shares) and the specialist interest (26,000 shares). The specialist algorithm receives a report of the execution and immediately sends a cancel of the remaining 3,000 shares of interest. The order display book is then autoquoted.

Figure 68:
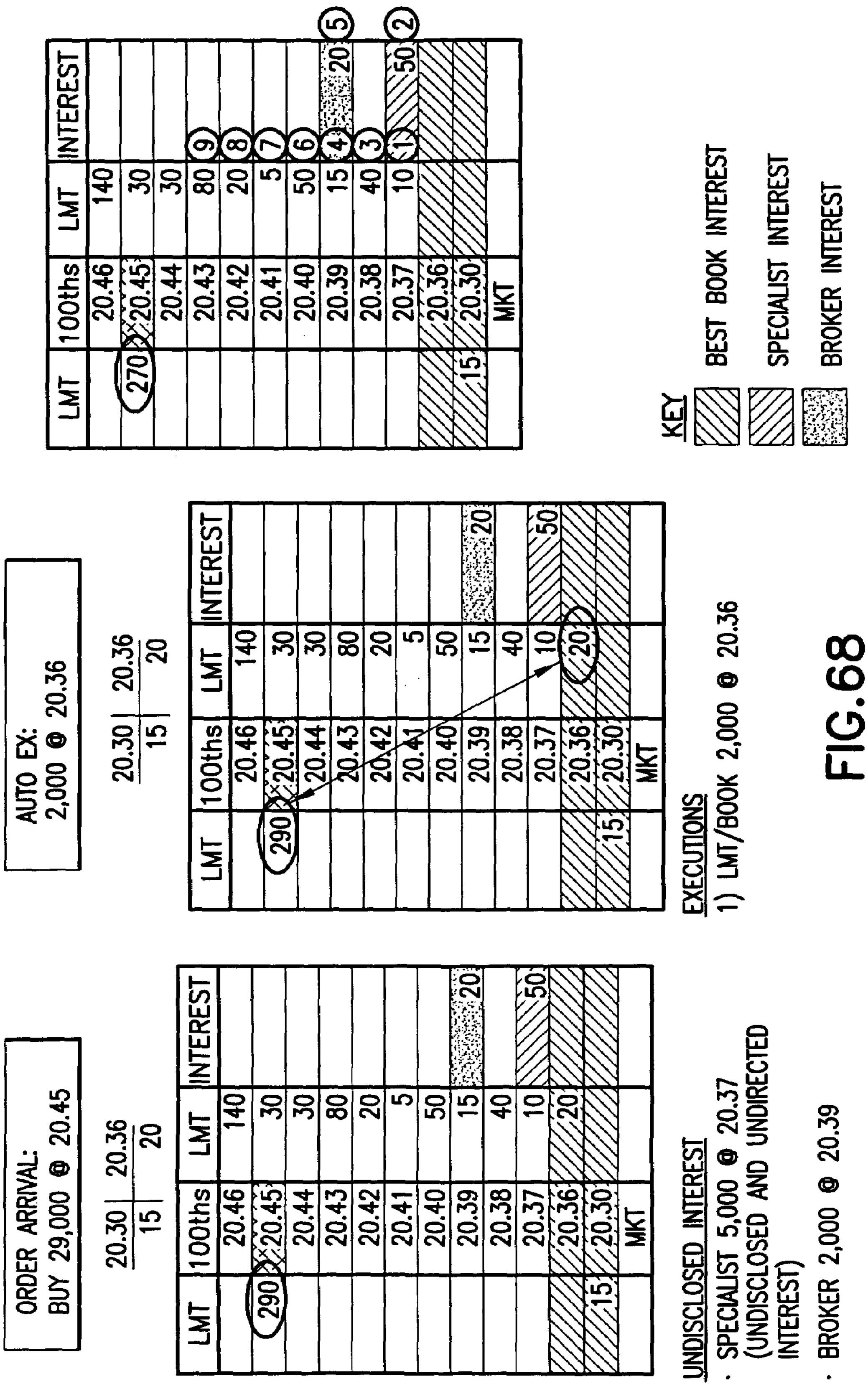
Figure 69:
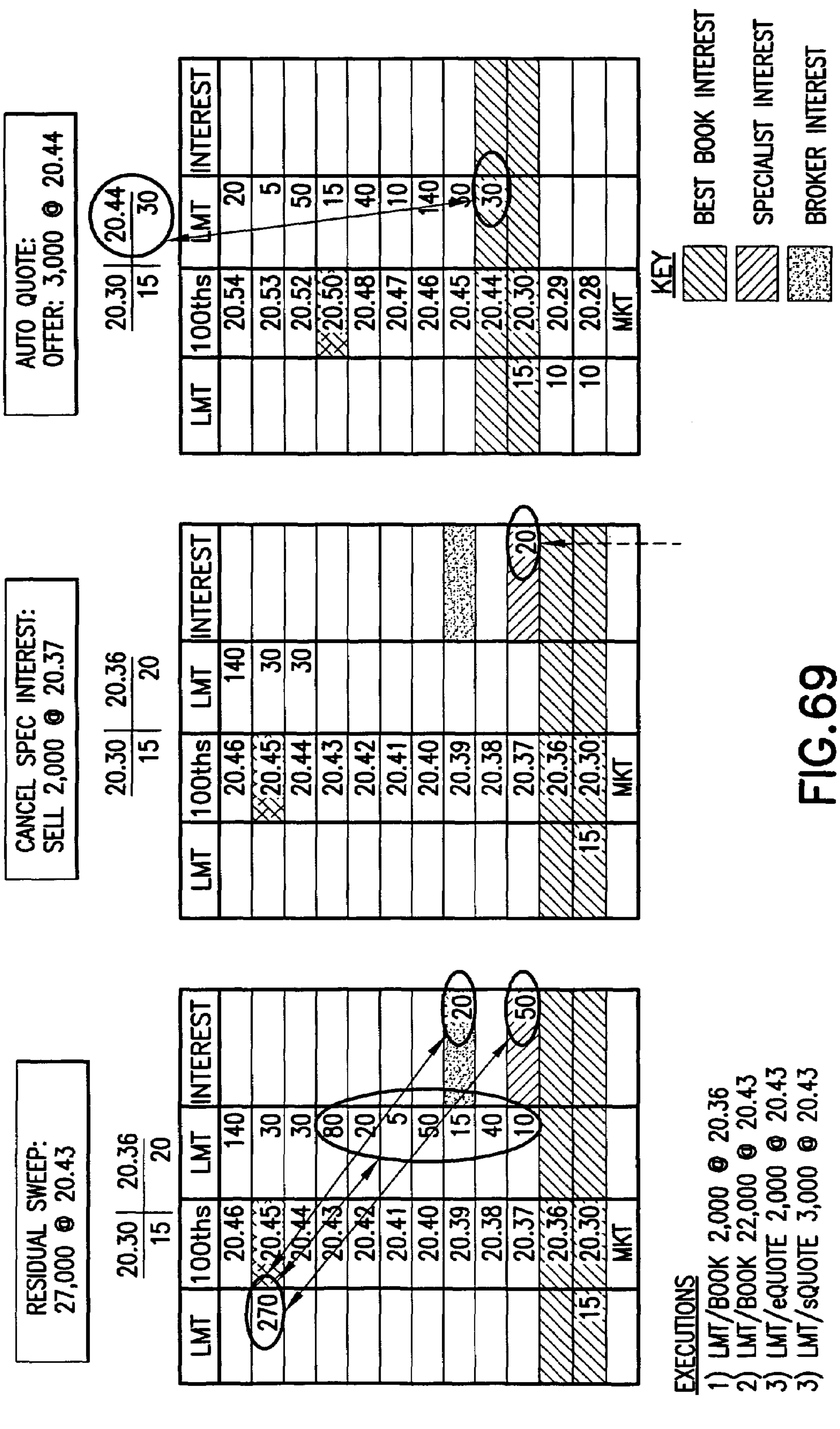

FIGS. 68 and 69 illustrate how specialist interest submitted by the specialist algorithm as layered interest can help dampen volatility during a sweep, but the specialist interest must yield to book interest at the sweep price. The best bid and offer are $20.30 and $20.36. There is undisclosed specialist interest on the order display book to sell 5,000 shares at $20.37, and undisclosed broker interest on the order display book to sell 2,000 shares at $20.39. A limit order is received to buy 29,000 shares at $20.45, which is automatically executed. The first 2,000 shares go to the best offer and the balance sweeps the order display book at $20.43. The order display book calculates the maximum sweep price for the order based on disclosed and undisclosed interest within the order price range. In the example, 27,000 shares, which is the sweep order quantity, are available by sweeping to a price of $20.43. This includes 3,000 shares of specialist interest at $20.37 and 2,000 shares of broker interest at $20.39. The order display book calculates the interest remaining at the sweep price and if that amount is greater than zero, then the specialist must yield to the order display book for that amount of shares. In the example, 2,000 shares at $20.43 would remain on the book, but will be automatically cancelled by the order display book (otherwise the specialist would be offering on a minus tick). The order display book is then autoquoted.

FIGS. 70 and 71 illustrate how specialist interest has the ability to provide price improvement between the best bid and best offer if certain conditions are met. The best bid and offer are $20.31 and $20.36. The offer at $20.36 includes 2,000 shares from the order display book and 1,000 shares of specialist interest. An order is received by the specialist algorithm to buy 2,000 shares at the offer ($20.36). The specialist algorithm decides to provide price improvement at $20.34. Specialist interest is received to sell 2,000 shares at $20.34 with an identifier of the last order seen. The specialist offer of price improvement is not quoted, and the minimum price improvement is calculated from the best offer. The order to buy 2,000 shares at $20.36 is received and it is automatically executed with price improvement at $20.34.

Figure 72:
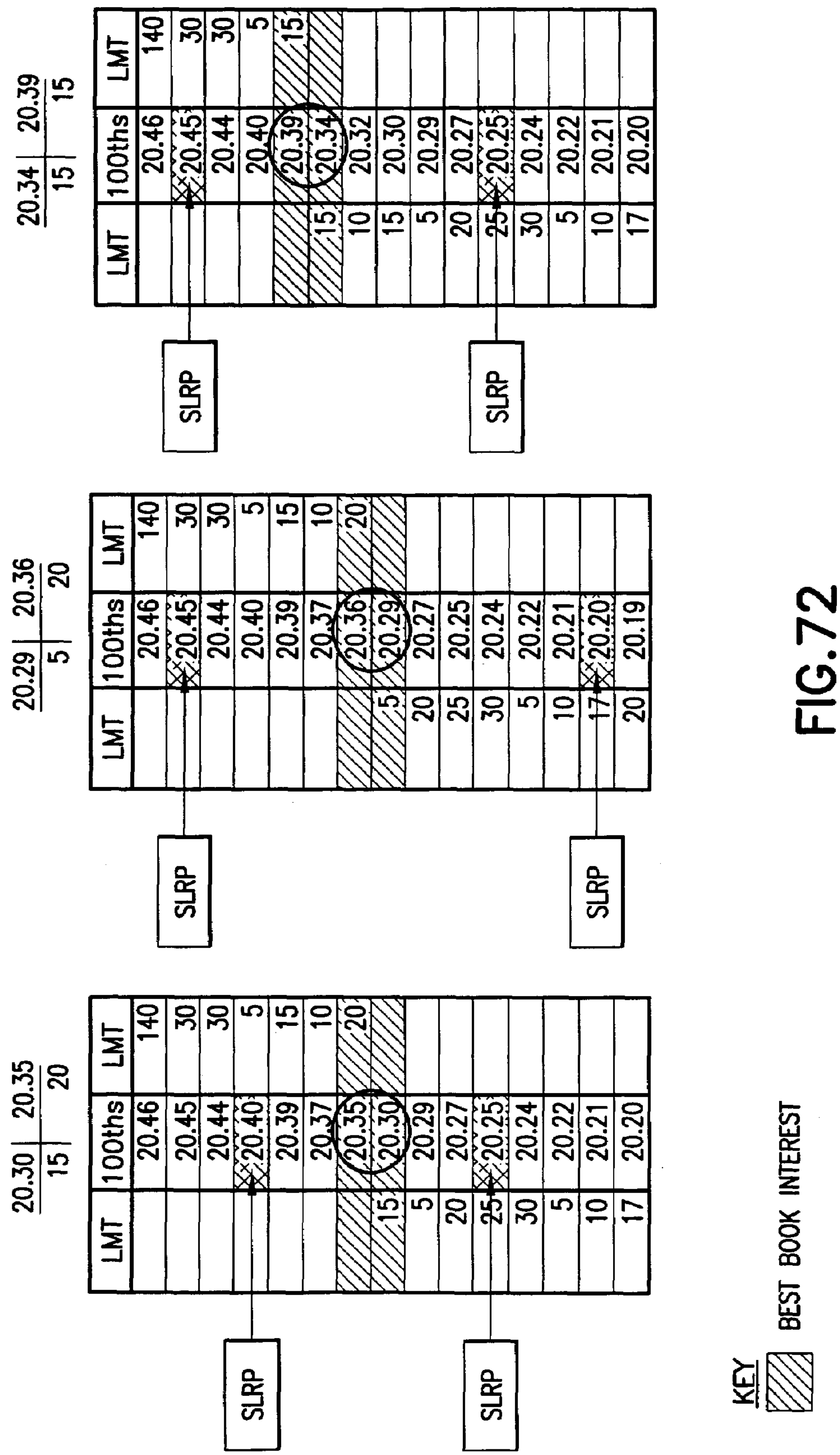

FIG. 72 illustrates setting a Sweep Liquidity Replenishment Point or Price (Sweep LRP) at a fixed 5 cent increment, a minimum of 5 cents and a maximum of 9 cents from the best bid or best offer. In the first example, the best bid and best offer are $20.30 and $20.35. A Sweep LRP is set at fixed 5 cent increments (i.e., 0.05, 0.10, 0.15, 0.20, etc.) a minimum of 5 cents and a maximum of 9 cents from the Exchange best bid and best offer. To calculate a Sweep LRP, 5 cents is added to the offer and if not an even 5 cents, then rounded up to the nearest 5 cents. 5 cents is also subtracted from the bid and if not an even 5 cents, then rounded down to the nearest 5 cents. In the first example with the best offer at $20.35, when 5 cents is added, the result of $20.40 is an even 5 cents, so that is the upper or offer Sweep LRP. With the best bid at $20.30, when 5 cents is subtracted, the result of $20.25 is also an even 5 cents, so that is the lower or bid Sweep LRP. In the second example, with the best bid and best offer $20.29 and $20.36, adding or subtracting a minimum of 5 cents and then rounding to the next even 5 cents results in a bid Sweep LRP of $20.20 and an offer Sweep LRP of $20.45. In the third example with the best bid and best offer $20.34 and $20.39, adding or subtracting a minimum of 5 cents and then rounding to the next even 5 cents results in a bid Sweep LRP of $20.25 and an offer Sweep LRP of $20.45.

Figure 73:
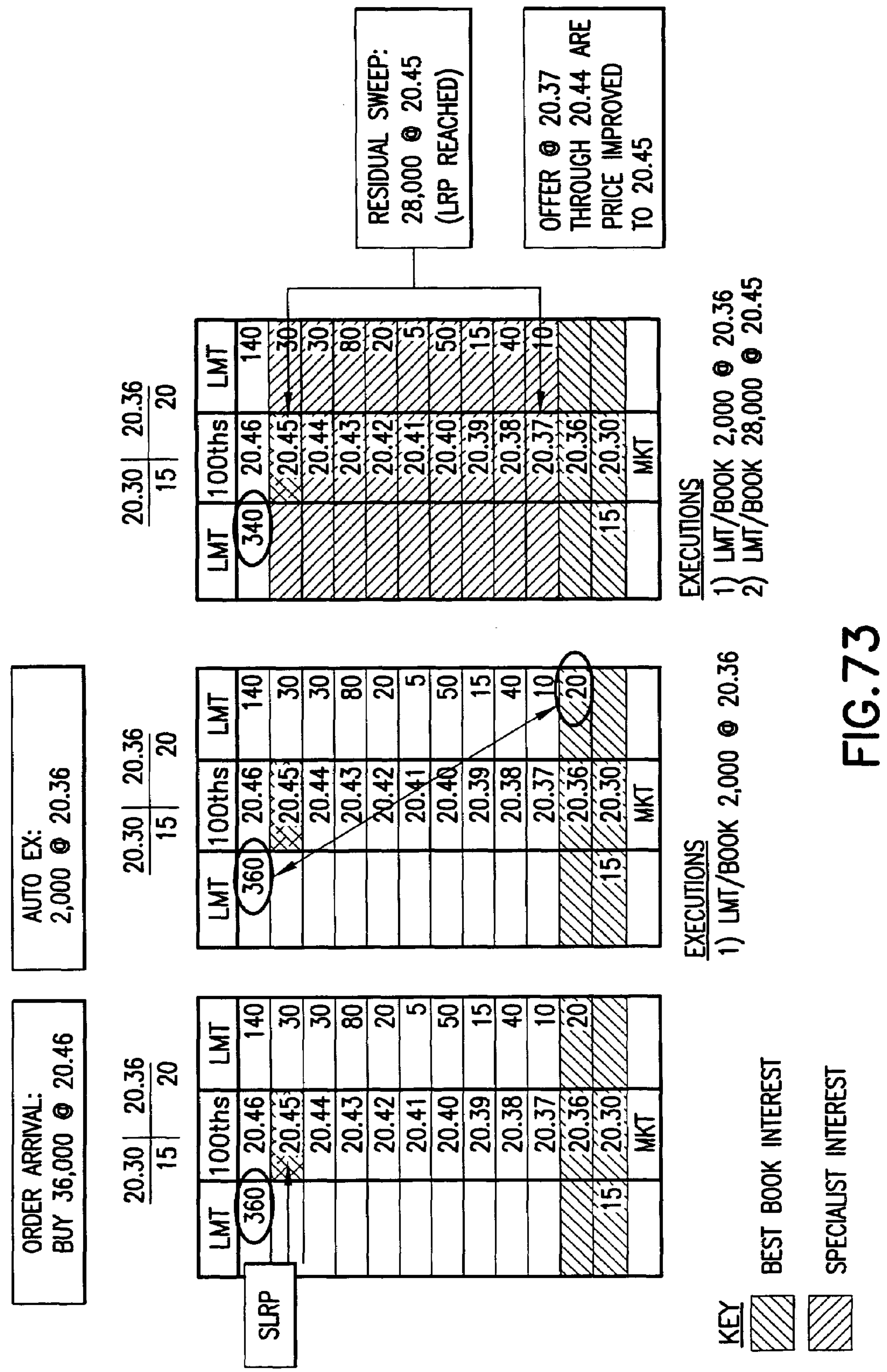

FIGS. 73 and 74 illustrate a residual sweep that reaches the Sweep LRP, with the balance causing a locked or crossed order display book. The best bid and best offer are $20.30 and $20.36, and the offer Sweep LRP is $20.45. A limit order is received to buy 36,000 shares at $20.46, which is automatically executed. The first 2,000 shares trade at the offer price of $20.36, taking all of the size in the offer, and then the order sweeps the order display book. There are 28,000 shares remaining on the order display book up to and including the orders at the offer Sweep LRP, and all of those shares are price improved and participate in the sweep at $20.45. However, after the sweep at $20.45, 6,000 shares remain from the limit order to buy. Because the offer Sweep LRP of $20.45 was reached, this causes the order display book to change from fast to slow, stopping automatic executions, and the remaining 6,000 shares from the limit order are quoted at the offer Sweep LRP of $20.45. A manual trade by the specialist is required before the quote will return to fast and automatic execution resumes.

Figure 75:
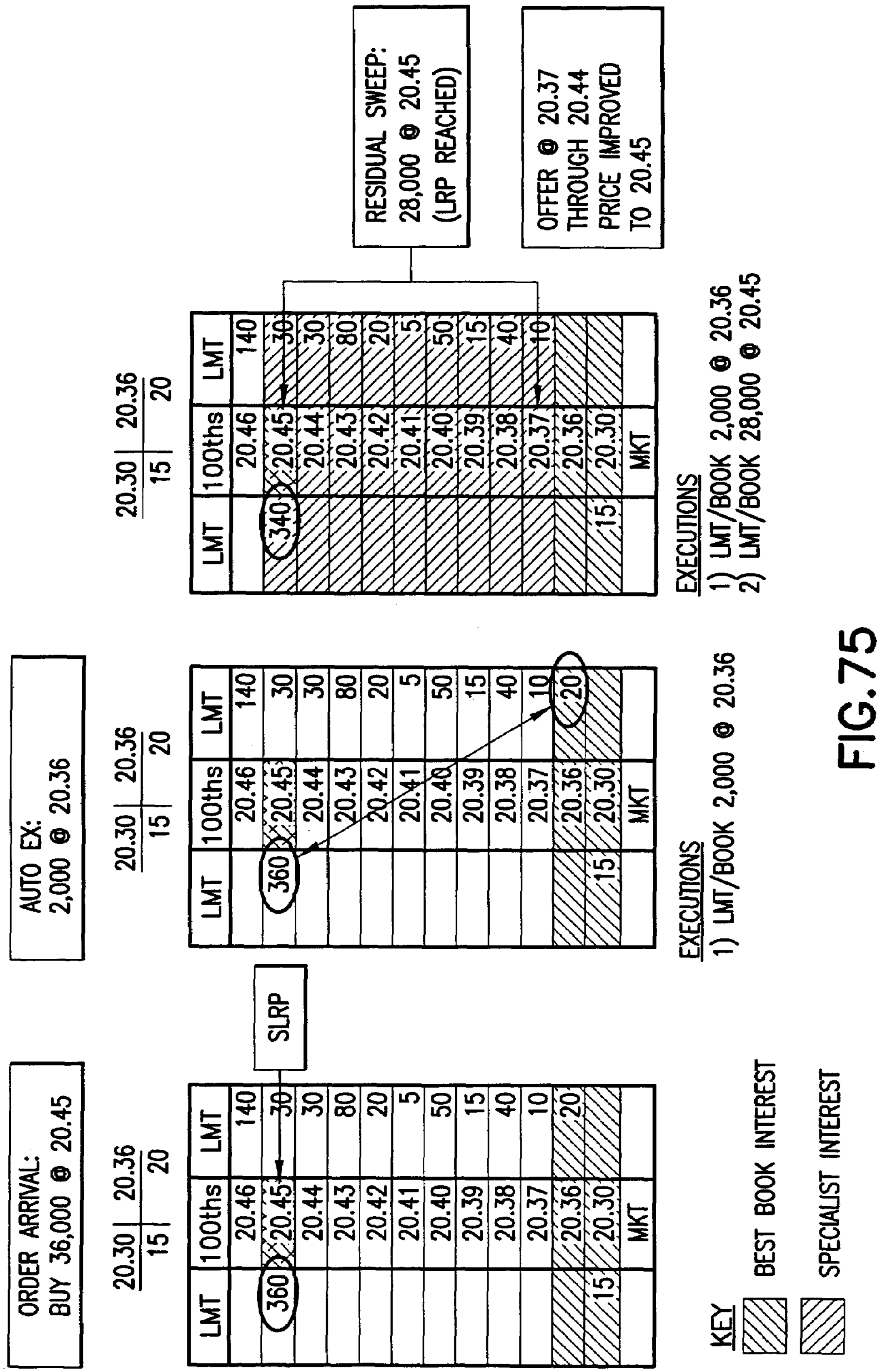
Figure 76:
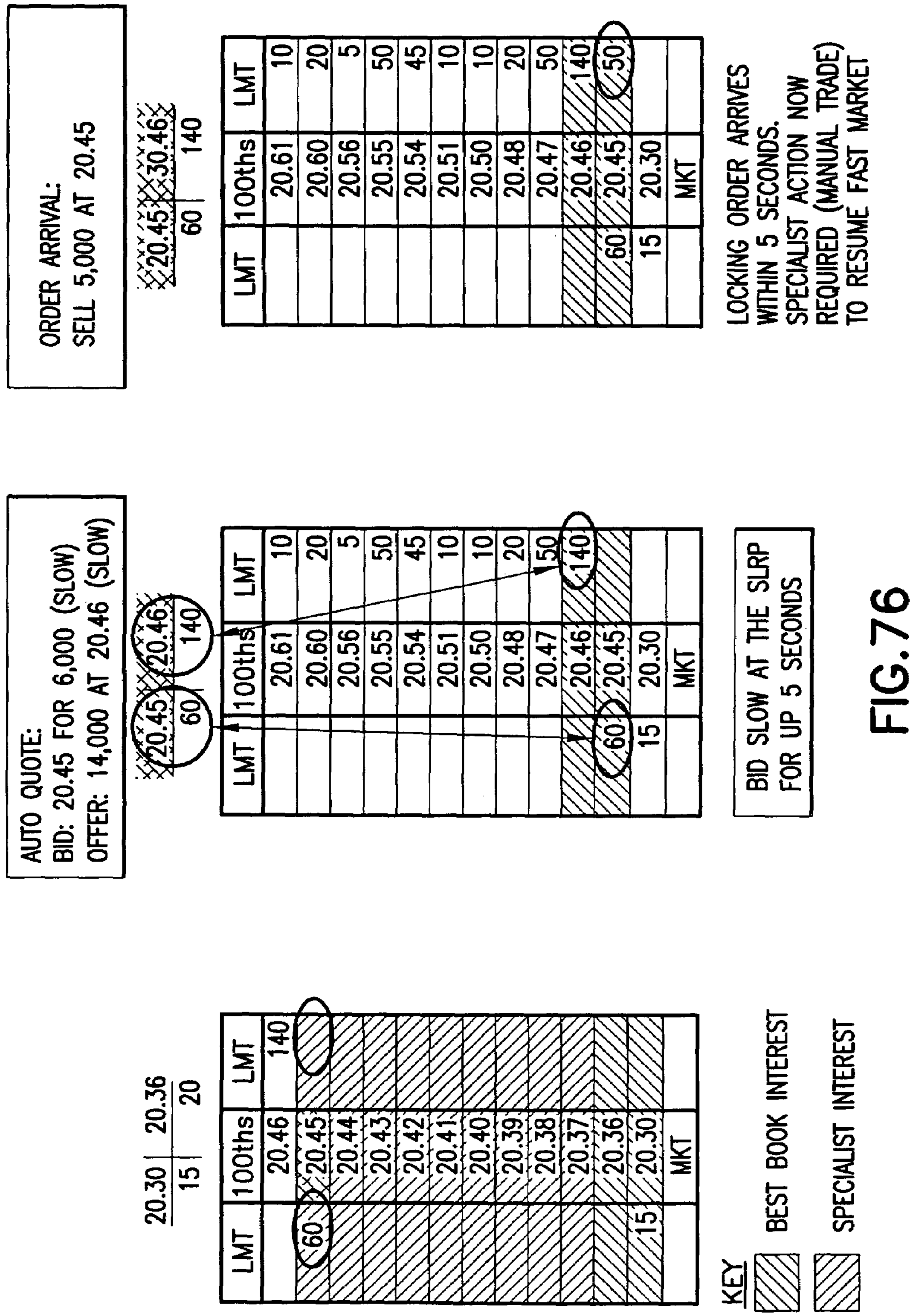

FIGS. 75 and 76 illustrate a residual sweep to the Sweep LRP with a residual at the Sweep LRP, but in this example the order display book is not crossed or locked, and the slow quote only lasts for 5 seconds. The best bid and best offer are $20.30 and $20.36, and the offer Sweep LRP is $20.45. A limit order is received to buy 36,000 shares at $20.45 (the offer Sweep LRP), which is automatically executed. The first 2,000 shares trade at the offer price of $20.36, taking all of the size in the offer, and then the order sweeps the order display book. There are 28,000 shares remaining on the order display book up to and including the orders at the offer Sweep LRP, and all of those shares are price improved and participate in the sweep at $20.45. As before, the offer Sweep LRP of $20.45 is reached, and this causes the order display book to change from fast to slow, with the remaining 6,000 shares of the limit order bid at the offer Sweep LRP of $20.45. In contrast to the previous example in this example there is no size remaining on the order display book in the offer at $20.45, so the order display book is not crossed or locked. However, during the 5 second timer, an order is received to sell 5,000 shares at $20.45, which locks the order display book, and a manual trade by the specialist is required to resume a fast market and automatic execution. In such an situation, when a Sweep LRP is reached and a residual remains that is not capable of trading at a price above (for a buy order) or a price below (for a sell order) the Sweep LRP (i.e., limit price=Sweep LRP), then autoquote and automatic execution will resume in no more than 5 seconds, unless in that time an order arrives that locks or crosses the market.

Figure 77:
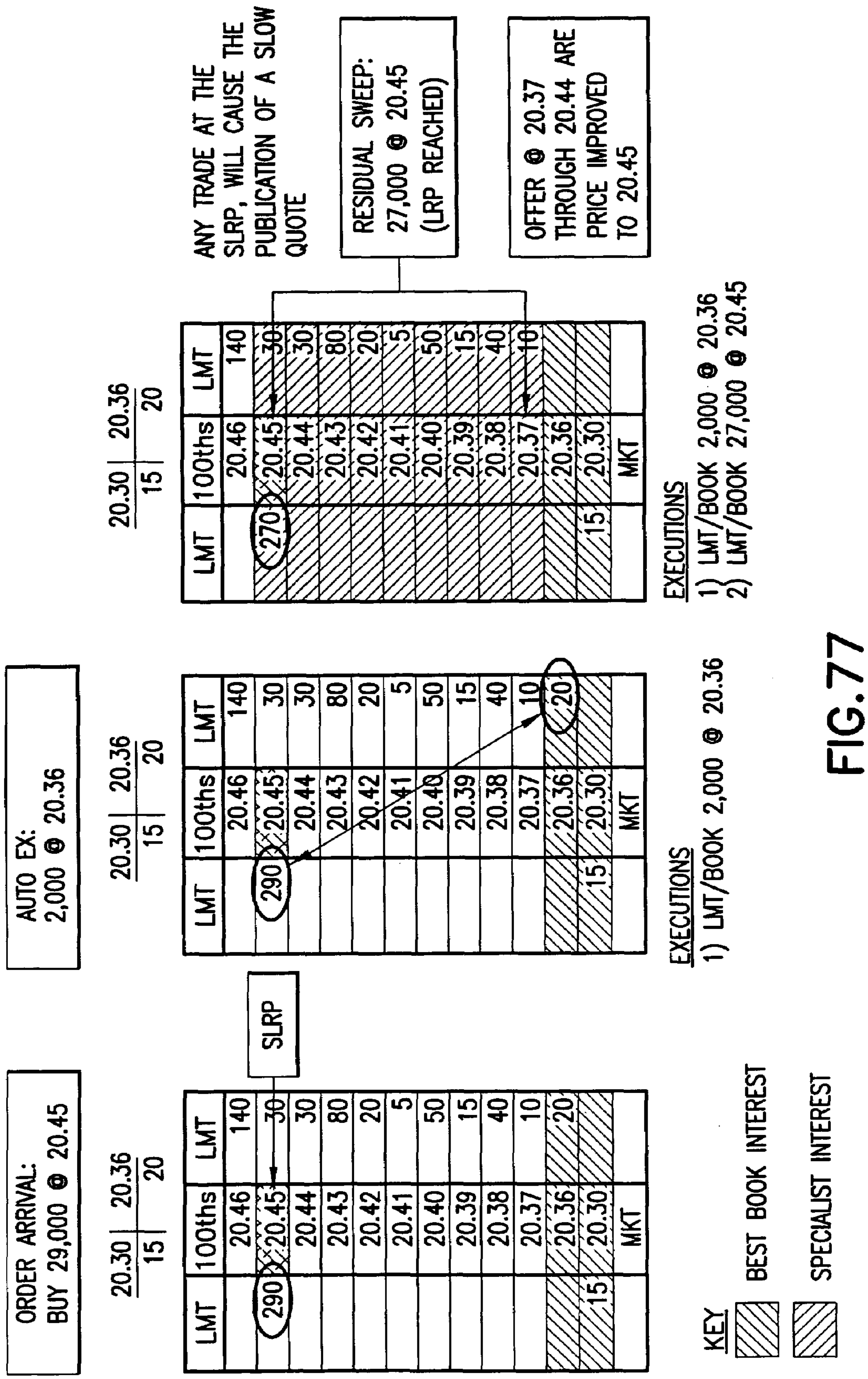
Figure 78:
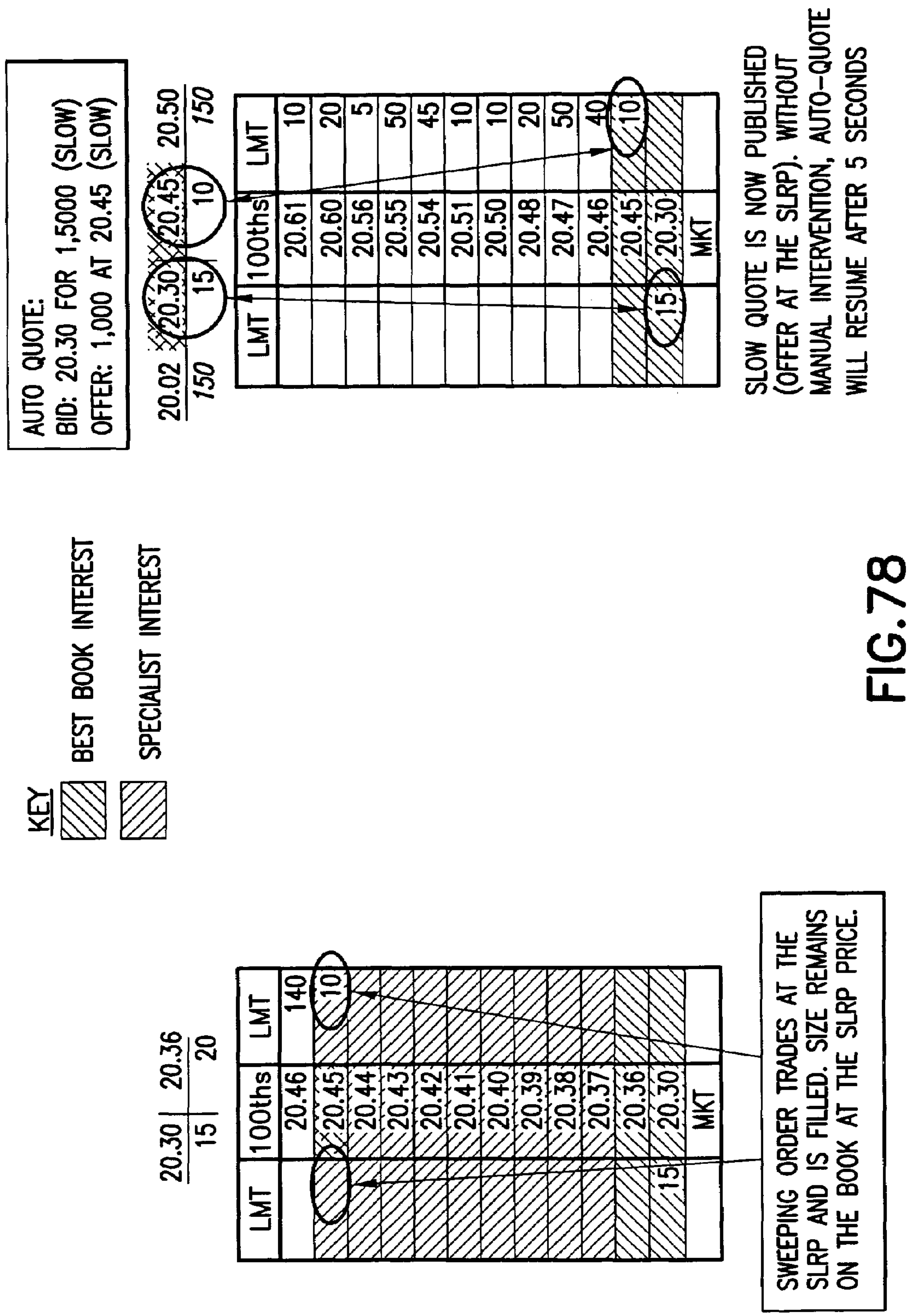

FIGS. 77 and 78 illustrate a residual sweep to the Sweep LRP with no residual balance on the sweeping order. The best bid and best offer are $20.30 and $20.36, and the offer Sweep LRP is $20.45. A limit order is received to buy 29,000 shares at $20.45 (the offer Sweep LRP), which is automatically executed. The first 2,000 shares trade at the offer price of $20.36, taking all of the size in the offer, and then the order sweeps the order display book. 27,000 shares remain in the limit order to buy and there are 28,000 shares remaining on the order display book up to and including the orders at the offer Sweep LRP. 27,000 of those shares are price improved and participate in the sweep at $20.45, leaving 1,000 shares offered on the order display book at $20.45. As before, a trade at the Sweep LRP causes the quote to change from fast to slow for up to 5 seconds. Unless the specialist manually intervenes, a fast market will automatically resume in 5 seconds.

Figure 79:
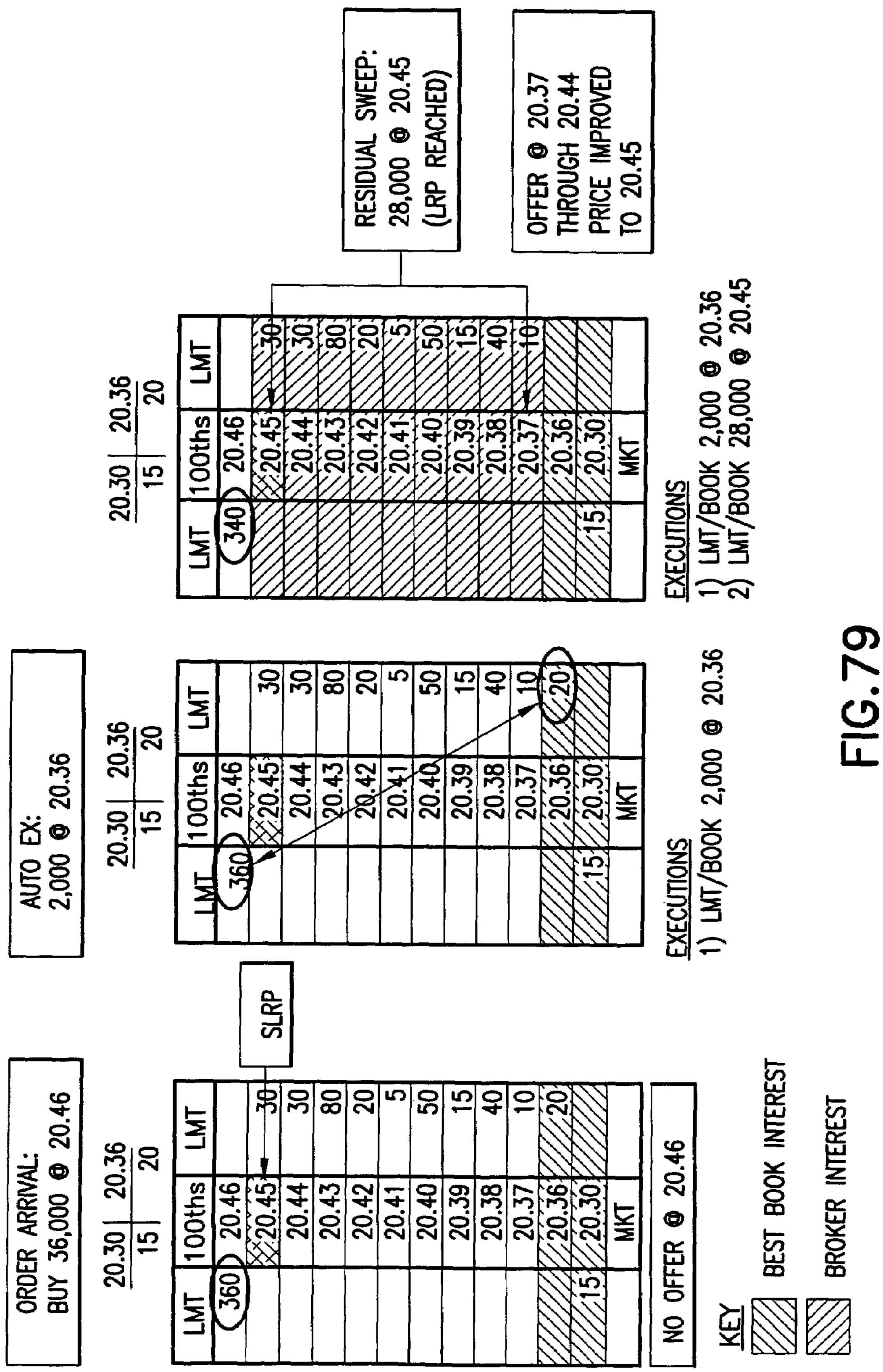
Figure 80:
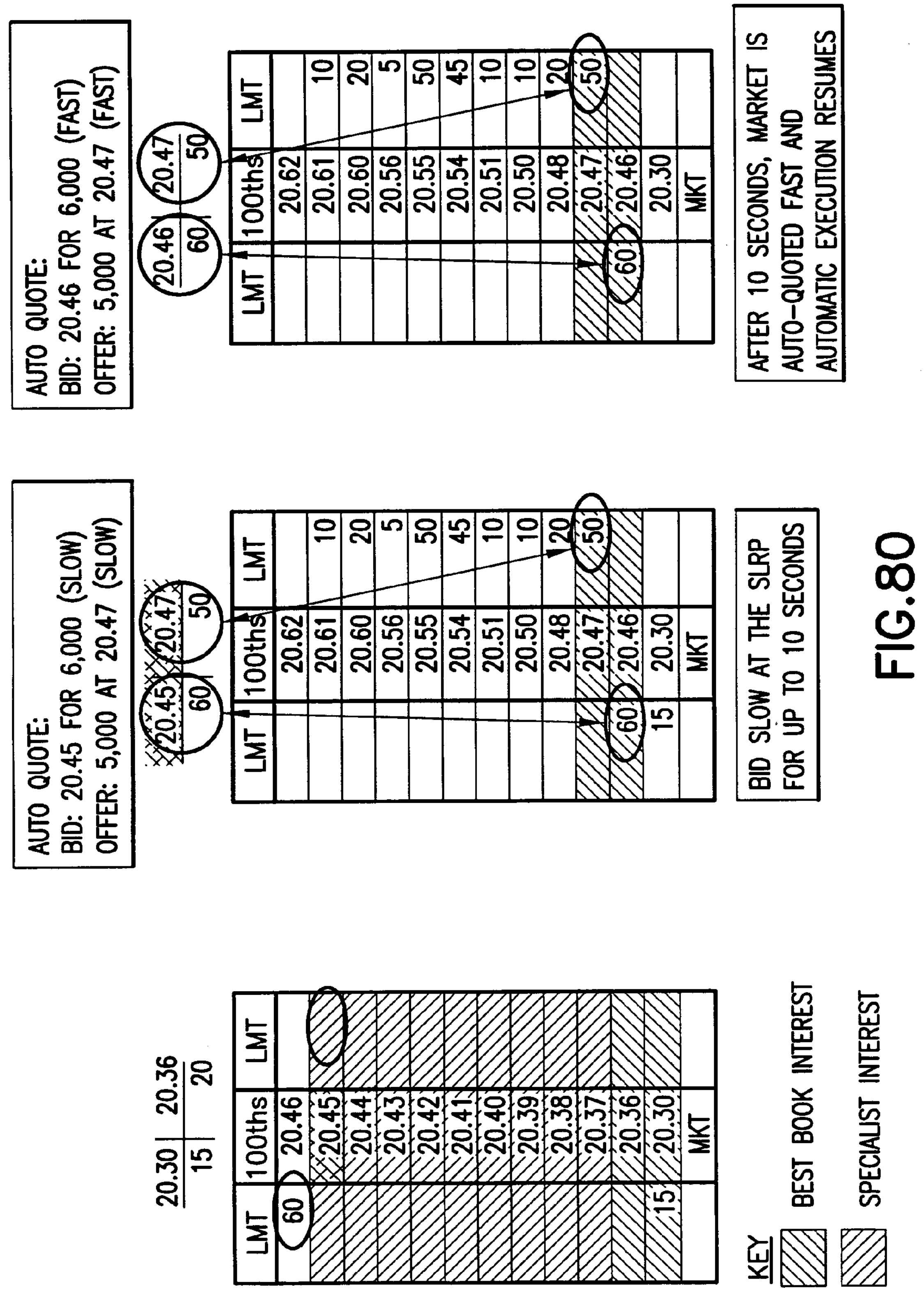

FIGS. 79 and 80 illustrate a residual sweep to a Sweep LRP, with a balance above the LRP, but not crossed or locked. The best bid and best offer are $20.30 and $20.36, and the offer Sweep LRP is $20.45. A limit order is received to buy 36,000 shares at $20.46, which is automatically executed. The first 2,000 shares trade at the offer price of $20.36, taking all of the size in the offer, and then the 28,000 shares of the order sweep the order display book. The 28,000 shares are price improved and participate in the sweep at $20.45. This leaves 6,000 shares unexecuted from the limit order to buy. As before, the trade at the Sweep LRP causes the quote to change from fast to slow. The 6,000 share balance from the limit order are quoted at the Sweep LRP. However, because there is a balance from the limit order remaining above the Sweep LRP in this example, the timer is for up to 10 seconds, and unless the specialist manually intervenes, a fast market will automatically resume in 10 seconds.

Figure 81:
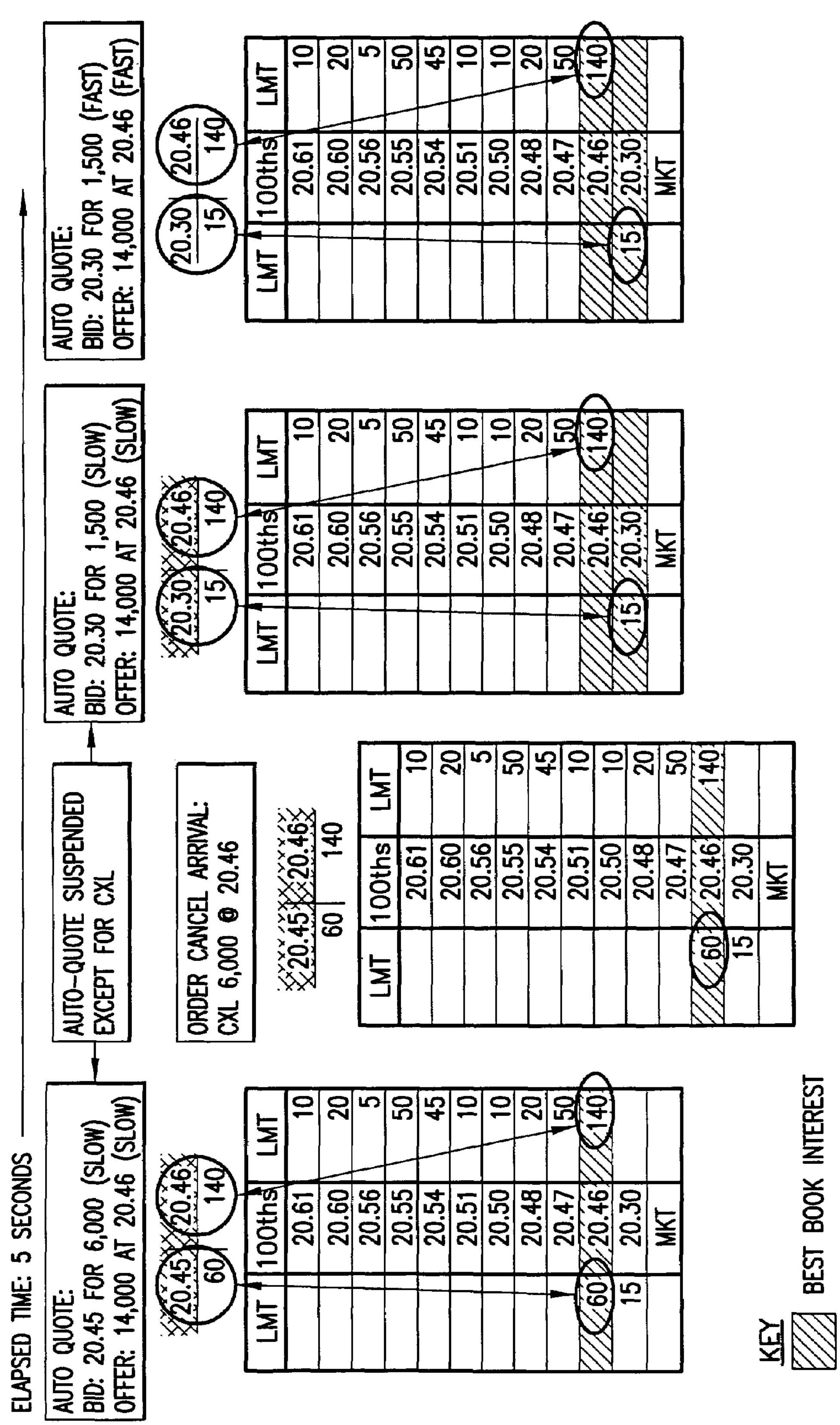

FIG. 81 illustrates hitting an LRP with a locked order display book, but the locking order cancels. As in the example of FIGS. 73 and 74, the Sweep LRP was hit and a residual remains on both sides so the order display book is locked with autoquoting suspended except for cancels. Normally, manual intervention by the specialist would be required for the market to go fast. However, in this example an order cancel is received to cancel the 6,000 shares at $20.46, which is the locking order. This starts a 5 second timer and a fast market will resume within 5 seconds.

Figure 82:
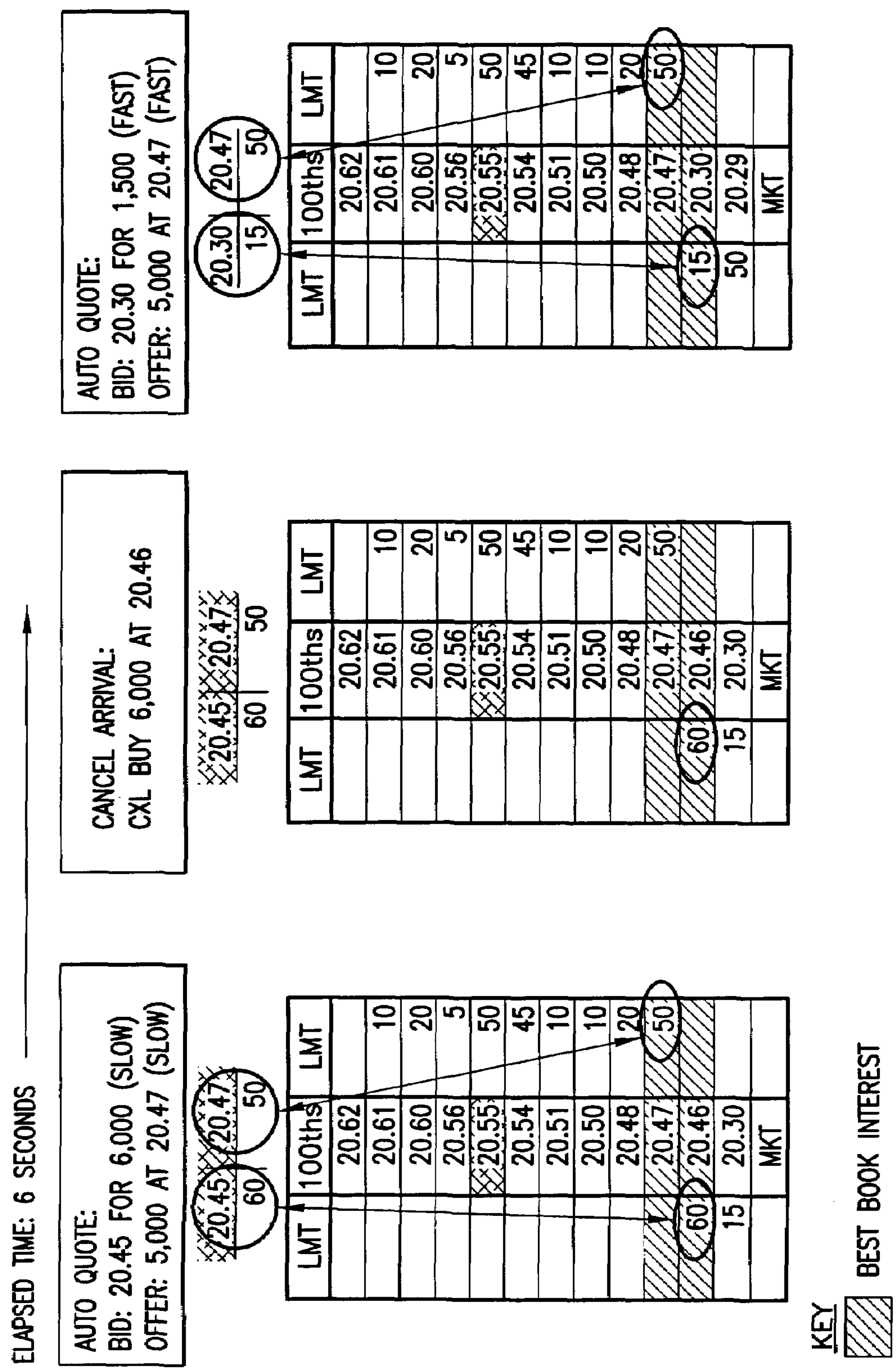

FIG. 82 illustrates a sweep that hits the Sweep LRP and a residual with a limit price above the Sweep LRP. The residual is bid at the Sweep LRP, but the order display book is not locked or crossed. The quote is slow for up to 10 seconds. In this example a cancel is received for the remaining 6,000 shares from the limit order. The cancel is received 6 seconds after the slow market was published and because this is after 5 seconds, the market resumes fast immediately.

Figure 83:
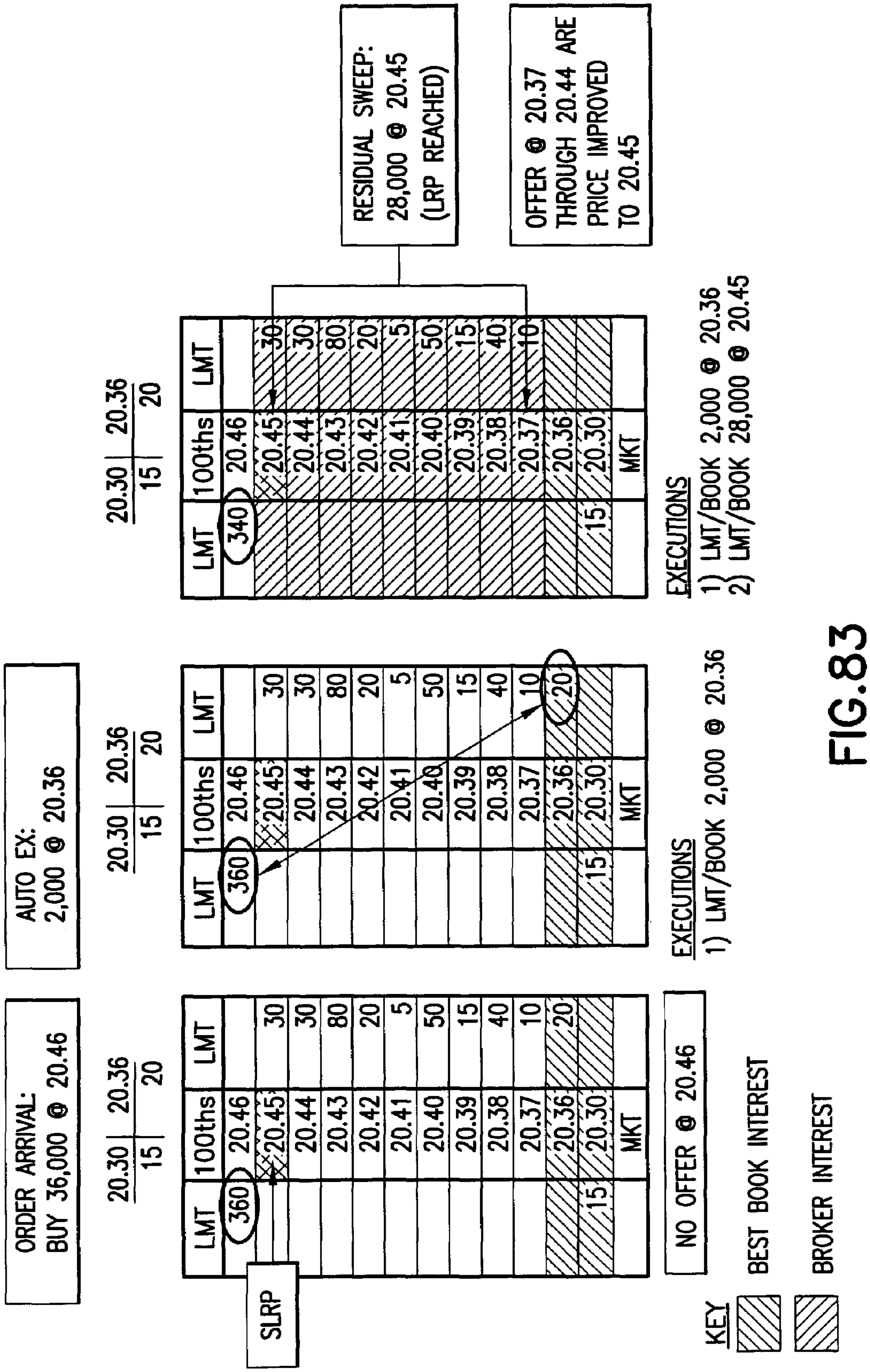
Figure 84:
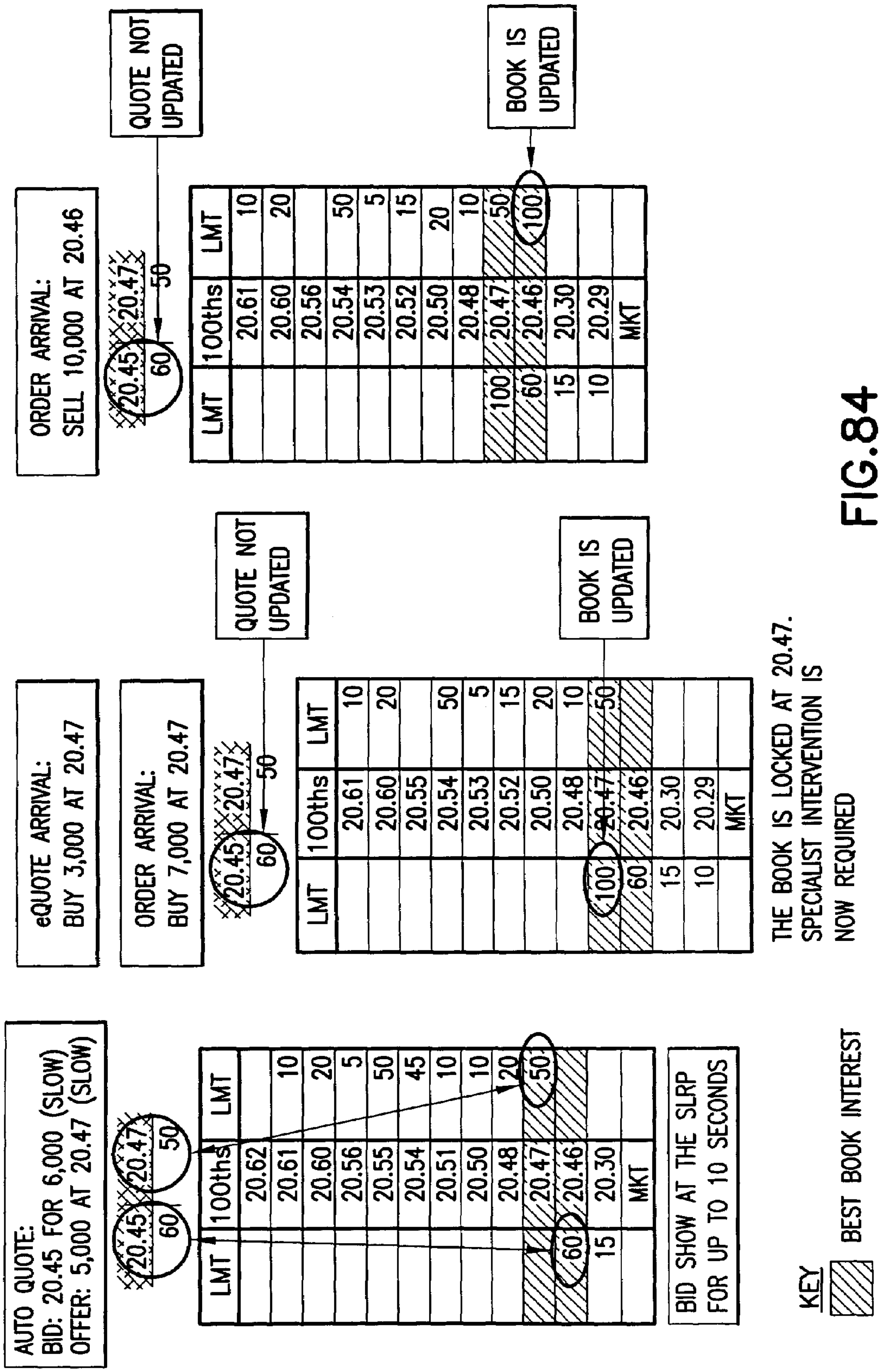
Figure 85:
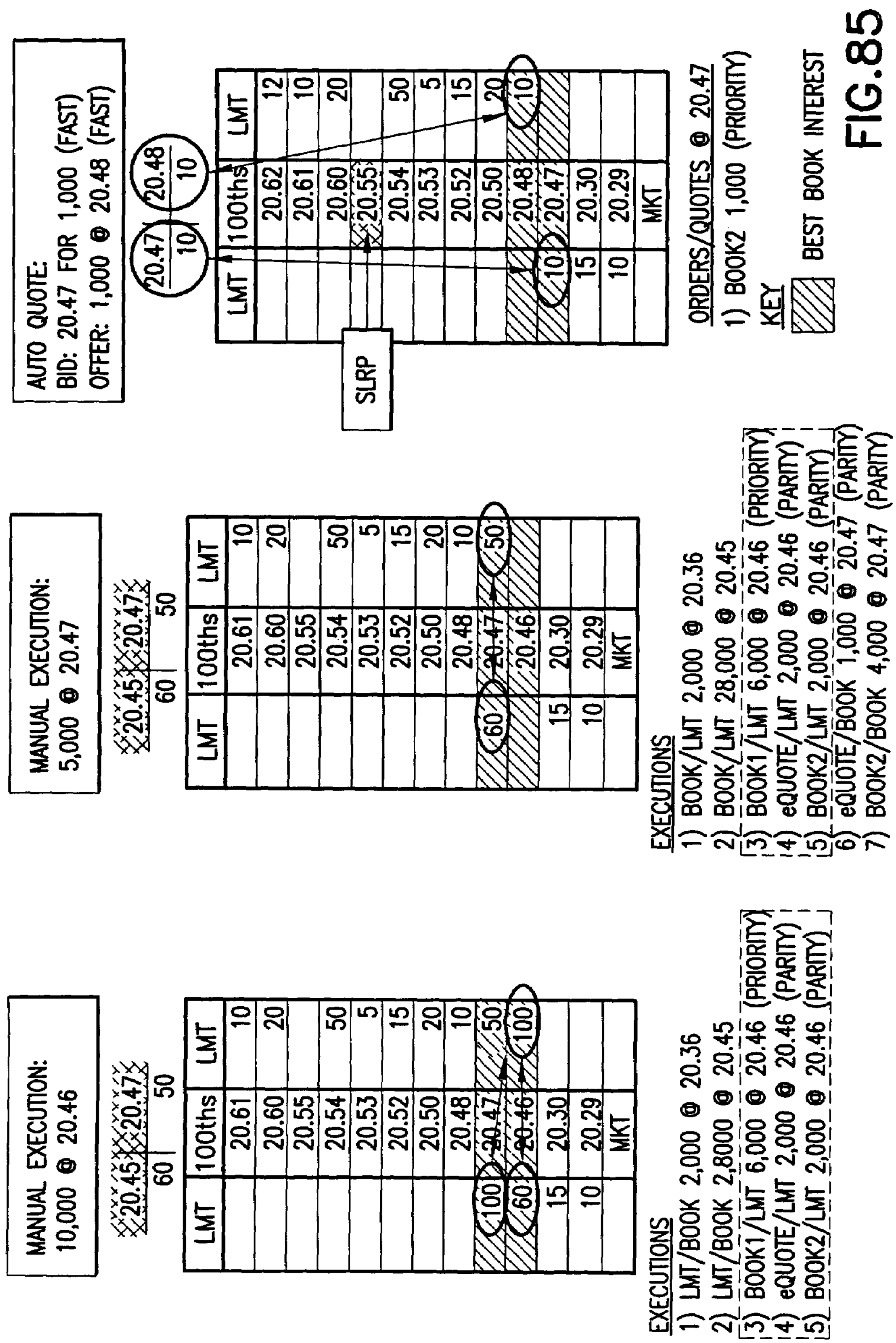

FIGS. 83, 84 and 85 illustrate a sweep that hits the Sweep LRP and the residual quantity is bid slow at the Sweep LRP. This order will have priority for one trade at its limit price and specialist intervention is requires if a locking order arrives. The bid and offer are $20.30 and $20.36, and the offer Sweep LRP is $20.45. There is no offer at $20.46 and a limit order is received to buy 36,000 shares at $20.46, which is automatically executed. The first 2,000 shares trade at $20.36 taking all of the size at the offer and 28,000 shares sweep at $20.45. This hits the Sweep LRP causing the quote to change from fast to slow for up to 10 seconds, and the balance of the limit order is bid at the offer Sweep LRP ($20.45). At this time the order display book is not crossed or locked. Broker interest is received to buy 3,000 shares at $20.47 and a limit order to buy is received to buy 7,000 shares at $20.47. Now the order display book is locked at $20.47 and specialist intervention is required. Also, the order display book is updated, but the quote is not updated. A limit order is received to sell 10,000 shares at $20.46. Again, the order display book is updated, but the quote is not updated. The specialist completes a manual execution of 10,000 shares at $20.46, and a manual execution of 5,000 shares at $20.47. The quote automatically changes from slow to fast. It is noted that even with better bids on the order display book the original order at 20.46 maintains priority at its limit price.

Figure 86:
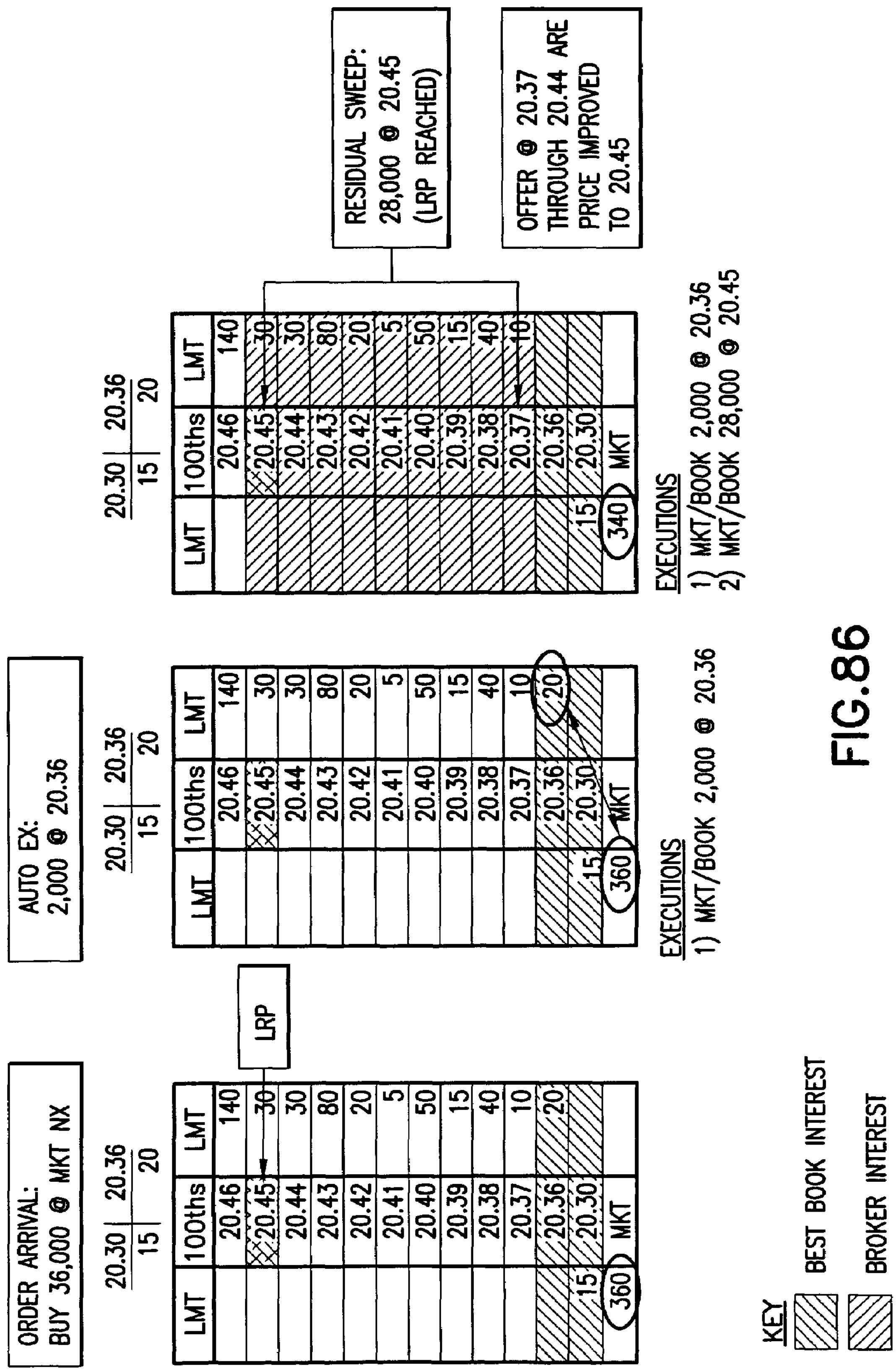
Figure 87:
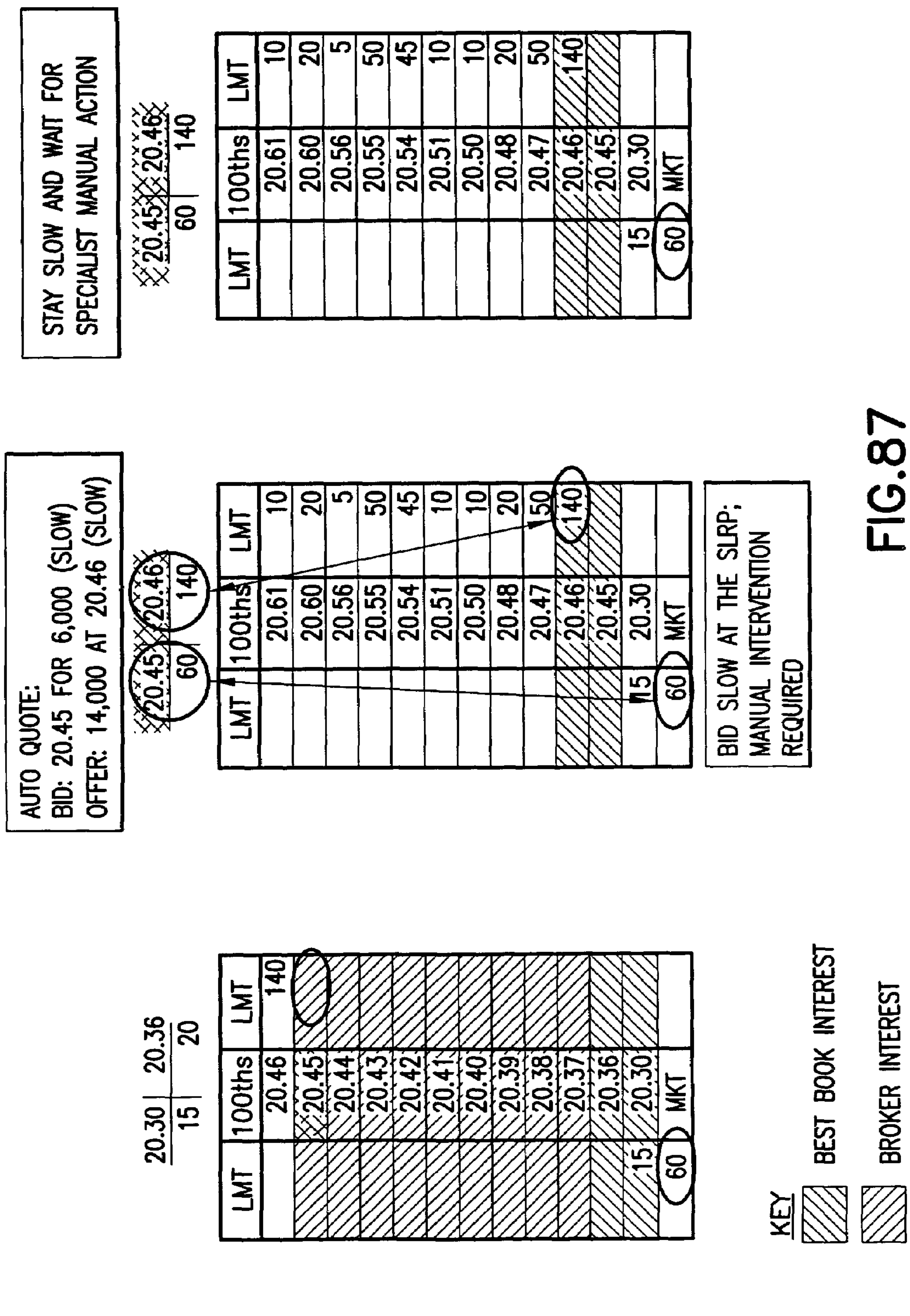

FIGS. 86 and 87 illustrate a market order sweep that hits an LRP. The best bid and best offer are $20.30 and $20.36, with the offer Sweep LRP $20.45. A MKT NX order is received to buy 36,000 shares, which is automatically executed. The first 2,000 shares trade at the offer of $20.36 taking all of the size at the offer and 28,000 shares sweep the order display book reaching the offer Sweep LRP. As before the trade at the Sweep LRP causes the quote to change from fast to slow, and the 6,000 share balance from the MKT NX order is quoted at the Sweep LRP. However, a market order is treated the same as a crossing limit order, meaning that manual intervention by the specialist is required, and there is no time-out.

Figure 88:
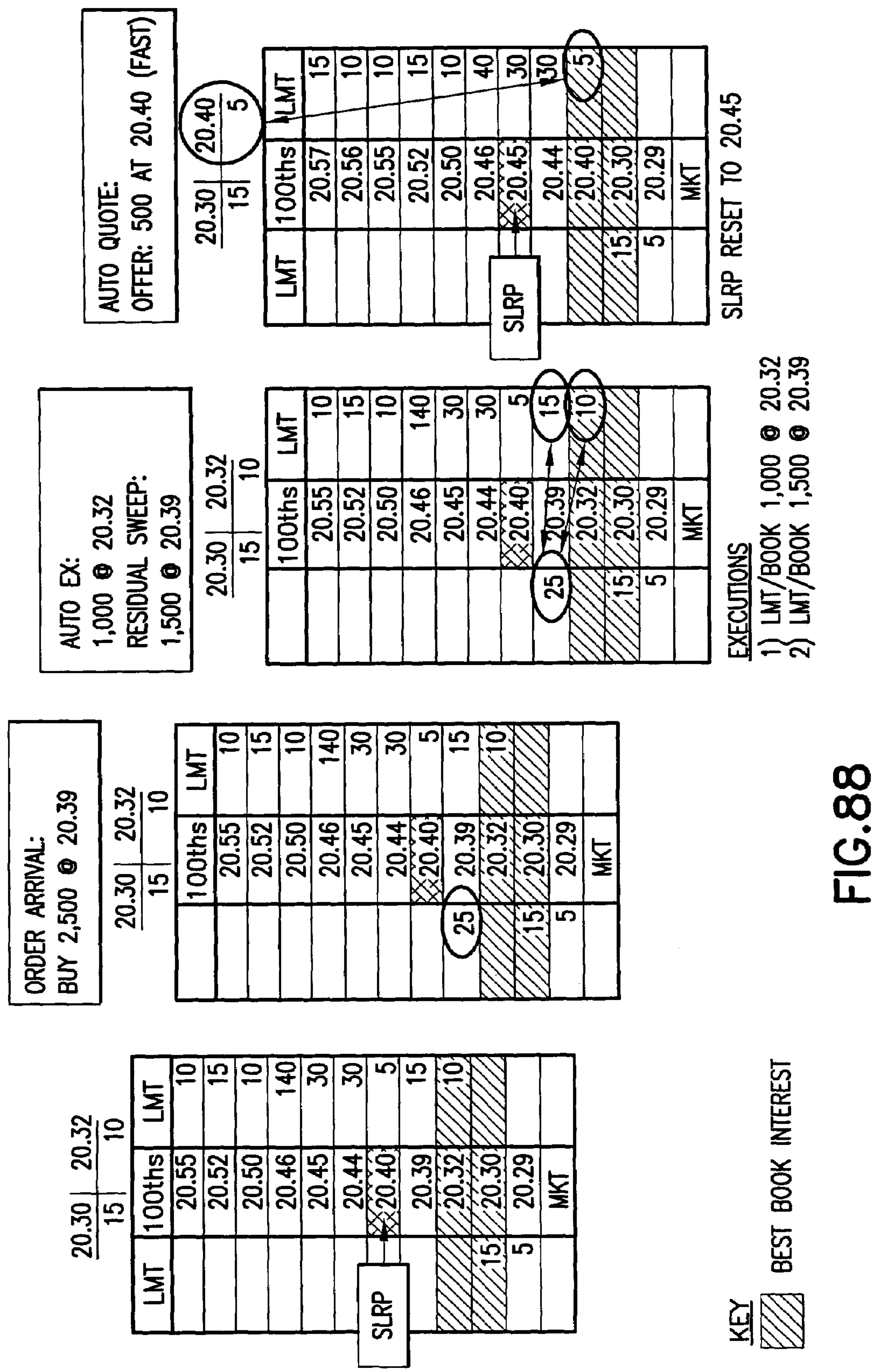
Figure 89:
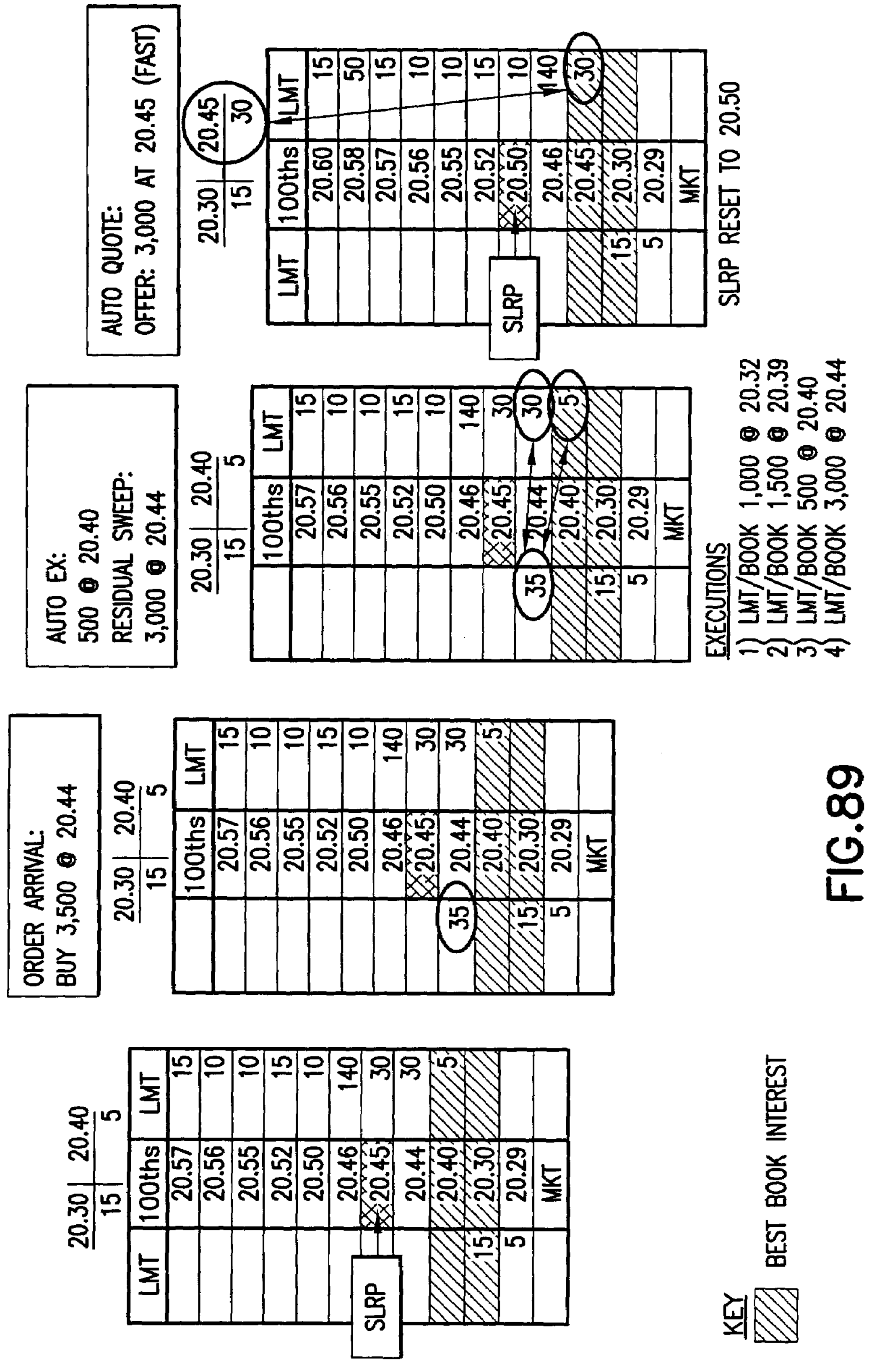

FIGS. 88 and 89 illustrate multiple crossing limit orders trading just below a Sweep LRP. The best bid and offer are $20.30 and $20.32. The offer Sweep LRP is $20.40. A limit order arrives to buy 2,500 shares at $20.39, which is automatically executed taking the 1,000 shares at the offer and sweeping to $20.39. The offer quantity at $20.40 is autoquoted and the Sweep LRP is reset to $20.45. A limit order is received to buy 3,500 shares at $20.44, which is automatically executed taking the 500 shares at the offer and sweeping to $20.44. The offer at $20.45 on the order display book is autoquoted and the Sweep LRP is reset. The example shows how a series of orders would not trigger the Sweep LRP, but the pattern could continue indefinitely unless another type of LRP measure is available.

FIG. 90 illustrates how Momentum Liquidity Replenishment Points or Prices (Momentum LRPs) are determined over a moving or sliding 30 second window. The Momentum LRPs are based on the high and low trading prices within that 30 second window, using the greater of 25 cents or 1% of the last sale price. For example, at 10:05:25, the trade is at $20.15 and over the previous 30 seconds (10:05:06 forward) the low trading price was $19.92 and the high trading price was $20.15. One percent of the last sale price would be $0.2015, so 25 cents is greater and the lower or bid Momentum LRP is set by subtracting 25 cents from the high trading price ($20.15−0.25=$19.90) and the higher or offer Momentum LRP is set by adding 25 cents to the low trading price ($19.92+0.25=$20.17). If an automatic execution would occur at a price lower than $19.90 or at a price higher than $20.17, then the Momentum LRP is triggered and the trade is not automatically executed.

Figure 91:
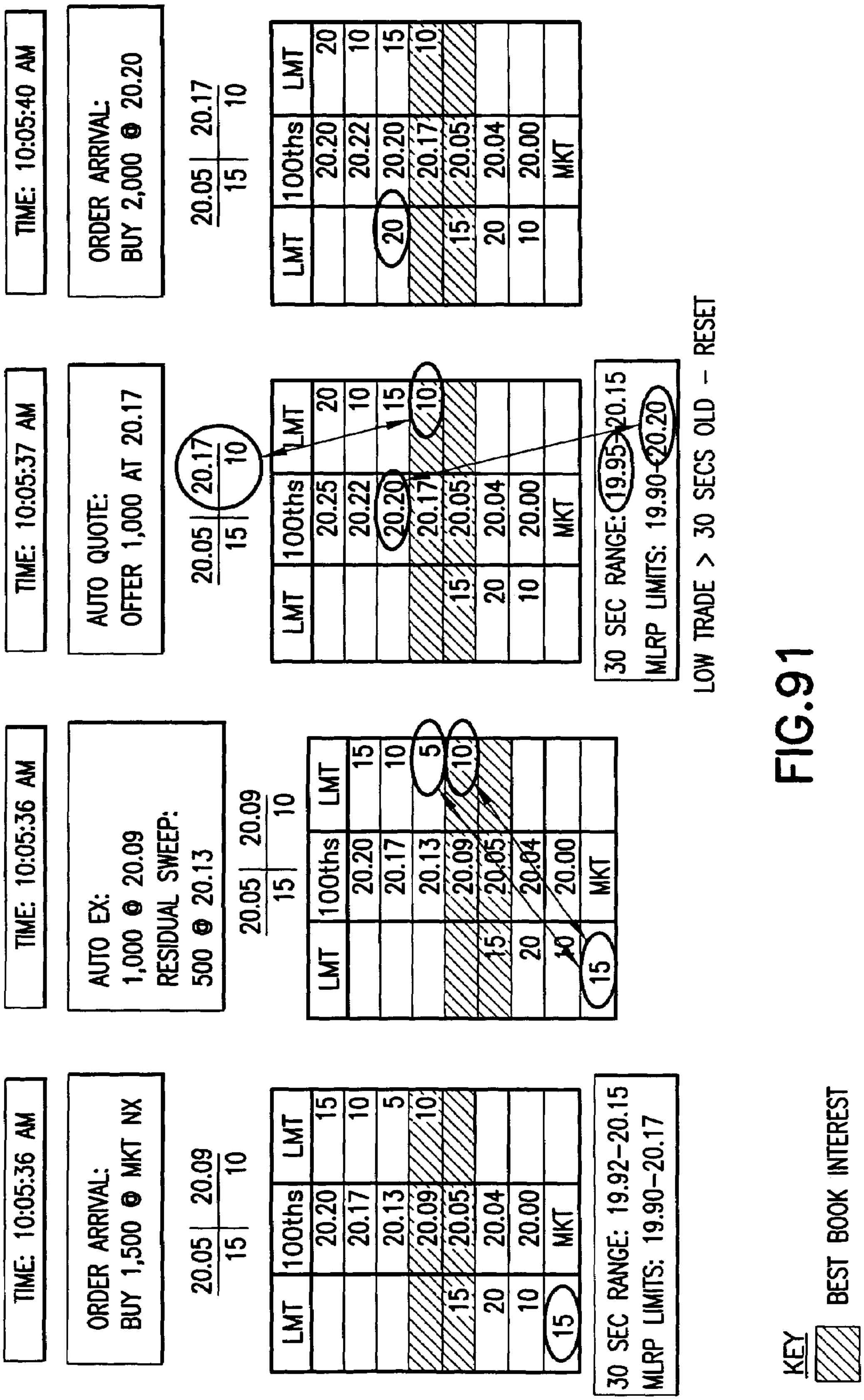
Figure 92:
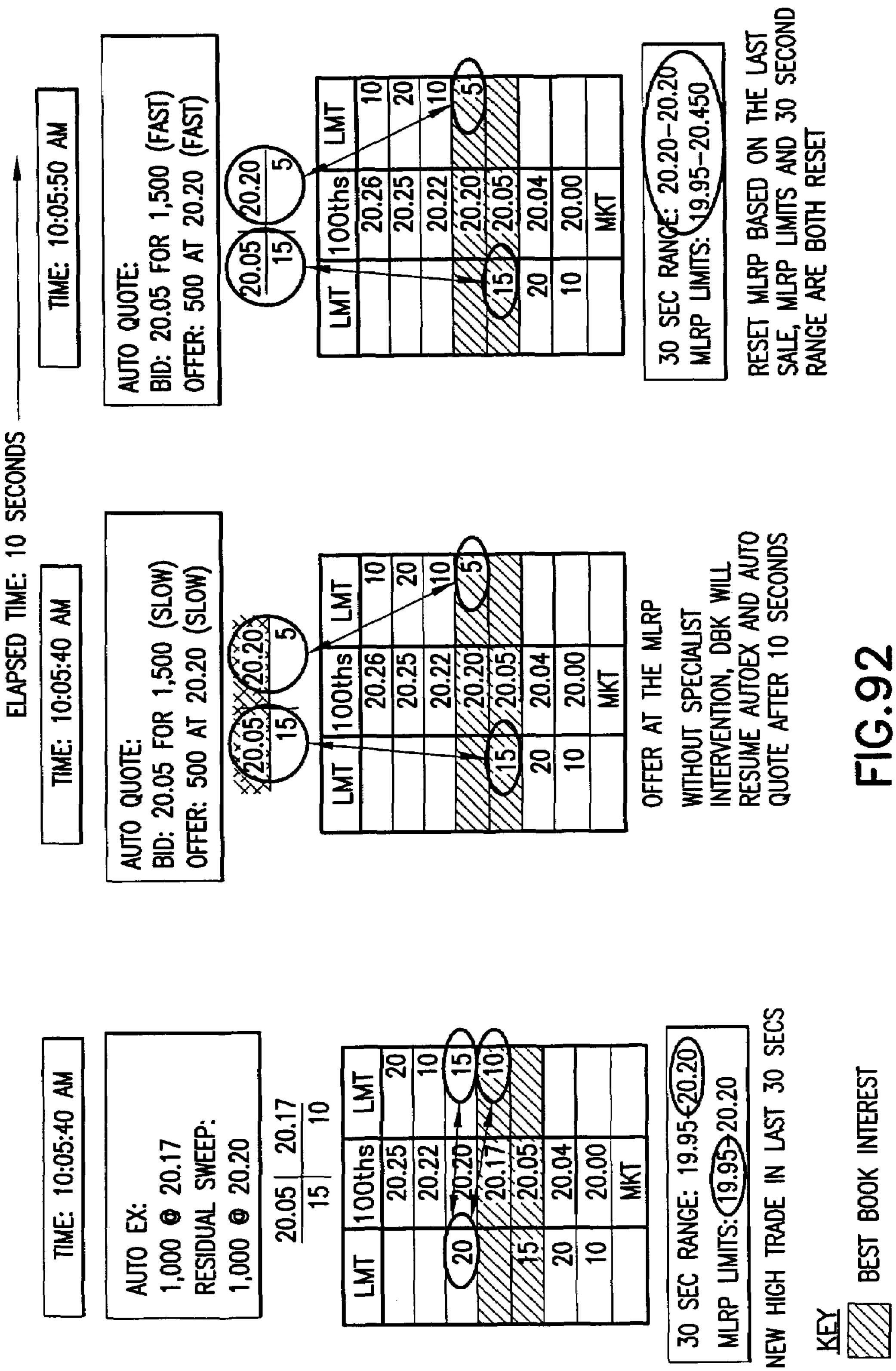

FIGS. 91 and 92 illustrate a trade at a Momentum LRP that depletes the sweeping order. The market is quoted slow and automatic execution resumes after 10 seconds. The best bid and offer are $20.05 and $20.09 and within the last 30 seconds the low and high trade prices were $19.92 and $20.15, making the Momentum LRPs $19.90 and $20.17. An MKT NX order arrives to buy 1,500 shares, which is automatically executed, taking the 1,000 shares at the offer and sweeping the order display book to $20.13. Within the 30 second window, the lowest trade is now $19.95, so the upper or bid Momentum LRP is reset to $20.20, and the order display book is autoquoted. A limit order is received to buy 2,000 shares at $20.20, which is automatically executed, taking the 1,000 shares at the offer and sweeping the order display book to $20.20. This trade hits the upper Momentum LRP, but the trade depletes the sweeping order and 500 shares remain at the upper Momentum LRP, so the quote changes from fast to slow and the order display book is autoquoted slow with the offer price at the upper Momentum LRP. Without specialist intervention, the quote will change from slow to fast after 10 seconds and automatic execution will resume. After 10 seconds elapse, the low and high trades within the last 30 seconds are $20.20 and $20.20 and the Momentum LRPs are reset to $19.95 and $20.45. Additionally, the quote is changed from slow to fast and automatic execution resumes.

Figure 93:
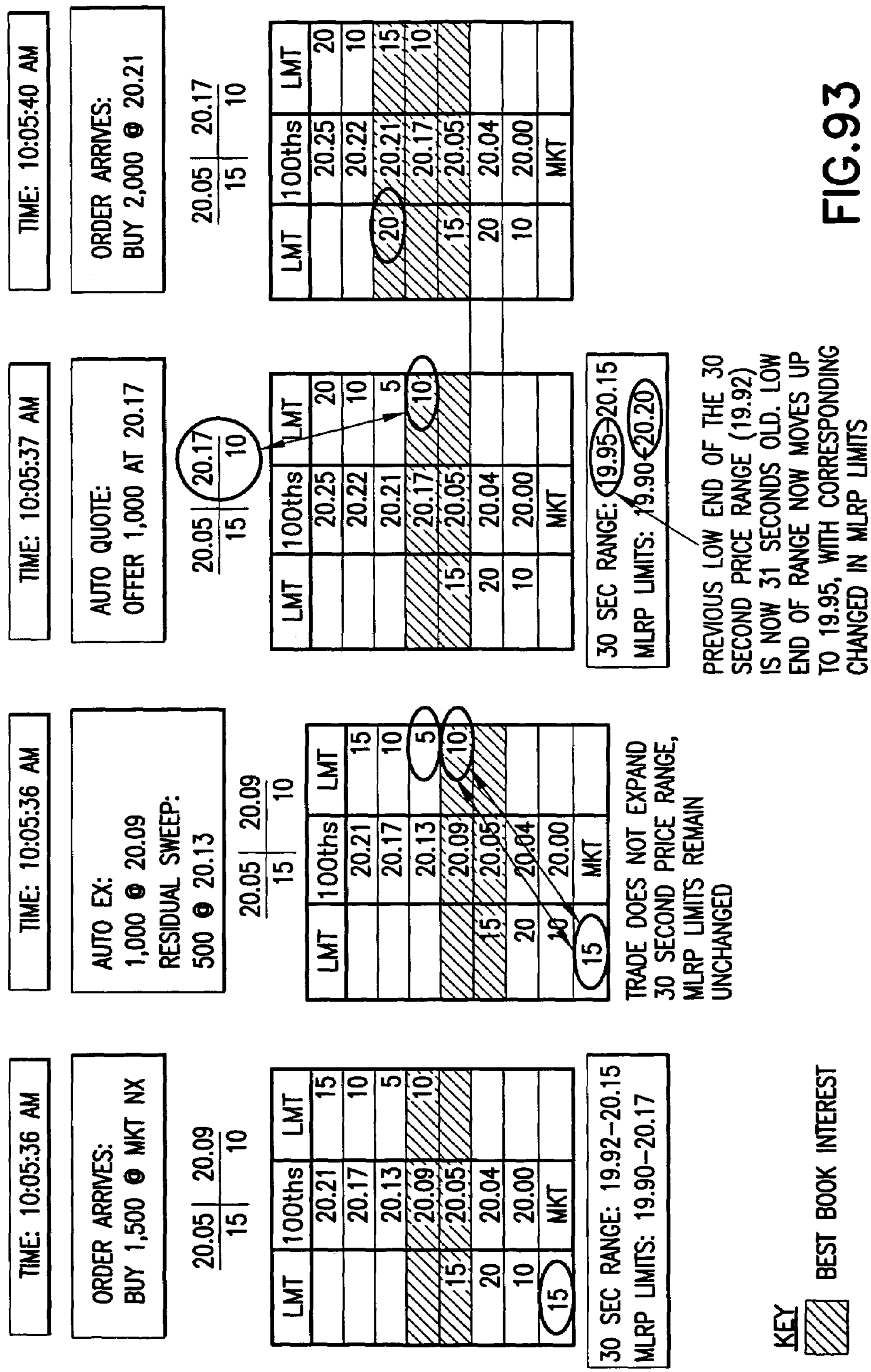
Figure 94:
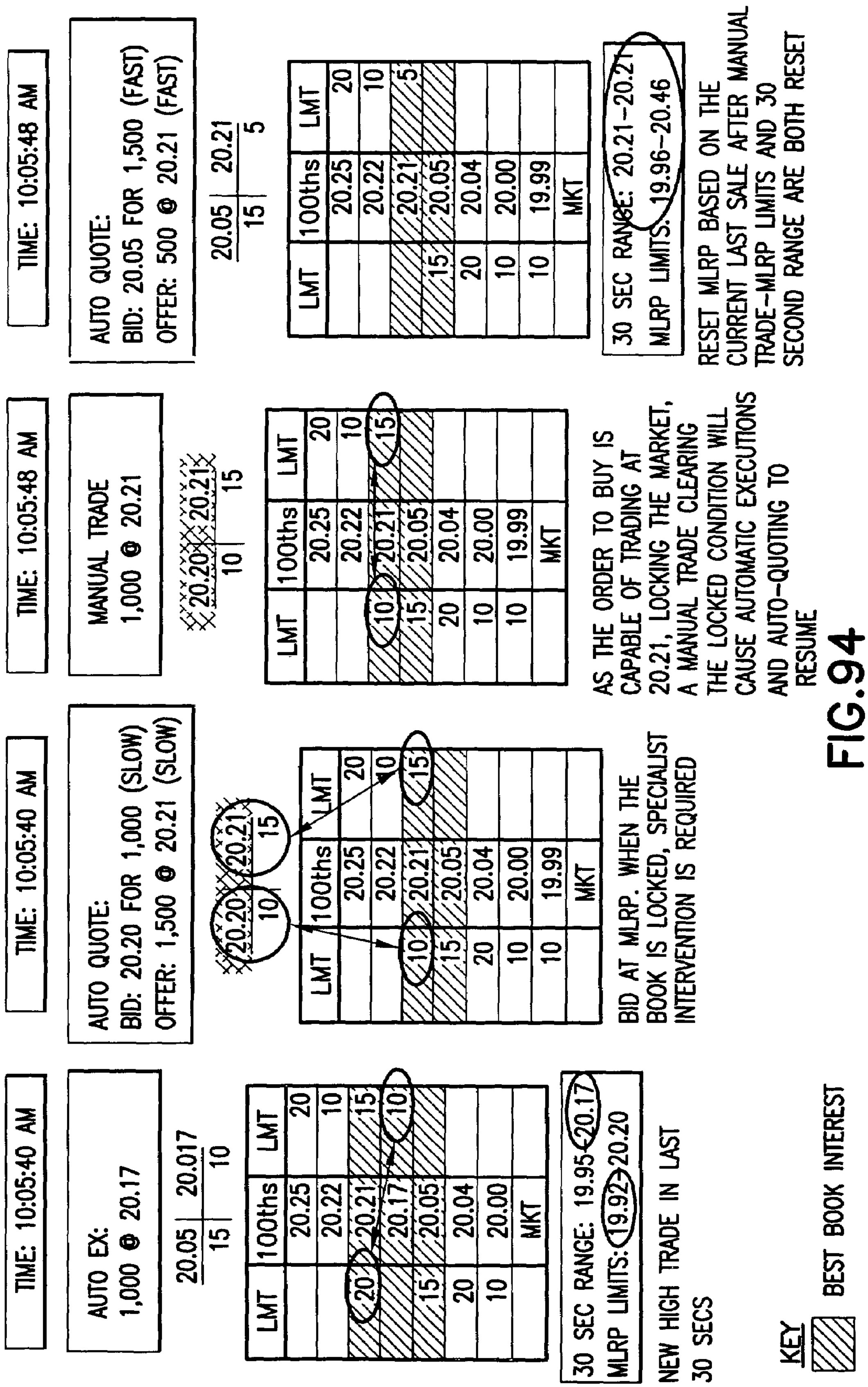

FIGS. 93 and 94 illustrate multiple trades within a set time that trigger the Momentum LRP. A crossing order causes a slow quote and specialist intervention is required to resume a fast market. The Momentum LRPs are $19.90 and $20.17 and a MKT NX order arrives to buy 1,500 shares, which is automatically executed, taking 1,000 shares at the offer and sweeping to $20.13. This trade does not change the prices within the 30 second window so the Momentum LRPs remain unchanged. The order display book is autoquoted to reflect the new best offer at $20.17. The 30 second window moves 1 second and the new lowest trade is now $19.95, so the upper Momentum LRP is changed to $20.20. A limit order is received to buy 2,000 shares at $20.21, which is automatically executed, taking the 1,000 shares offered at $20.17. However, a sweep of the remaining balance of this order would be at $20.21, which is above or outside the upper Momentum LRP of $20.20. This causes the quote to change from fast to slow and the quote of the bid to be the Momentum LRP. In this example the order display book is also locked. There is size on both the buy and sell size at $20.21 and specialist intervention is required with a manual trade to clear the locking condition. Once the manual execution is completed, automatic execution can resume and the quote will change from slow to fast. The low and high trades in the last 30 seconds are now $20.21 so the Momentum LRPs are reset to $19.96 and $20.46.

Figure 95:
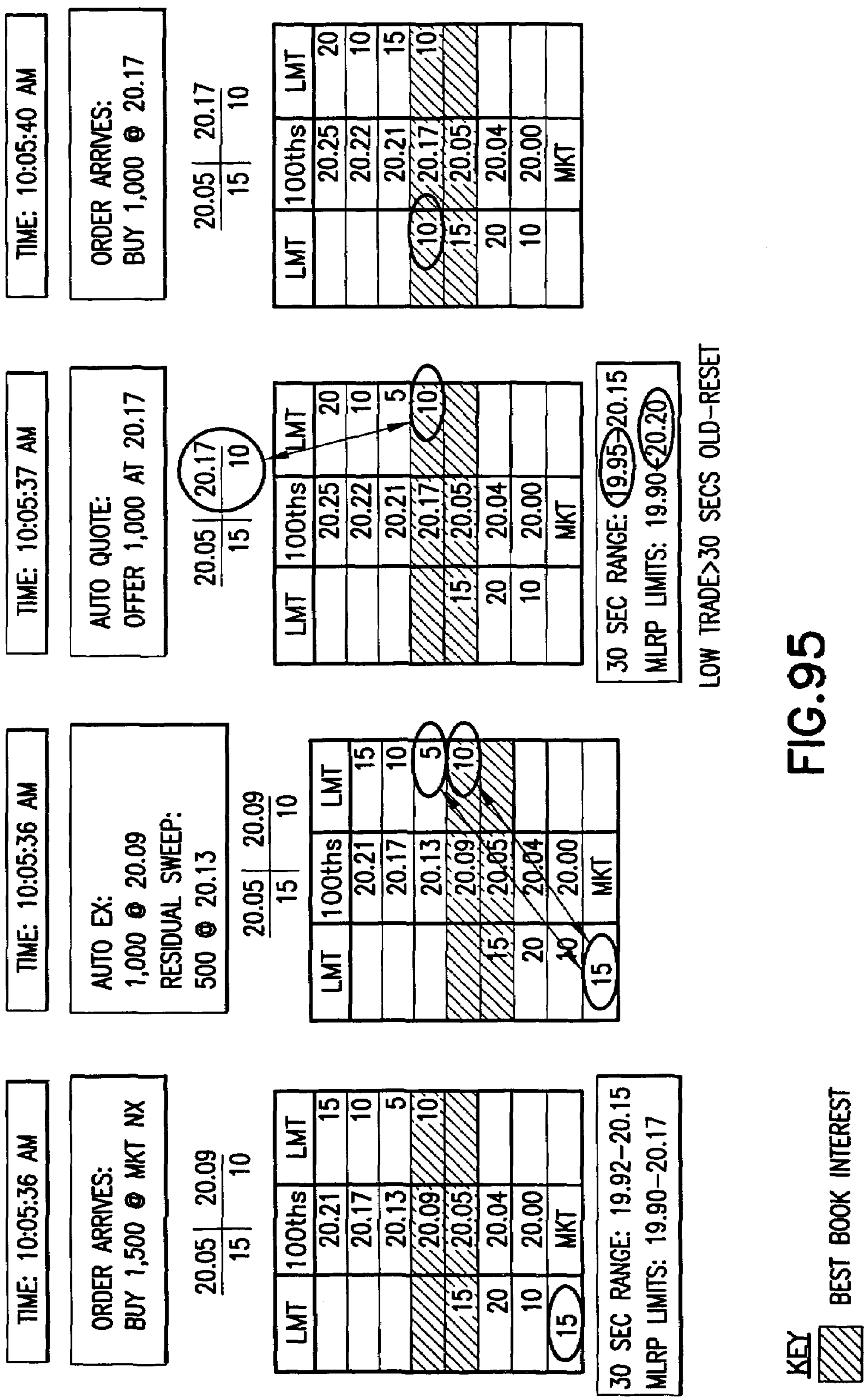
Figure 96:
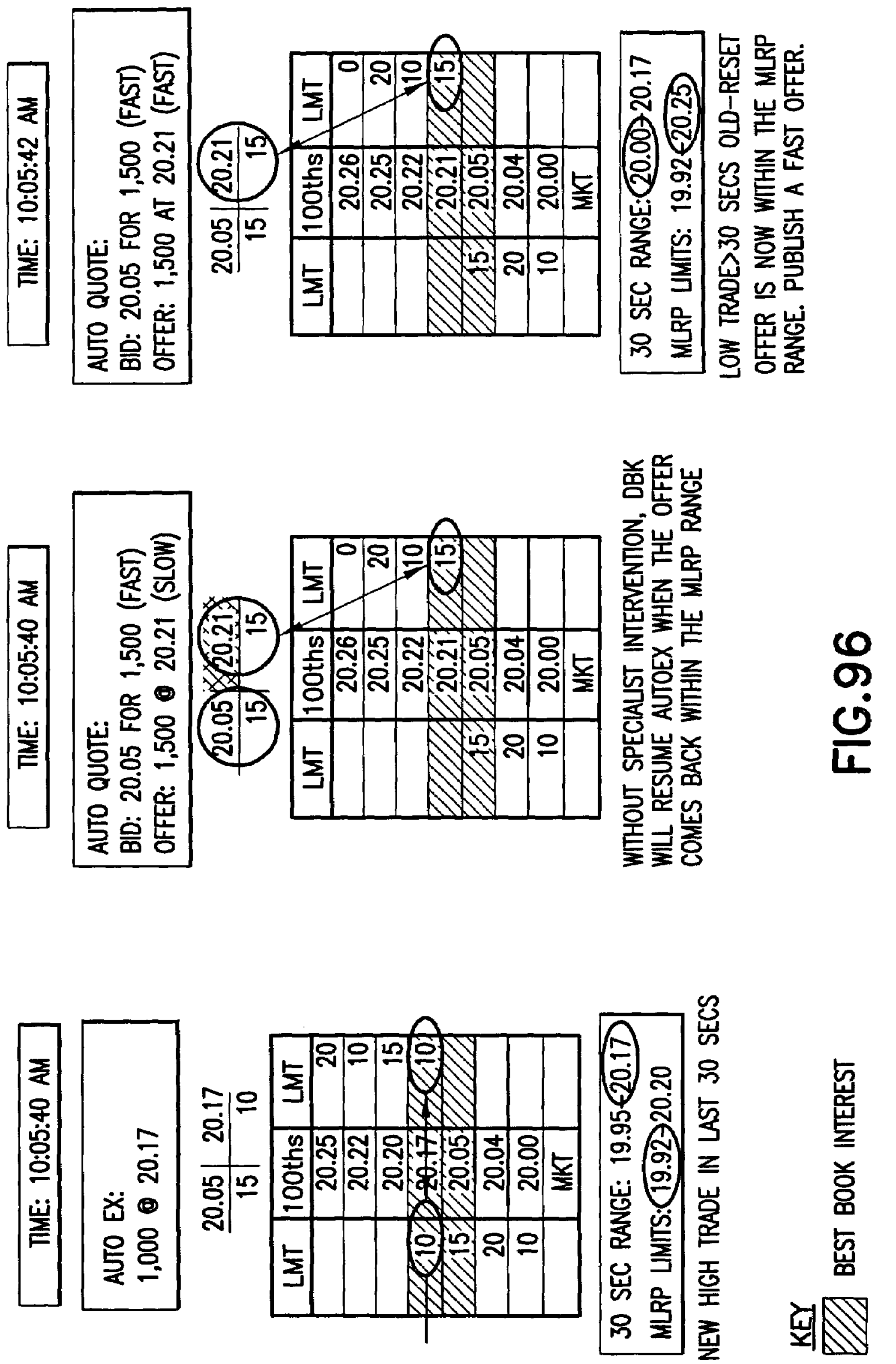

FIGS. 95 and 96 illustrate a trade that depletes all interest within the Momentum LRP and the next best offer is quoted slow. When the offer is back within the Momentum LRP range automatic execution automatically resumes. The Momentum LRPs are $19.90 and $20.17 and a MKT NX order is received to buy 1,500 shares, which is automatically executed, taking the 1,000 share size at the offer with a residual sweep to $20.13. The order display book is autoquoted and the upper Momentum LRP is reset. A limit order is received to buy 1,000 shares at $20.17, which is automatically executed. This is a new high trade so the lower Momentum LRP is reset to $19.92. The trade at $20.17 was within the Momentum LRP range, but after the offer size is depleted, the next best offer at $20.21 is outside the Momentum LRP range. This results in a slow quote on the offer side of the market where the published quote is outside the Momentum LRP range. Without specialist intervention, the quote will change from slow to fast and a fast market will resume when the offer comes back within the Momentum LRP range.

Figure 97:
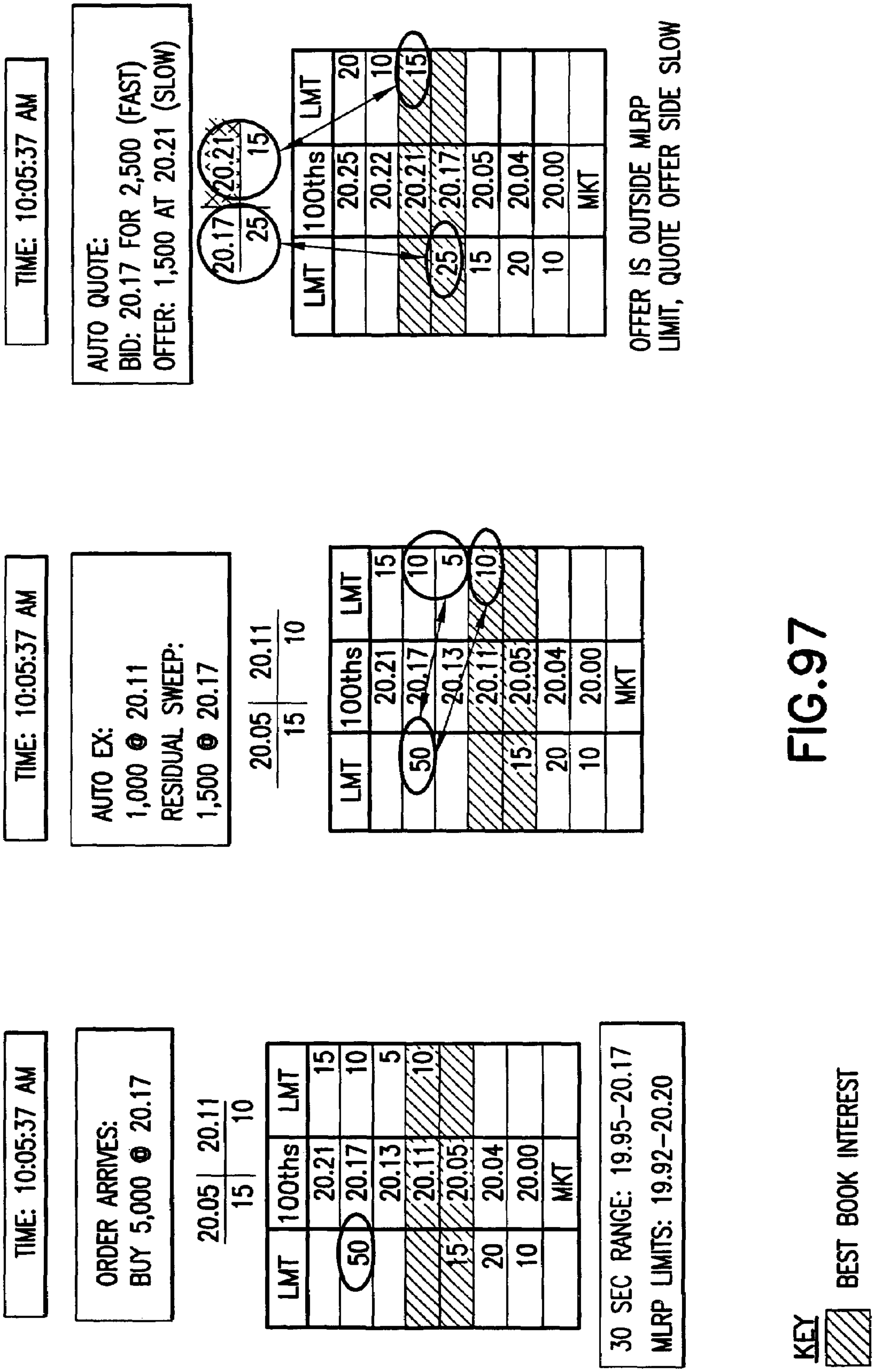
Figure 98:
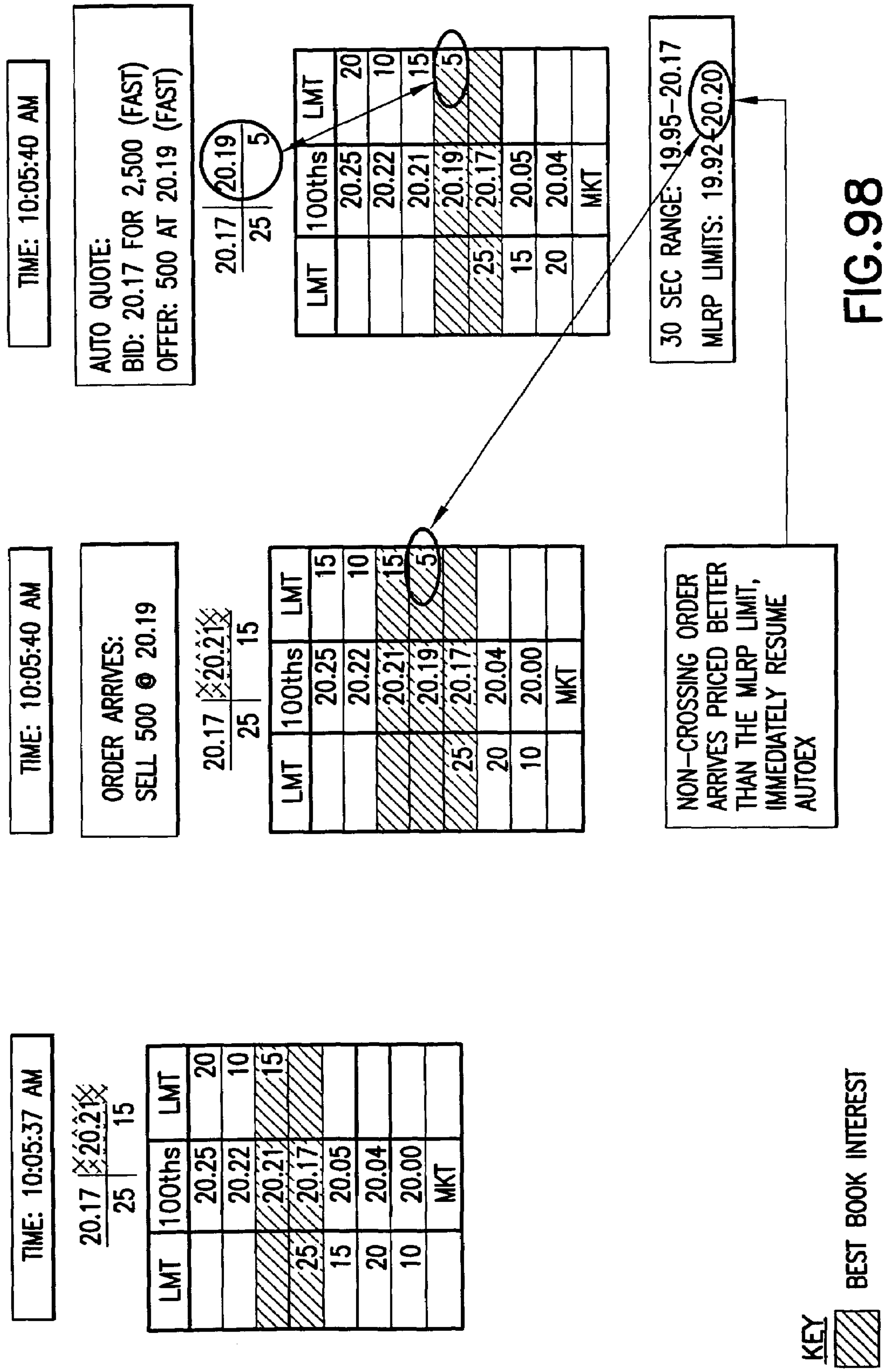

FIGS. 97 and 98 illustrate a trade that depletes all interest within the Momentum LRP and the next best offer is quoted slow. While the offer is slow, an order arrives establishing a new best offer within the Momentum LRP range so automatic execution resumes immediately and the quote changes from slow to fast. The Momentum LRP range is $19.92 to $20.20 and a limit order arrives to buy 5,000 shares at $20.17, which is automatically executed taking all 1,000 shares offered at $20.11 and sweeping to $20.17. This leaves a balance of 2,500 shares on the limit order, which is autoquoted as the new best bid. Also, the best offer is now $20.21, which is outside the Momentum LRP range so the offer side is quoted slow. While slow, a limit order is received to sell 500 shares at $20.19, which is a non-crossing order and a new best offer that is within the Momentum LRP range, so automatic execution resumes immediately.

Figure 99:
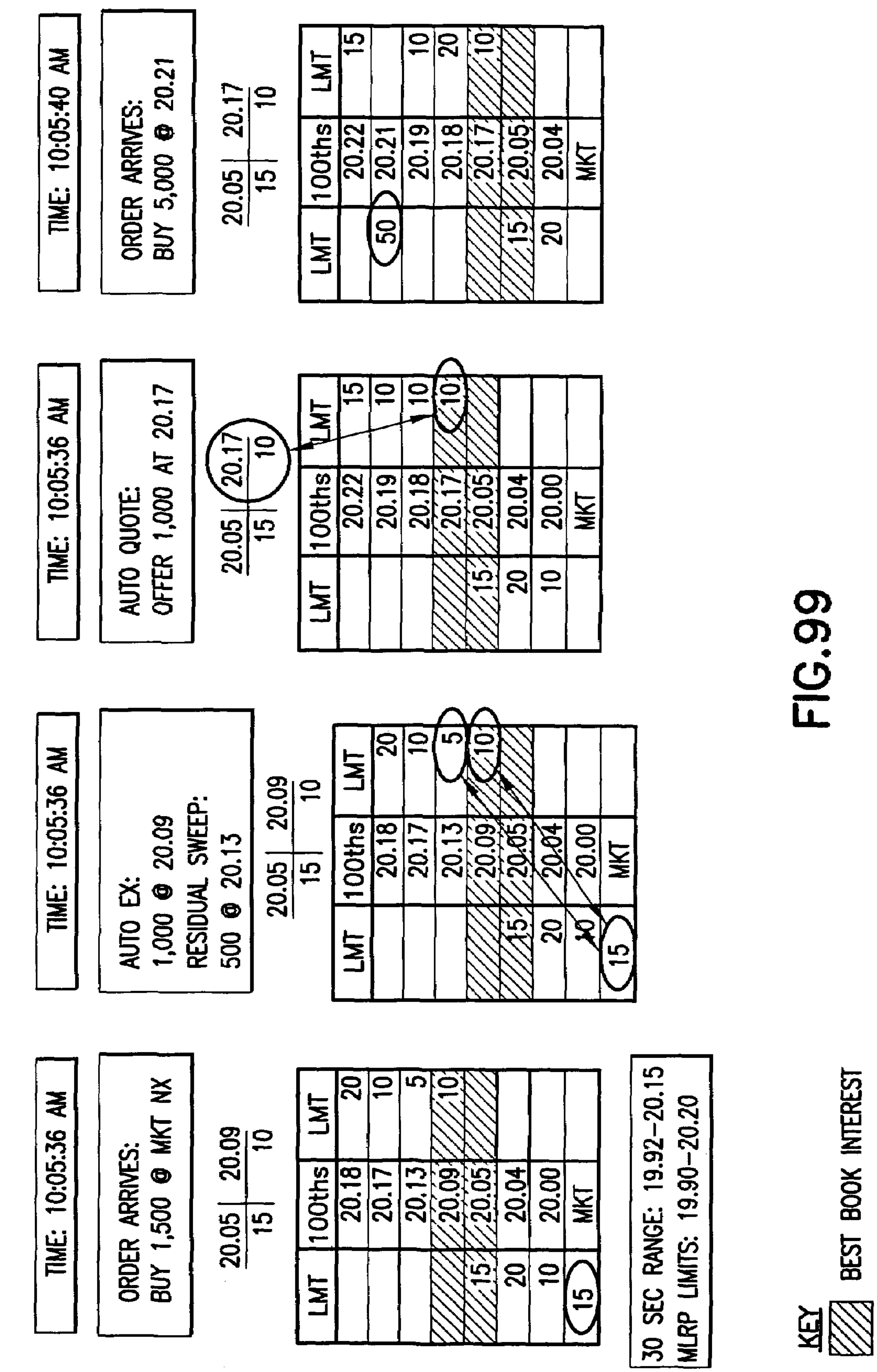
Figure 100:
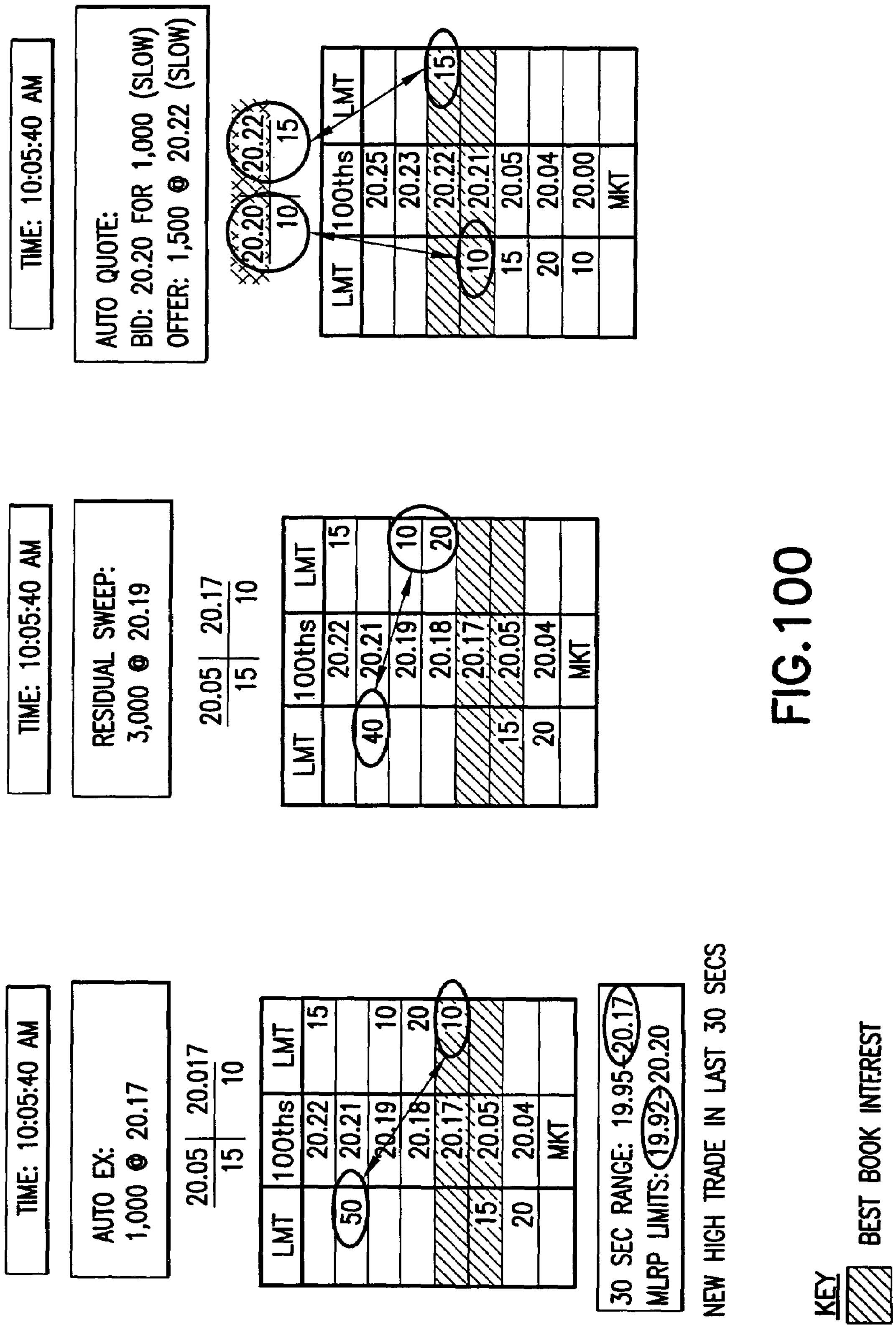
Figure 101:
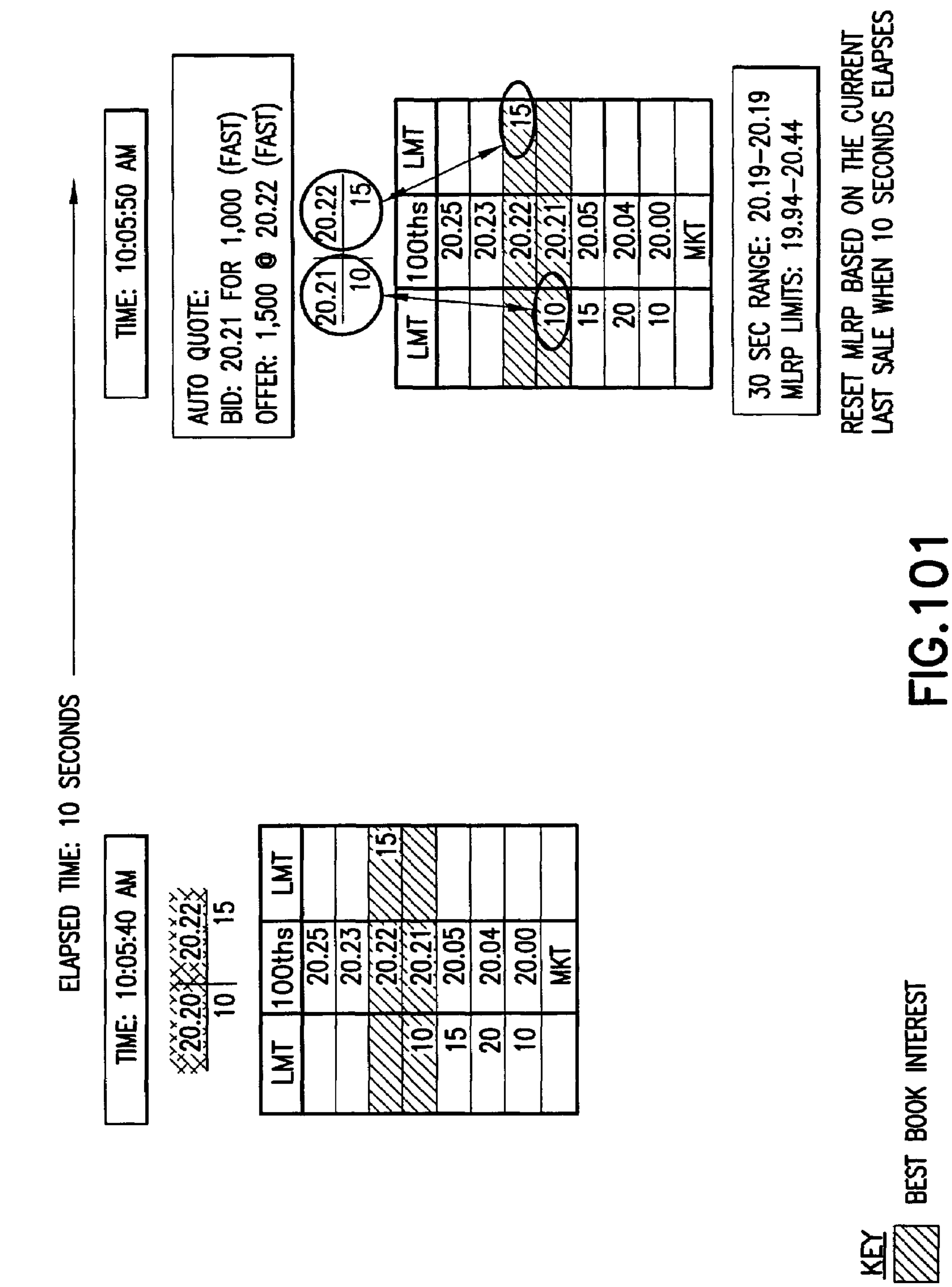

FIGS. 99, 100 and 101 illustrate an order that partially sweeps and triggers a Momentum LRP when the next best offer is outside the Momentum LRP limit. Automatic execution resumes automatically after 10 seconds. The Momentum LRPs are $19.90 and $20.20. A MKT NX order arrives to buy 1,500 shares, which is automatically executed taking 1,000 shares at the offer with the residual sweeping to $20.13. The order display book is autoquoted, and a limit order arrives to buy 5,000 shares at $20.21. 1,000 shares of the limit order automatically execute at the offer price, and a residual sweep occurs for 3,000 shares at $20.19. 1,000 shares of the sweeping limit order remain, which is autoquoted at the Momentum LRP, and the quote is changed from fast to slow. The order display book is not crossed or locked, so the quote is slow for up to 10 seconds. After 10 seconds the order display book automatically re-quotes a fast market based on the current state of the order display book and resets the Momentum LRP limits and 30 second Momentum LRP timer.

Figure 102:
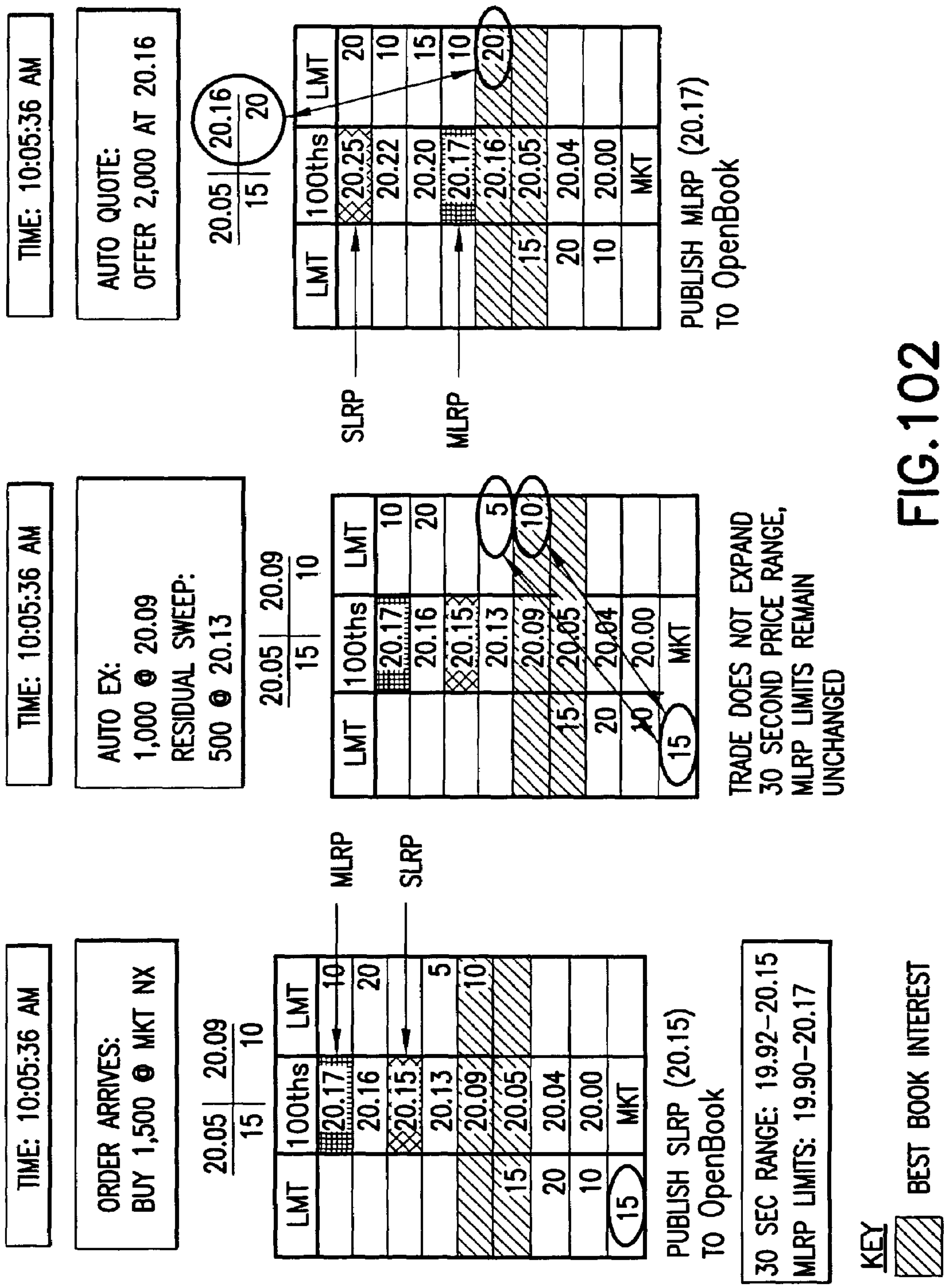

FIG. 102 illustrates how the Sweep LRP and Momentum LRP are both used to dampen volatility. If the limits overlap, then the tighter of the two limits is published. The best bid and offer are $20.05 and $20.09, and the upper Sweep LRP is $20.15, while the upper Momentum LRP is $20.17. The upper Sweep LRP is tighter and is published to OpenBook®. A MKT NX order is received to buy 1,500 shares, which is automatically executed with 1,000 shares at the offer price of $20.09 and the residual 500 shares sweeping to $20.13. This trade does not expand the 30 second price, so the Momentum LRPs remain unchanged. The sweep took all of the size at $20.13 and the next best offer is 2,000 shares at $20.16, so the order display book is autoquoted to show the best bid and offer as $20.05 and $20.16. This changes the upper Sweep LRP to $20.25, and now the upper Momentum LRP is the tighter LRP, so the Momentum LRP is published to OpenBook®.

Figure 103:
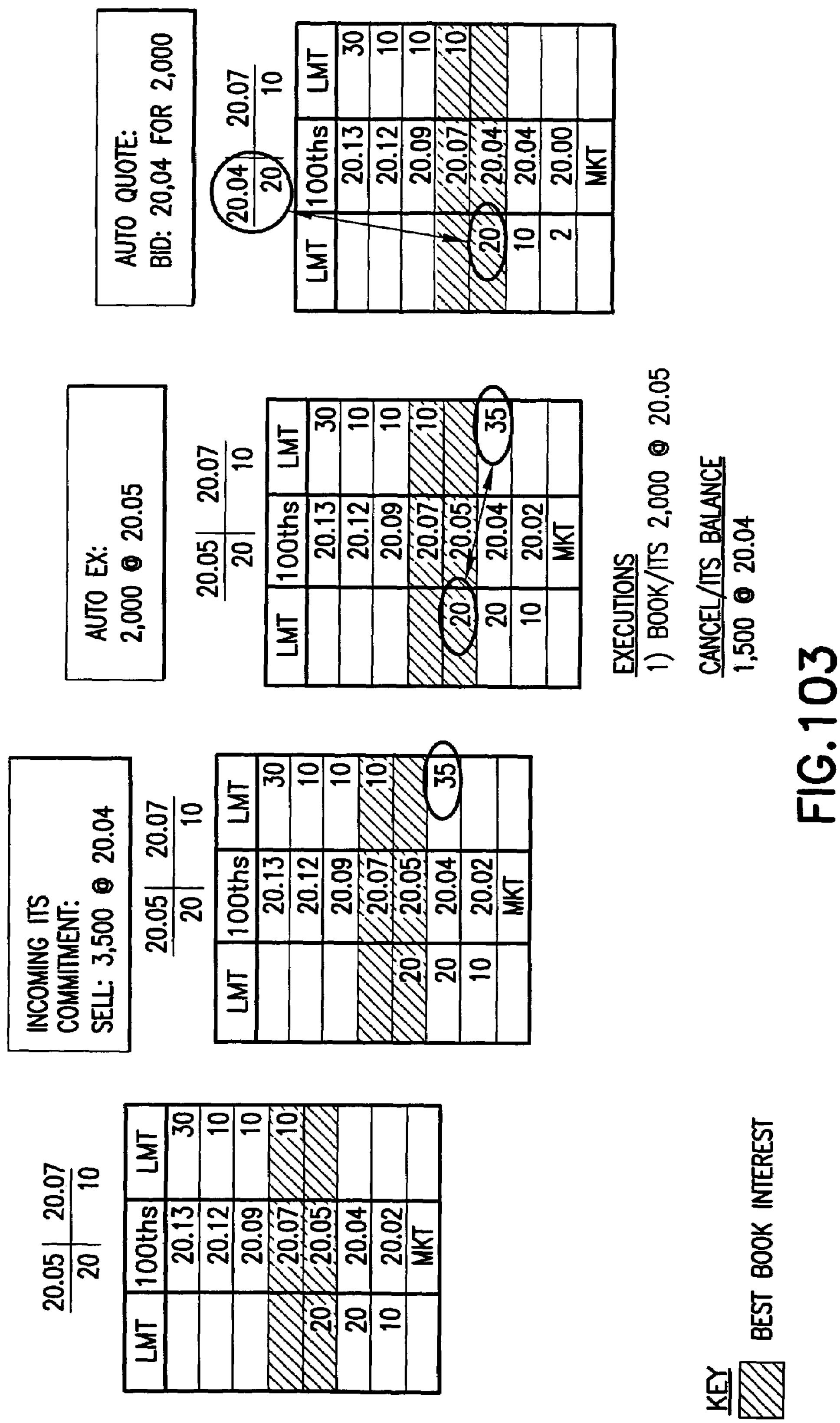

FIG. 103 illustrates an incoming ITS commitment that is automatically executed up to the quoted size, with no residual sweep. Any unfilled balance is cancelled. The best bid and offer are $20.05 and $20.07, with 2,000 shares bid and 1,000 shares offered. An ITS commitment is received to sell 3,500 shares at $20.04. The ITS commitment is automatically executed against the bid, taking 2,000 shares. Although there are 2,000 shares bid at $20.04, the 1,500 shares balance of the ITS commitment is cancelled and it does not sweep. The order display book is automatically quoted.

Figure 104:
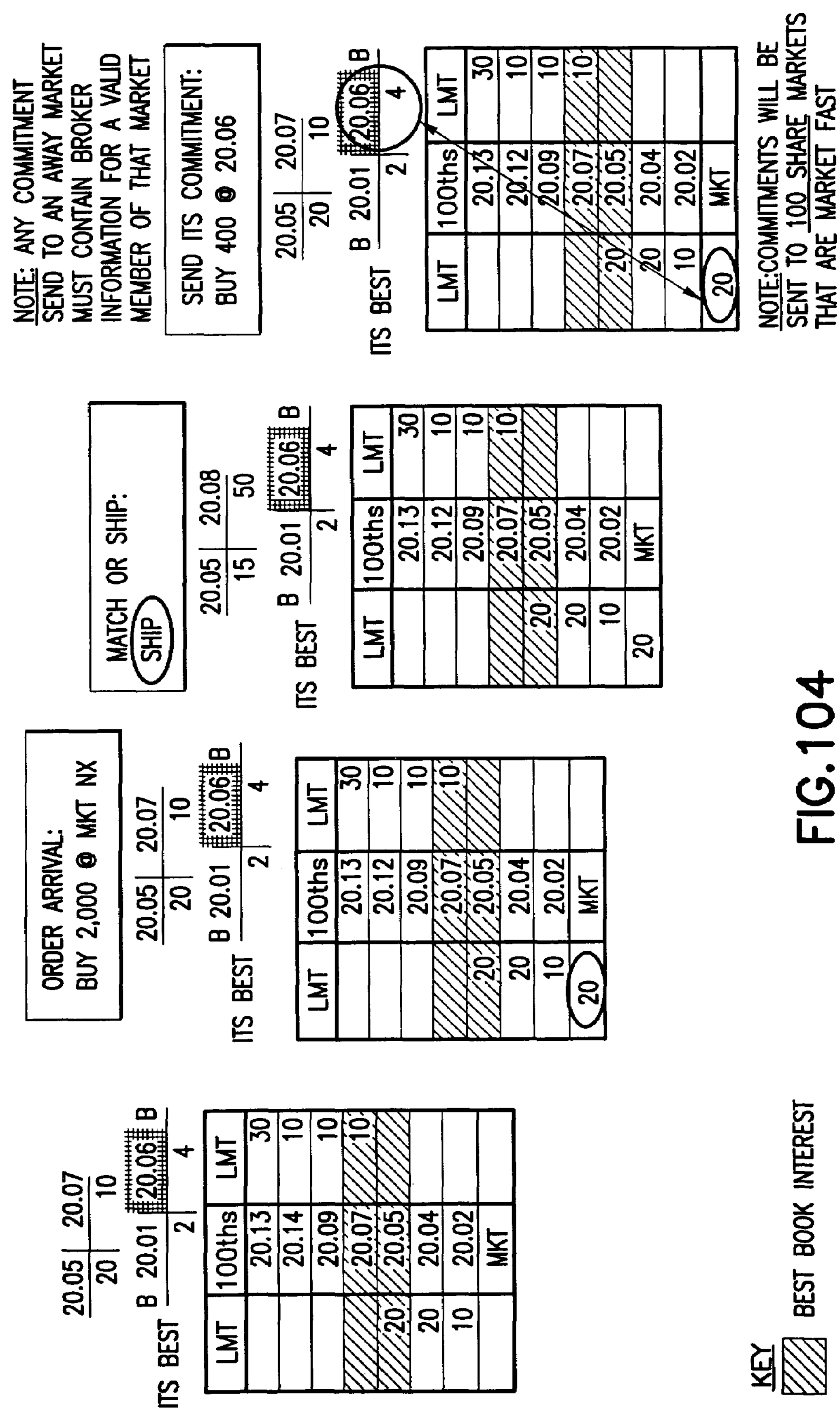
Figure 105:
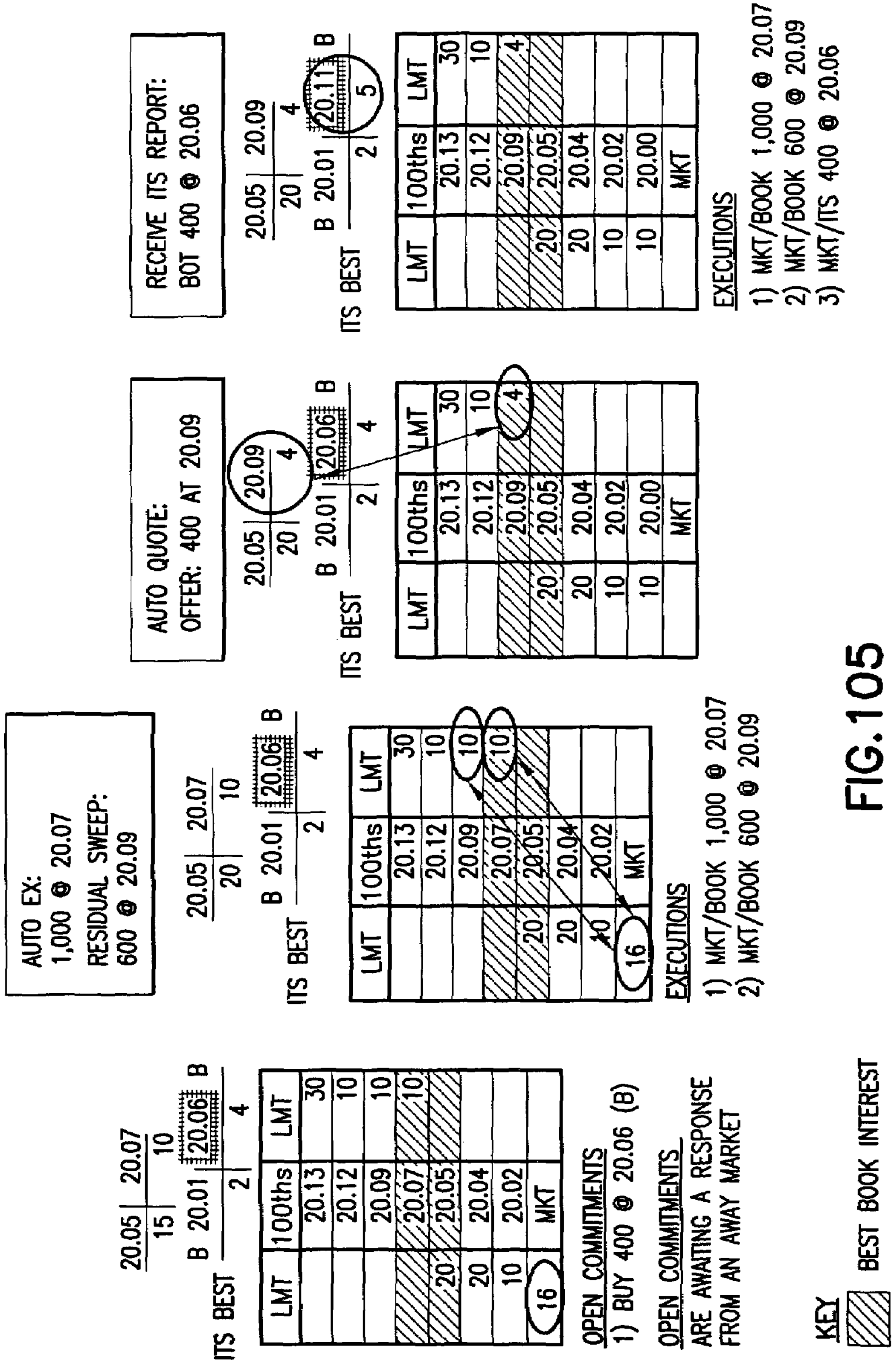

FIGS. 104 and 105 illustrate automatic routing of an order to an away market that has a better priced bid or offer, with specialist match and trade of the unshipped balance. The Exchange bid and offer are $20.05 and $20.07, while an away market has a bid and offer of $20.01 and $20.06, making the away market offer at $20.06 the best offer. In addition, the away market is publishing a fast market. A MKT NX order arrives to buy 2,000 shares. The specialist algorithm is set to ship the order and an ITS commitment is sent to the away market to buy 400 shares at $20.06. The 1,600 share balance of the order is automatically executed, with 1,000 shares at the Exchange offer of $20.07 and the 600 residual share balance sweeping to $20.09. This leaves 400 shares on the order display book at $20.09, which is autoquoted. The away market sends an ITS report that the 400 shares were executed at $20.06.

Figure 106:
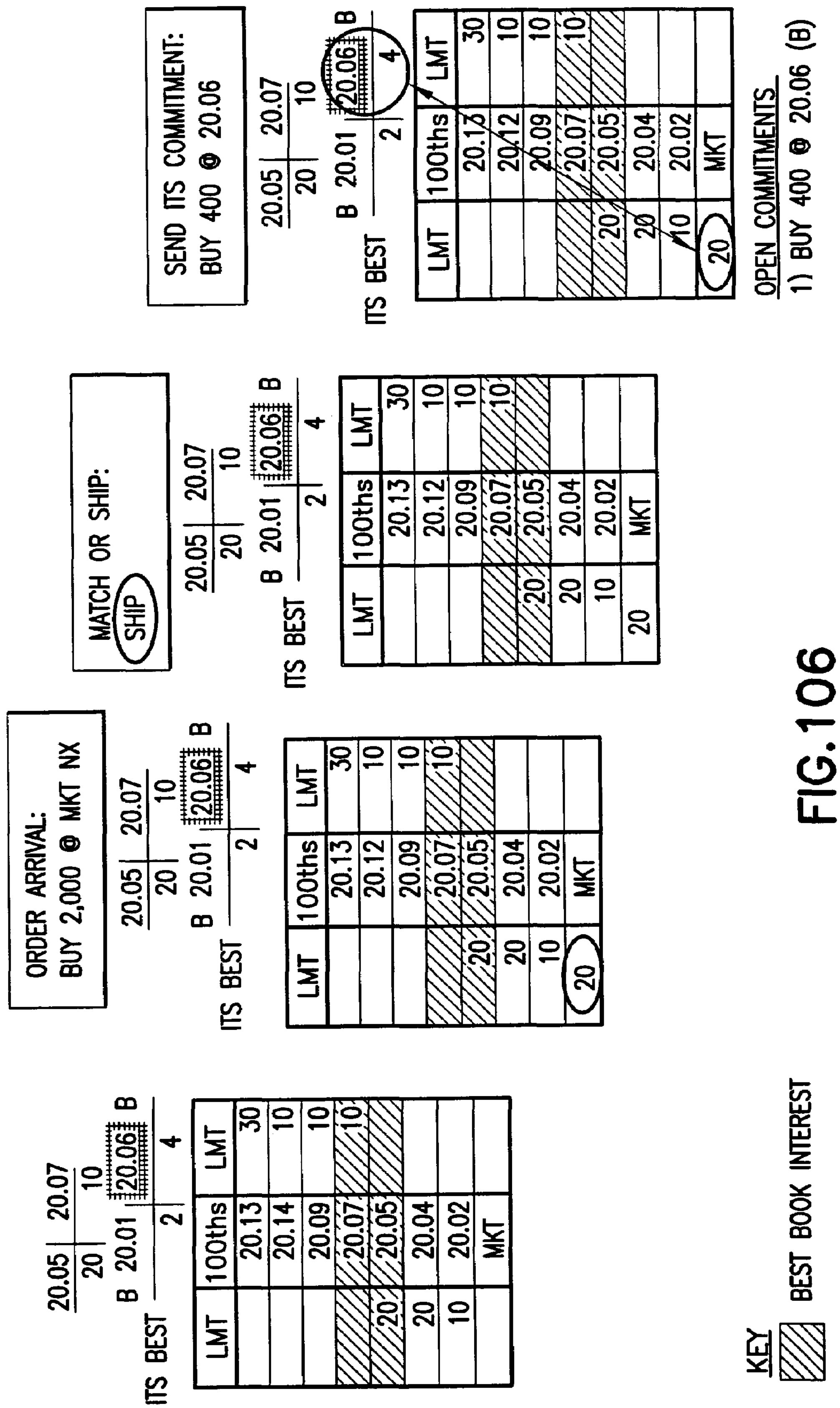
Figure 107:
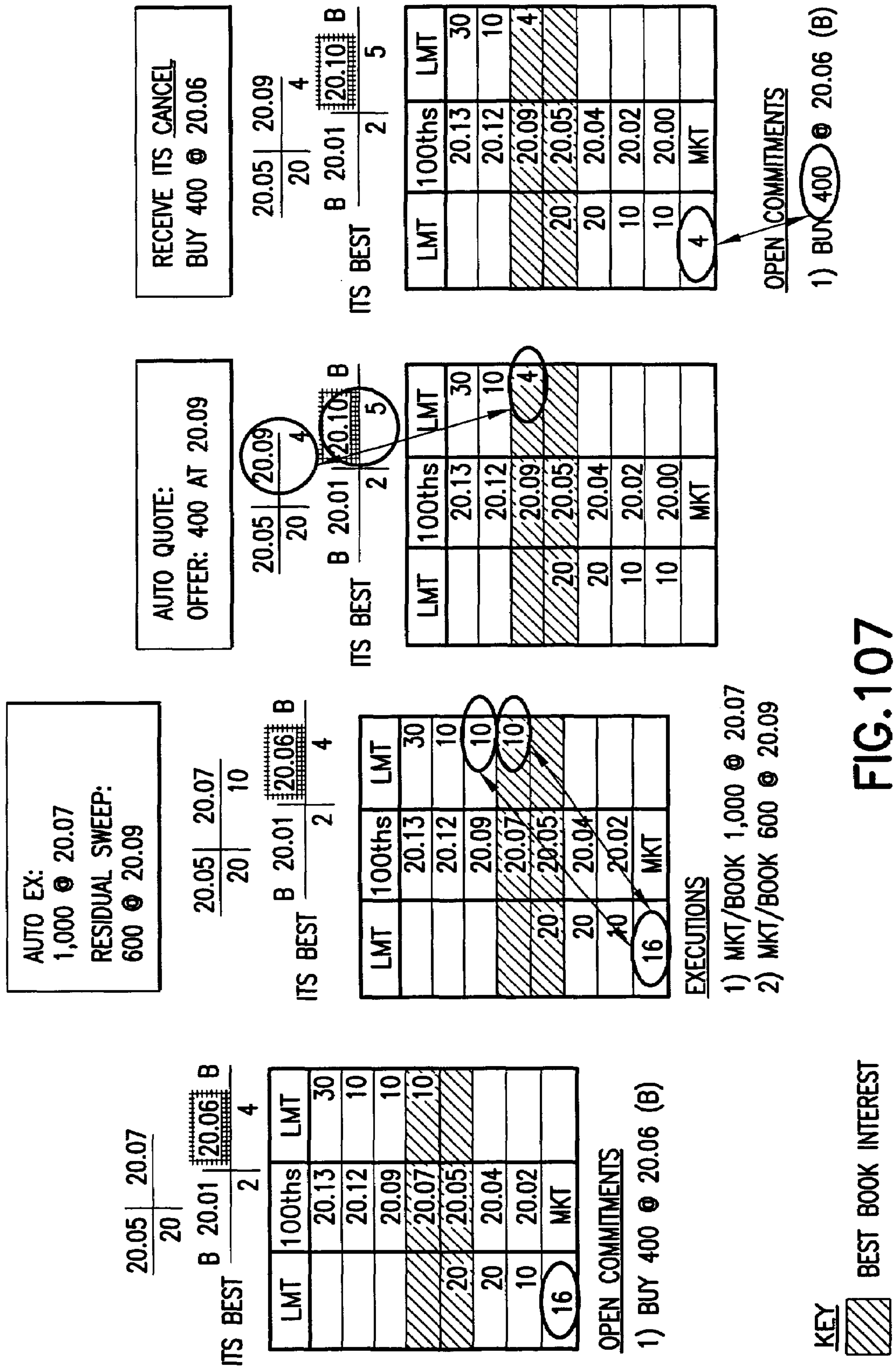
Figure 108:
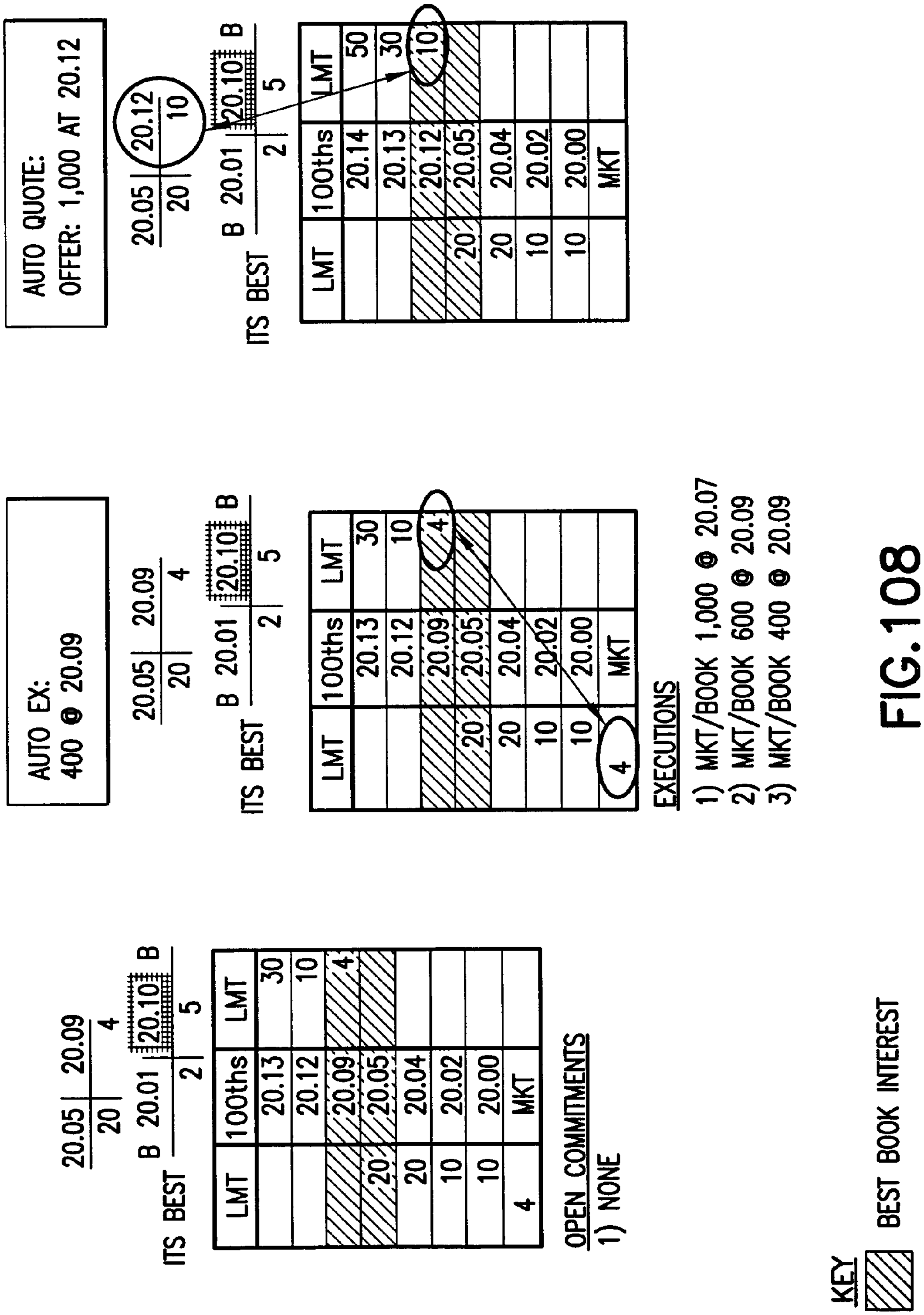

FIGS. 106, 107 and 108 illustrate automatic routing of an order to an away market with specialist match option, the commitment cancels, causing restoration of the shares to the Exchange market and subsequent automatic execution. The Exchange bid and offer are $20.05 and $20.07, while an away market bid and offer are $20.01 and $20.06, making the away market the best offer. A MKT NX order arrives to buy 2,000 shares. The specialist algorithm is set to ship, and an ITS commitment to buy 400 shares is sent to the away market. The 1,600 share balance is automatically executed, with 1,000 shares at the Exchange offer of $20.07 and the 600 residual share balance sweeping to $20.09. This leaves 400 shares on the order display book at $20.09, which is autoquoted. A cancel is received from the ITS commitment to buy 400 shares, restoring the order. The restored order is automatically executed against the offer at $20.09, taking all of the size at $20.09, and the order display book is autoquoted.

Figure 109:
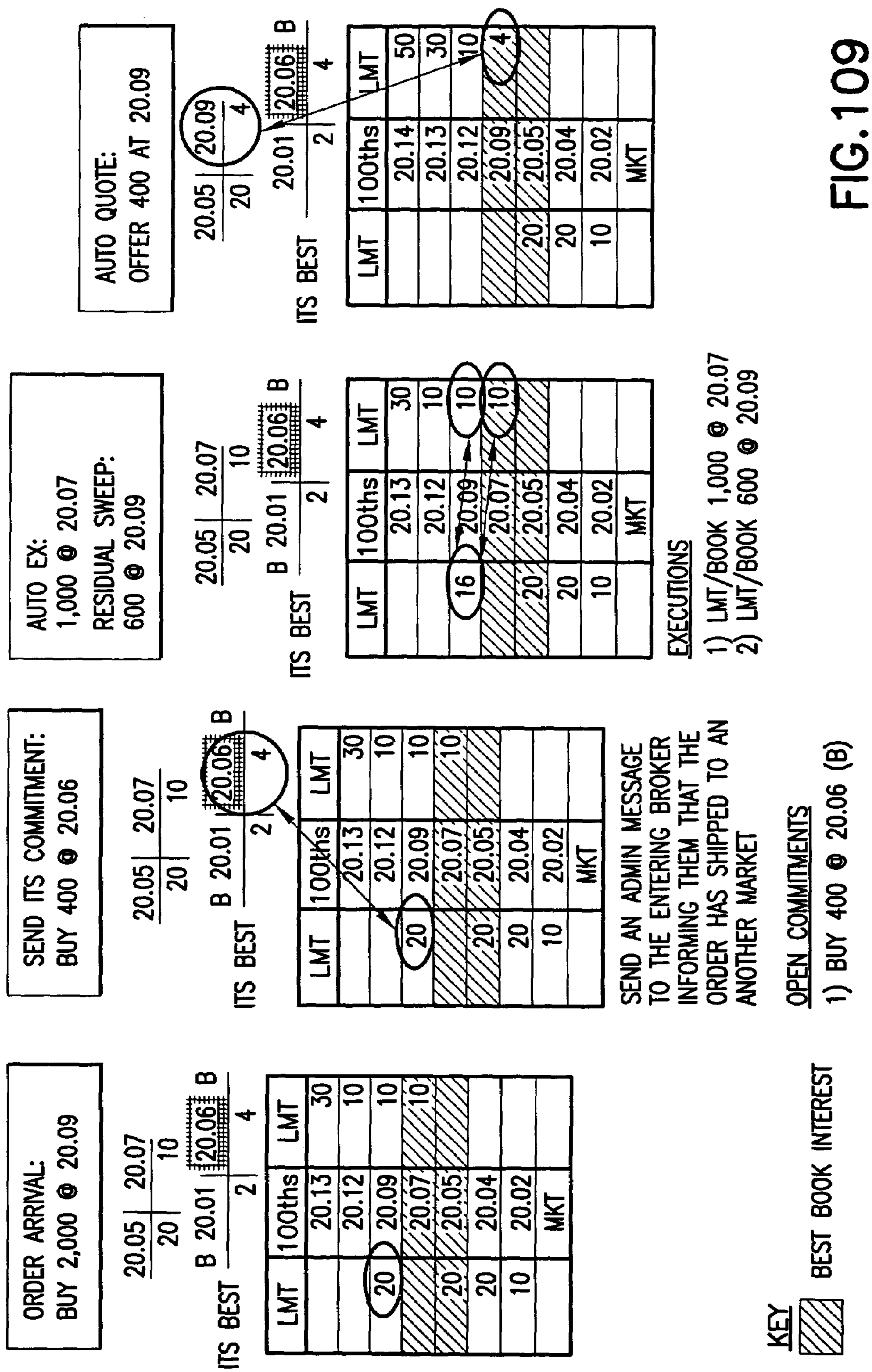
Figure 110:
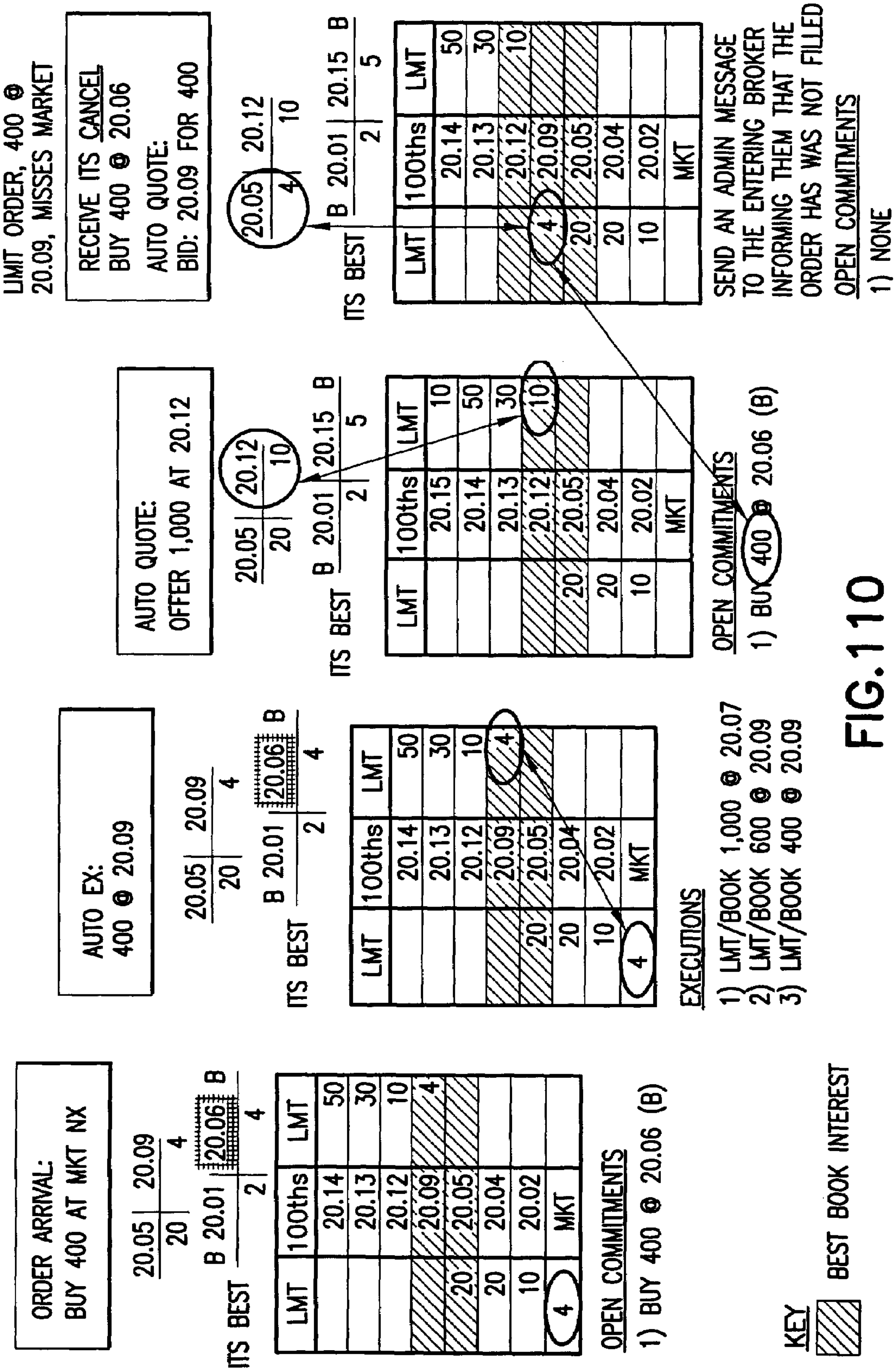

FIGS. 109 and 110 illustrate automatic routing of a marketable limit order to an away market, with specialist match option, trade of the unshipped balance, cancel of the ITS commitment, and the limit order misses the market and is quoted. The Exchange bid and offer are $20.05 and $20.07, while an away market bid and offer are $20.01 and $20.06, making the away market the best offer. A limit order is received to buy 2,000 shares at $20.09. An ITS commitment is sent to the away market to buy 400 shares at $20.06, and a message is sent to the entering broker to inform them that the order was shipped to another market. The 1,600 share balance is automatically executed, with 1,000 shares at the Exchange offer of $20.07 and the 600 residual share balance sweeping to $20.09. This leaves 400 shares on the order display book at $20.09, which is autoquoted. A MKT NX order is received to buy 400 shares, which is automatically executed against the offer, taking all of the size of the offer. The order display book is autoquoted to show the Exchange offer as $20.12. A cancel is received from the ITS commitment to buy 400 shares, restoring the order. The 400 shares of the limit order missed the market and they are autoquoted as the Exchange best bid. A message is sent to the entering broker to inform them that part of the order was not filled.

Figure 111:
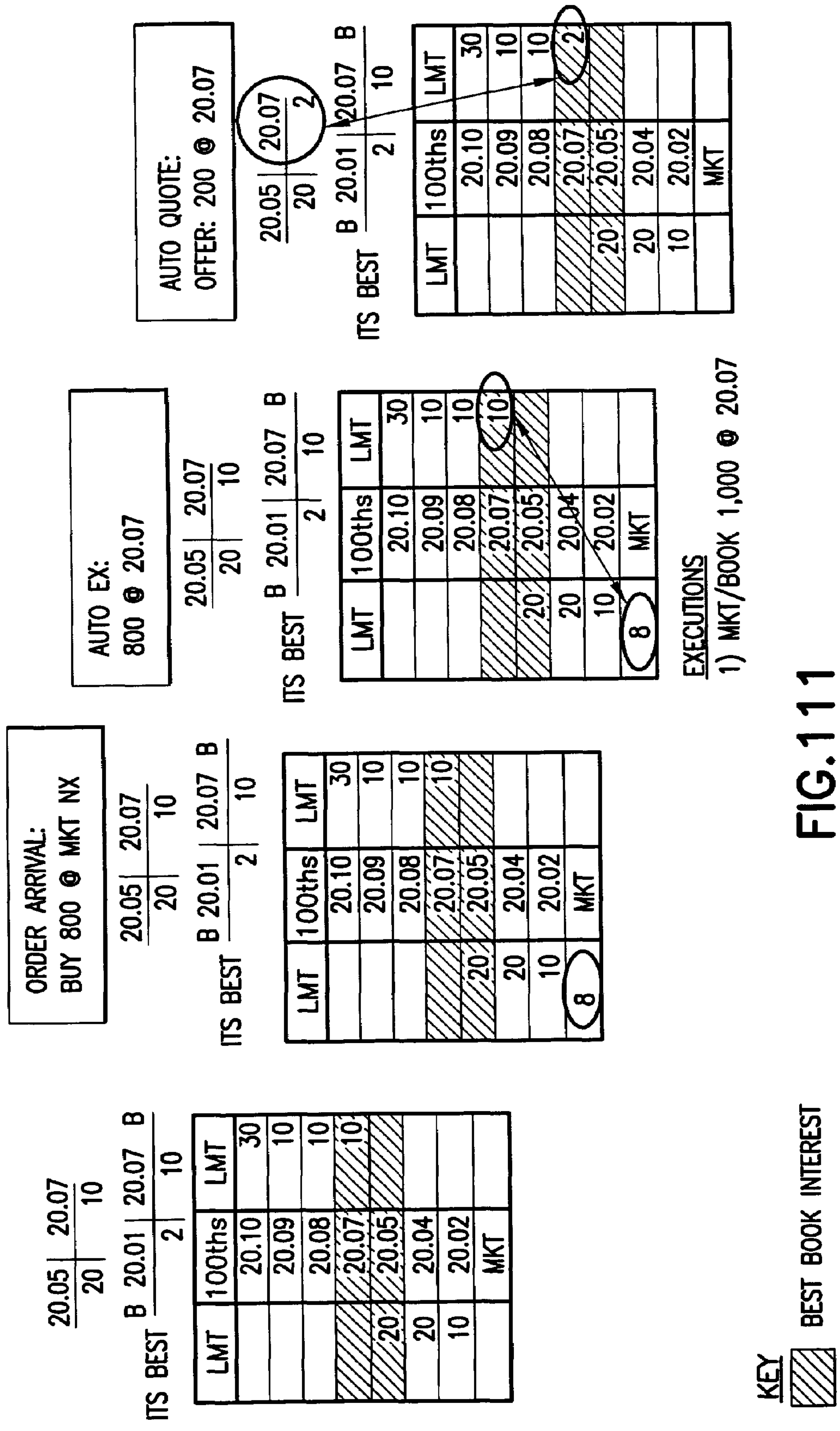
Figure 112:
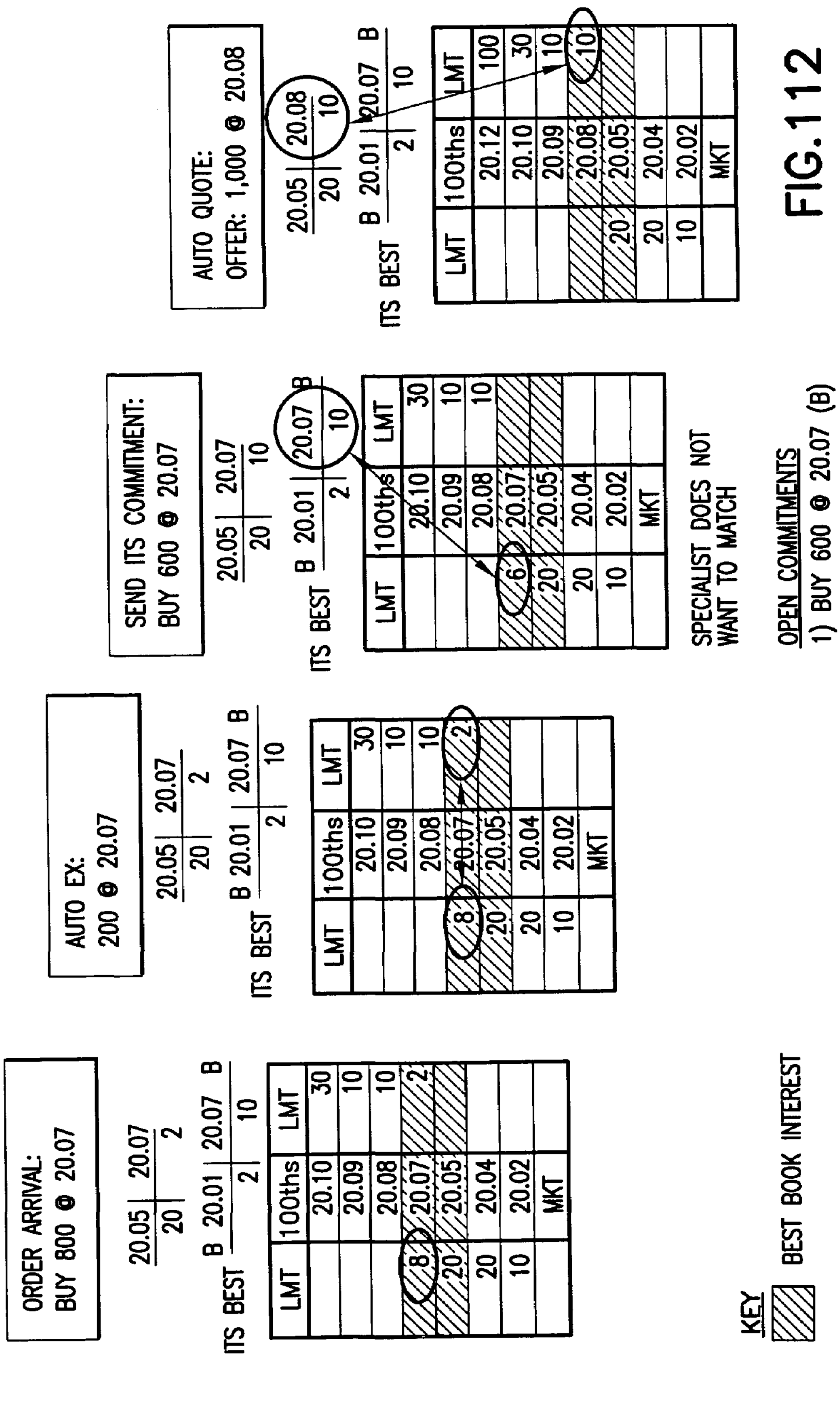

FIGS. 111 and 112 illustrate an Exchange bid or offer that is matched by an away market. The Exchange bid or offer gets filled first and upon depletion, the balance is automatically routed to the away market displaying the best bid or offer. The Exchange bid and offer are $20.05 and $20.07, while an away market bid and offer are $20.01 and $20.07. A MKT NX order is received to buy 800 shares, which is automatically executed against the Exchange offer, taking 800 shares and leaving 200 shares at the Exchange offer, which is autoquoted. A limit order is received to buy 800 shares at $20.07. 200 shares are automatically executed, taking the balance of the Exchange offer. The specialist has elected not to match, and an ITS commitment to buy 600 shares at $20.07 is sent to the away market that has an offer of $20.07. The order display book is autoquoted.

Figure 113:
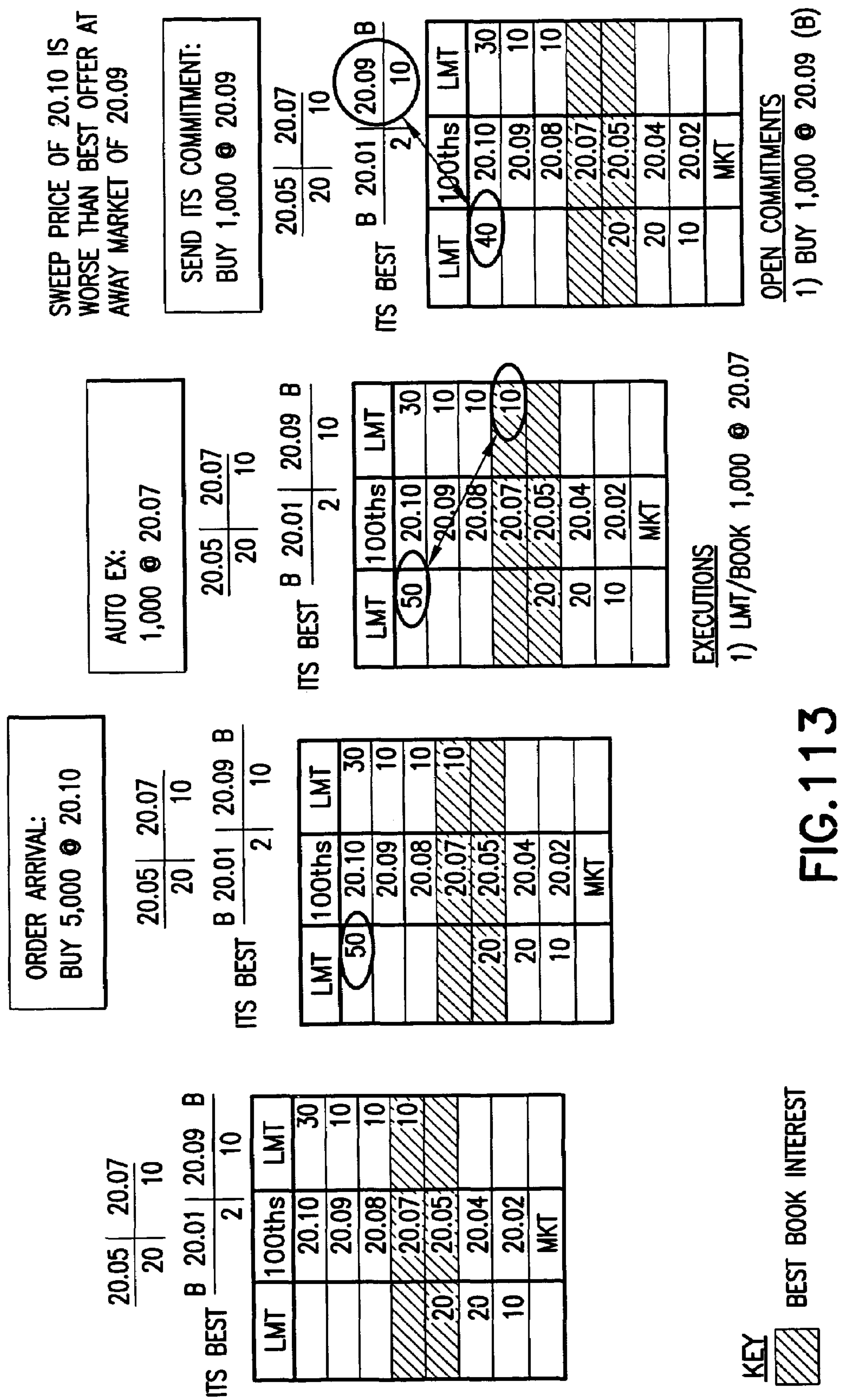
Figure 114:
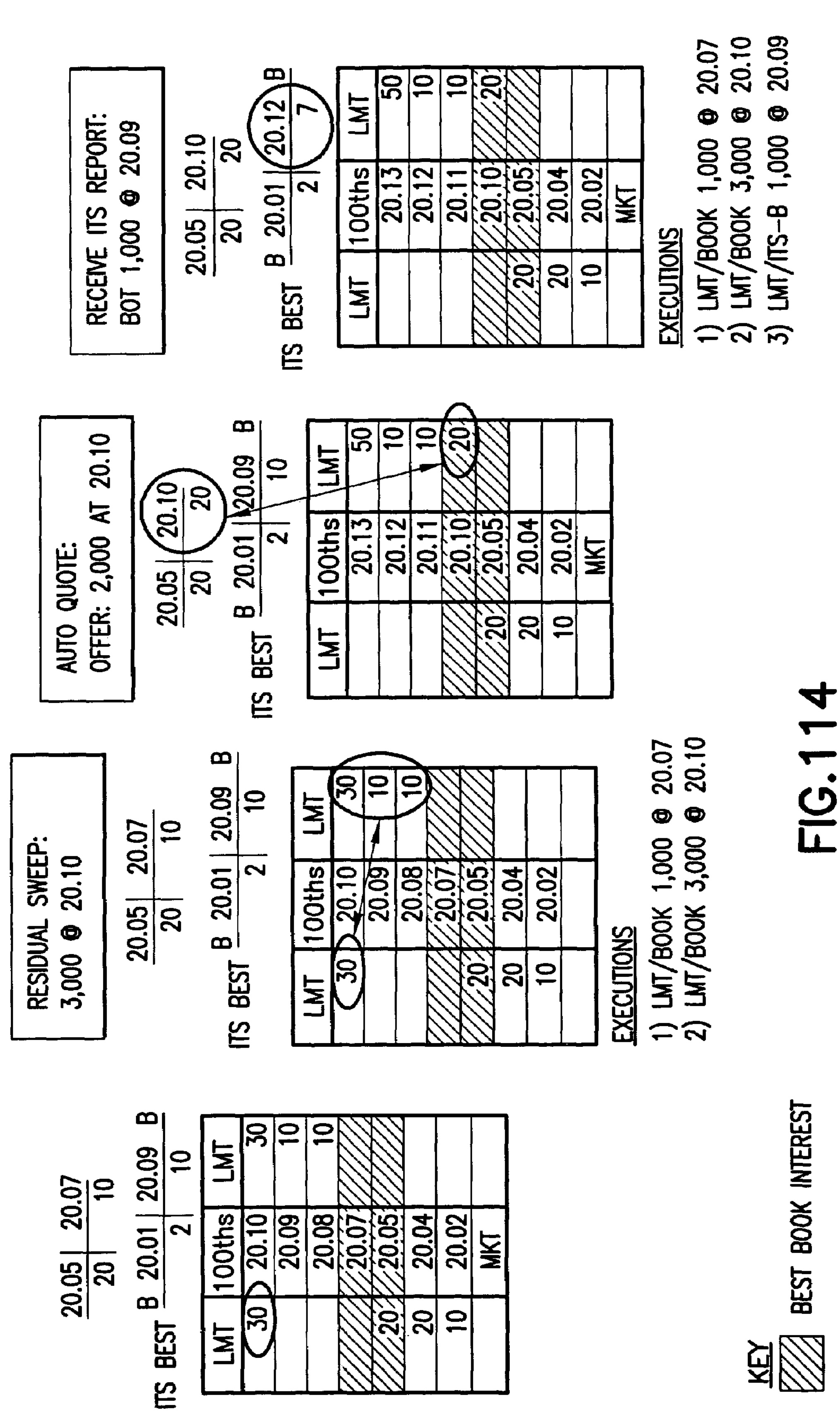

FIGS. 113 and 114 illustrate a better priced bid or offer published by an away market. The portion of the sweeping order that satisfies the better-priced bid or offer is routed to the away market. The Exchange bid and offer are $20.05 and $20.07, while an away market bid and offer are $20.01 and $20.09. A limit order is received to buy 5,000 shares at $20.10, which is automatically executed. 1,000 shares trade at the Exchange offer of $20.07, taking all of the size at the offer. The sweep price of $20.10 is worse than the best offer of $20.09 at the away market, so an ITS commitment to buy 1,000 shares at $20.09 is sent to the away market. The residual 3,000 shares sweeps at $20.10, and the order display book is autoquoted. An ITS report is received for the execution of the 1,000 shares.

Figure 115:
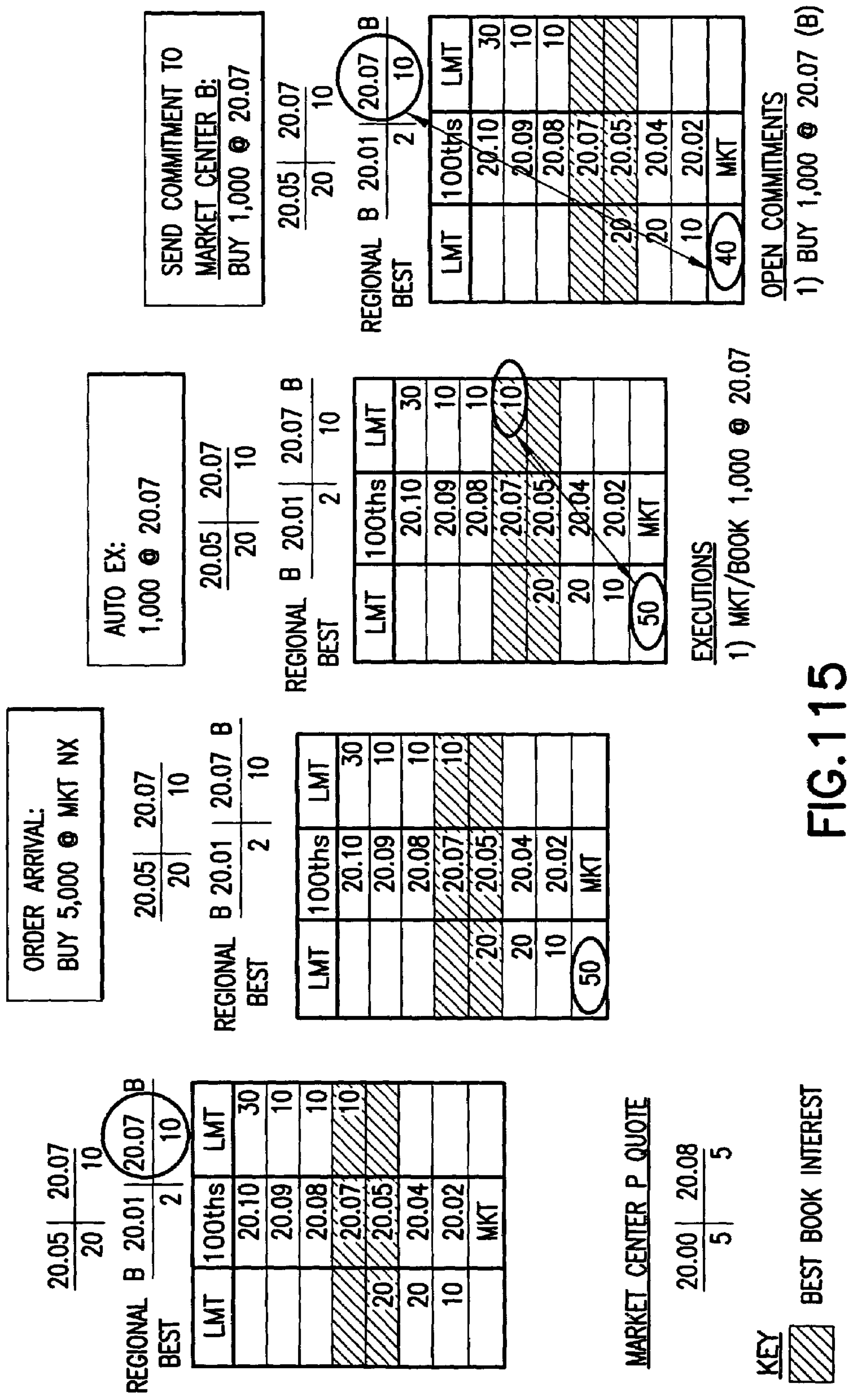
Figure 116:
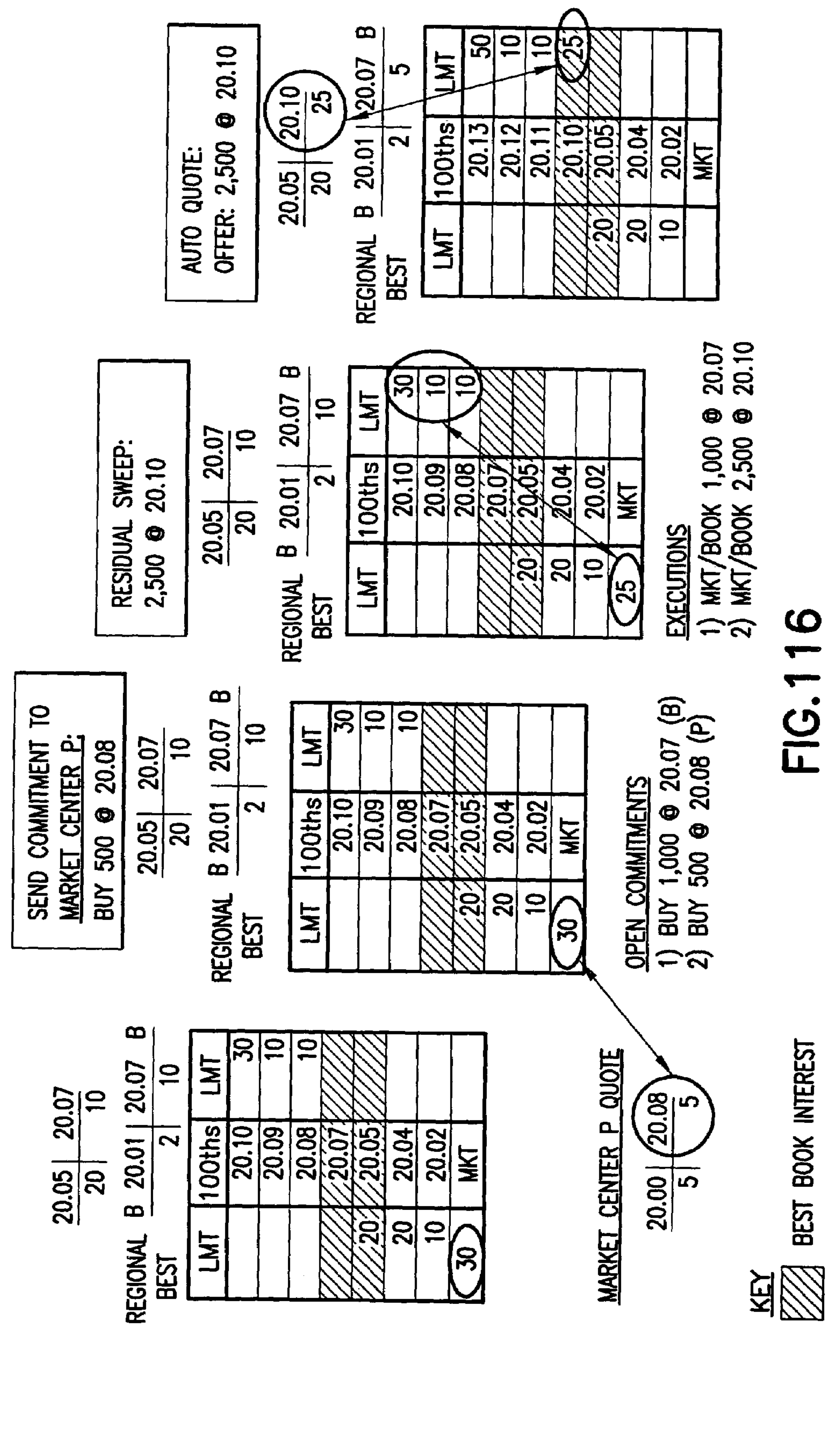

FIGS. 115, 116 and 117 illustrate a market order with sufficient size to deplete the Exchange inside offer and sweep the order display book. The top if each ITS member is checked to avoid a trade through. The Exchange bid and offer are $20.05 and $20.07, with 2,000 shares bid and 1,000 shares offered. A regional best bid is $20.01 for 200 shares and best offer is $20.07 for 1,000 shares. A MKT NX order is received to buy 5,000 shares. 1,000 shares are automatically executed against the Exchange offer, taking all of the offer size. Without considering any away market, the balance would sweep the Exchange order display book at $20.10. The published quote for each ITS member that is quoting for the stock is checked to avoid trading through their published best bid or offer. Because the regional best is 1,000 shares offered $20.07, an ITS commitment is sent to that market center (market center B). Another market center (market center P) is publishing 500 shares offered at $20.08, so an ITS commitment is sent to market center P. The residual 2,500 share balance of the order sweeps the order display book at $20.10, and the order display book is autoquoted. ITS reports are received from market center B and market center P.

Figure 118:
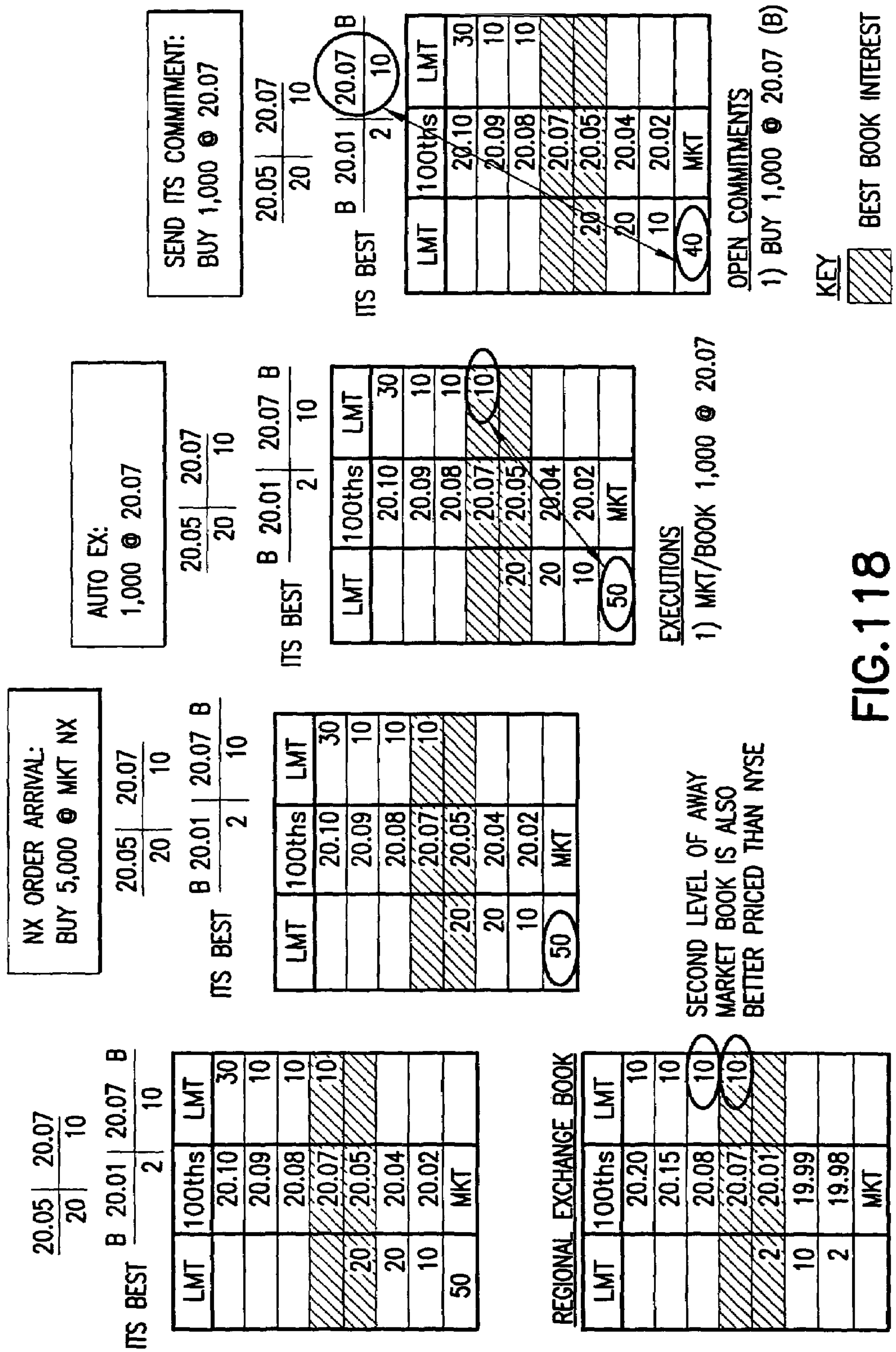
Figure 119:
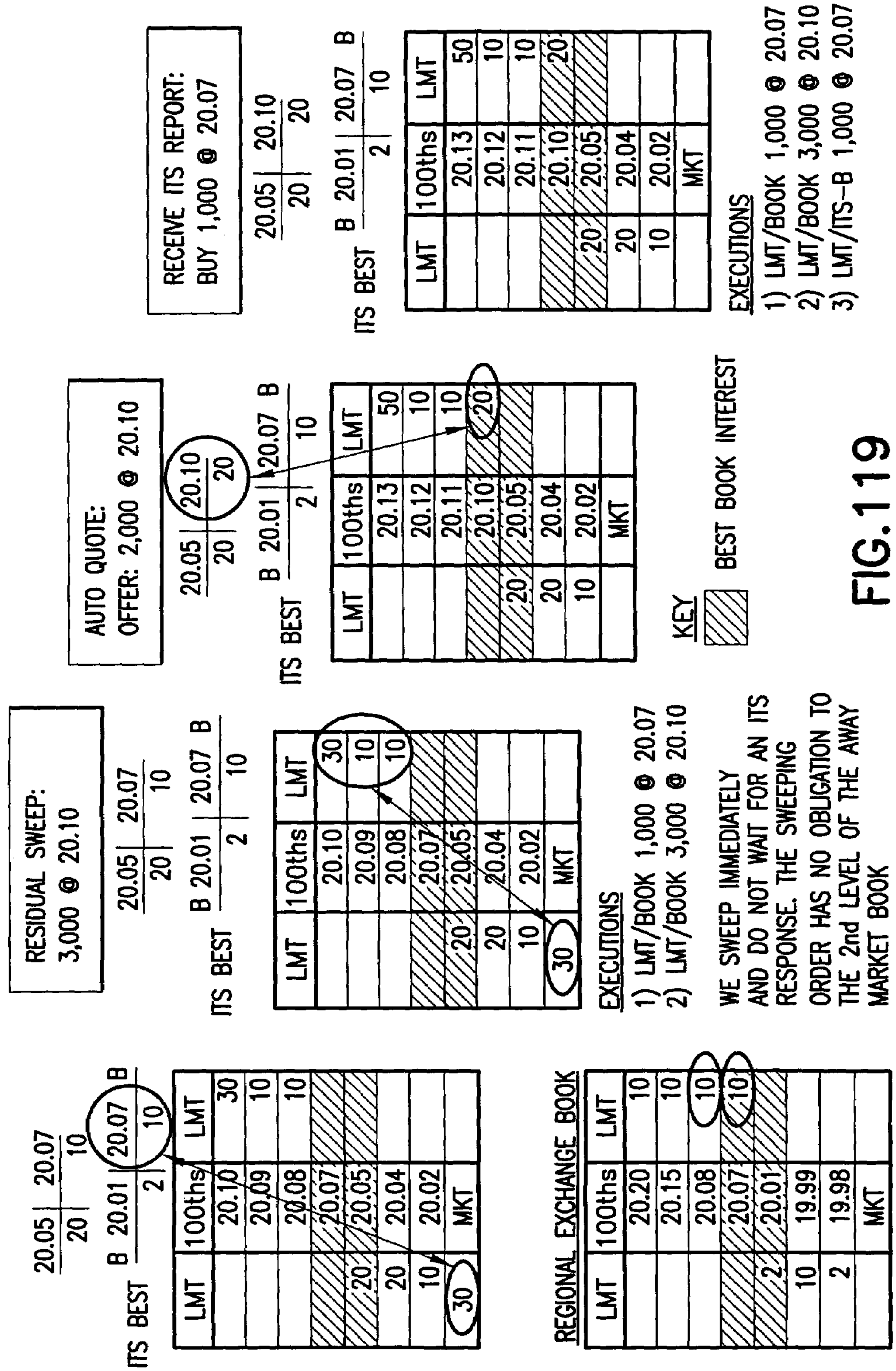

FIGS. 118 and 119 illustrate an Exchange best bid or offer matched by another market, a MKT NX order automatically executes at the offer, and an ITS commitment is sent and a residual sweep is initiated immediately. The Exchange bid and offer are $20.05 and $20.07, with 2,000 shares bid and 1,000 shares offered. An ITS best is 200 shares bid at $20.01, and 1,000 shares offered at $20.07. The regional exchange order display book also shows 1,000 shares offered at $20.08. A MKT NX order is received to buy 5,000 shares. 1,000 shares are automatically executed, taking all of the Exchange offer. An ITS commitment to buy 1,000 shares at $20.07 is sent to the away market. The 3,000 share residual balance of the order is swept at $20.10, and is not sent to the second level offered at the regional exchange. The order display book is autoquoted and an ITS report is received.

Figure 120:
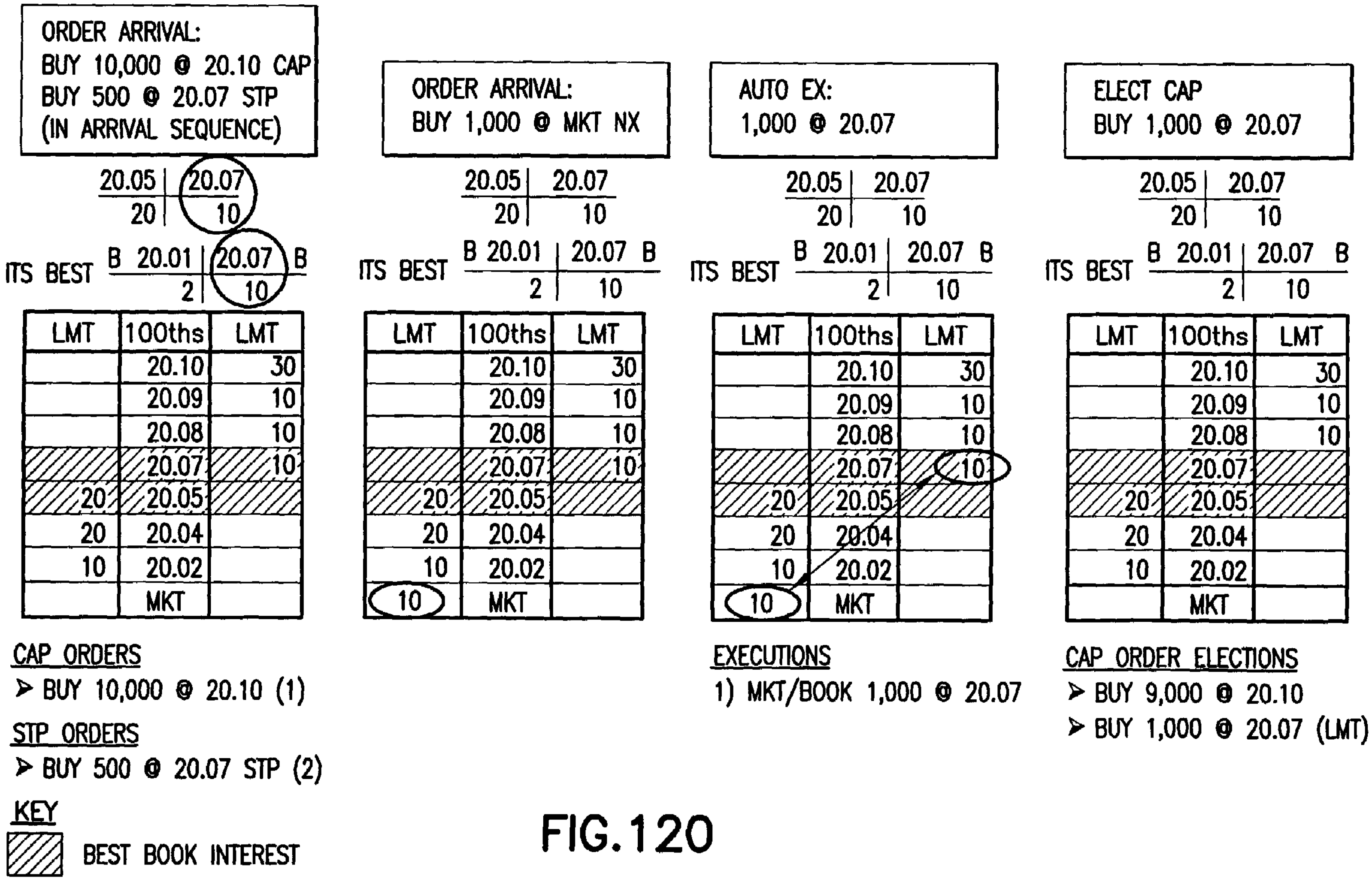
Figure 121:
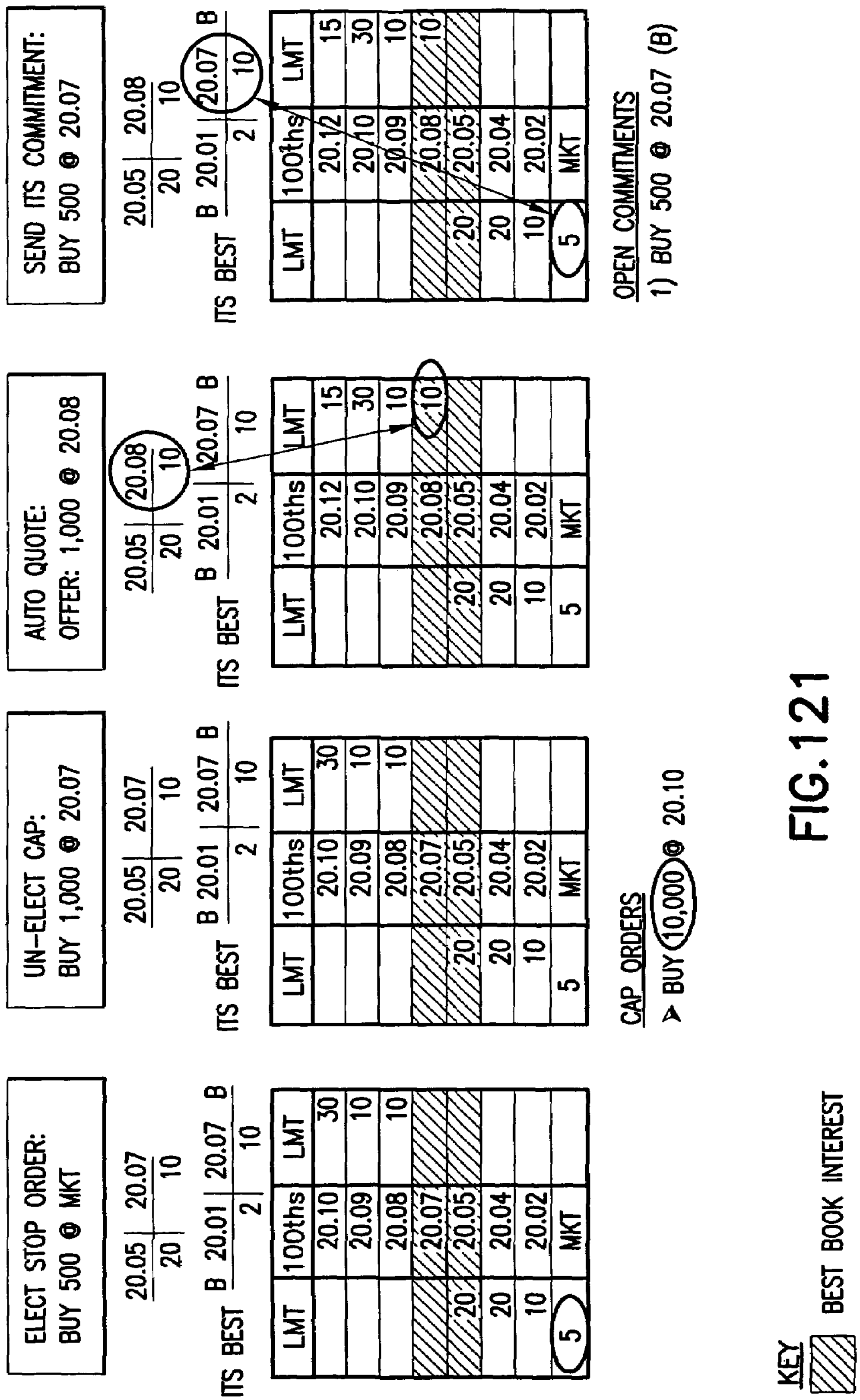

FIGS. 120 and 121 illustrate an Exchange best bid or offer that is matched by another market. The Exchange bid or offer is filled first, electing CAP and STP orders. The Exchange bid and offer are $20.05 and $20.07, with 2,000 shares bid and 1,000 shares offered. An ITS best is 200 shares bid at $20.01, and 1,000 shares offered at $20.07. There are CAP orders to buy 10,000 shares at $20.10 and STP orders to buy 500 shares at $20.07. A MKT NX order is received to buy 1,000 shares, which is automatically executed taking all of the Exchange offer. 1,000 shares of the CAP orders are elected to buy at $20.07. All 500 shares of the STP order are elected to buy at the market. Because there is no size at the Exchange available to trade with the elected CAP, it is not shipped to the away market and the 1,000 shares are unelected. The order display book is autoquoted to show the next offer, and an ITS commitment is sent to buy 500 shares of the elected STP order. The elected STP order is treated as a regular market order sent to the away market.

Figure 122:
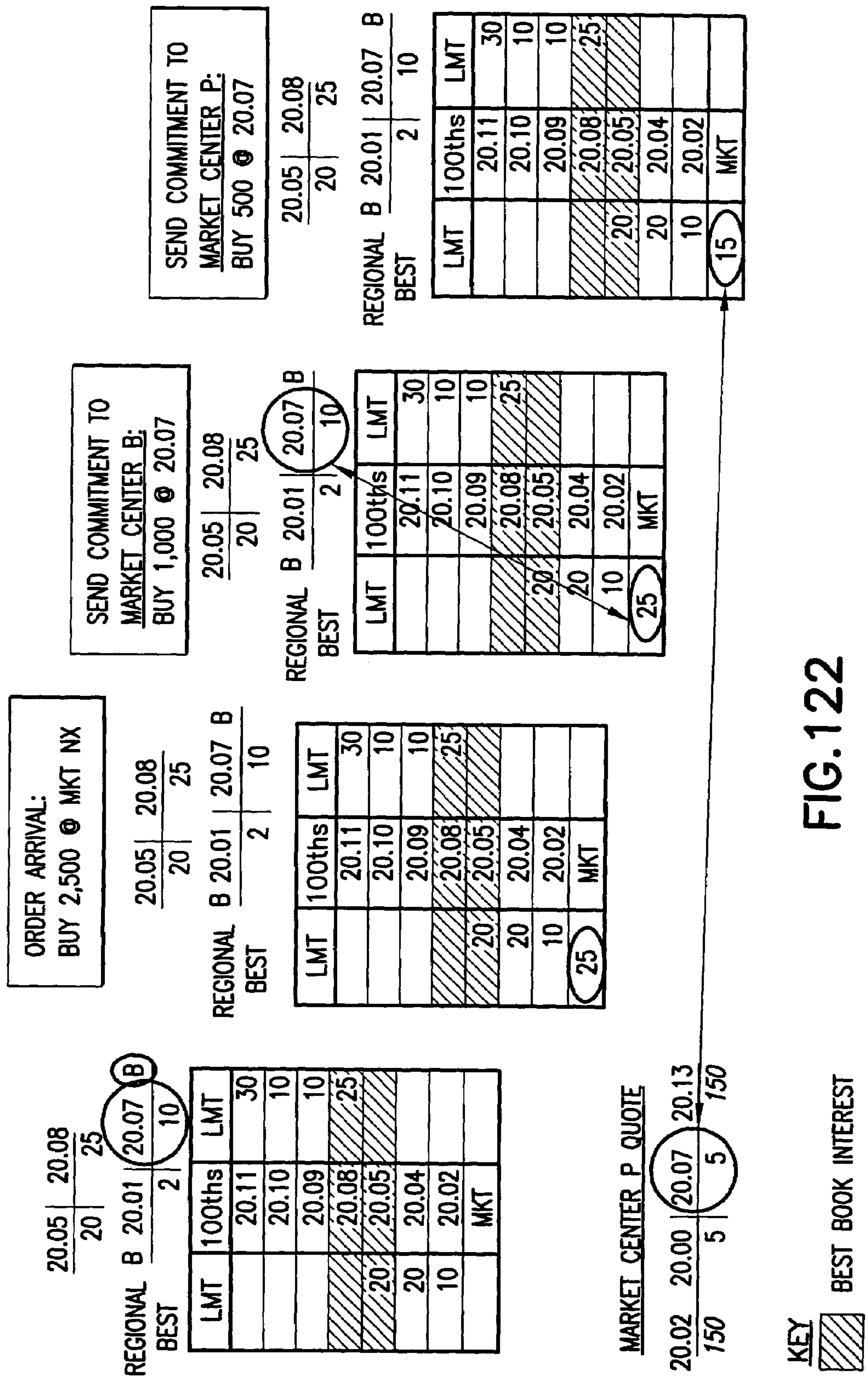
Figure 123:
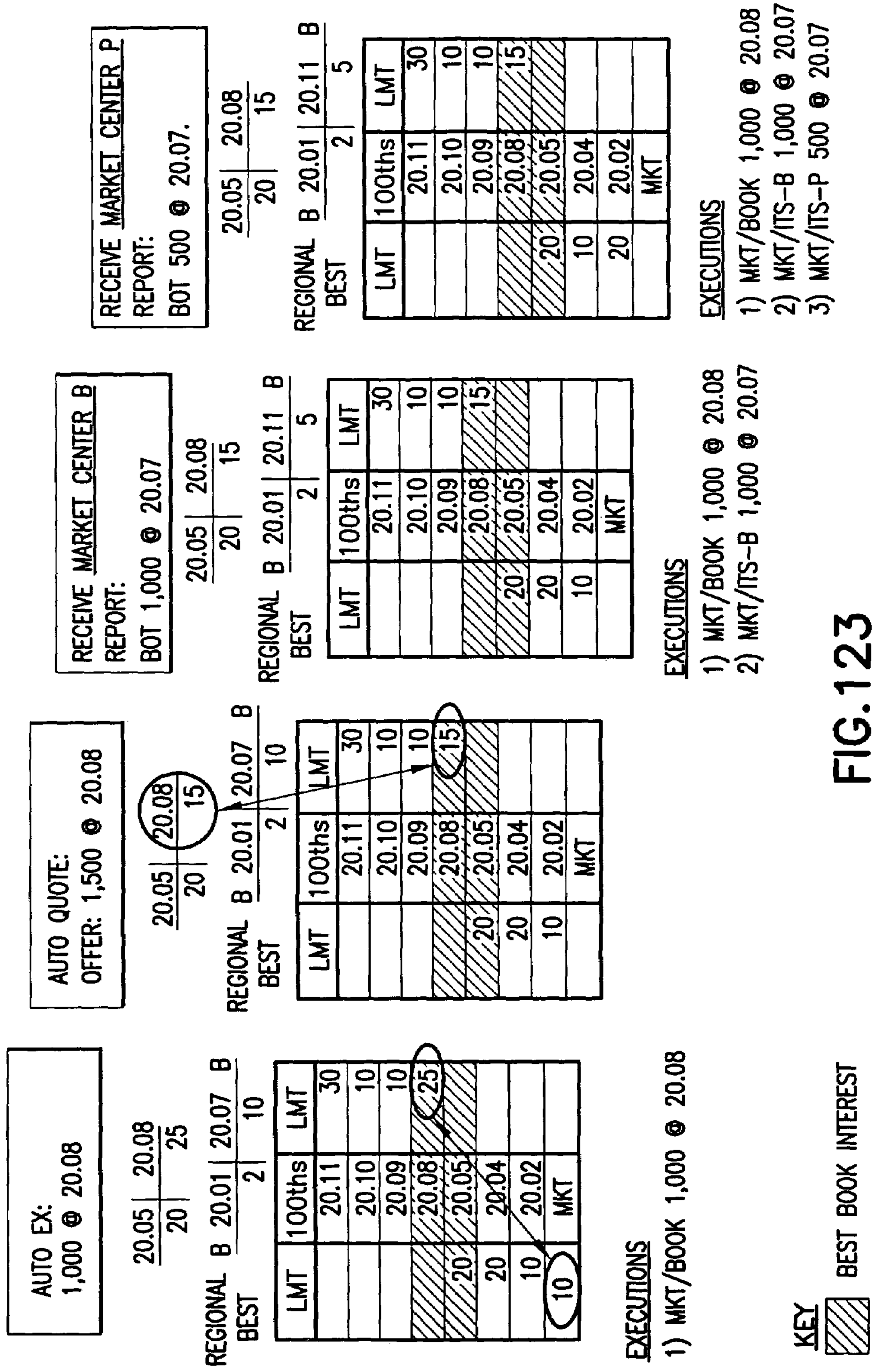

FIGS. 122 and 123 illustrate handling of a market order when the best offer is at an away market. A commitment is sent to the away market and the balance is executed at the Exchange. The Exchange bid and offer are $20.05 and $20.08, with 2,000 shares bid and 2,500 shares offered. A regional best (market center B) is 200 shares bid at $20.01, and 1,000 shares offered at $20.07, making the regional the best offer. Market center P is also publishing 500 shares offered at $20.07. A MKT NX order is received to buy 2,500 shares. A commitment is sent to buy 1,000 shares at $20.07 to market center B. Another commitment is sent to buy 500 shares at $20.07 to market center P. When shipping to multiple away markets, the criteria used to determine which to ship to first is price, size and time. The residual 1,000 share balance is automatically executed against the order display book, and the order display book is autoquoted to show the new offer size. Reports are received from market centers B and P.

Figure 124:
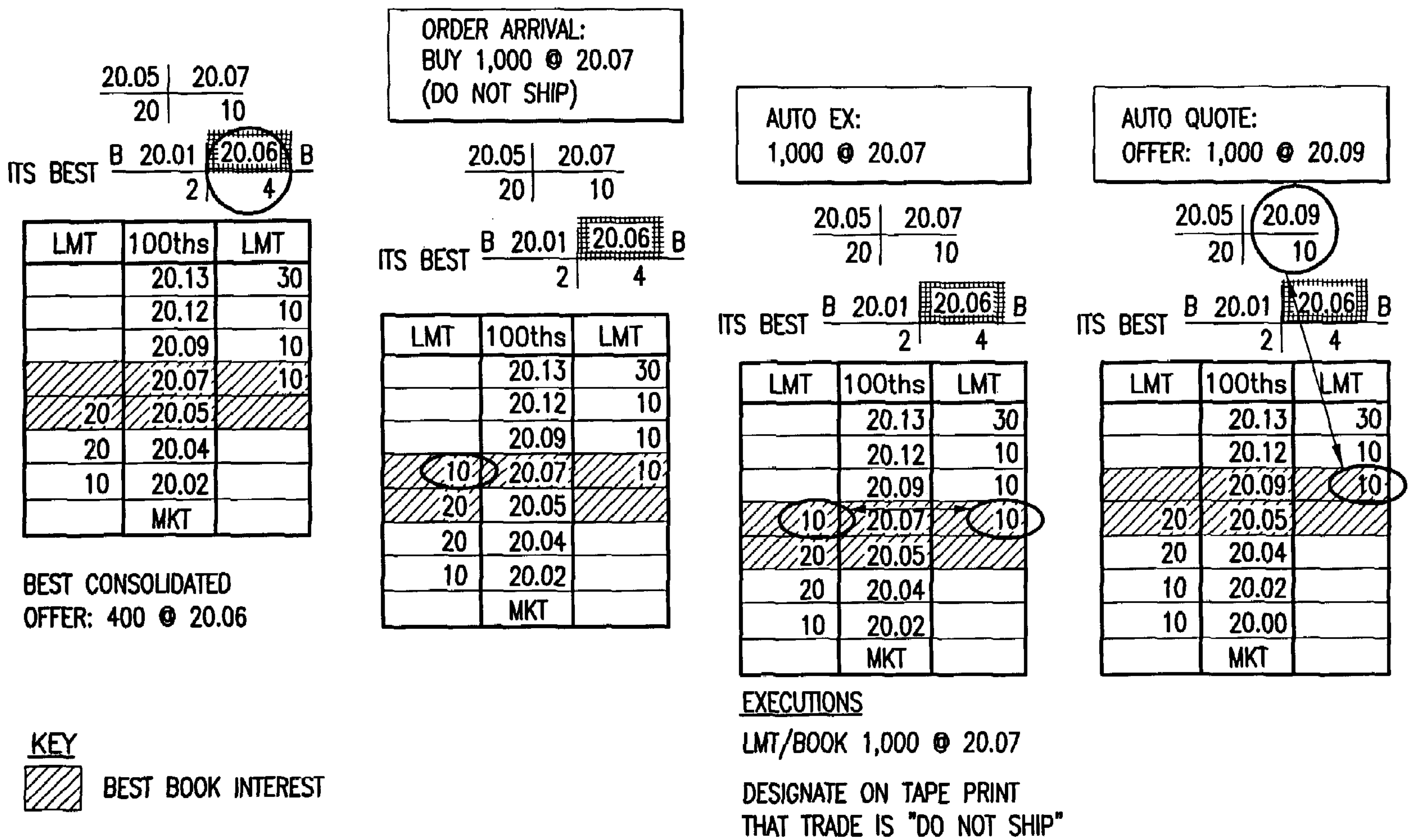

FIG. 124 illustrates orders that include do not ship instructions. The Exchange bid and offer are $20.05 and $20.07. An away market best is 200 shares bid at $20.01, and 400 shares offered at $20.06, making the away market the best offer. A limit order is received to buy 1,000 shares at $20.07, with instructions "do not ship." Although there is a better published offer at the away market for $20.06, the order is automatically executed at $20.07 against the Exchange offer and the tape print is designated as "do not ship."

Figure 125:
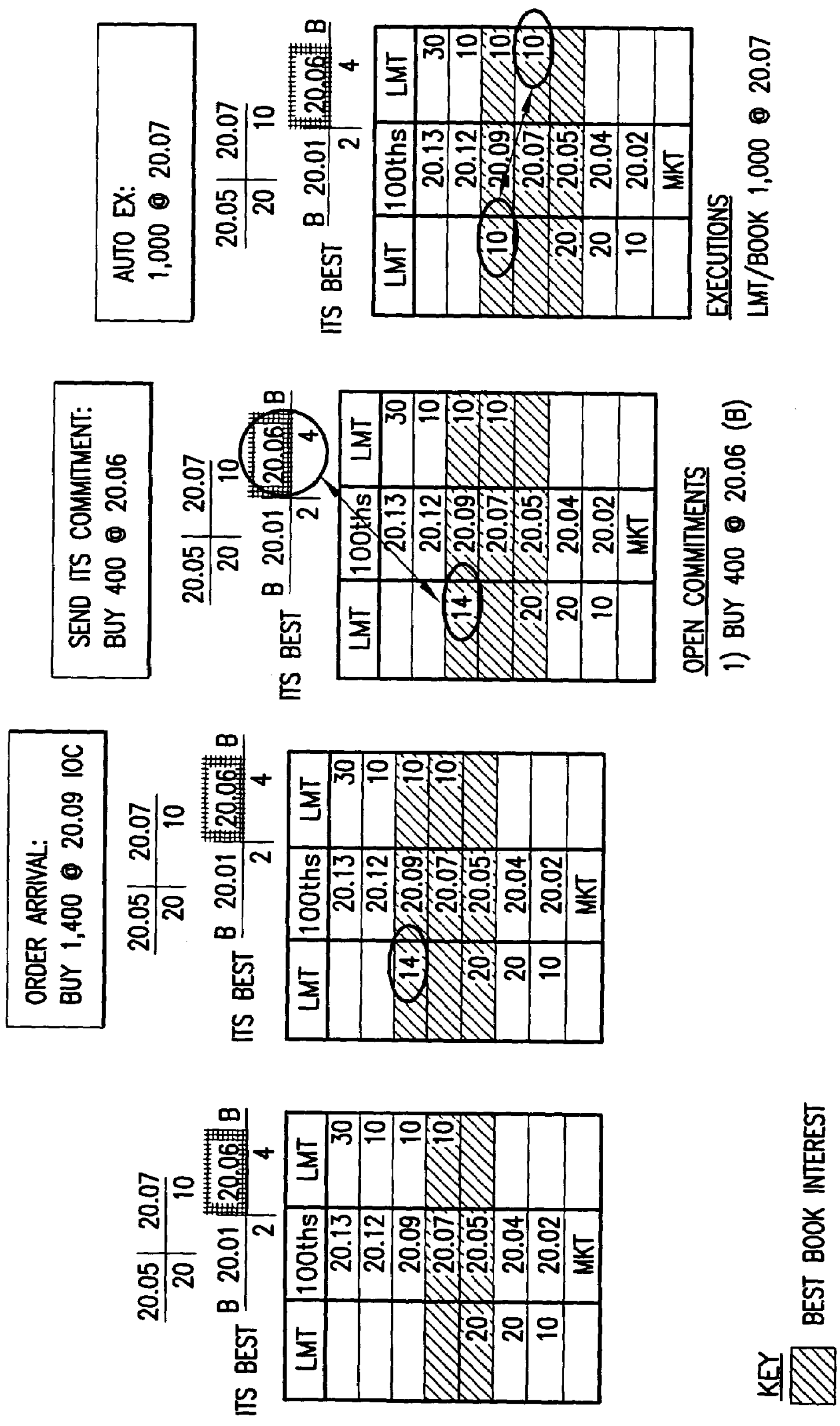
Figure 126:
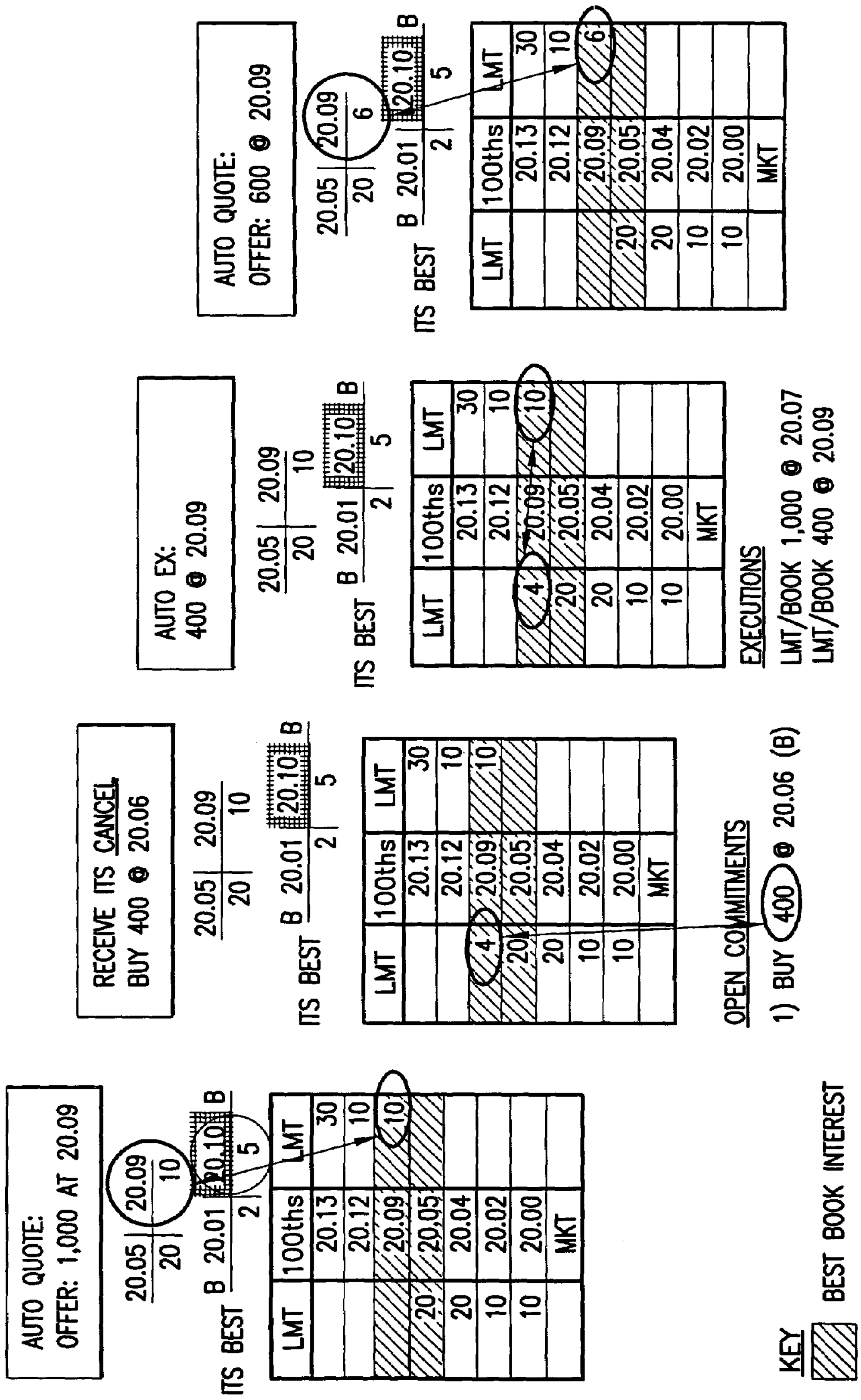

FIGS. 125 and 126 illustrate immediate or cancel (IOC) order routing to an away market, commitment cancel and restore of the shares to the Exchange for subsequent automatic execution. The Exchange bid and offer are $20.05 and $20.07. An away market best is 200 shares bid at $20.01, and 400 shares offered at $20.06, making the away market the best offer. A limit order that is designated IOC is received to buy 1,400 shares at $20.09. An ITS commitment to buy 400 shares at $20.06 is sent to the away market and the 1,000 share balance is automatically executed against the Exchange offer. The order display book is autoquoted and a cancel is received for the ITS commitment. The shares are restored to the Exchange and they are eligible for immediate trade. If the shares cannot trade with the order display book, they are cancelled back to the customer. In the example the 400 shares are automatically executed at $20.09 and the order display book is autoquoted.

Figure 127:
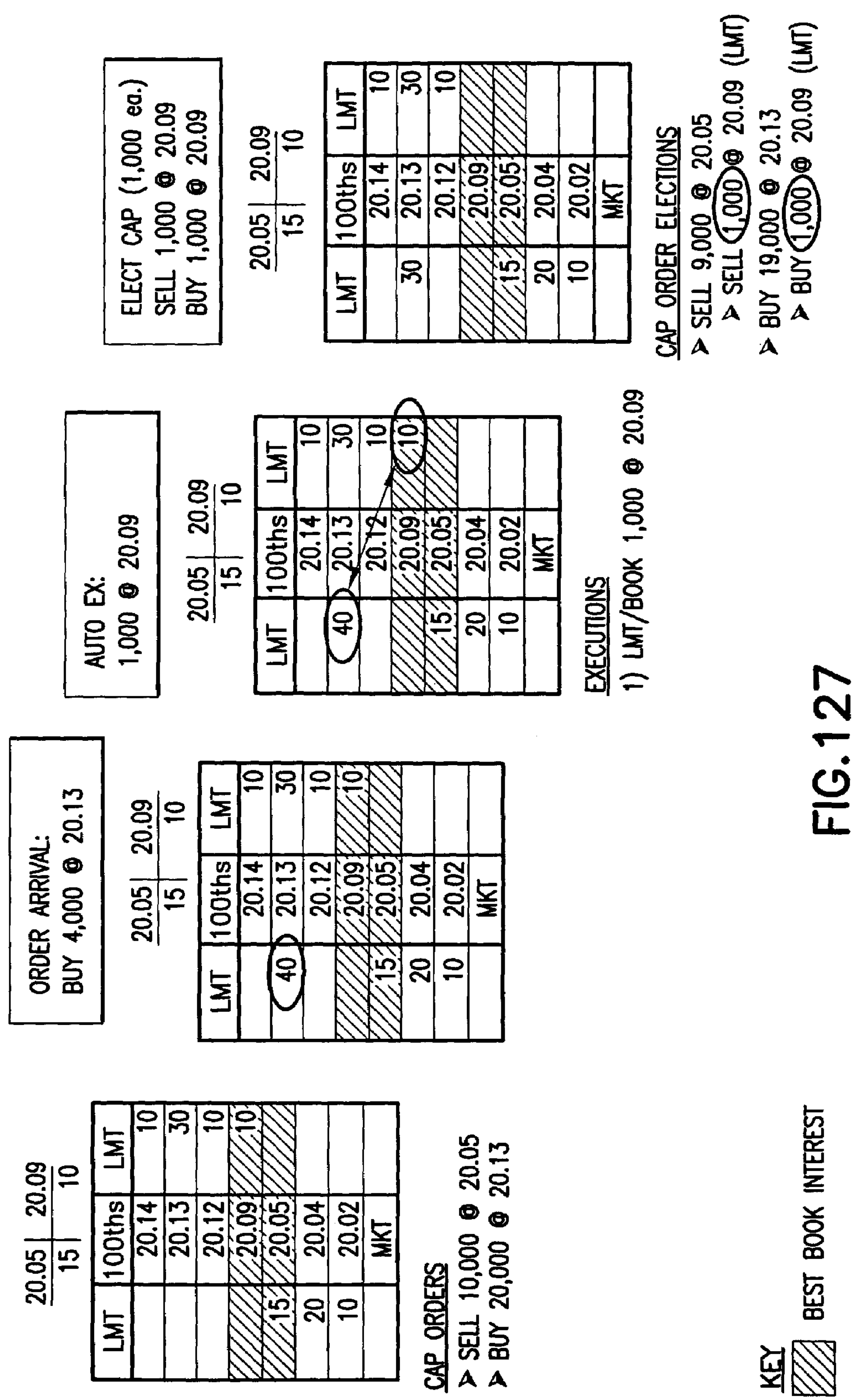
Figure 128:
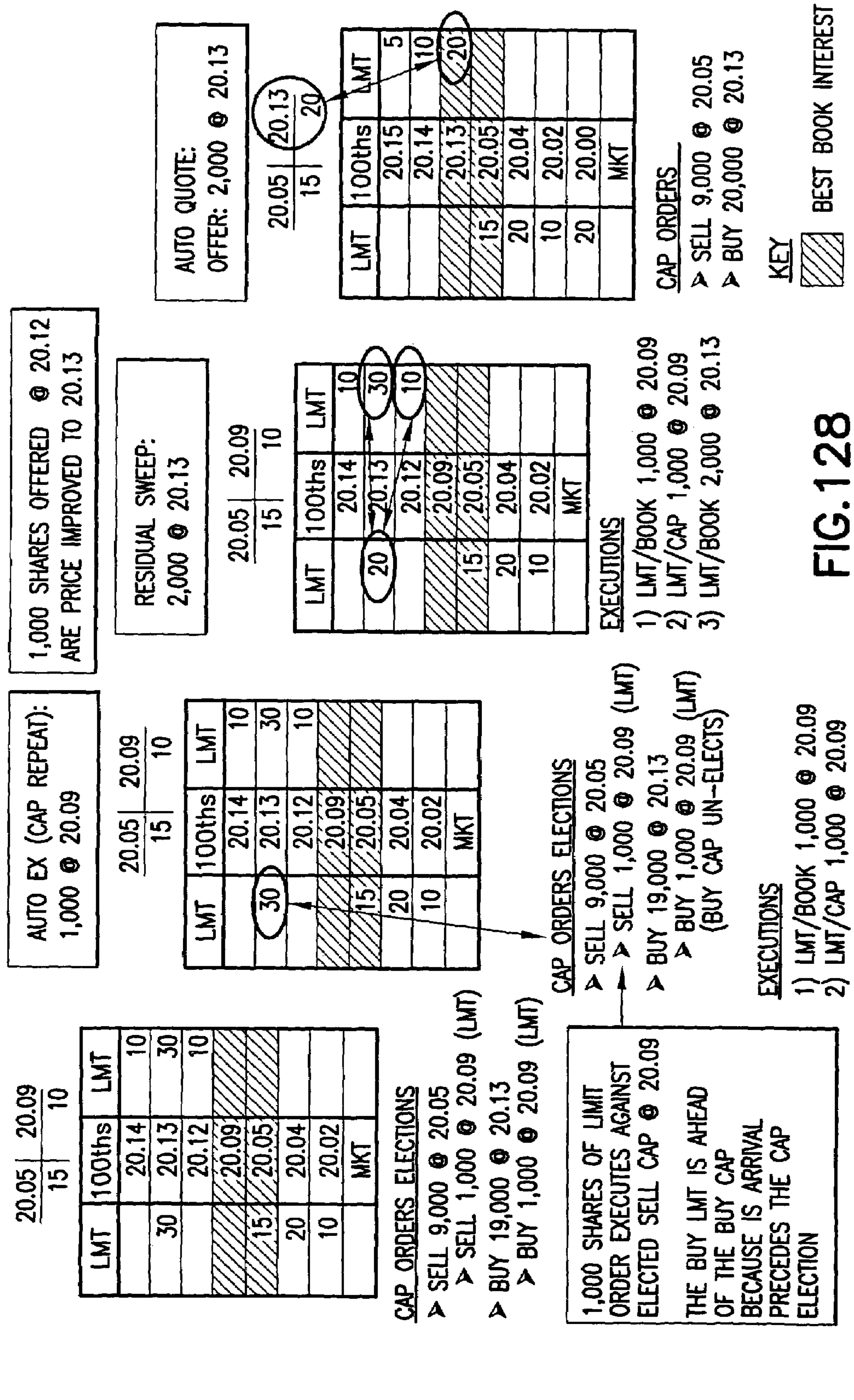
Figure 129:
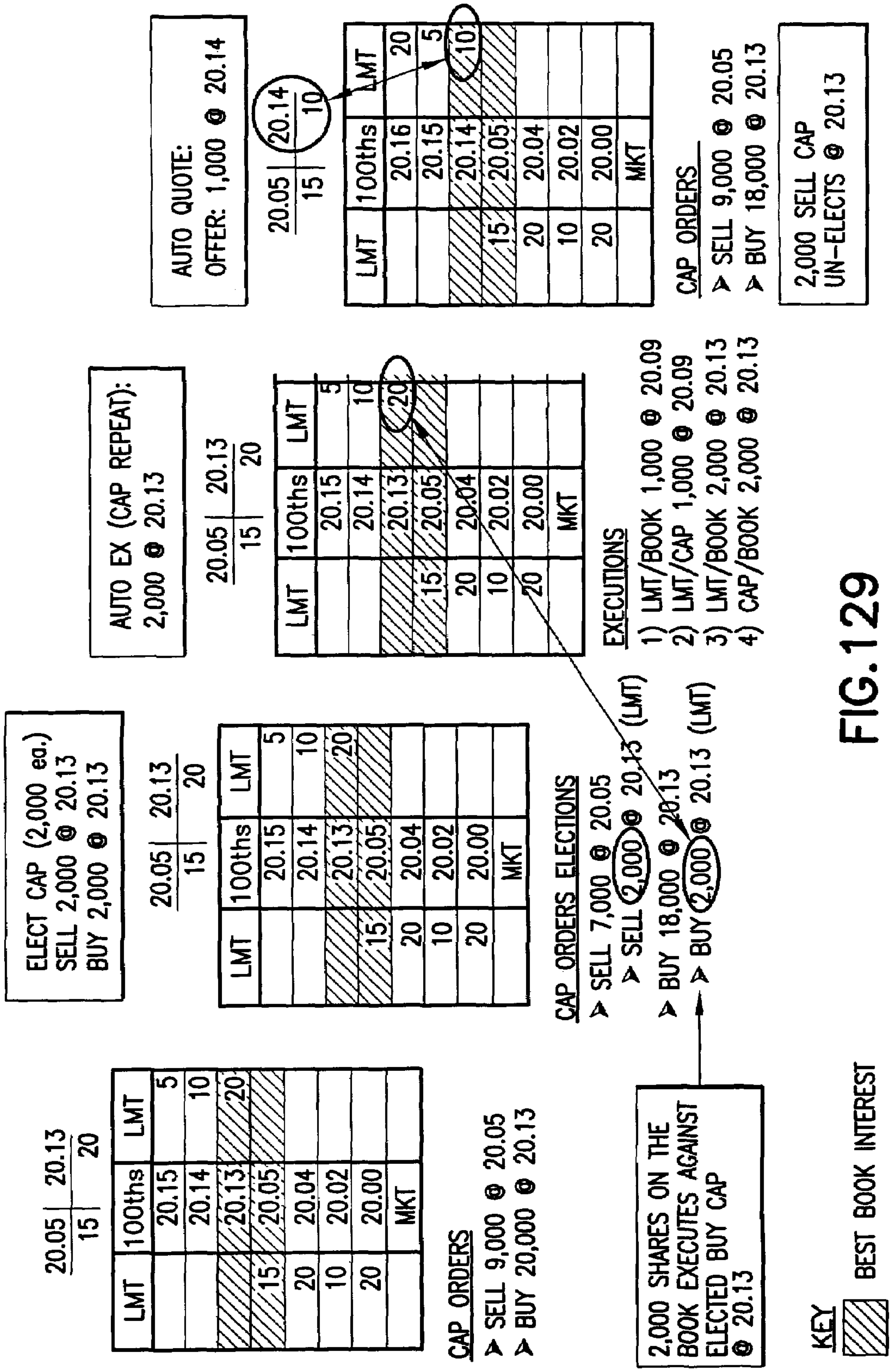

FIGS. 127, 128 and 129 illustrate election of CAP orders after automatic execution at the quote but before a residual sweep. CAP can trade with the crossing order before the sweep but not with the order display book. The best bid and offer are $20.05 and $20.09, and there are CAP orders to sell 10,000 shares at $20.05 and CAP orders to buy 20,000 shares at $20.13. A limit order is received to buy 4,000 shares at $20.13, which is automatically executed. This example will also work if the arriving order is a MKT order. 1,000 shares trade at the offer price of $20.09, taking all of the offer. Before the sweep, 1,000 shares each of the CAP order to buy and the CAP order to sell are elected at $20.09. Another 1,000 shares of the limit order trade against the 1,000 shares of the elected CAP order to sell. The buy limit order is ahead of the elected buy CAP order because the buy limit order's arrival precedes the CAP election. The buy CAP un-elects. The residual 2,000 shares of the limit order sweep at $20.13, and the order display book is autoquoted. 2,000 shares each of the CAP order to sell and the CAP order to buy elect at $20.13. The 2,000 shares of the elected CAP order to buy automatically execute against the offer size of 2,000 shares at the offer price of $20.13, and the 2,000 shares of the CAP order to sell un-elect.

Figure 130:
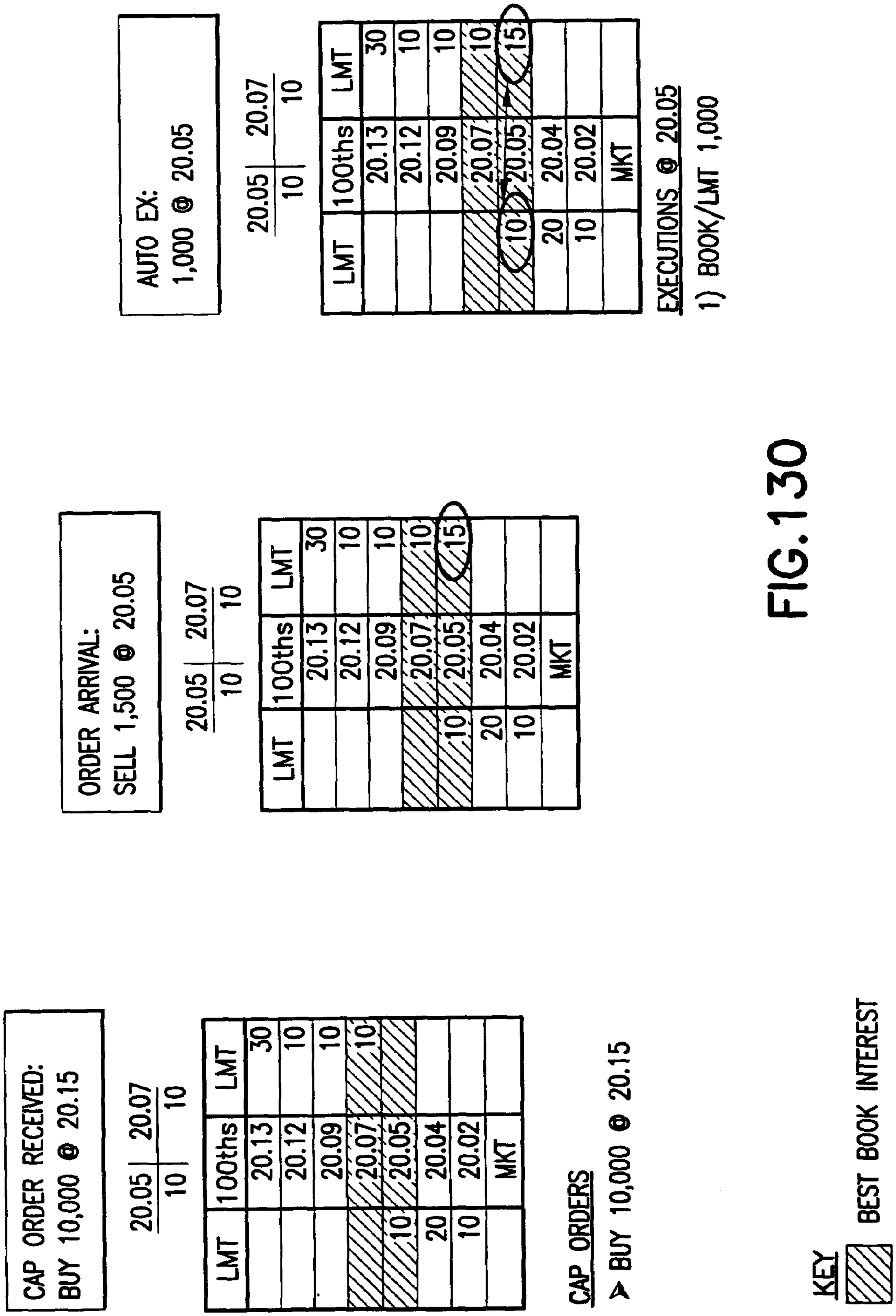
Figure 131:
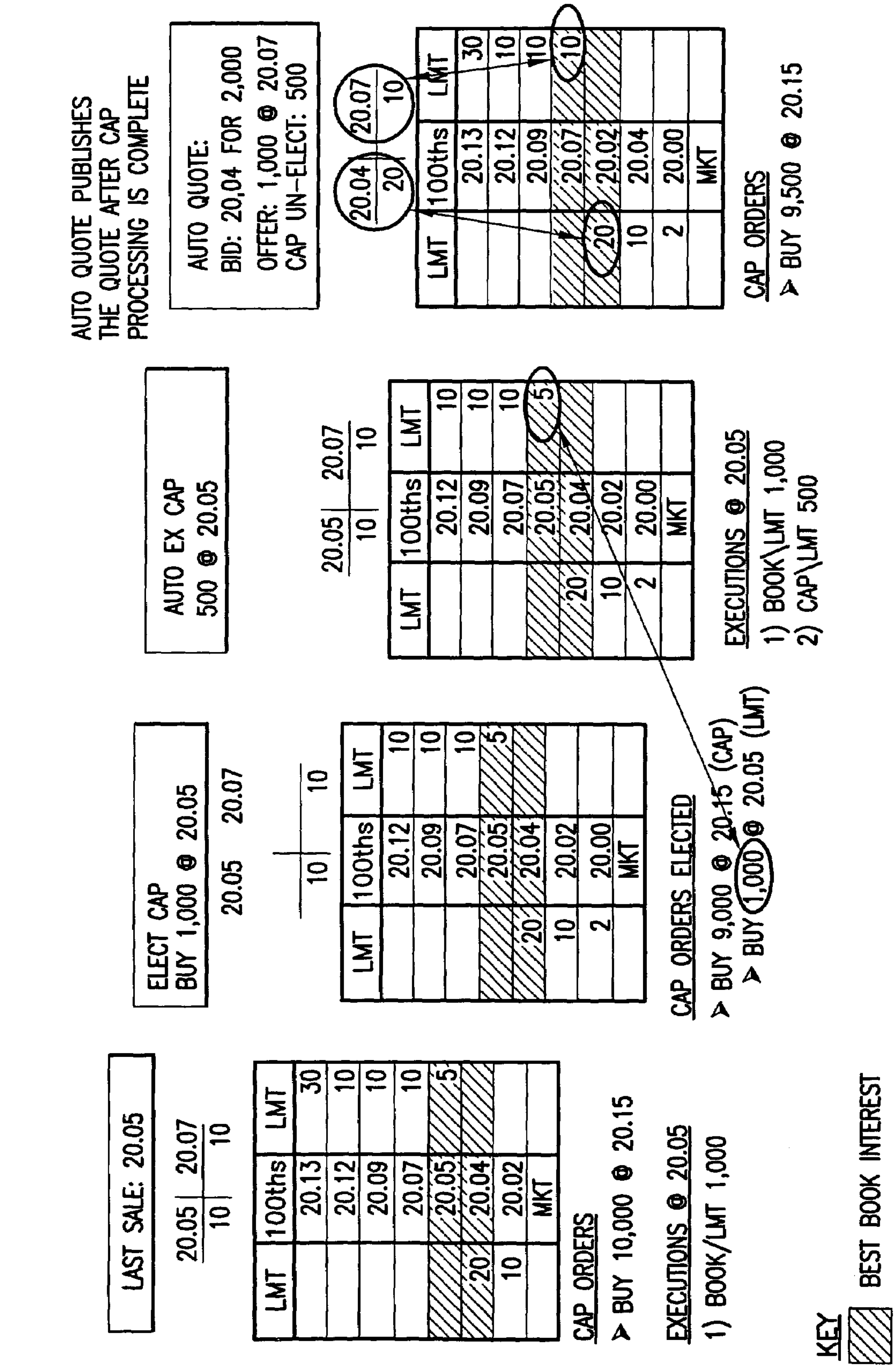

FIGS. 130 and 131 illustrate automatic election of CAP orders up to the size of the last sale and then automatic execution with repeats up to the available contra size at the last sale price. The best bid and offer are $20.05 and $20.07, and there are CAP orders to buy 10,000 shares at $20.15. A limit order is received to sell 1,500 shares at $20.05, which is automatically executed at the bid price of $20.05, taking 1,000 shares of the offer size and leaving 500 shares. This makes the last sale price $20.05. 1,000 shares of the CAP orders are elected to buy at $20.05. 500 shares of the elected CAP orders are automatically executed at $20.05, taking the remaining size at the offer. The order display book is autoquoted after the CAP processing is finished.

Figure 132:
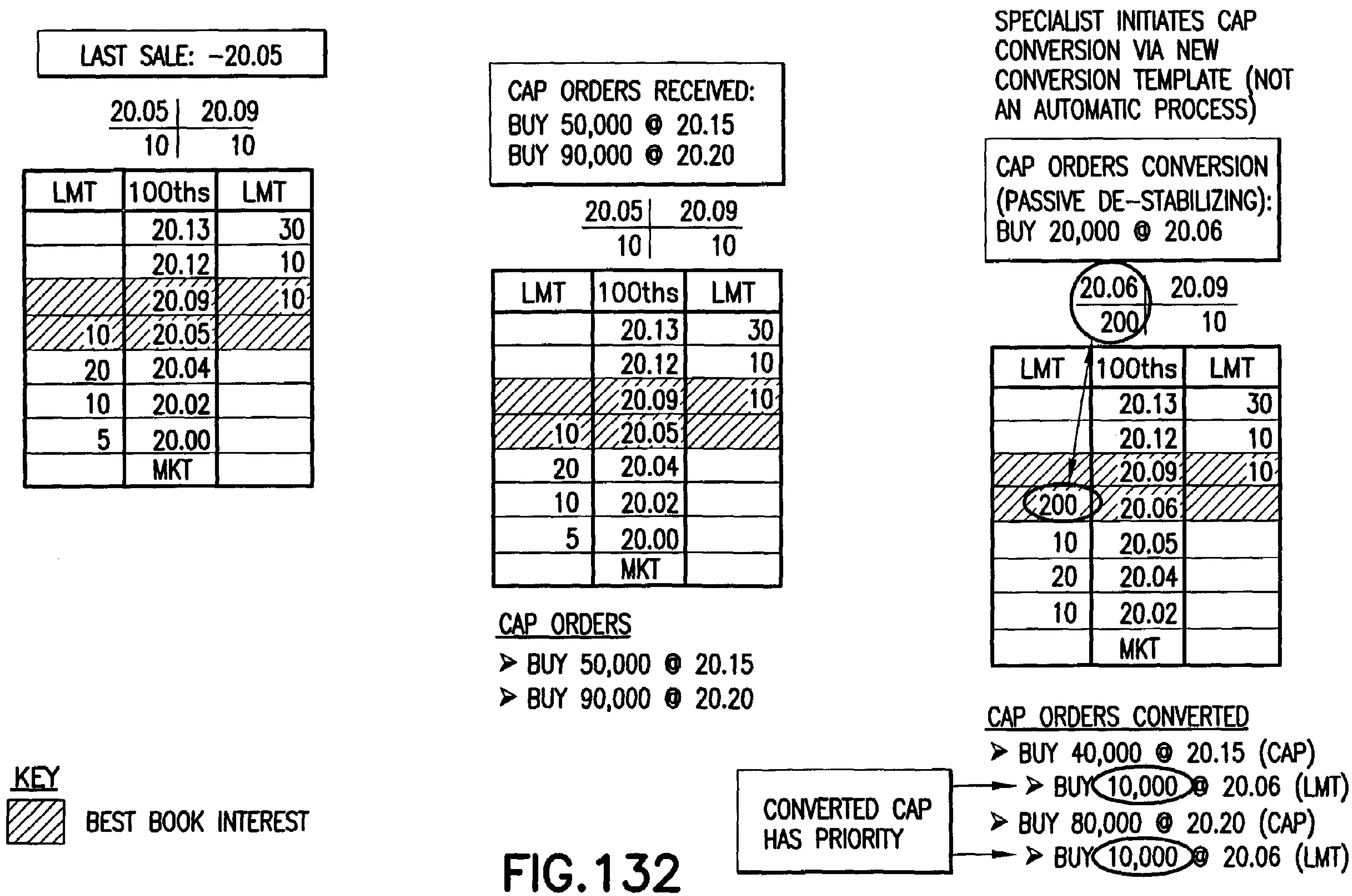
Figure 133:
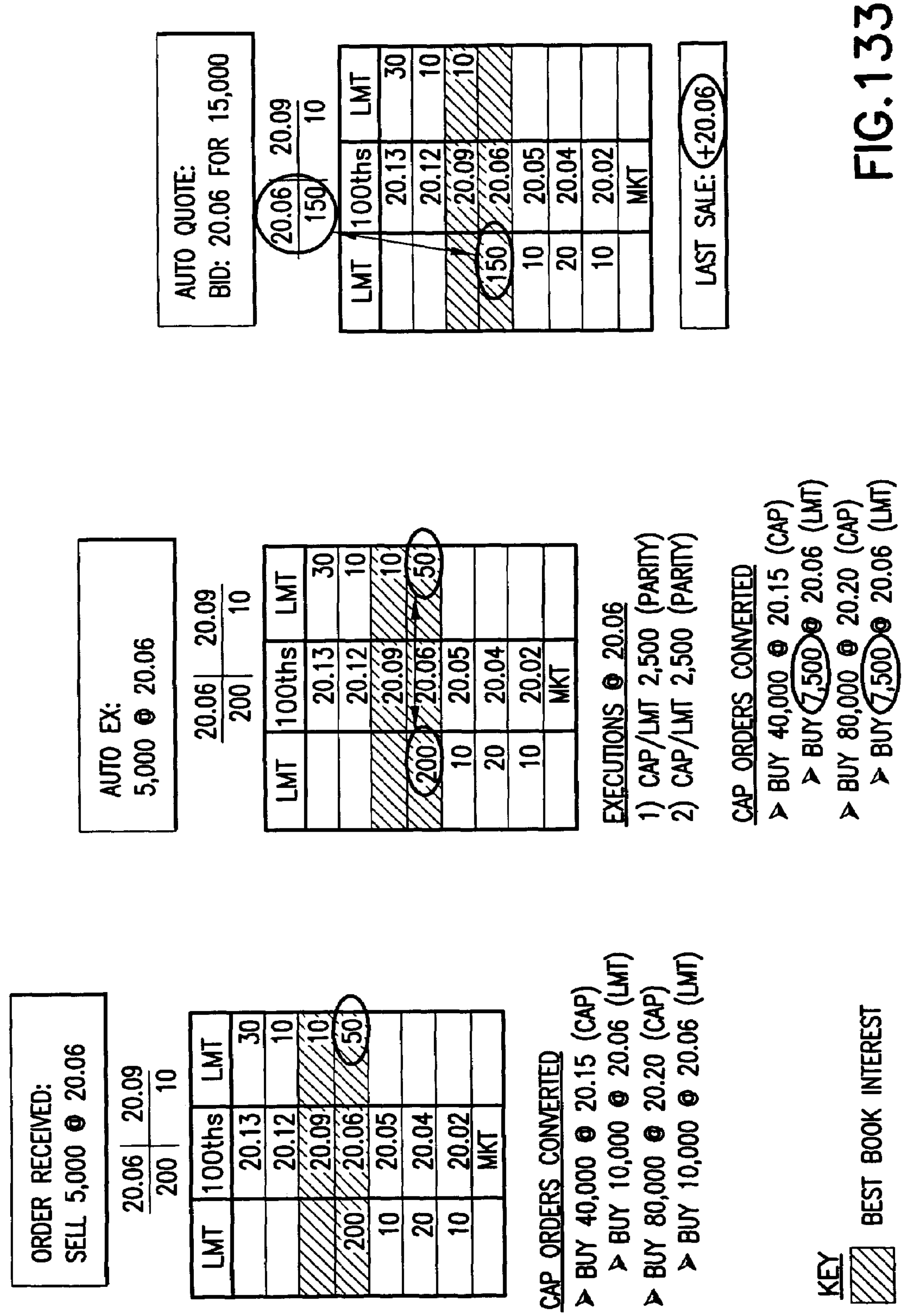
Figure 137:
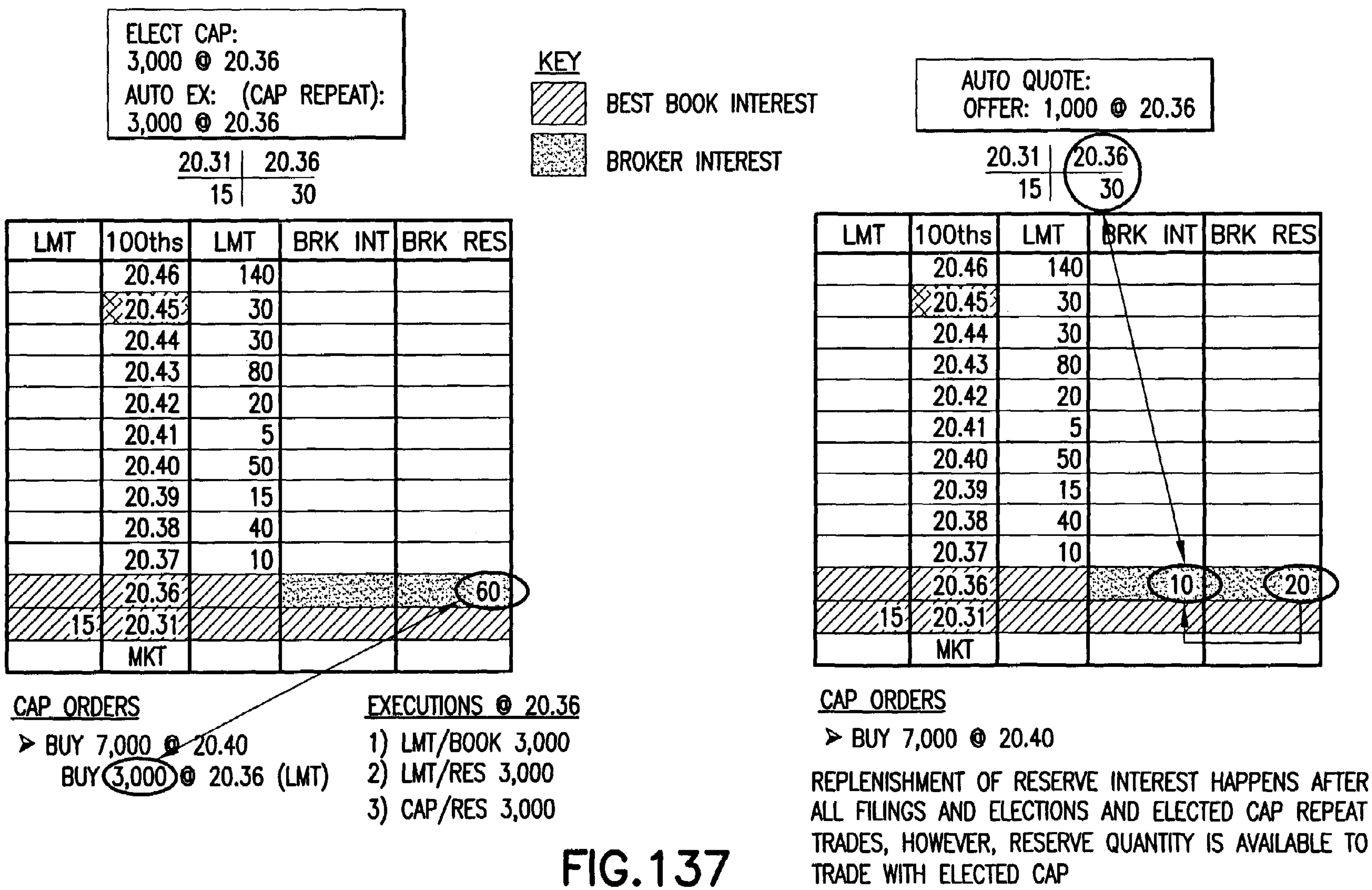
Figure 139:
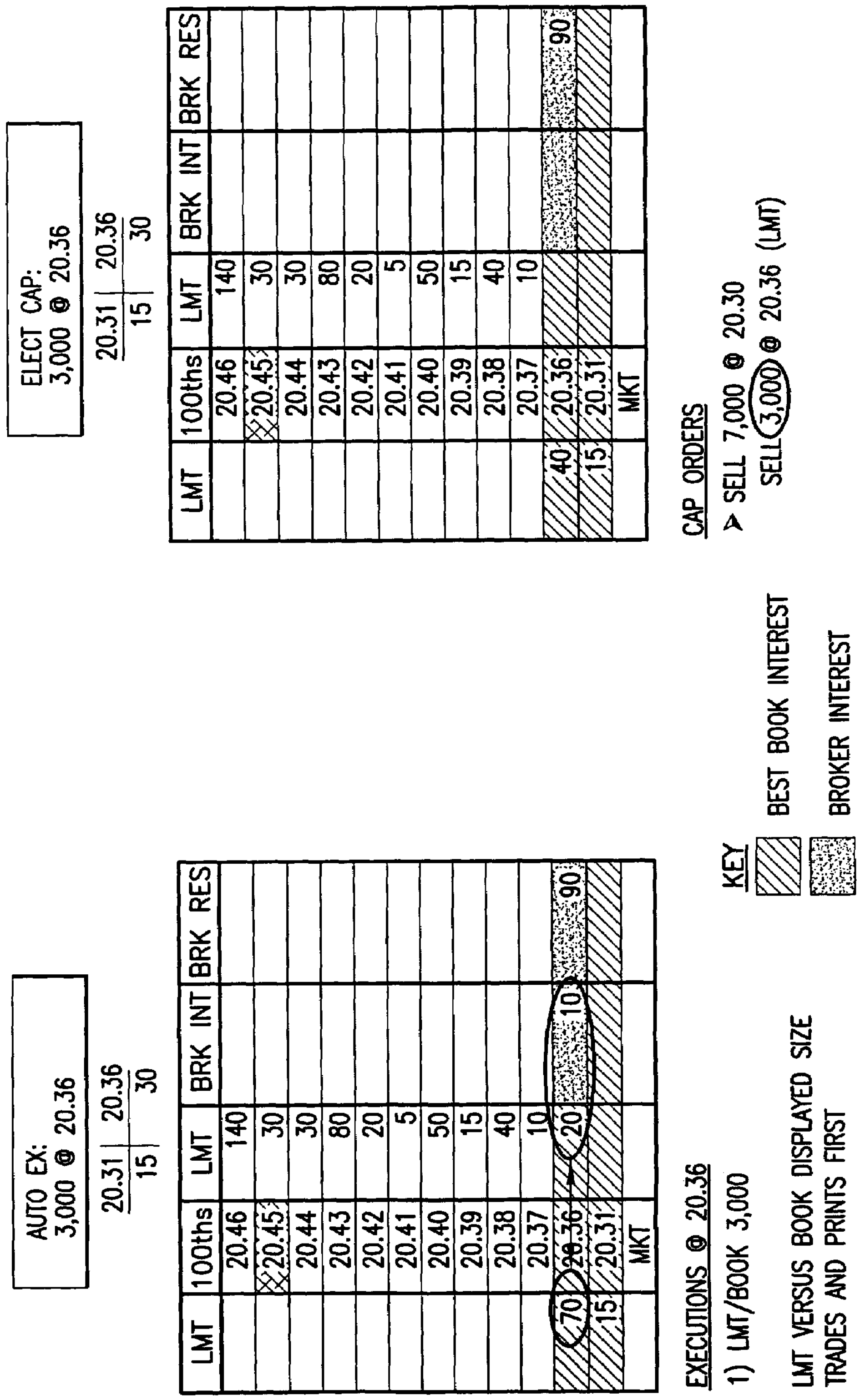
Figure 141:
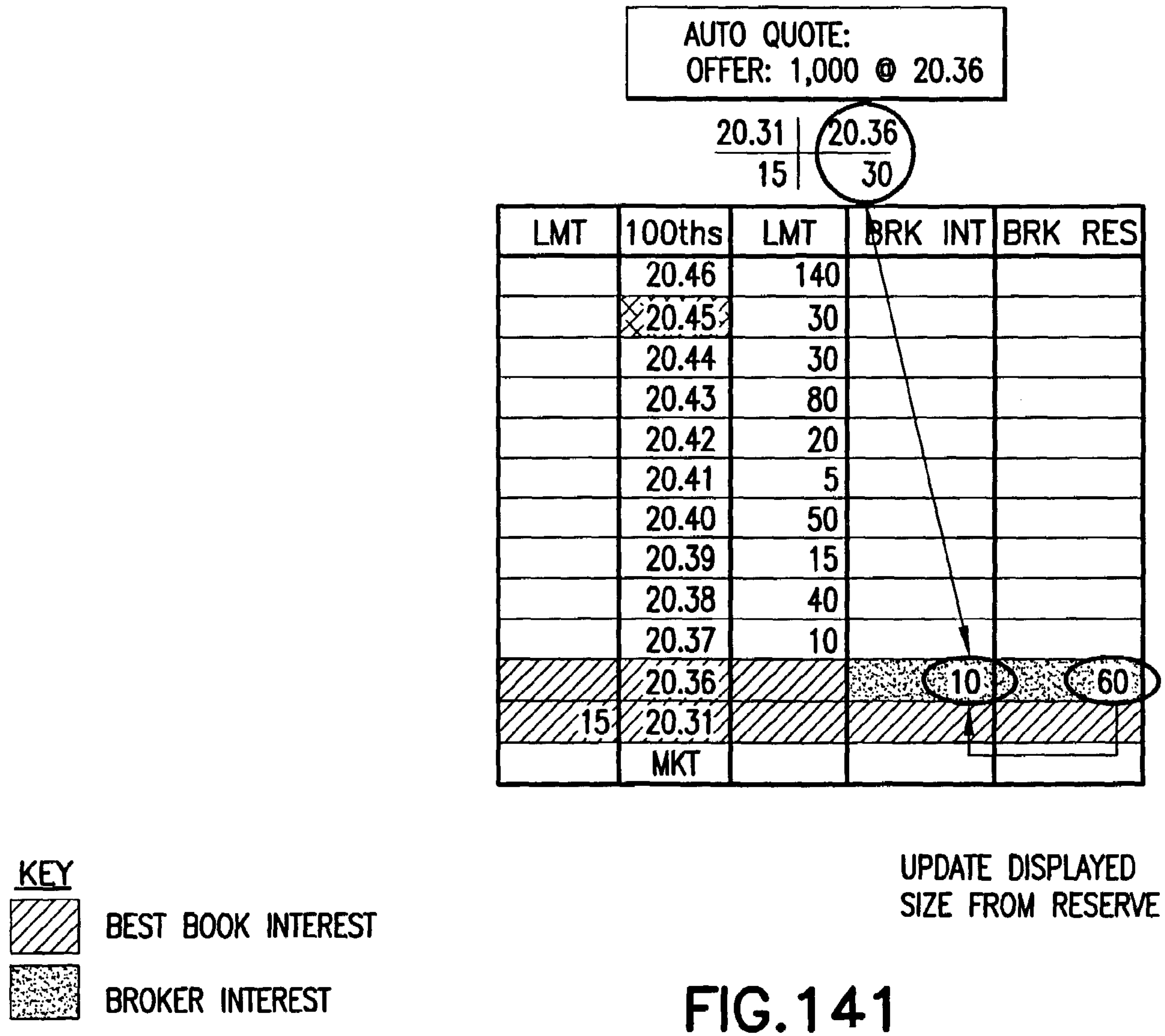

FIGS. 132 and 133 illustrate passive CAP conversion. An order is placed on the order display book and quoted. Converted CAP is displayed and quoted as a regular limit order, but trades on parity with the specialist. The last sale price is $20.05 and the best bid and offer are $20.05 and $20.09. CAP orders are received to buy 50,000 shares at $20.15 and to buy 20,000 shares at $20.20. The specialist initiates CAP conversion, converting 10,000 shares of each of the CAP orders to limit orders to buy at $20.06, passive de-stabilizing. The order display book is autoquoted to show the new best bid at $20.06. A limit order is received to sell 5,000 shares at $20.06, which is automatically executed against the converted CAP orders on parity.

FIGS. 134, 135, 136 and 137 illustrate elected CAP orders trading against reserve quantity, CAP is on the opposite side from reserve. CAP trades once the order display book order is filled. The best bid and offer are $20.31 and $20.36, and there is displayed broker interest of 1,000 shares included in the offer of 3,000 shares, plus reserve (undisclosed) broker interest of 9,000 shares at the offer. There are also CAP orders to buy 10,000 shares at $20.40. A limit order is received to buy 6,000 shares at $20.36, which is automatically executed against the offer size of 3,000 shares. 3,000 shares of the CAP orders are automatically elected to buy at $20.36. The residual 3,000 shares of the original limit order automatically execute against broker reserve interest at $20.36. The elected CAP orders un-elect. The elected CAP cannot trade ahead of the balance of the order that is part of the electing sale, nor can it trade along with the unexecuted portion of this order. 3,000 shares of the CAP orders are again automatically elected to buy at $20.36, and automatically execute against the broker reserve interest. After the CAP execution, the broker reserve interest replenishes the displayed broker interest and the order display book autoquotes.

FIGS. 138, 139, 140 and 141 illustrate elected CAP trades on parity with reserve quantity, CAP is on the same side as the reserve. The best bid and offer are $20.31 and $20.36, and there is displayed broker interest of 1,000 shares included in the offer of 3,000 shares, plus reserve (undisclosed) broker interest of 9,000 shares at the offer. There are also CAP orders to sell 10,000 shares at $20.30. A limit order is received to buy 7,000 shares at $20.36, which is automatically executed against the offer size of 3,000 shares. 3,000 shares of the CAP orders are elected to sell at $20.36. The elected CAP orders to sell and the broker reserve interest are on parity, so 2,000 shares of the elected CAP and 2,000 shares of broker reserve automatically execute against the limit order at $20.36. The unexecuted 1,000 shares of the CAP orders are un-elected. The broker disclosed interest is replenished from the reserve interest, and the order display book is autoquoted.

Figure 142:
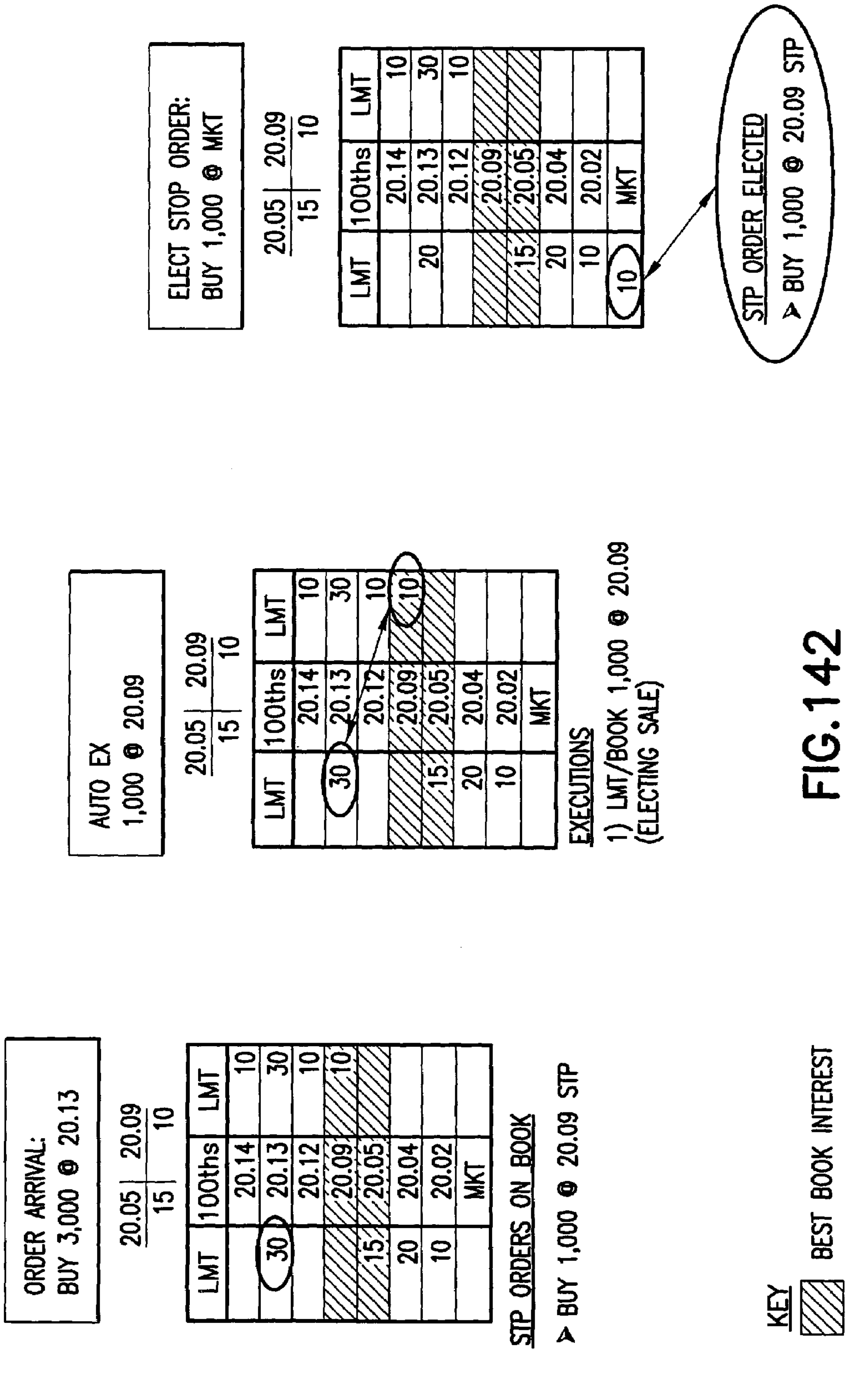
Figure 143:
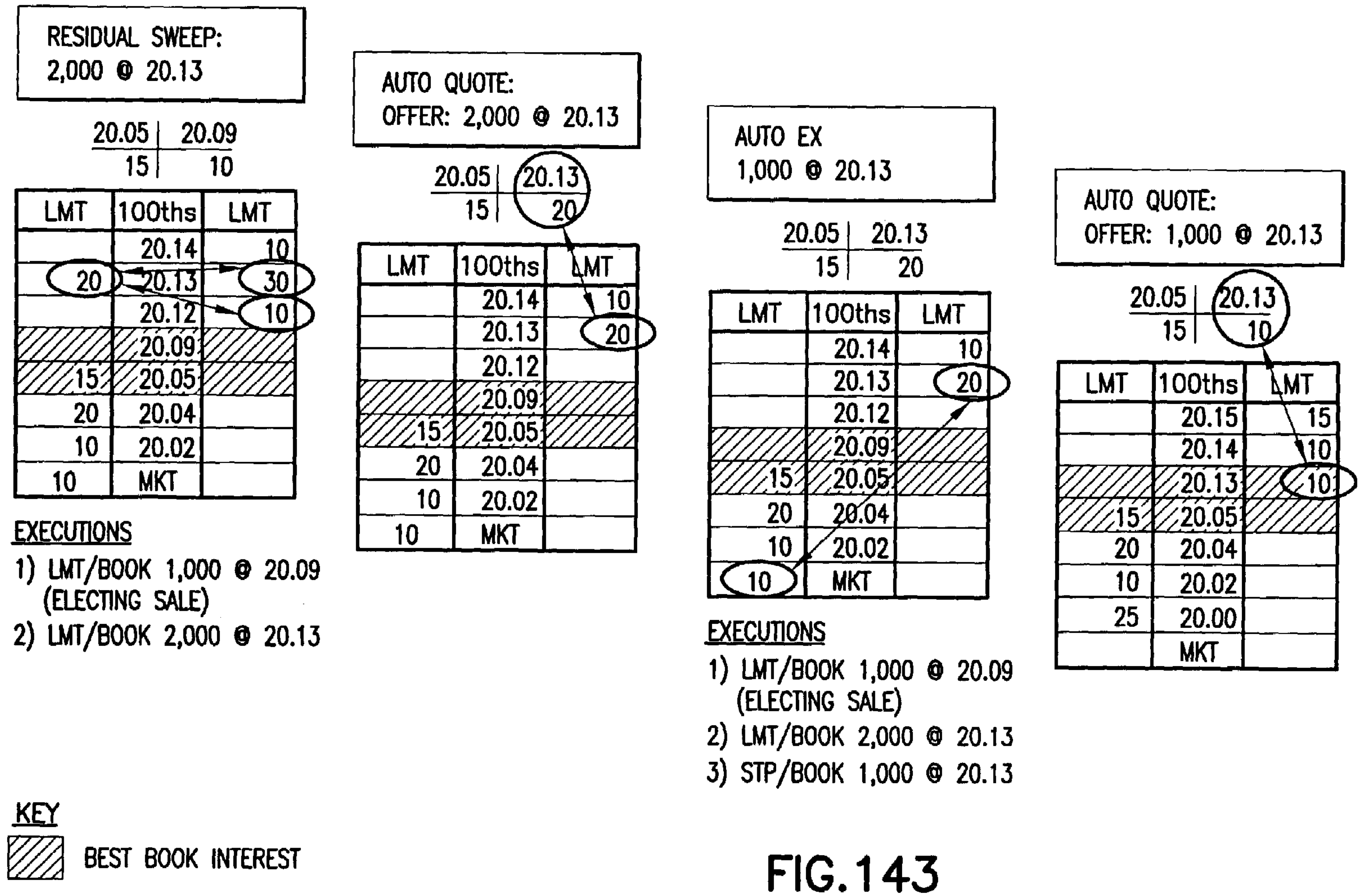

FIGS. 142 and 143 illustrate election of STP orders after an automatic execution at the quote but before a residual sweep. Elected STP orders trade after the residual sweep. The best bid and offer are $20.05 and $20.09, and there are STP orders to buy 1,000 shares at $20.09. A limit order is received to buy 3,000 shares at $20.13, and 1,000 shares are automatically executed against the offer at $20.09. 1,000 shares of the STP orders are elected to buy at the market. The residual 2,000 shares from the limit order sweep the order display book at $20.13 and the order display book is autoquoted. The elected 1,000 STP shares automatically execute at $20.13, and the order display book is autoquoted.

Figure 144:
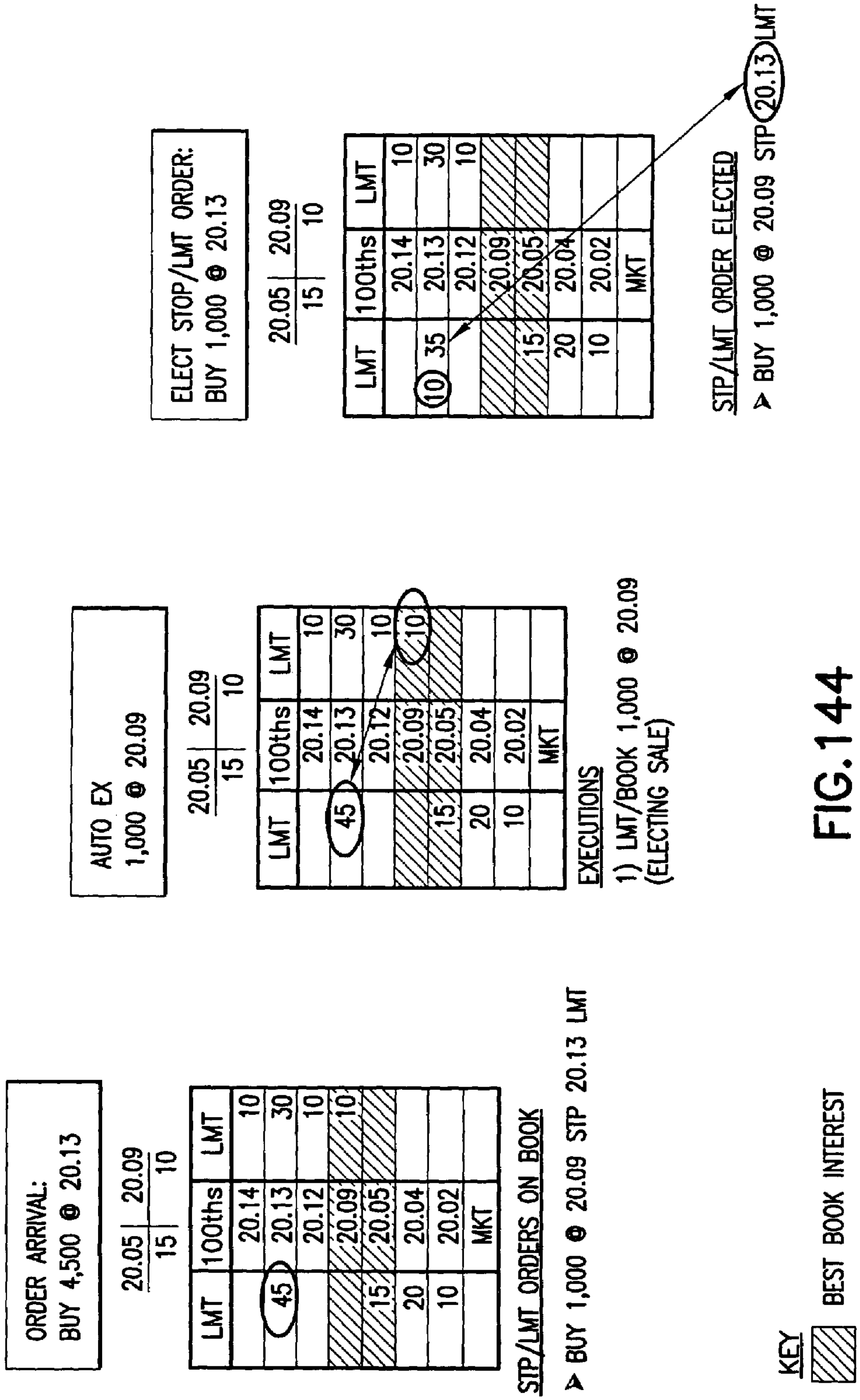
Figure 145:
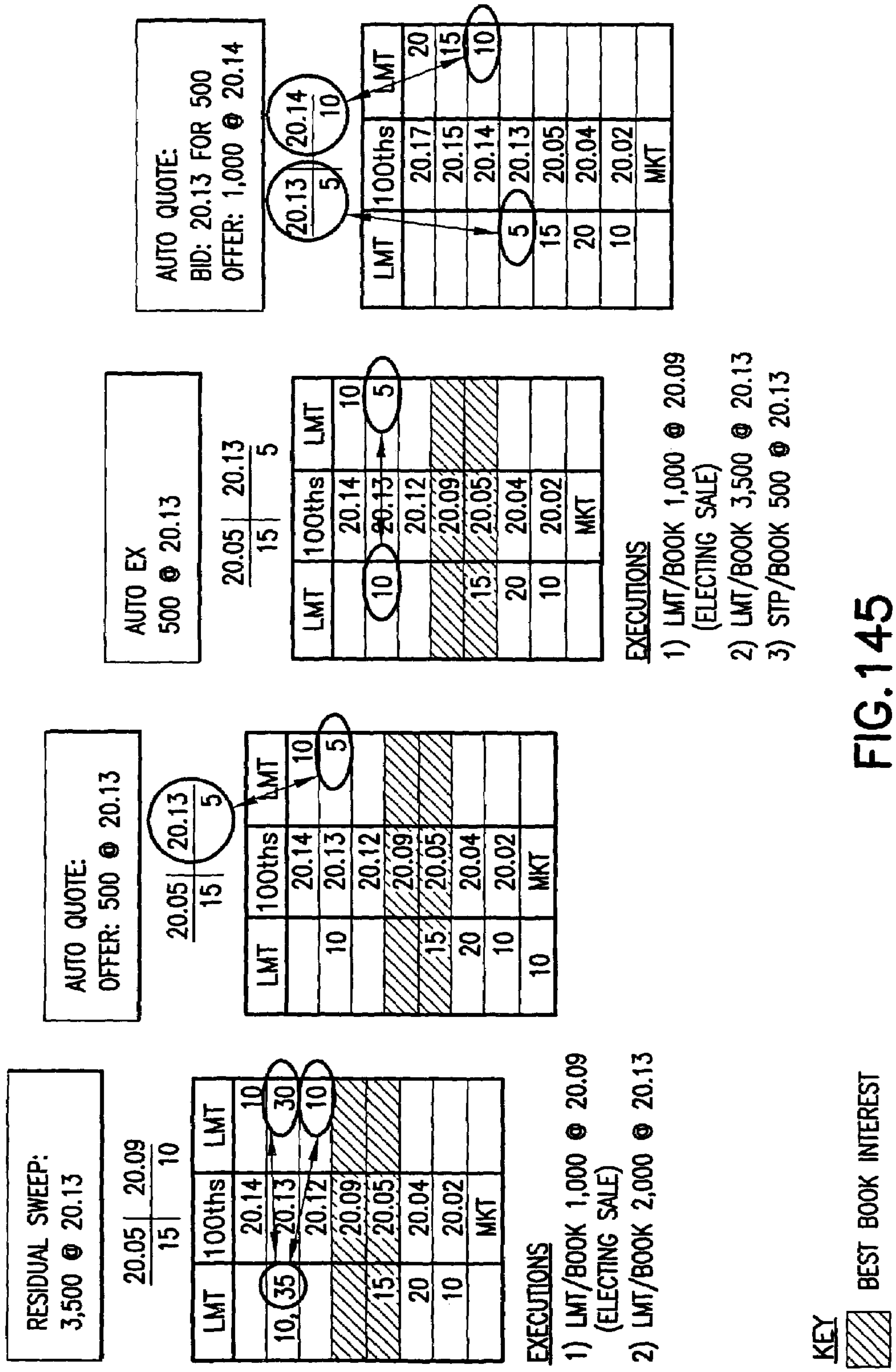

FIGS. 144 and 145 illustrate election of STP/LMT orders after the automatic execution at the quote but before the residual sweep. Elected STP/LMT orders trade after the residual sweep. The best bid and offer are $20.05 and $20.09, and there are STP/LMT orders to buy 1,000 shares at $20.09 STP $20.13 LMT. A limit order is received to buy 4,500 shares at $20.13, and 1,000 shares are automatically executed against the offer at $20.09. 1,000 shares of the STP/LMT orders are elected to buy at $20.09 STP $20.13. The residual 3,500 shares from the limit order sweep the order display book at $20.13 and the order display book is autoquoted. 500 shares of the elected 1,000 STP/LMT shares automatically execute at $20.13. The remaining balance of the STP/LMT order is converted to a regular limit order to buy 500 shares at $20.13 and the order display book is autoquoted.

Figure 146:
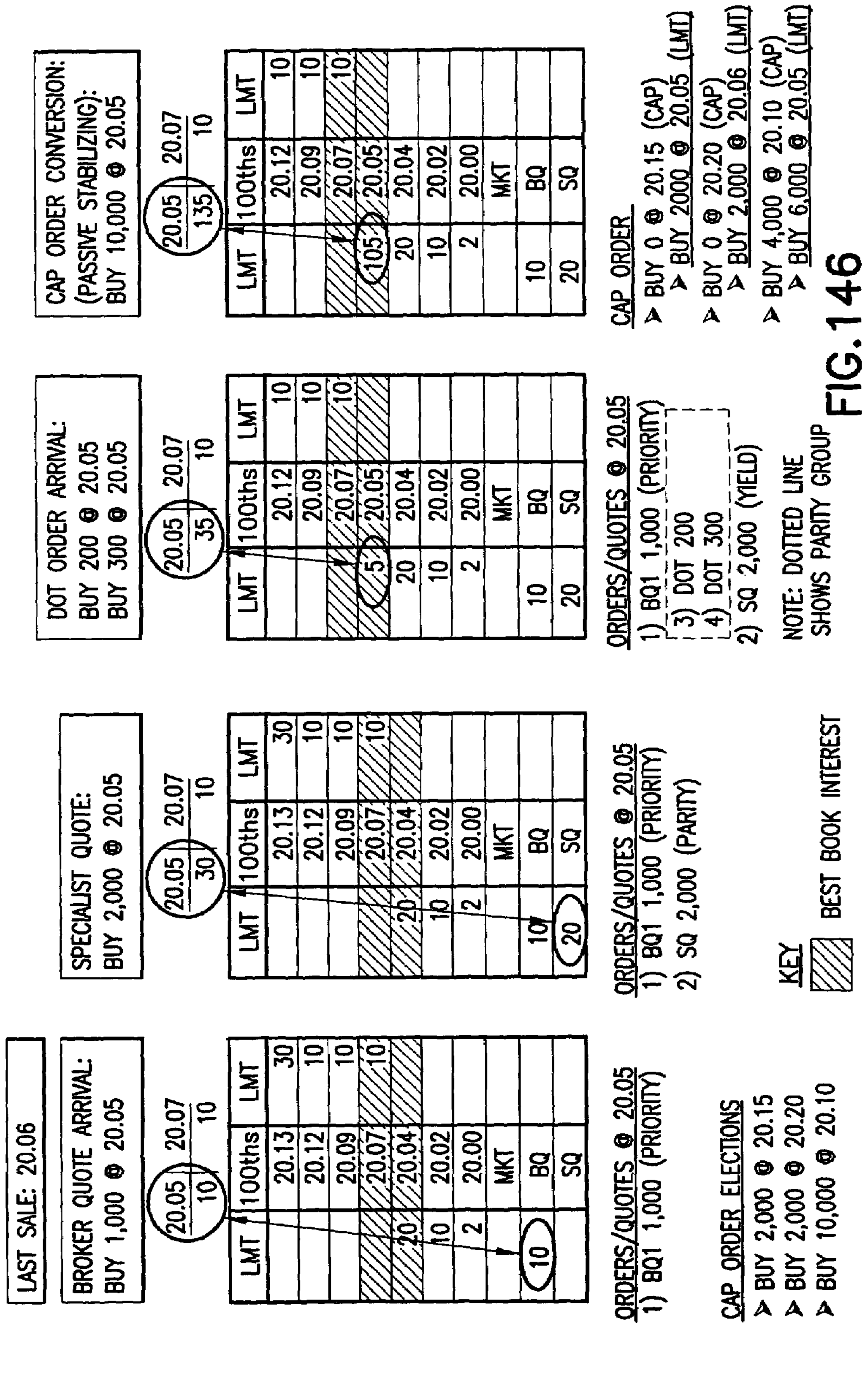
Figure 147:
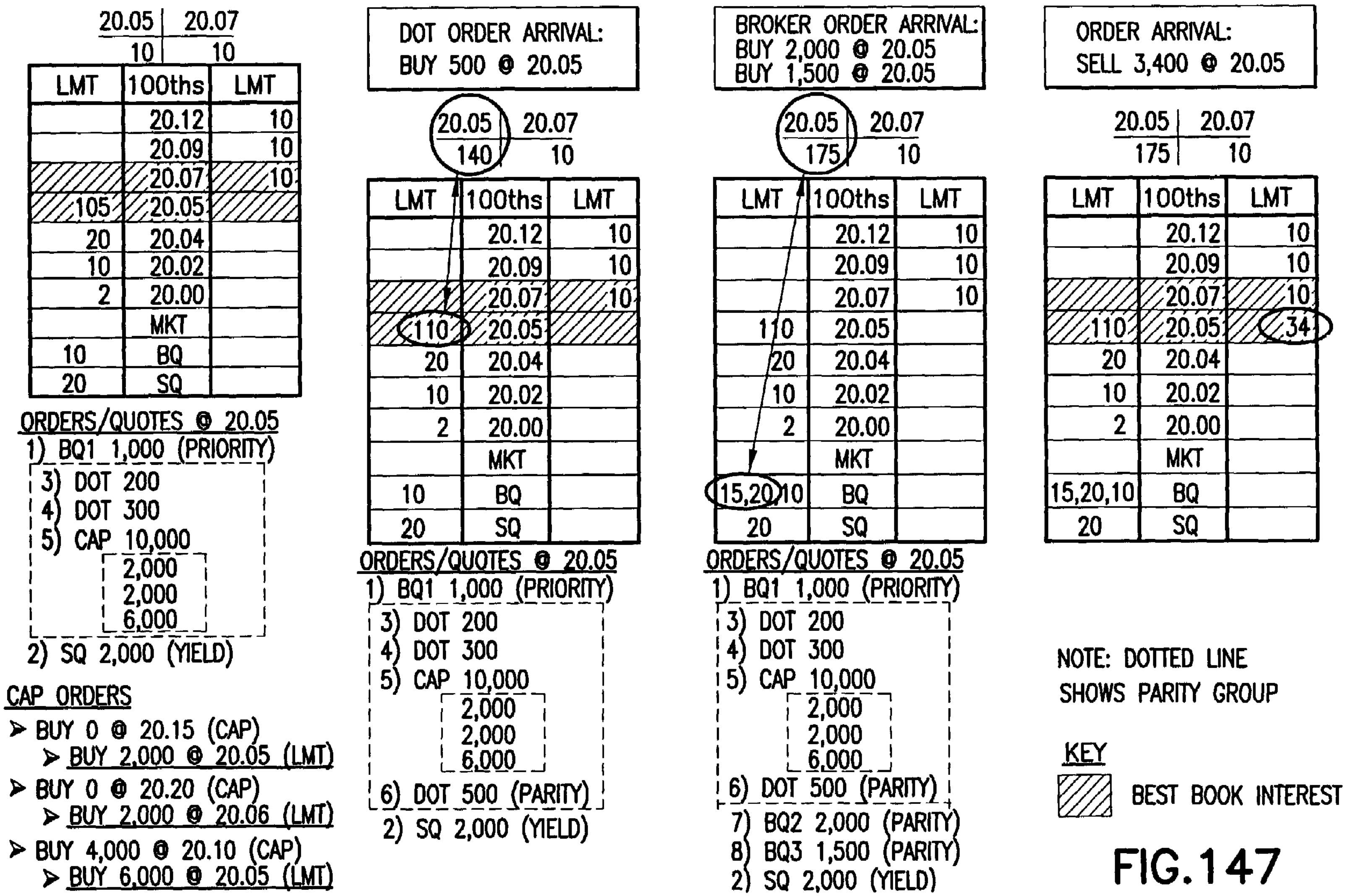
Figure 148:
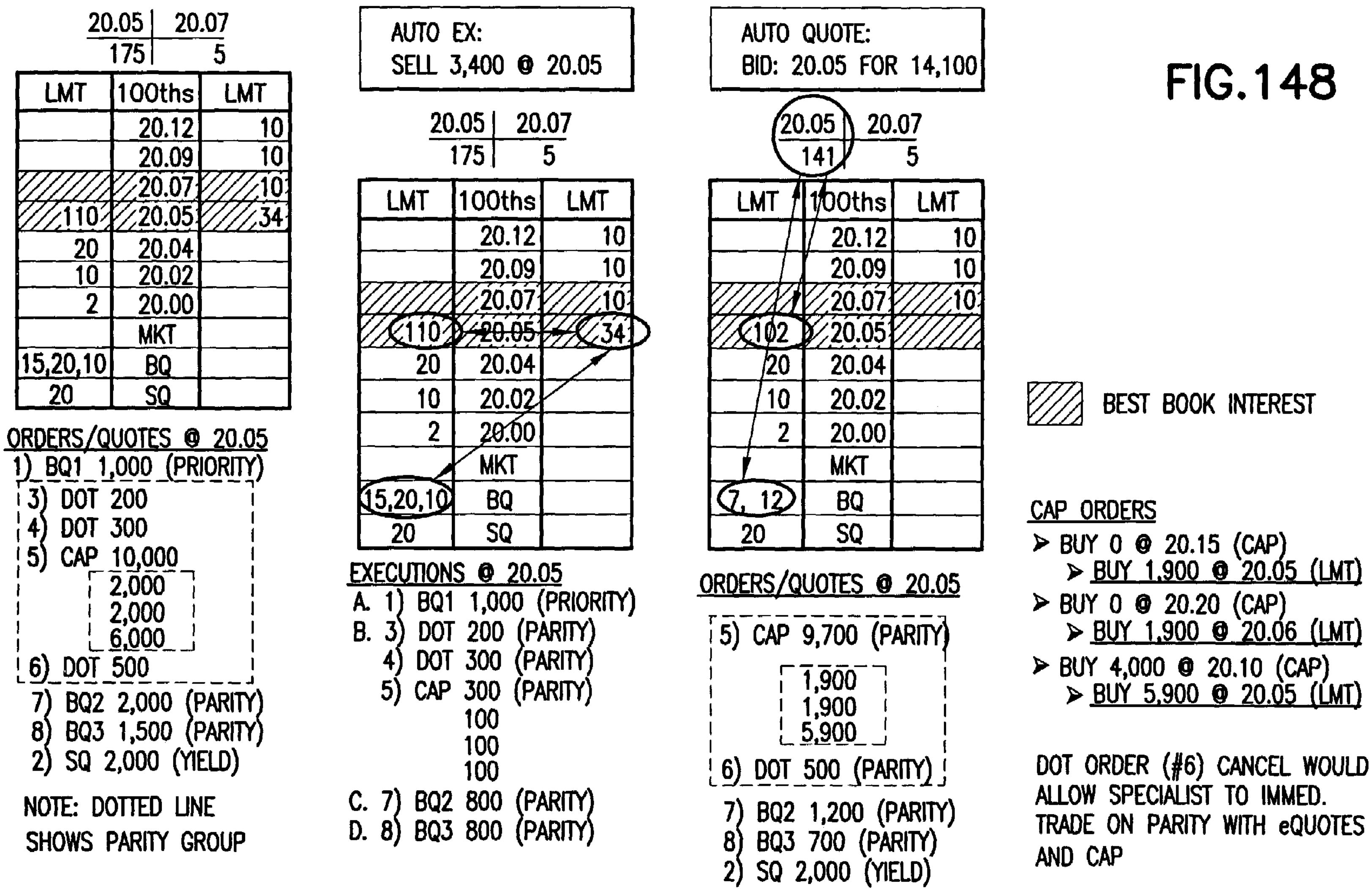

FIGS. 146, 147 and 148 illustrate allocation of shares in trades involving DOT, broker interest (BQ), specialist interest (SQ) and CAP using round robin, DOT time sequencing and CAP allocation respectively. The last sale was $20.06 and broker interest is received to buy 1,000 shares at $20.05, the broker interest is autoquoted as the best bid. In addition, there are CAP orders to buy 2,000 shares at $20.15, buy 2,000 shares at $20.20 and buy 10,000 shares at $20.10. Specialist interest arrives to buy 2,000 shares at $20.05, which is added to the bid and autoquoted. The broker interest has priority and the specialist interest is on parity. A first DOT order arrives to buy 200 shares at $20.05, followed by a second DOT order to buy 300 shares at $20.05. The broker interest still has priority, the DOT order are on parity and the specialist interest must yield. CAP orders are converted (passive stabilization) to buy 10,000 shares at $20.05 and the order display book is autoquoted. The broker interest still has priority, the CAP orders are on parity with each other, the aggregated CAP orders and DOT order are on parity, and the specialist interest must yield. A DOT order arrives to buy 500 shares at $20.05. The broker interest still has priority, the CAP orders are on parity with each other and the aggregated CAP orders and DOT order are on parity, and the specialist interest must yield. Second broker interest is received to buy 2,000 shares at $20.05 and third broker interest is received to buy 1,500 shares at $20.05. The first broker interest still has priority, the CAP orders are on parity with each other, and the aggregated CAP orders and DOT order are on parity as a group. The second broker interest and the third broker interest are all on parity, and the specialist interest must yield. A limit order is received to sell 3,400 shares at $20.05, which automatically executes. The allocation is 1,000 shares to the first broker interest that had priority. The remaining 2,400 shares are allocated as follows: All bidders on parity get an equal portion of the 2,400 shares. CAP and DOT together get a single allocation of 800 shares. The second and third broker interest are represented by brokers in the crowd and each get a single allocation of 800 shares. The 800 shares allocated to the CAP and DOT orders are assigned on a time priority basis. The first order gets as much as it bid for (200). All three CAP orders were converted at the same time and therefore are allocated shares using a round-robin. The specialist must yield, so does not execute any shares.

Figure 149:
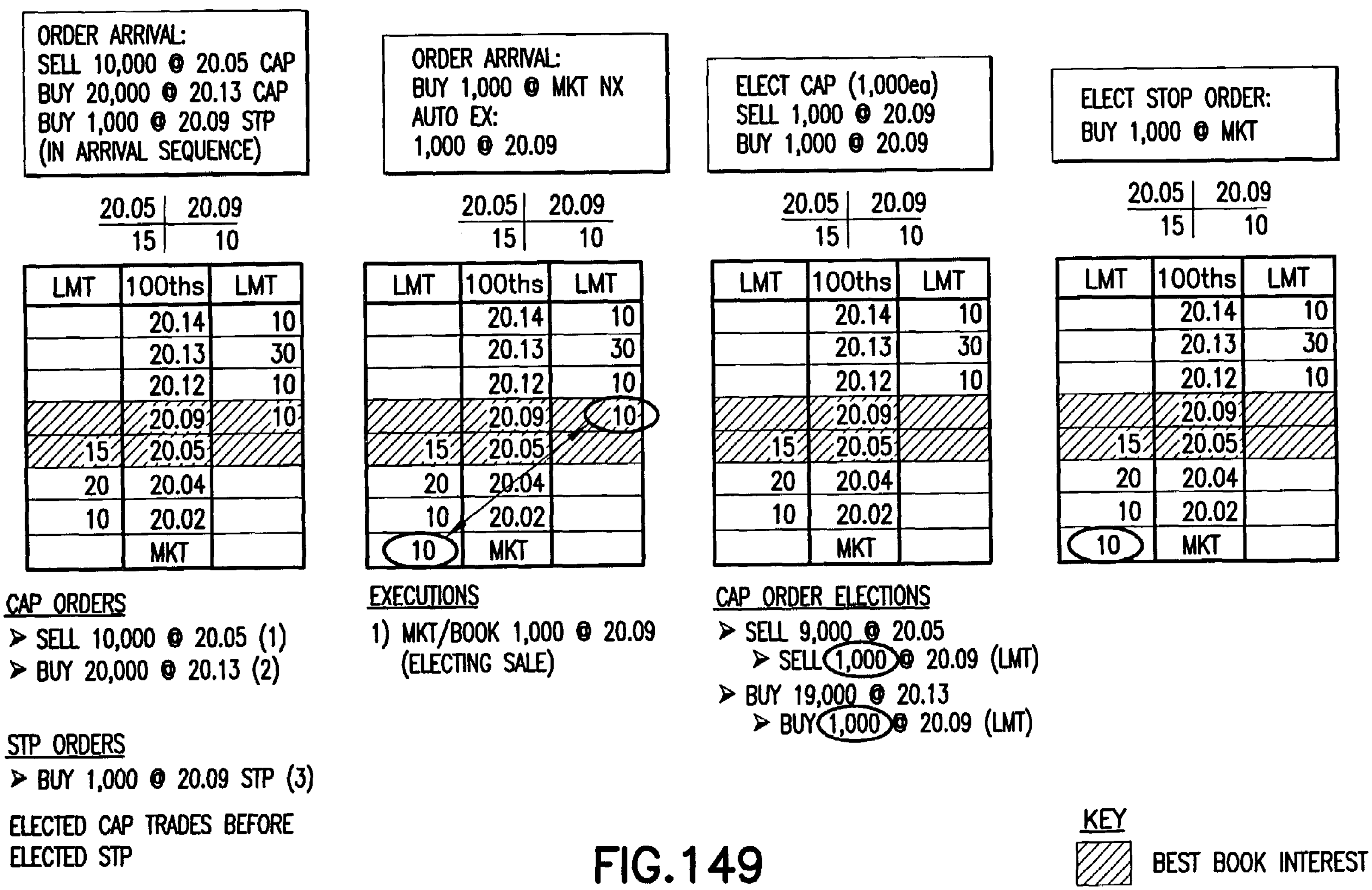
Figure 150:
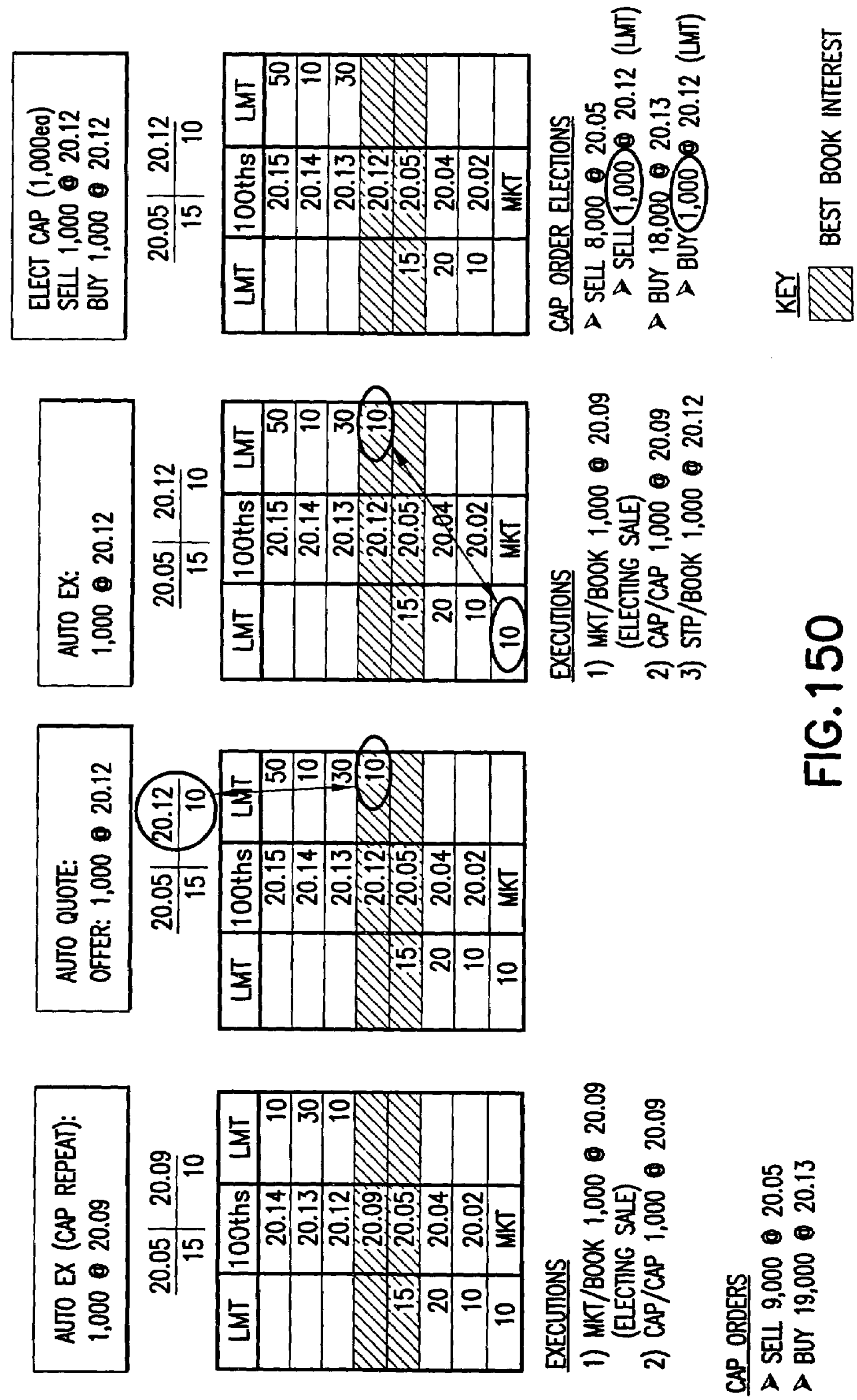

FIGS. 149 and 150 illustrate election of CAP and STP orders after both automatic and manual executions. The original order arrival time determines the sequence of executions. The sequence of order arrival is: sell 10,000 shares at $20.05 CAP; buy 20,000 shares at $20.13 CAP; and buy 1,000 shares at $20.09 STP. Elected CAP trades before elected STP. A MKT NX order arrives to buy 1,000 shares and is automatically executed against the offer, taking all of the offer size. This is the electing sale and 1,000 shares each elect of the CAP orders to buy and sell at $20.09. Then 1,000 shares of the STP order elect at the market. The 1,000 shares of elected CAP orders to buy and sell automatically execute at $20.09, and the order display book autoquotes at $20.12. The 1,000 shares of elected STP order automatically execute at $20.12. 1,000 shares of the CAP orders to buy and sell are further elected at $20.12 and will automatically execute at $20.12. If more stock was available on the order display book at $20.12 then the buy CAP would trade against the book first at $20.12 and then any buy CAP remaining unexecuted would trade against the sell CAP.

Figure 151:
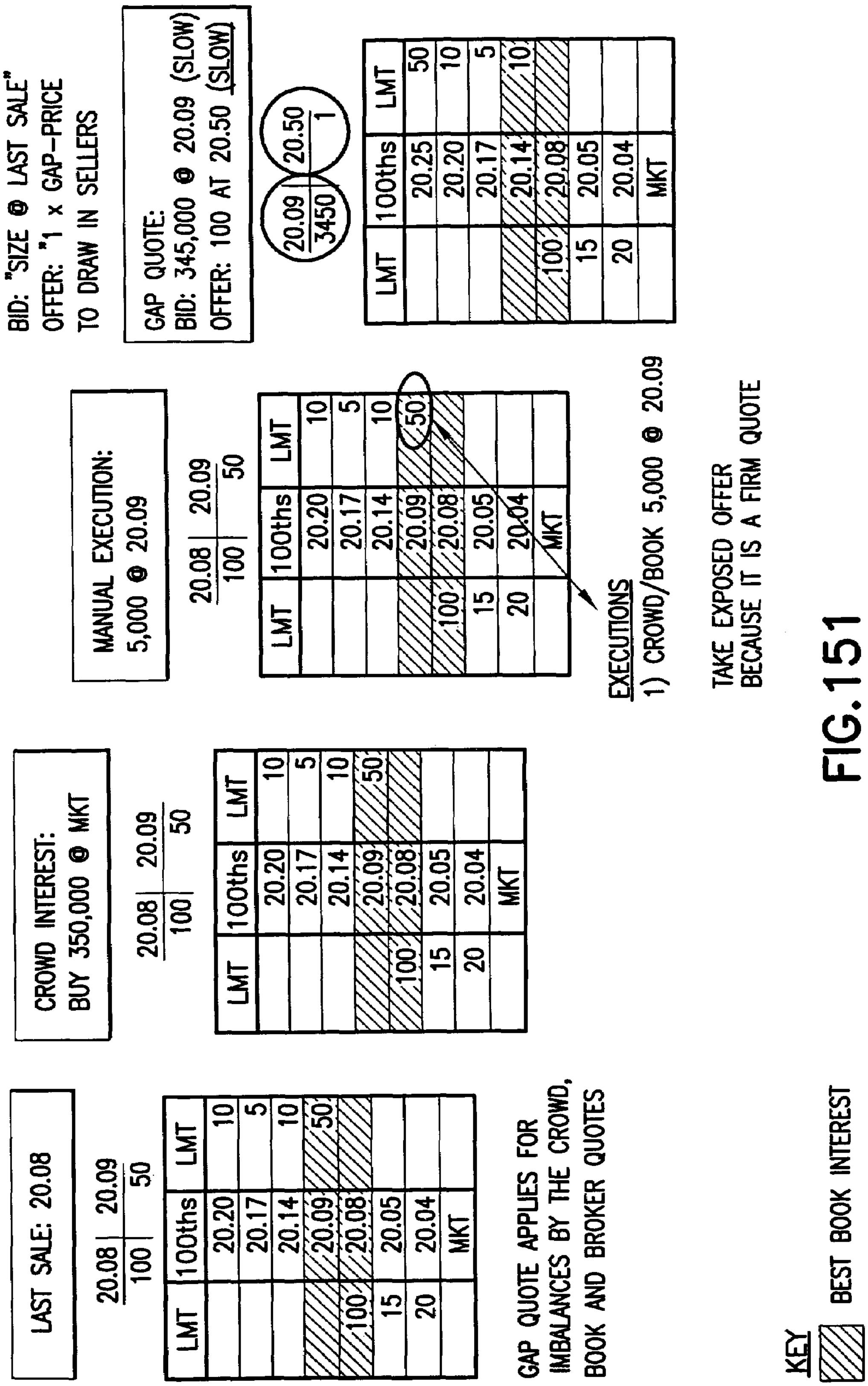

FIG. 151 illustrates how an imbalance prompts the specialist to designate a non-automatic execution gap quote (size×1) and there is no time-out. A manual trade or quote is needed to resume a fast market. The quote is 10,000 shares bid at $20.08 and 5,000 shares offered at $20.09. There is crowd interest to buy 350,000 shares at the market. The specialist does a manual execution for 5,000 shares at the offer of $20.09 because it is a firm quote. Then the specialist publishes the bid as size of the crowd interest at the last sale and offer as the gap price and 100 shares to draw in sellers. The quote is slow and does not time-out. A manual action (trade or quote) is required by the specialist.

Figure 152:
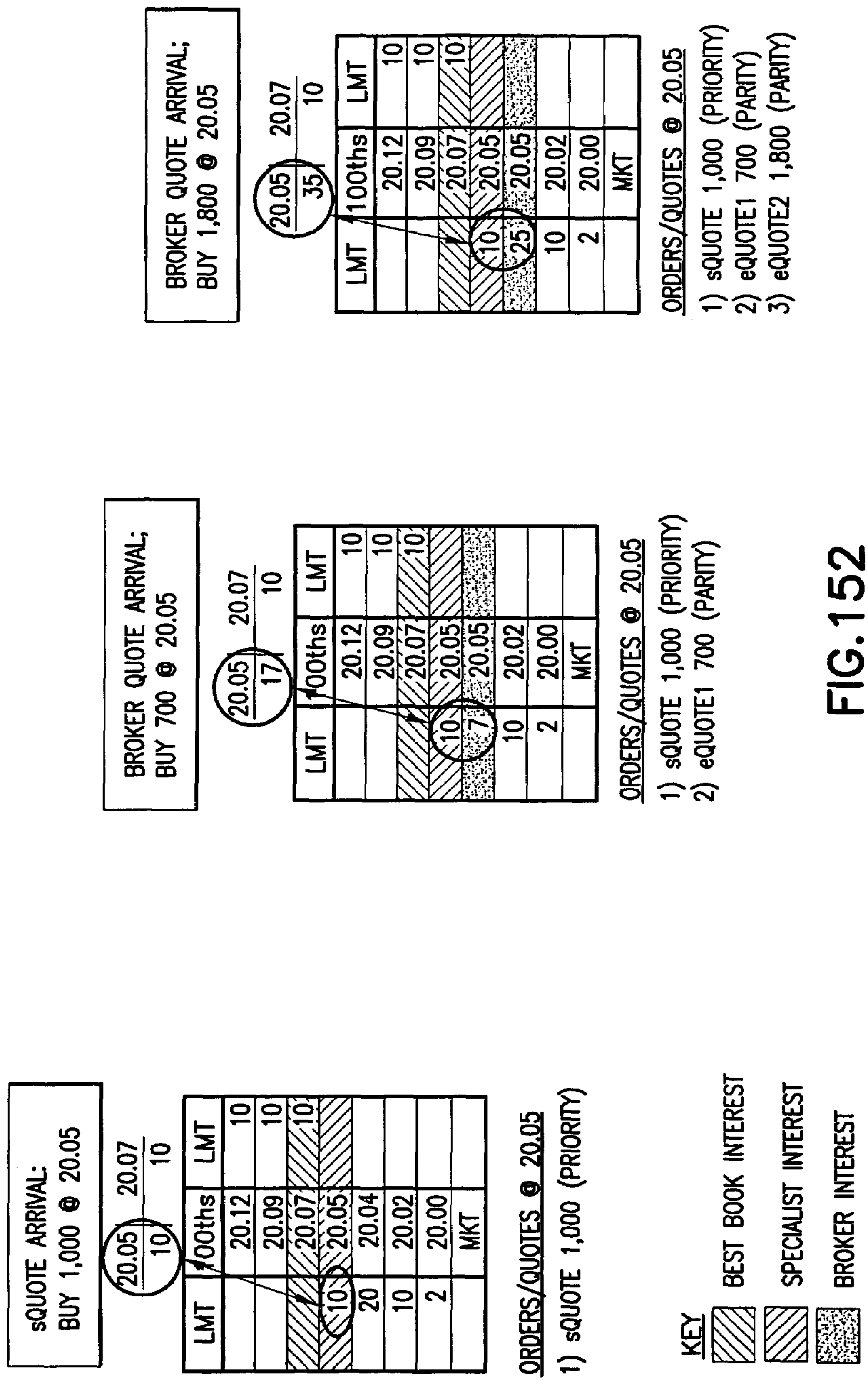
Figure 153:
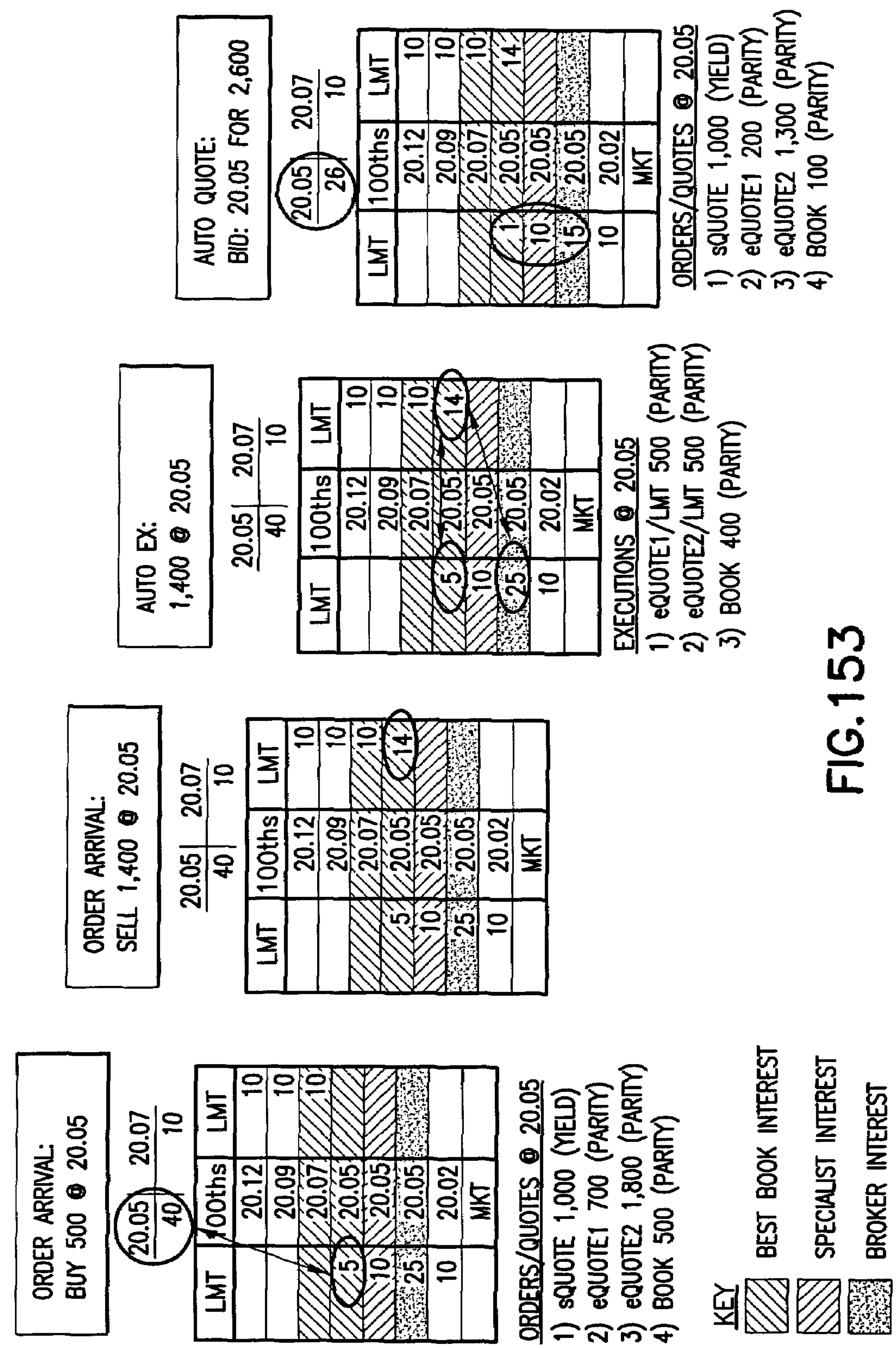

FIGS. 152 and 153 illustrate rules of priority, parity and yield. Specialist interest is received to buy 1,000 shares at $20.05, which is the best bid and is autoquoted. First broker interest is received to buy 700 shares at $20.05, which is added to the specialist interest and autoquoted. The specialist interest has priority and the first broker interest is on parity. Second broker interest is received to buy 1,800 shares at $20.05, which is added to the bid and autoquoted. The specialist interest has priority and the first and second broker interest are on parity. A limit order is received to buy 500 shares at $20.05, which is added to the bid and autoquoted. The first and second broker interest are on parity with the limit order, and the specialist interest must yield while there are unfilled book orders at its price. A limit order is received to sell 1,400 shares at $20.05, which is automatically executed. The allocation is 500 shares each to the broker interest and 400 shares to the book order because it was last to arrive. Because 100 shares of the book order remain, the specialist must yield and the other orders at $20.05 are on parity. If the 100 shares of the book order cancel, then the specialist will be back on parity.

Figure 154:
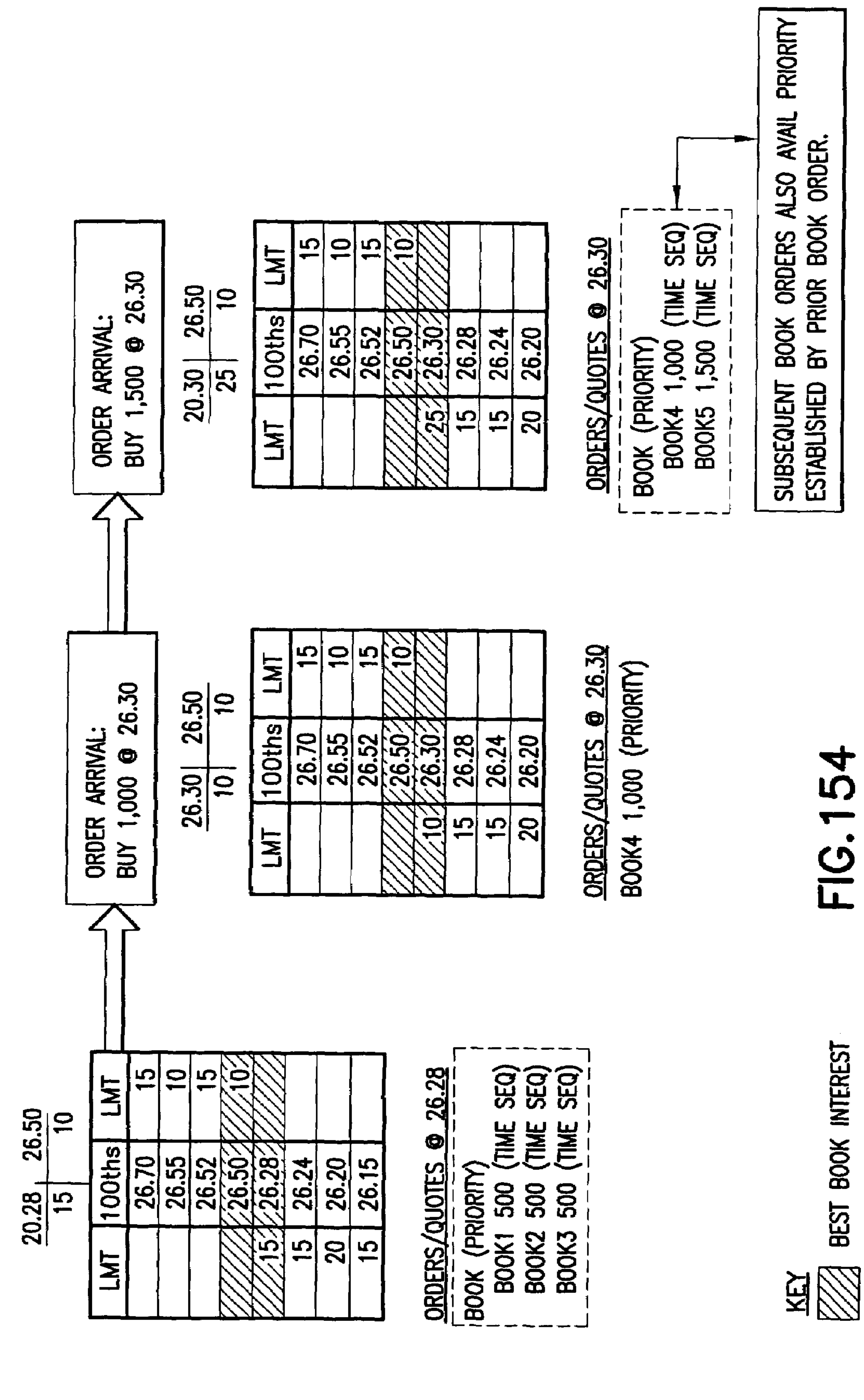

FIG. 154 illustrates how book orders that establish the quote get priority. If no broker interest arrives in between, additional book orders that follow immediately at the same price also get priority. The best bid and offer are $26.28 and $26.50. A limit order is received to buy 1,000 shares at $26.30, making it the best bid with priority. Another limit order is received to buy 1,500 shares at $26.30, which is also priority with time sequence.

Figure 155:
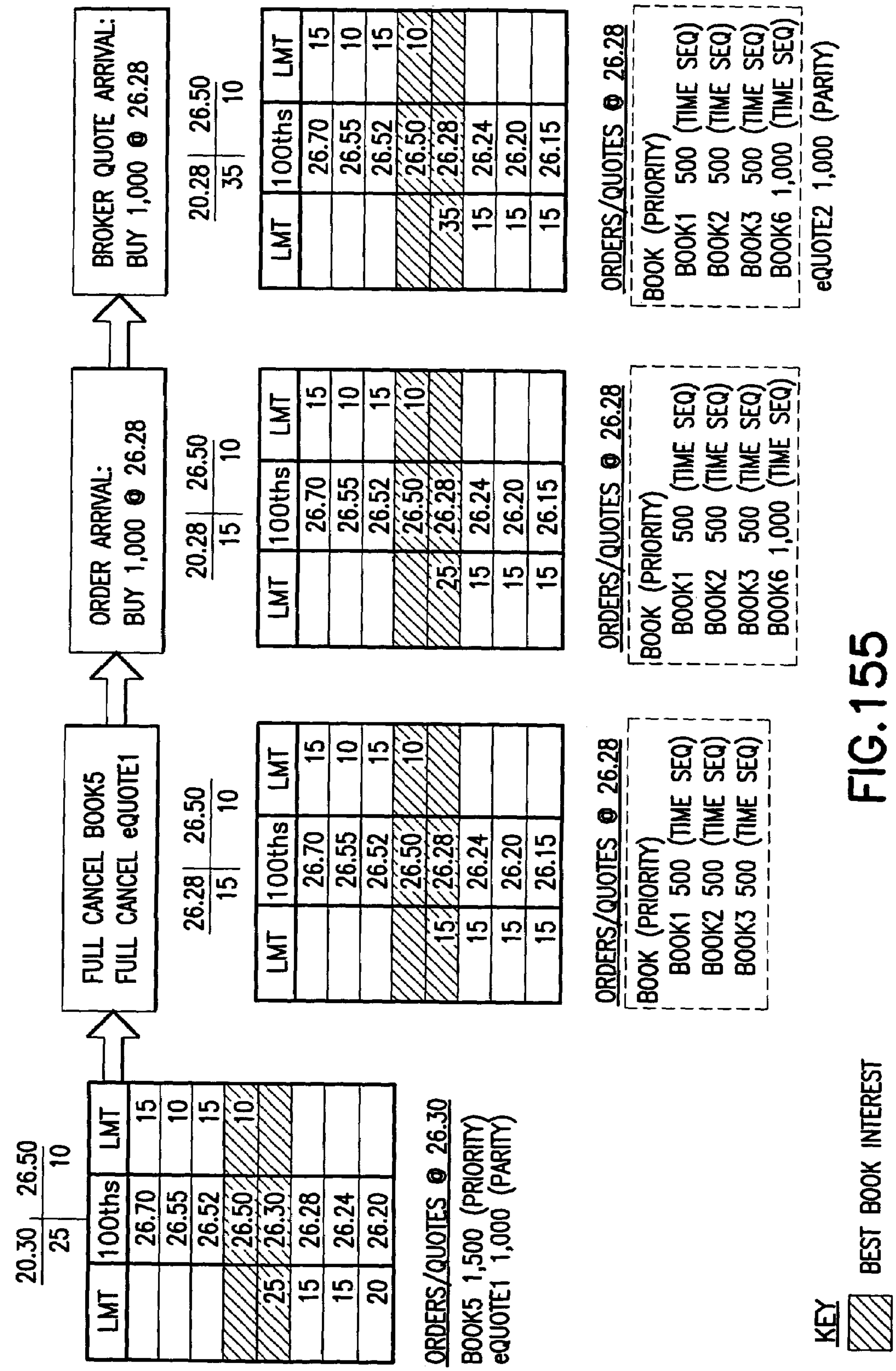

FIG. 155 illustrates how interest is re-evaluated for priority and price if cancellation results in a new quote price. The best bid and offer are $26.30 and $26.50. In the bid, 1,500 shares from the book have priority and 1,000 shares of broker interest are on parity. The 1,500 shares from the book and the 1,000 shares of broker interest cancel. This makes the best bid 1,500 shares at $26.28 with three book orders each of 500 shares having priority in time sequence. A limit order arrives to buy 1,000 shares at $26.28, which also has priority with the other book orders. Broker interest arrives to buy 1,000 shares at $26.28, which has parity after the book orders.

Figure 156:
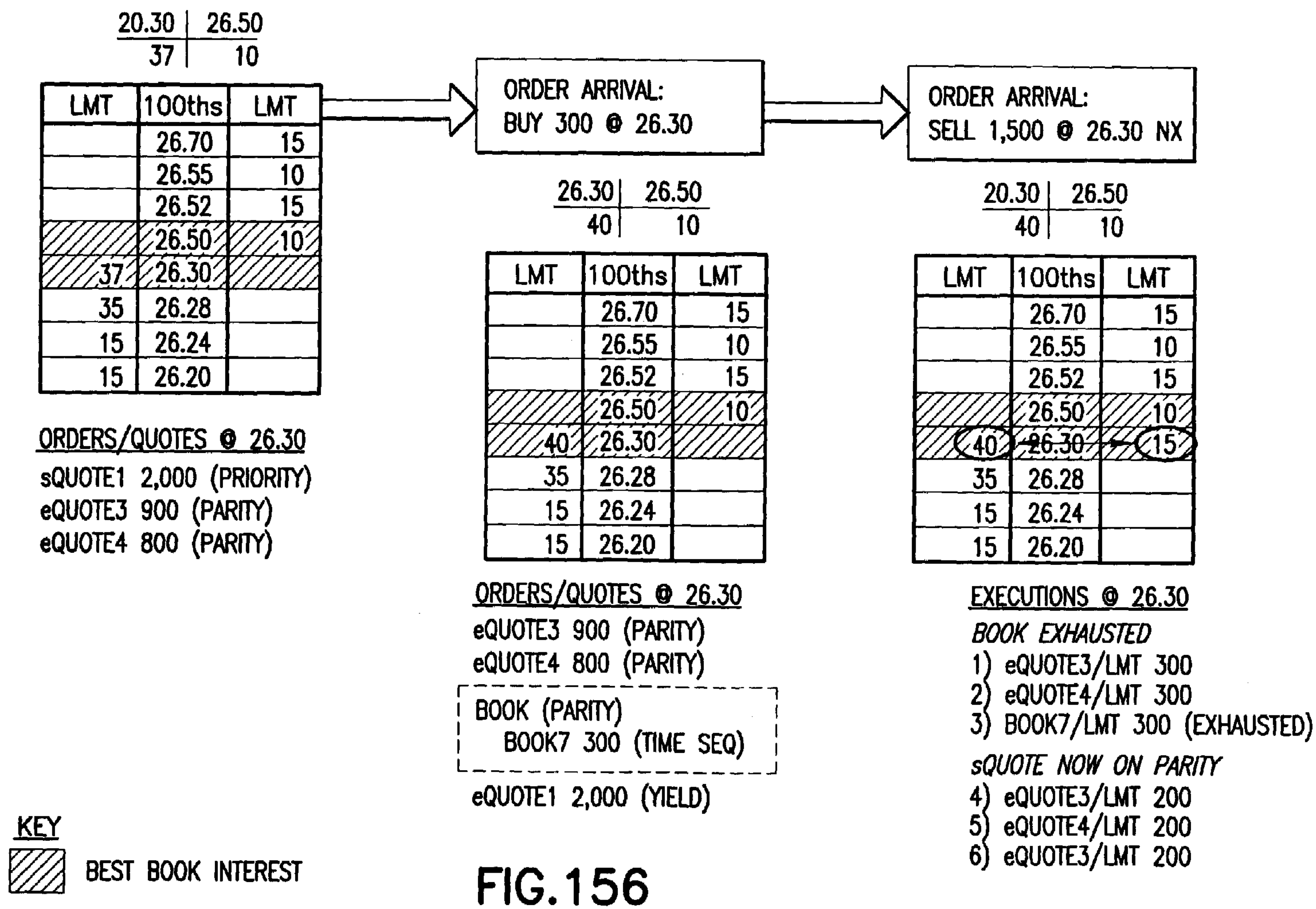

FIG. 156 illustrates how specialist interest loses priority as soon a book order arrives at that price. The specialist interest yields to the book parity group. The best bid and offer are $26.30 and $26.50. In the bid, 2,000 shares of specialist interest have priority and 1,700 shares of broker interest are on parity. A limit order arrives to buy 300 shares at $26.30. Now, the 1,700 shares of broker interest are on parity with the limit order and the specialist interest must yield. A MKT NX order is received to sell 1,500 shares. 900 shares are executed on parity (300 each to the book order and the broker interests). The book order for 300 shares is exhausted and now the specialist interest is on parity with the remaining broker interest, so 600 shares are allocated 200 each to the specialist interest and the two broker interests.

The description above along with FIGS. 3-42 and 44-156 explain various embodiments of the inventions in the context an order display book. In the following description, various embodiments of the inventions are described and illustrated using flow charts.

Figure 157:
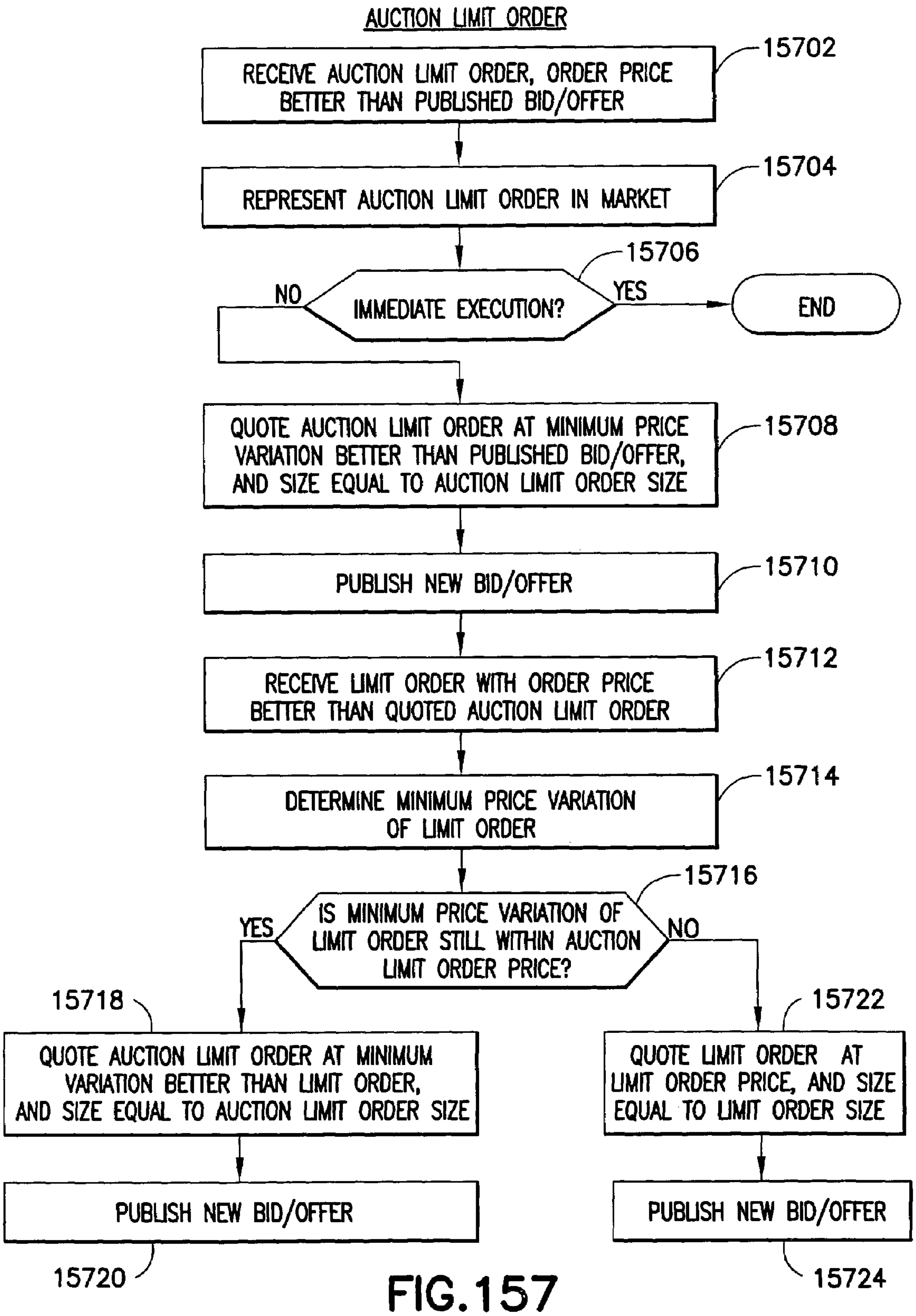
FIGS. 157-190 illustrates steps in methods of various embodiments of the inventions.

FIG. 157 illustrates an embodiment involving an Auction Limit Order. At step 15702, an Auction Limit (AL) order is received, and as previously described it has a limit price that is better than the published bid/offer. At step 15704, the AL order is represented in the market for immediate execution, and at step 15706, system 100 determines whether there was immediate execution, ending if the AL order was immediately executed.

If at step 15706, system 100 determines that the AL order was not immediately executed, then at step 15708, the AL order is quoted at a minimum price variation better than the published bid/offer, with a size equal to the auction limit order size.

At step 15710, system 100 publishes the quote with the new best bid/offer.

At step 15712, system 100 receives a limit order with an order price better than the quoted AL order, and at step 15714, system 100 determines the minimum price variation of the limit order.

If at step 15716 system 100 determines that the minimum price variation of the limit order is still within the AL order price, then at step 15718, the AL order is quoted at a minimum price variation better than the limit order price, with a size equal to the auction limit order size, and at step 15720, system 100 publishes the quote with the new best bid/offer.

If at step 15716 system 100 determines that the minimum price variation of the limit order is no longer within the AL order price, then at step 15722, system 100 quotes the limit order at the limit order price and size equal to the limit order size. System 100 then publishes the quote at step 15724.

Figure 158:
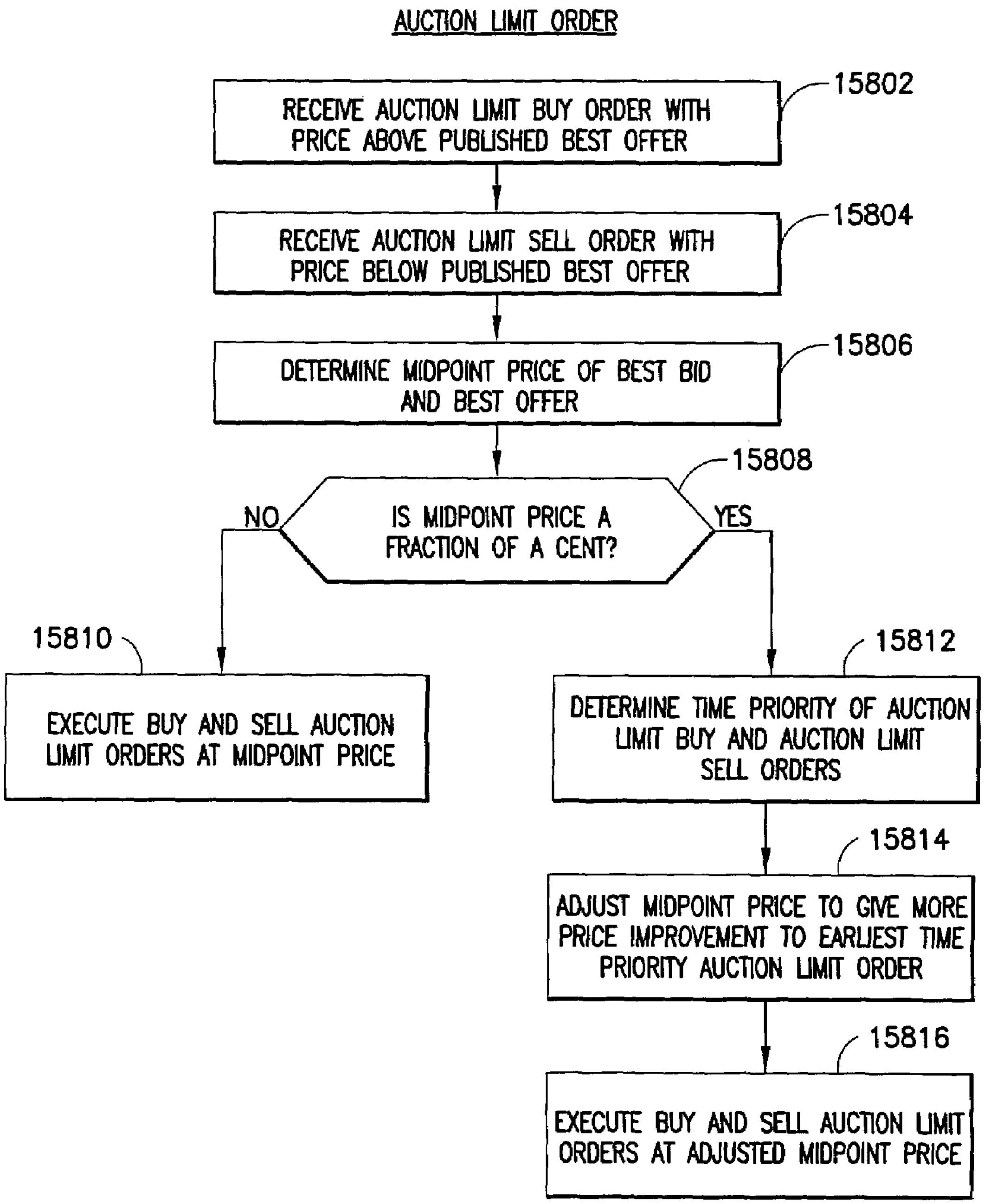

FIG. 158 illustrates an embodiment involving an Auction Limit Order. At step 15802, an Auction Limit (AL) order to buy is received with a limit price that is above the published best offer. At step 15804, an AL order to sell is received with a limit price that is below the published best bid. At step 15806, system 100 determines the mid-point price of the best bid and best offer.

At step 15808, system 100 determines whether the mid-point price is a fraction of a cent, and if not, at step 15810 executes the buy and sell AL orders at the mid-point price.

If at step 15808, system 100 determines that the mid-point price is a fraction of a cent, then at step 15812, system 100 determines the time priority of the AL buy and sell orders, and then at step 15814 adjusts the mid-point price to the next even cent so as to give price improvement to the earliest time AL order. At step 15816, system 100 executes the buy and sell AL orders at the adjusted mid-point price.

Figure 159:
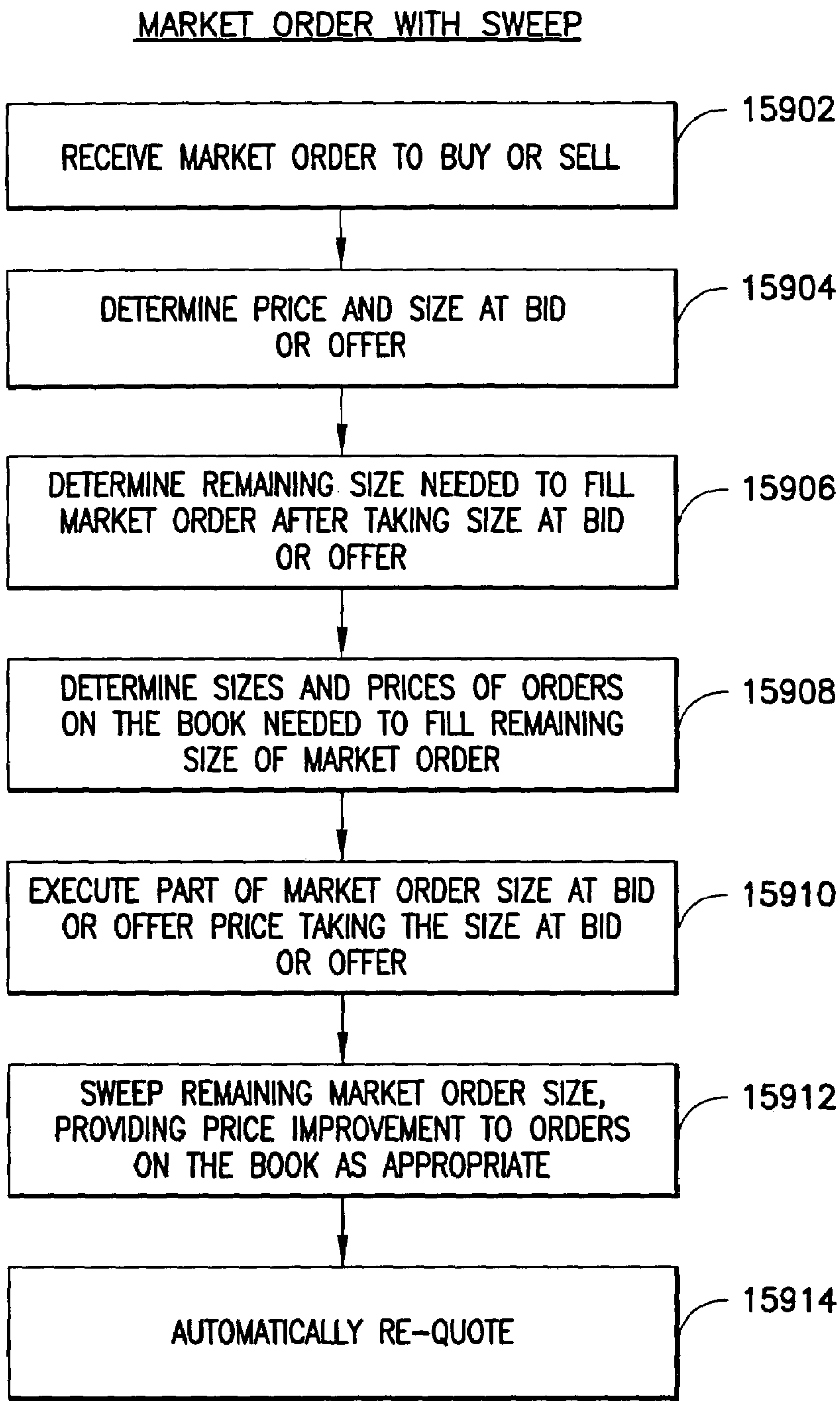

FIG. 159 illustrates an embodiment involving a market order with a sweep. At step 15902, system 100 receives a market order to buy or sell, and at step 15904, system 100 determines the price and size at the corresponding offer or bid.

At step 15906, system 100 determines whether the market order can be filled at the offer or bid, and if it can not then the remaining size that is needed to fill the market order.

At step 15908, system 100 determines the sizes and prices of orders on the order display book that will be needed to fill the remaining size of the market order.

At step 15910, system 100 executes all or part of the market order at the bid or offer price, either filling the market order, or taking all of the size of the bid or offer.

At step 15912, system 100 sweeps the remaining market order size against the orders on the order display book. The sweep price is the price needed to completely fill the market order, and this may provide price improvement to some of the orders on the order display book that are between the sweep price and the bid or offer price.

At step 15914, system 100 automatically re-quotes the order display book.

Figure 160:
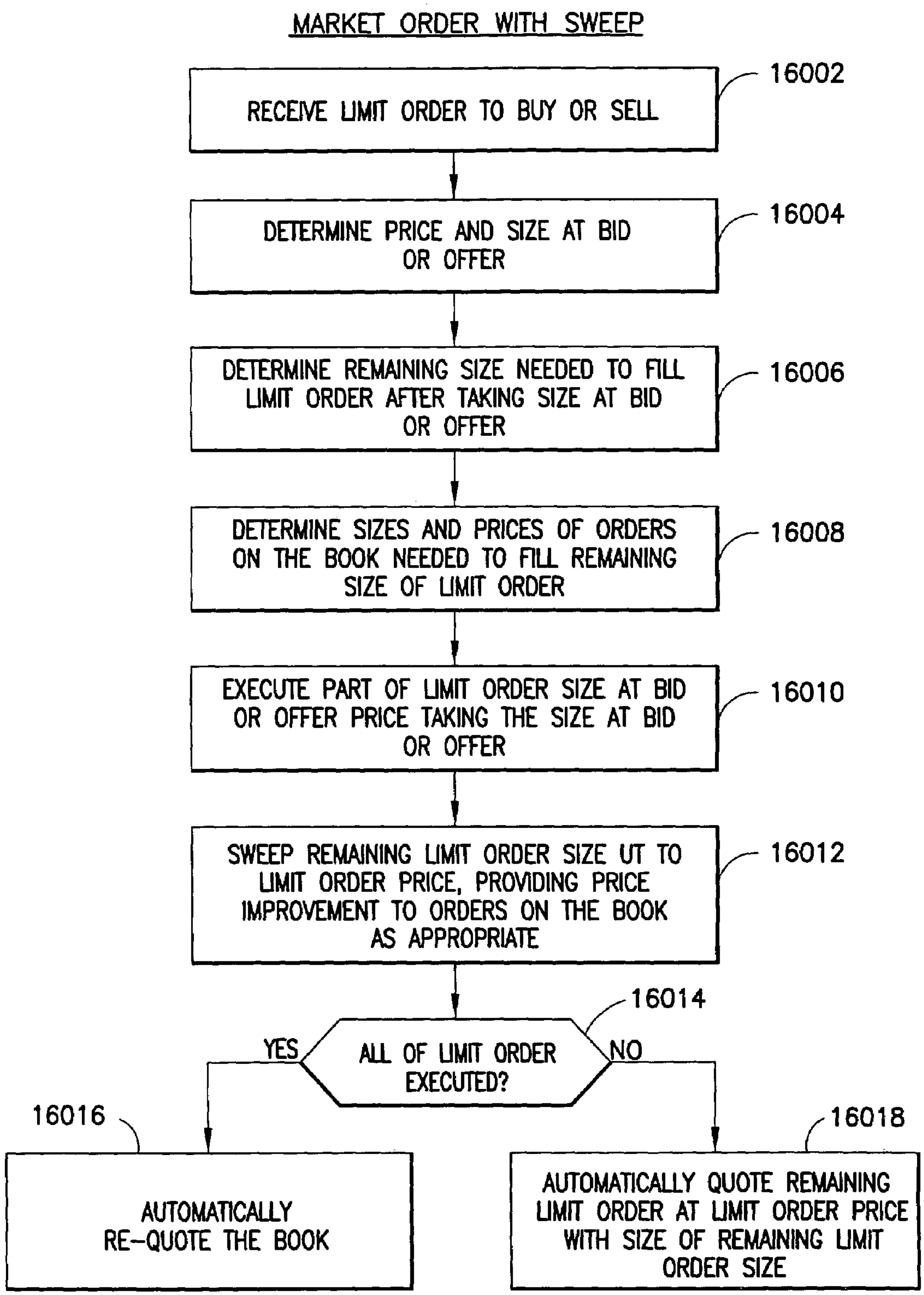

FIG. 160 illustrates an embodiment involving a limit order with a sweep. At step 16002, system 100 receives a marketable limit order to buy or sell, and at step 16004 system 100 determines the price and size at the corresponding offer or bid.

At step 16006, system 100 determines whether the limit order can be filled at the offer or bid, and if it can not then the remaining size that is needed in order to fill the limit order.

At step 16008, system 100 determines the sizes and prices of orders on the order display book that will be needed to fill the remaining size of the limit order.

At step 16010, system 100 executes all or part of the limit order at the bid or offer price, either filling the limit order, or taking all of the size of the bid or offer.

At step 16012, system 100 sweeps the remaining limit order size against the orders on the order display book. The sweep price is the price needed to completely fill the limit order, and this may provide price improvement to some of the orders on the order display book that are between the sweep price and the bid or offer price.

At step 16014, system 100 determines whether all of the limit order is executed and if it was, at step 16016 system 100 automatically re-quotes the order display book.

If at step 16014 system 100 determines that all of the limit order was not executed, then at step 16018, system 100 automatically quotes the limit order at the limit order price with size of the remaining limit order size.

Figure 161:
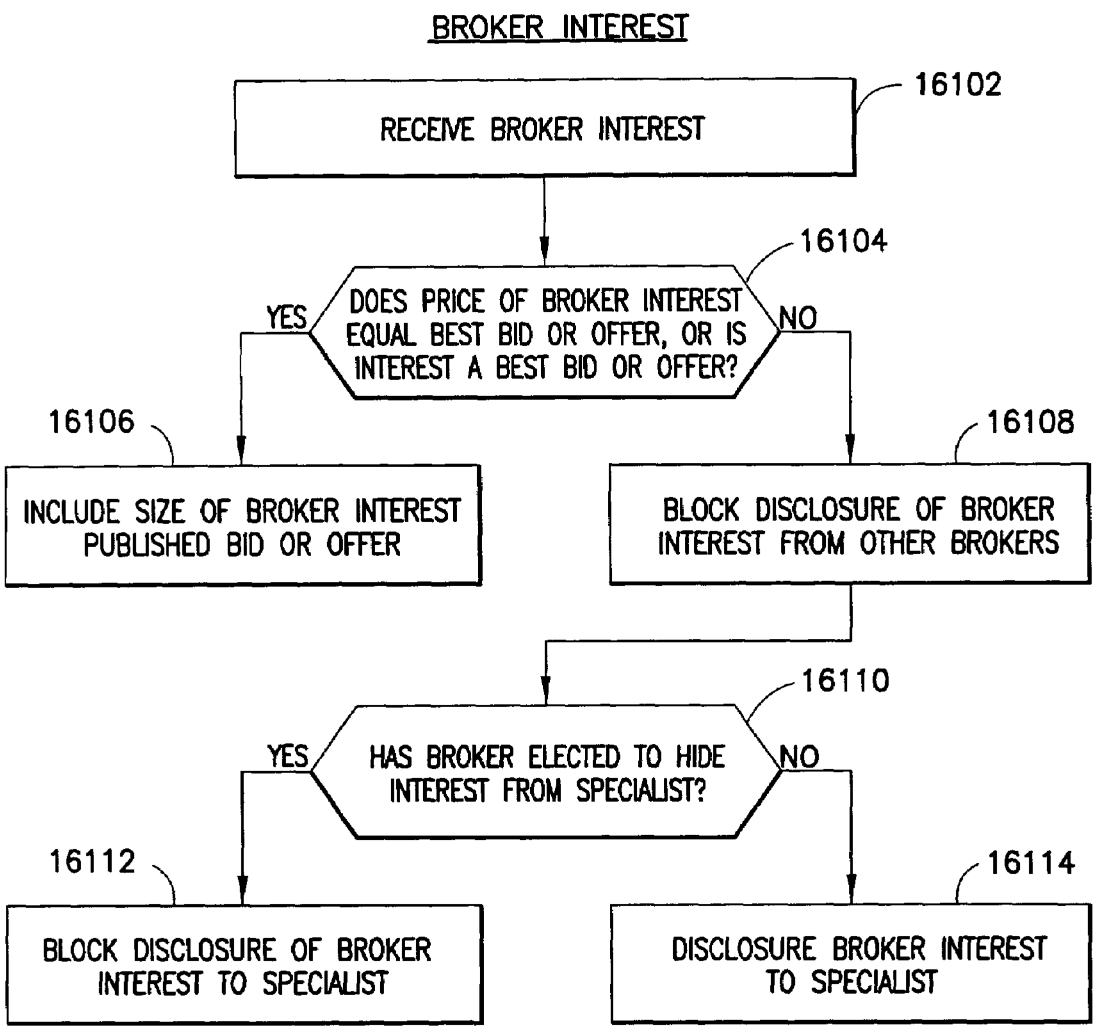

FIG. 161 illustrates an embodiment involving broker interest. At step 16102, system 100 receives broker interest to buy or sell at a particular price with a particular size.

At step 16104, system 100 determines whether the price of the broker interest is equal to the best bid or offer, or whether it is a new best bid or offer. If so, then at step 16106, system 100 either includes the broker interest in the best bid or offer, or publishes the broker interest as the best bid or offer.

If the broker interest is not equal at the best bid or offer, then at step 16108, system 100 blocks disclosure of the broker interest from other brokers.

At step 16110, system 100 determines whether the broker has elected to hide the interest from the specialist, and if so, at step 16112, system 100 blocks disclosure to the specialist.

If the broker has not elected to block disclosure of the broker interest from the specialist, then at step 16114, system 100 discloses the broker interest to the specialist.

Figure 162:
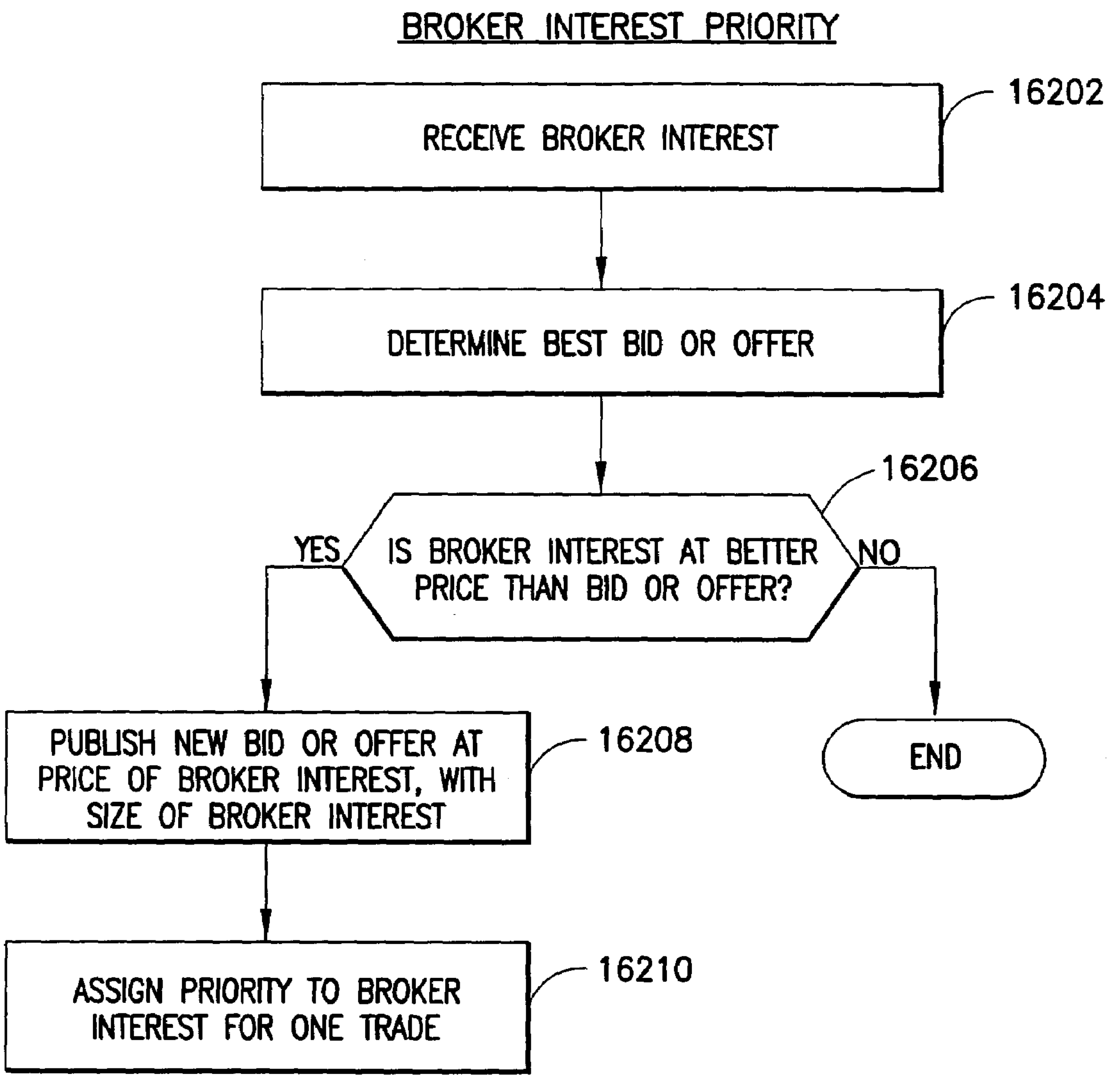

FIG. 162 illustrates an embodiment involving broker interest that gets priority. At step 16202 system 100 receives broker interest to buy or sell at a particular price with a particular size. At step 16204, system 100 determines the best bid or offer, and at step 16206, determines whether the broker interest is at a better price than the best bid or offer. If it is not, the process ends.

If the broker interest is a better price than the best bid or offer, then at step 16208, system 100 publishes a new bid or offer at the price of the broker interest, with a size of the broker interest. At step 16210, system 100 assigns priority to the broker interest for one trade.

Figure 163:
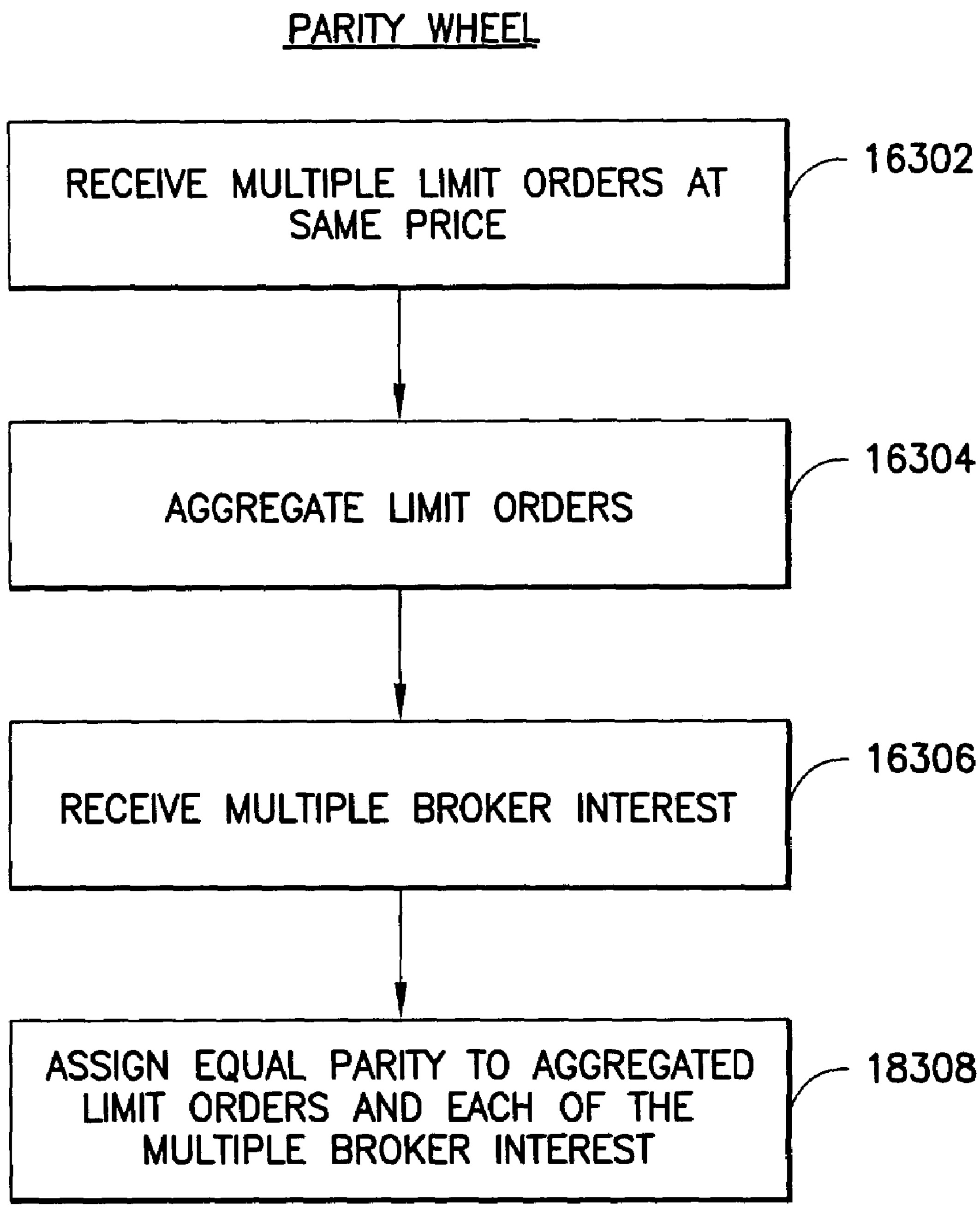

FIG. 163 illustrates an embodiment involving parity of broker interest with limit orders. At step 16302, system 100 receives multiple limit orders at the same price. At step 16304, system 100 aggregates the limit orders all at the same price.

At step 16306, system 100 receives multiple broker interest at the same price, and at step 16308, system 100 assigns equal parity to the aggregated limit orders and each of the multiple broker interests.

Figure 164:
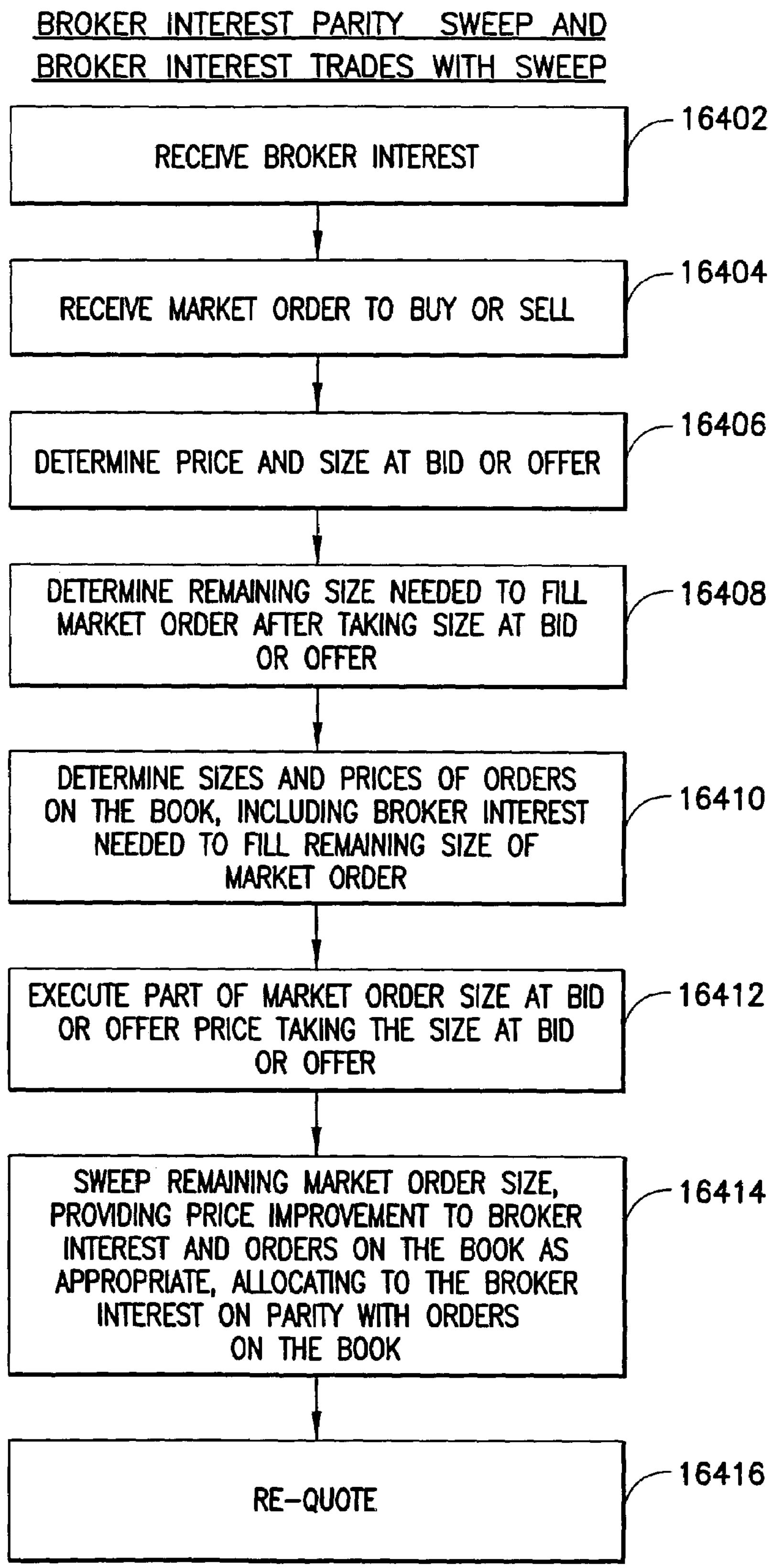

FIG. 164 illustrates an embodiment involving broker interest, parity and a sweep. At step 16402, system 100 receives broker interest, and at step 16404, system 100 receives a market order to buy or sell. At step 16406, system 100 determines the price and size at the bid or offer.

At step 16408, system 100 determines whether the market order can be filled at the offer or bid, and if it can not then the remaining size that is needed in order to fill the market order.

At step 16410, system 100 determines the sizes and prices of orders on the order display book, including broker interest, that will be needed to fill the remaining size of the market order.

At step 16412, system 100 executes all or part of the market order at the bid or offer price, either filling the market order, or taking all of the size of the bid or offer.

At step 16414, system 100 sweeps the remaining market order size against the orders on the order display book and broker interest. The sweep price is the price needed to completely fill the market order, and this may provide price improvement to some of the orders on the order display book that are between the sweep price and the bid or offer price. Broker interest receives allocation on parity with orders on the order display book.

At step 16416, system 100 automatically re-quotes the order display book.

Figure 165:
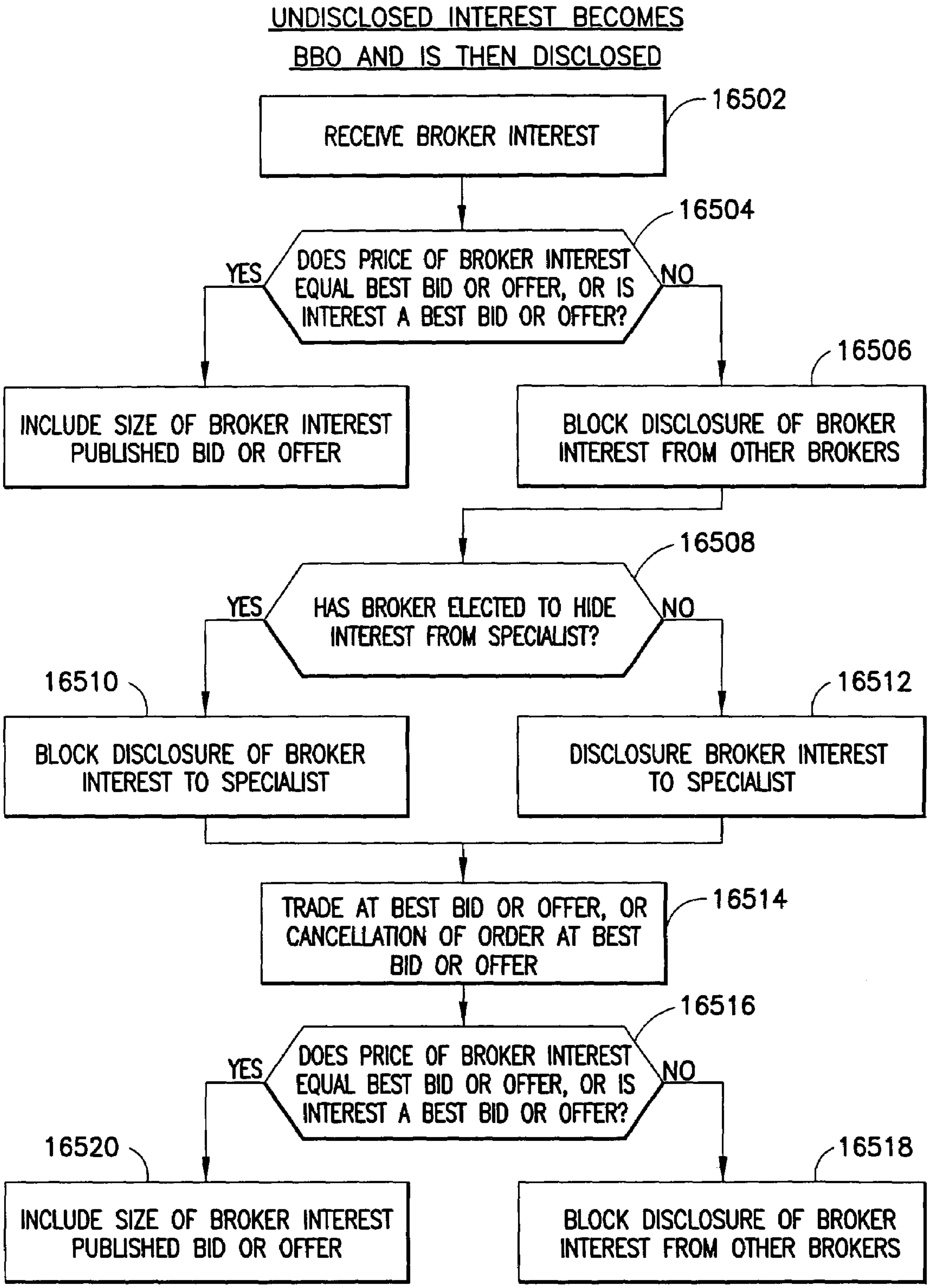

FIG. 165 illustrates an embodiment involving undisclosed broker interest that becomes the best bid or offer and is then disclosed. At step 16502, system 100 receives broker interest, and at step 16504, determines whether the price of the broker interest is equal to the best bid or offer, or whether the broker interest is a new best bid or offer. If the broker interest is not a new best bid or offer or equal to the best bid or offer, then at step 16506, system 100 blocks disclosure of the broker interest from other brokers.

At step 16508, system 100 determines whether the broker has elected to hide the interest from the specialist, and if so, at step 16510, system 100 blocks disclosure to the specialist. If the broker has not elected to block disclosure of the interest from the specialist, then at step 16512, system 100 discloses the broker interest to the specialist.

At step 16514, system 100 executes a trade at the best bid or offer, or cancels an order at the best bid or offer.

At step 16516, system 100 determines whether the price of the broker interest is equal to the best bid or offer, or whether the broker interest is a new best bid or offer. If the broker interest is not a new best bid or offer or equal to the best bid or offer, then at step 16518, system 100 blocks disclosure of the broker interest from other brokers. If the broker interest is a new best bid or offer or equal to the best bid or offer, then at step 16520, system 100 includes the size of the broker interest in the published bid or offer.

Figures 166, 166A:
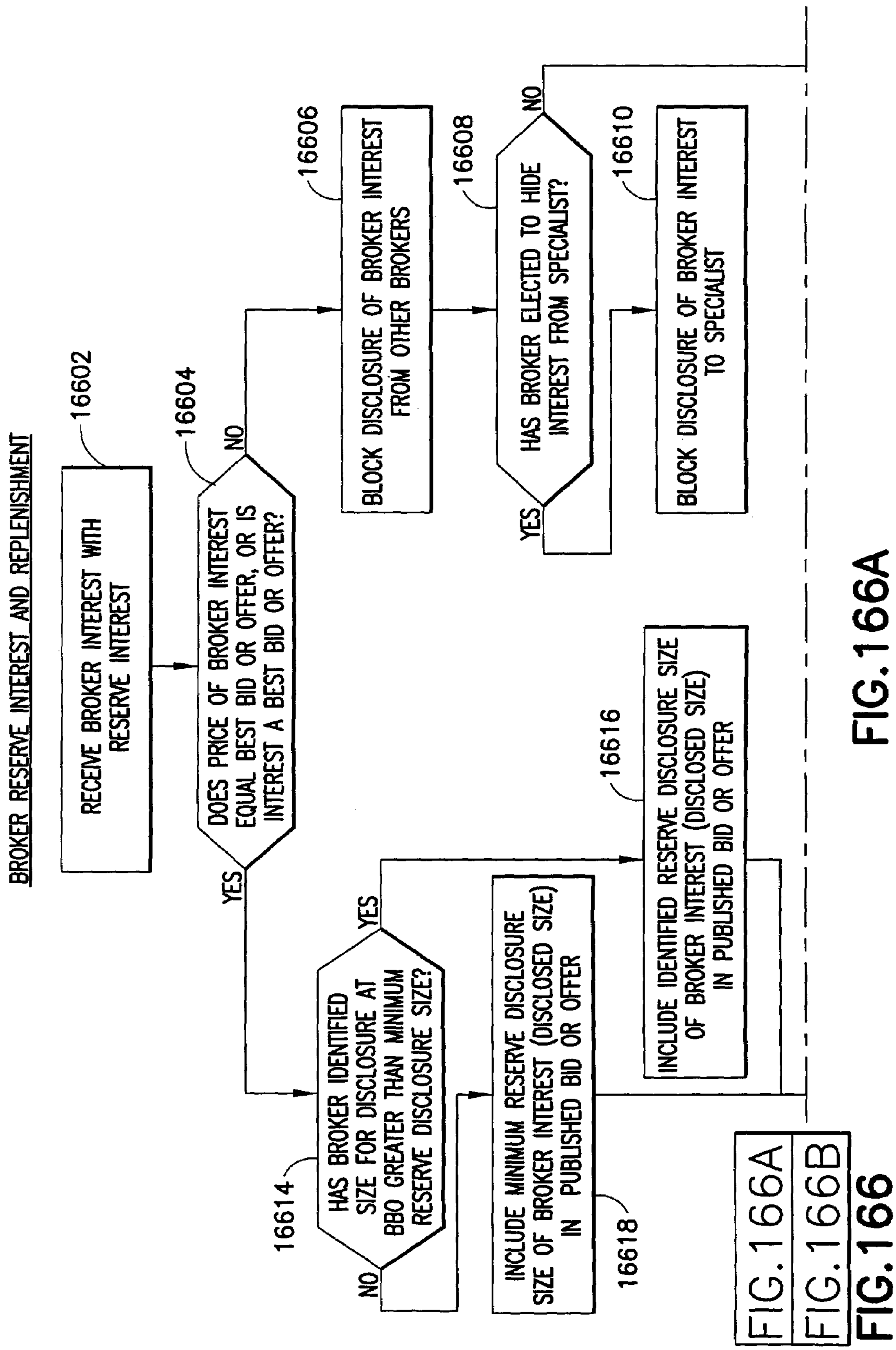
Figure 166B:
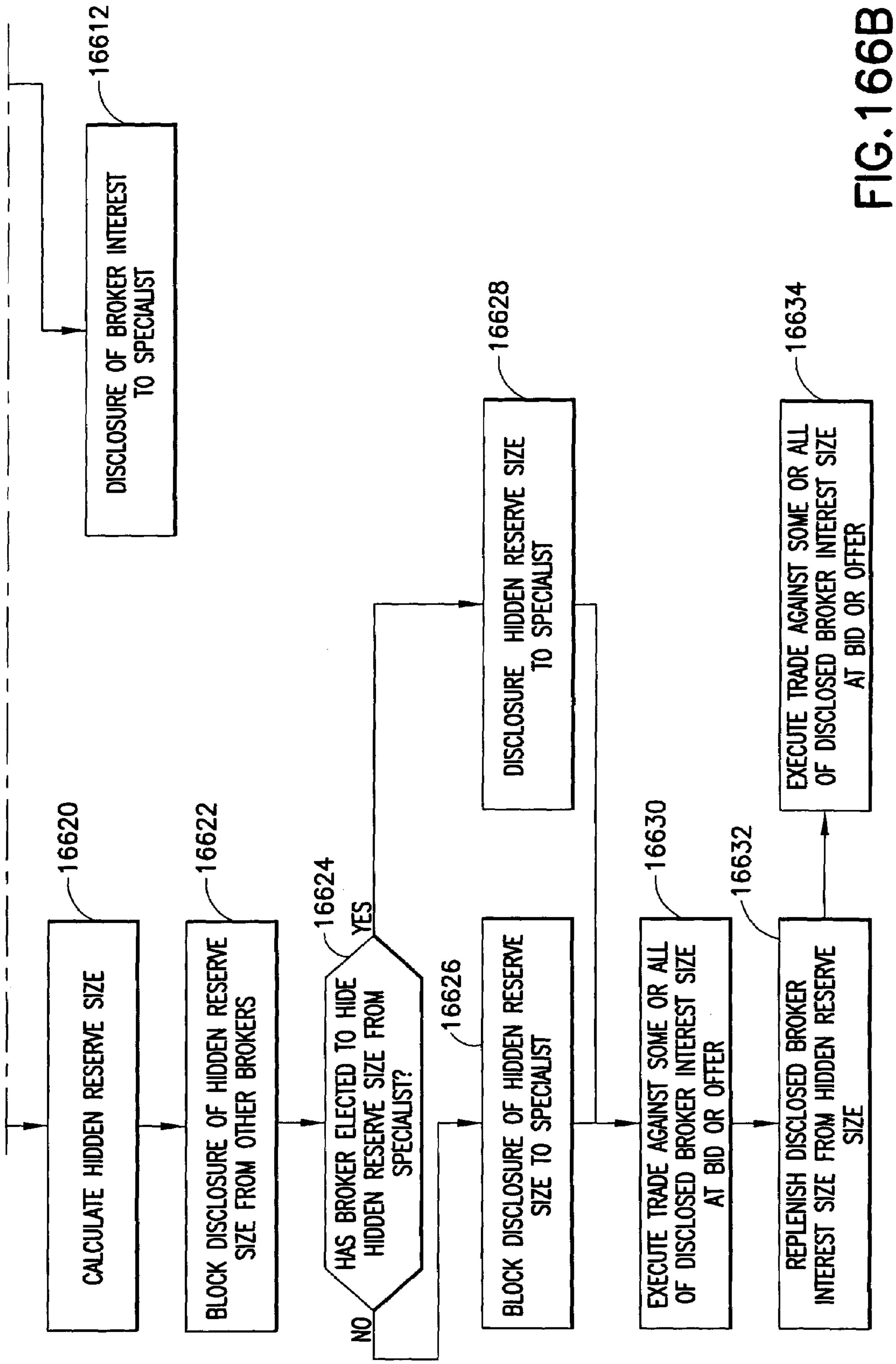

FIG. 166 illustrates an embodiment involving broker interest with reserve and replenishment from the reserve. At step 16602, system 100 receives broker interest with reserve interest, and at step 16604, determines whether the price of the broker interest is equal to the best bid or offer, or whether the broker interest is a new best bid or offer. If the broker interest is not a new best bid or offer or equal to the best bid or offer, then at step 16606, system 100 blocks disclosure of the broker interest from other brokers.

At step 16608, system 100 determines whether the broker has elected to hide the interest from the specialist, and if so, at step 16610, system 100 blocks disclosure to the specialist.

If the broker has not elected to block disclosure of the interest from the specialist, then at step 16612, system 100 discloses the broker interest to the specialist.

If at step 16604, system 100 determines that the broker interest is a new best bid or offer or equal to the best bid or offer, then at step 16614, system 100 determines whether the broker has identified size for disclosure at the best bid or best offer that is greater than the minimum reserve disclosure size. If the broker has identified size for disclosure at the best bid or best offer that is greater than the minimum reserve disclosure size, then at step 16616, system 100 discloses the broker identified size in the published bid or offer. Otherwise, at step 16618, system 100 discloses the minimum reserve disclosure size in the published bid or offer.

At step 16620, system 100 calculates the hidden reserve size of the broker interest, and at step 16622, system 100 blocks disclosure of the hidden reserve size from other brokers.

At step 16624, system 100 determines whether the broker has elected to hide the hidden reserve size from the specialist, and at steps 16626 and 16628 either blocks or discloses the hidden reserve size from the specialist.

At step 16630, system 100 executes a trade against some or all of the disclosed broker interest at the bid or offer price, and at step 16632, system 100 replenishes the disclosed broker interest from the hidden reserve, so as to restore the disclosed size to either the minimum reserve disclosure size, or broker identified reserve disclosure size (as determined at step 16614).

At step 16634, system 100 executes a trade against some or all of the disclosed broker interest size at the bid or offer.

Figure 167:
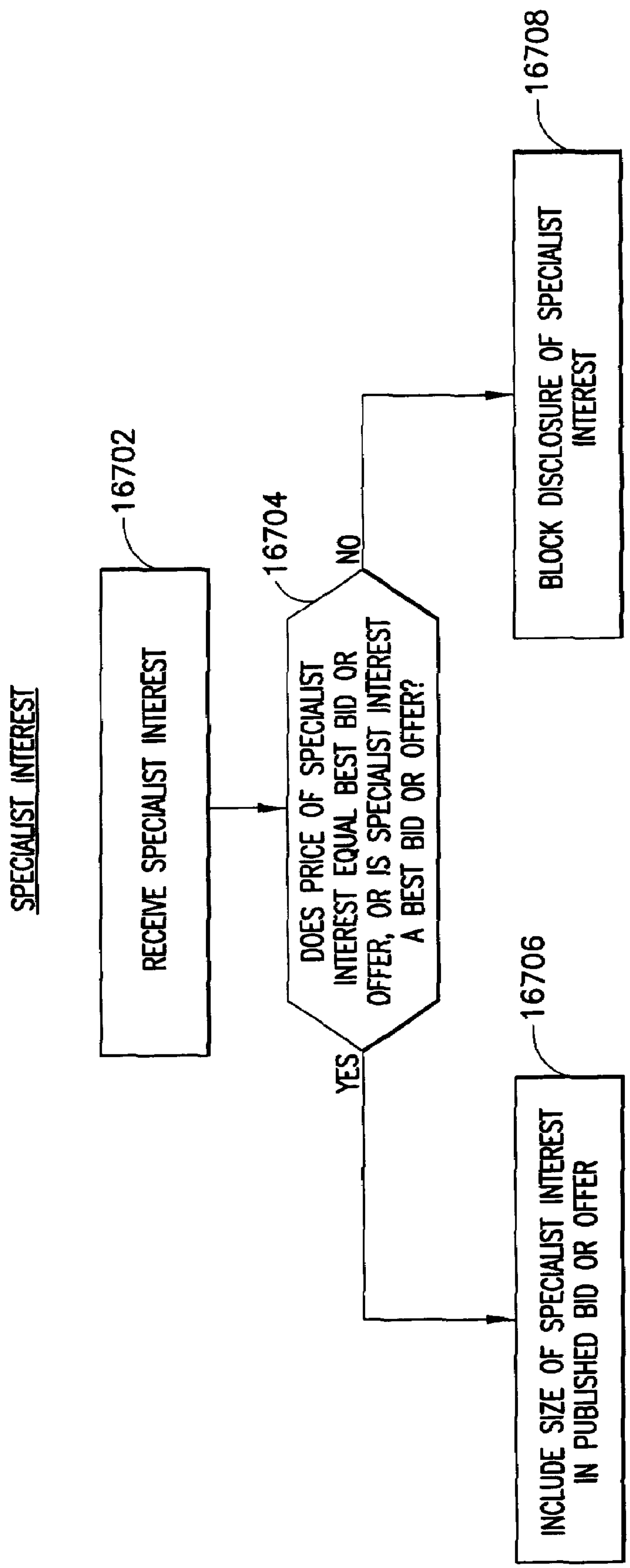

FIG. 167 illustrates an embodiment involving specialist interest. At step 16702, system 100 receives specialist interest, and at step 16704, system 100 determines whether the price of the specialist interest is a new best bid or offer or equal to the best bid or offer. If the specialist interest is a new best bid or offer or equal to the best bid or offer, then at step 16706, system 100 includes the size of the specialist interest in the published bid or offer. Otherwise, at step 16708, system 100 blocks disclosure of the specialist interest.

Figure 168:
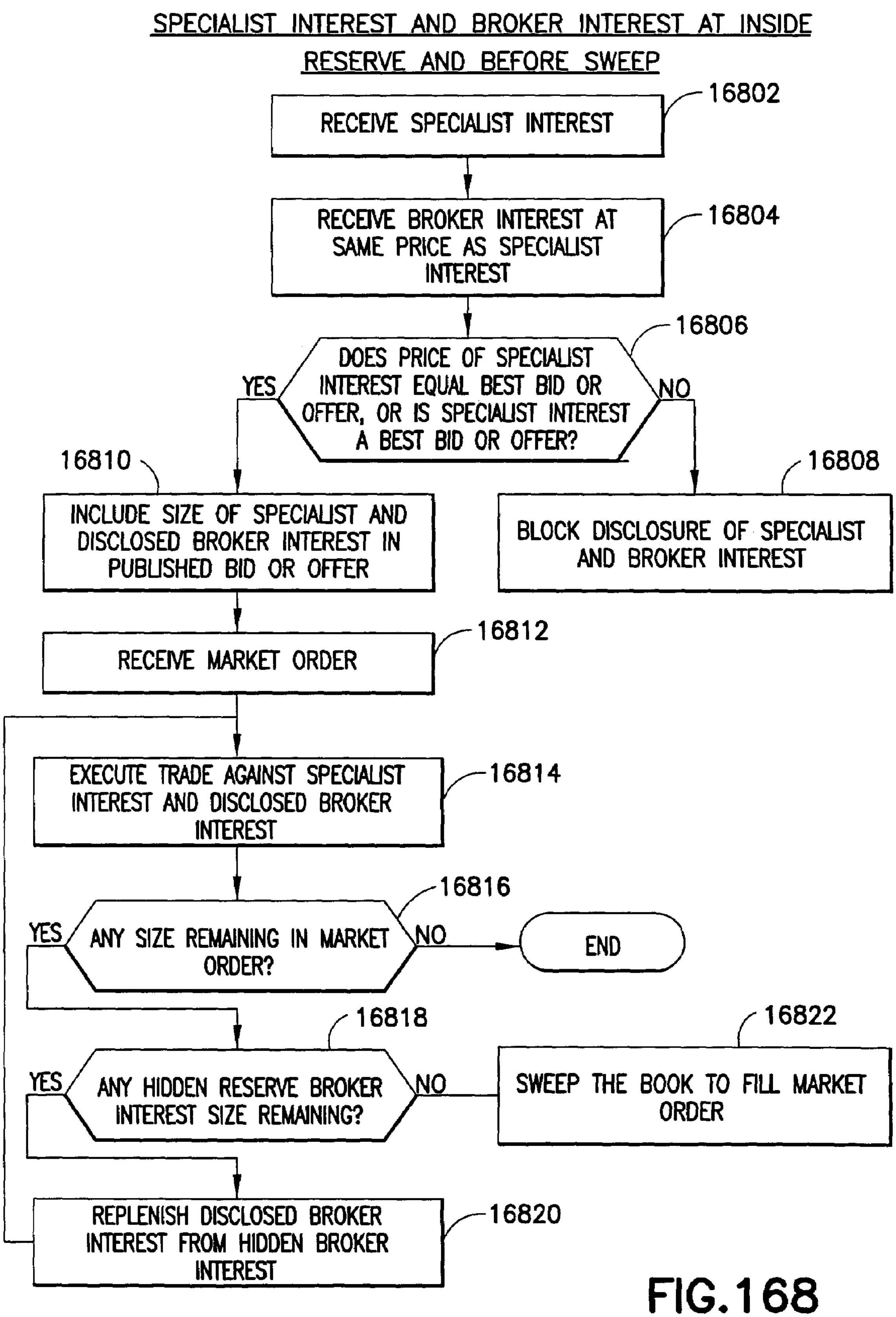

FIG. 168 illustrates an embodiment involving specialist interest and broker interest at the inside, with reserve before and after a sweep. At step 16802, system 100 receives specialist interest, and at step 16804, system 100 receives broker interest at the same price as the specialist interest.

At step 16806, system 100 determines whether the price of the specialist interest is a new best bid or offer or equal to the best bid or offer. If the specialist interest is not a new best bid or offer or equal to the best bid or offer, then at step 16808, system 100 blocks disclosure of the specialist interest. Otherwise, at step 16810, system 100 includes the size of the specialist interest and disclosed broker interest in the published bid or offer.

At step 16812, system 100 receives a market order, and at step 16814, executes a trade of the market order against the specialist interest and disclosed broker interest.

At step 16816, system 100 determines whether any size remains in the market order, and if not ends. If size remains in the market order, then at step 16818, system 100 determines whether there is any size remaining in hidden reserve broker interest. If so, at step 16820 system 100 replenishes the disclosed broker interest from the hidden broker interest, and loops to step 16814. If there is no size remaining in hidden reserve broker interest, then at step 16822 system 100 sweeps the order display book to fill the market order.

Figures 169, 169A:
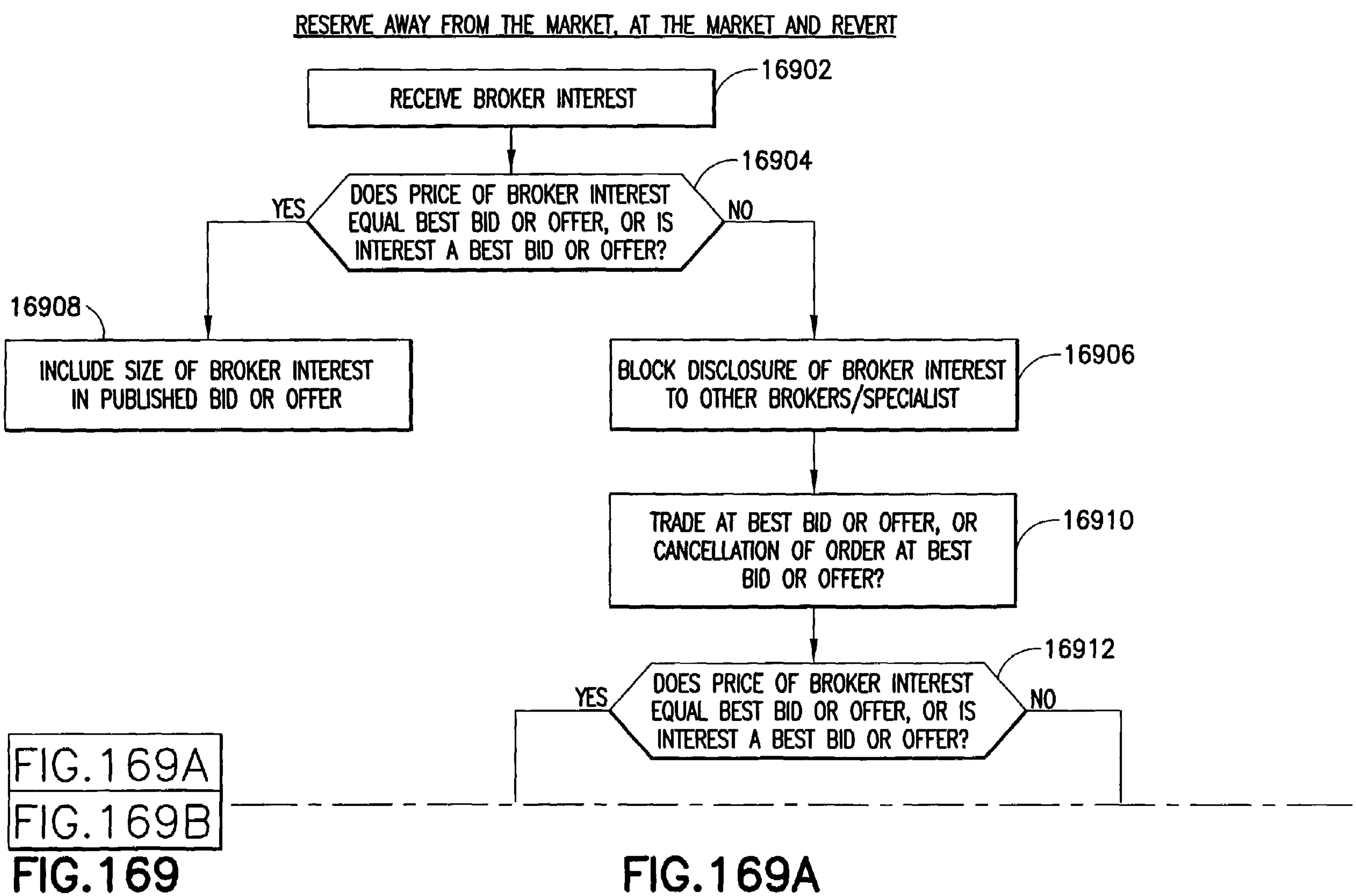
Figure 169B:
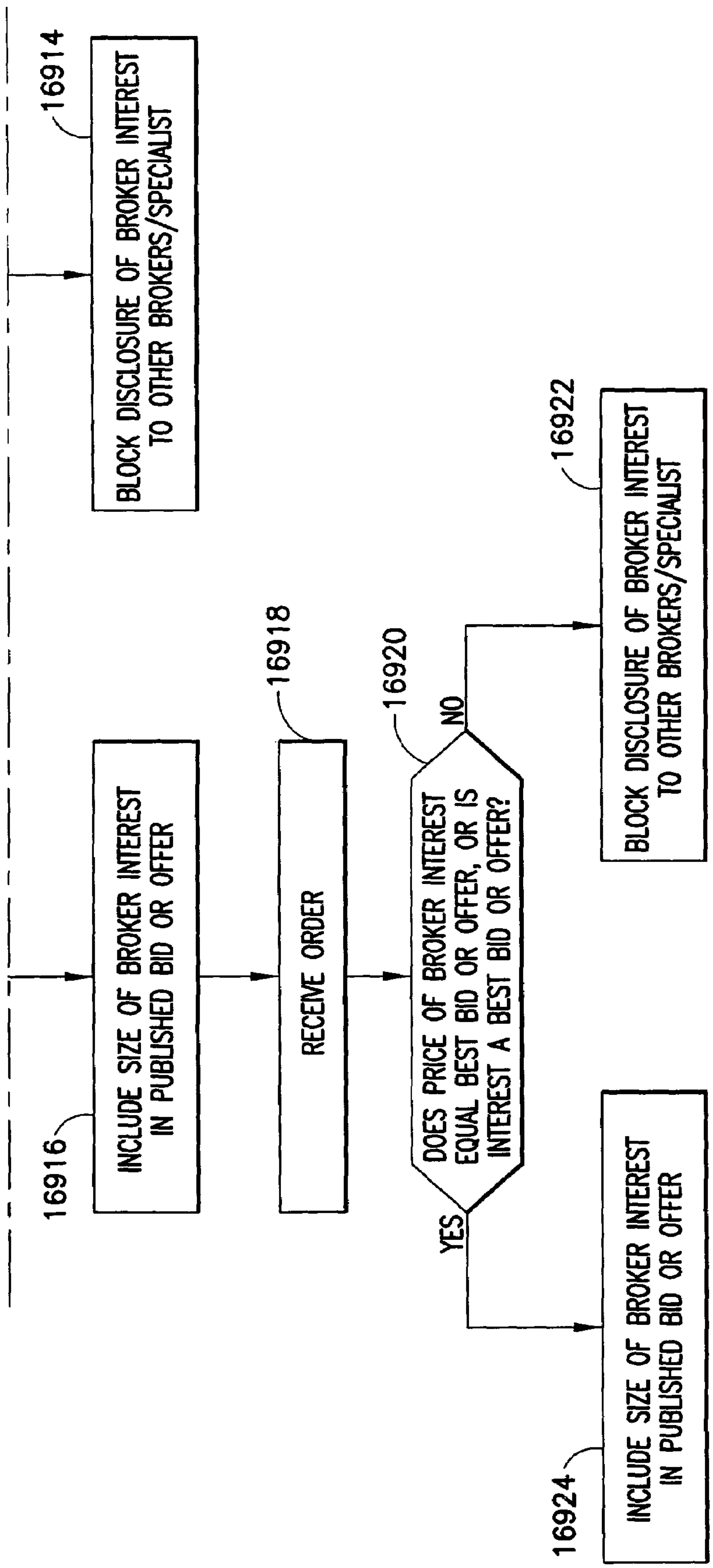

FIG. 169 illustrates an embodiment involving broker reserve interest away from the market, then at the market and then away from the market. At step 16902, system 100 receives broker interest, and at step 16904 determines whether the broker interest is a new best bid or offer or equal to the best bid or offer. If the broker interest is not a new best bid or offer or equal to the best bid or offer, then at step 16906, system 100 blocks disclosure of the broker interest. Otherwise, at step 16908, system 100 includes the size of the broker interest in the published bid or offer.

At step 16910, system 100 executes a trade at the best bid or offer, or cancels an order at the best bid or offer.

At step 16912, system 100 determines whether the broker interest is a new best bid or offer or equal to the best bid or offer. If the broker interest is not a new best bid or offer or equal to the best bid or offer, then at step 16914, system 100 blocks disclosure of the broker interest. Otherwise, at step 16916, system 100 includes the size of the broker interest in the published bid or offer.

At step 16918, system 100 receives a limit order, and at step 16920, system 100 determines whether the broker interest is a new best bid or offer or equal to the best bid or offer. If the broker interest is not a new best bid or offer or equal to the best bid or offer, then at step 16922, system 100 blocks disclosure of the broker interest. Otherwise, at step 16924, system 100 includes the size of the broker interest in the published bid or offer.

Figure 170:
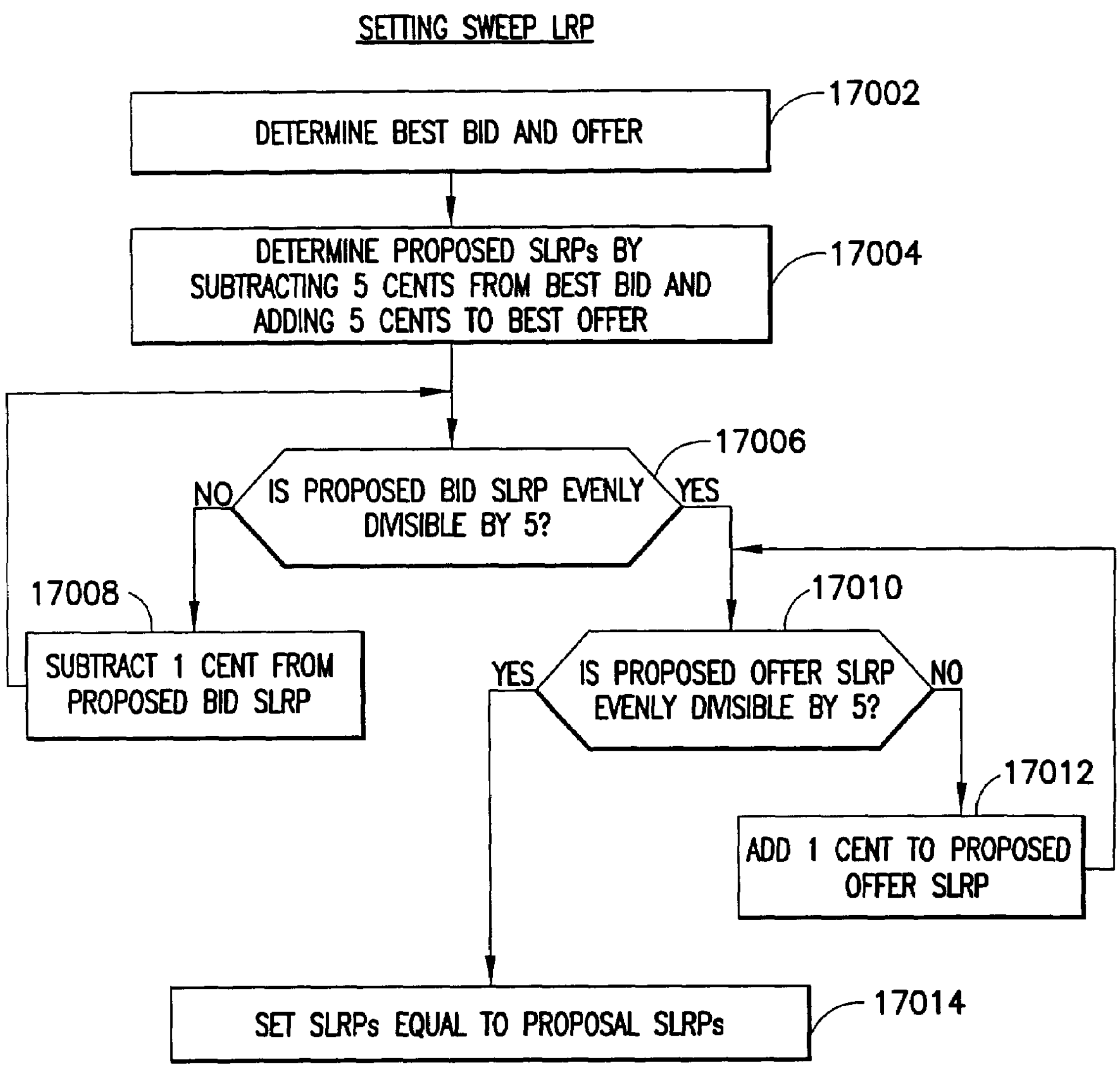

FIG. 170 illustrates an embodiment involving a Sweep LRP. At step 17002, system 100 determines the best bid and best offer, and at 17004 determines proposed Sweep LRPs for the bid and offer using the best bid and best offer. The proposed upper Sweep LRP, or Offer Sweep LRP, is determined by adding 5 cents to the best offer, while the proposed lower Sweep LRP, or Bid Sweep LRP, is determined by subtracting 5 cents from the best bid.

At step 17006, system 100 determines whether the proposed Bid Sweep LRP is evenly divisible by 5, and if not then at step 17008, system 100 subtracts 1 cent from the proposed Bid Sweep LRP and loops to step 17006 to check again. If system 100 determines that the proposed Bid Sweep LRP is evenly divisible by 5 then at step 17010, system 100 determines whether the proposed Offer Sweep LRP is evenly divisible by 5, and if not then at step 17012, system 100 adds 1 cent to the proposed Offer Sweep LRP and loops to step 17010 to check again. If system 100 determines that the proposed Offer Sweep LRP is evenly divisible by 5, then at step 17014, system 100 sets the Sweep LRPs equal to the proposed Sweep LRPs.

Figure 171:
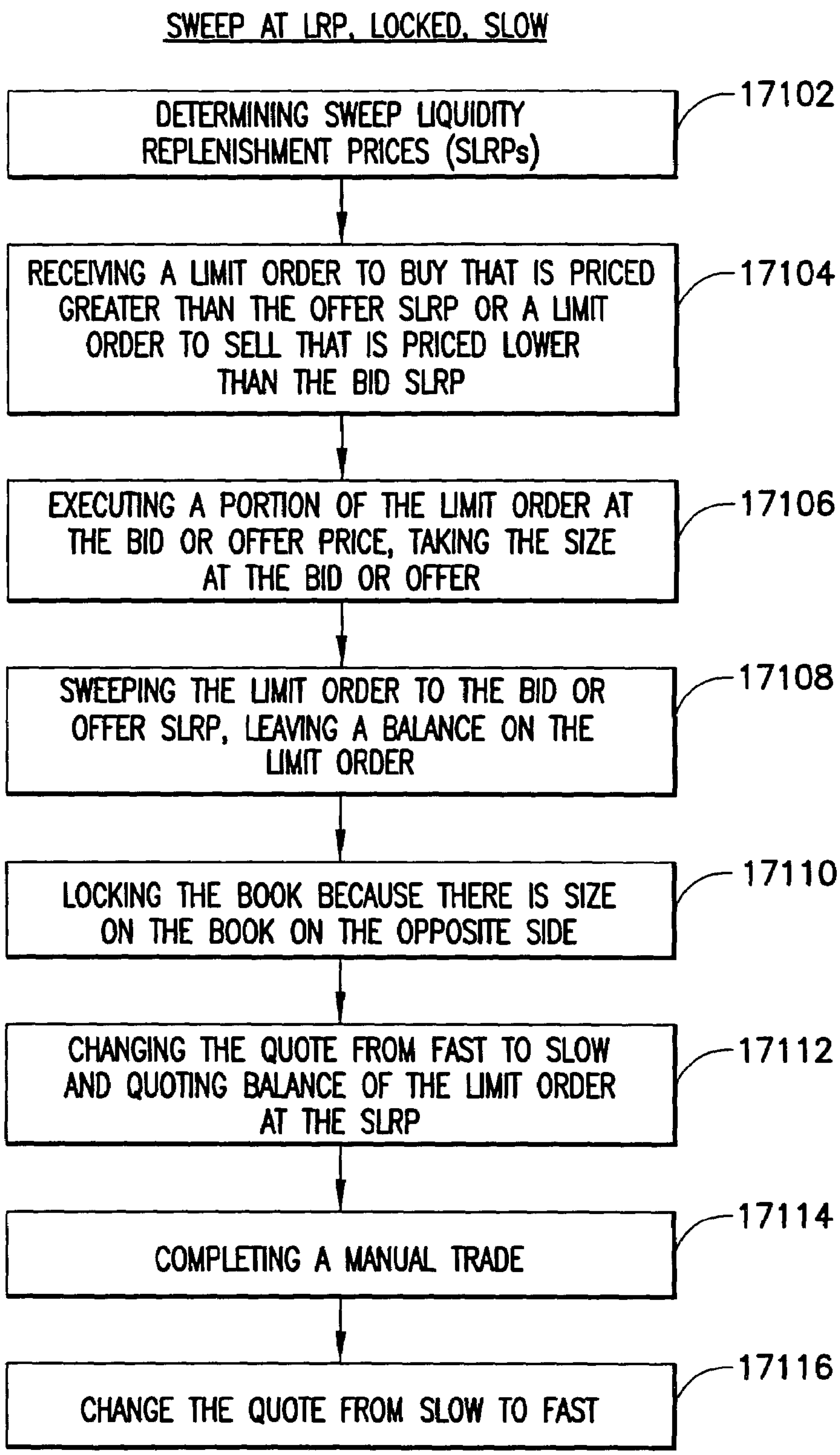

FIG. 171 illustrates an embodiment involving a sweep at the LRP with a locked order display book and slow quote. At step 17102, system 100 determines the Sweep LRPs, such as illustrated in FIG. 170. At step 17104, system 100 receives a limit order to buy that is priced greater than the Offer Sweep LRP, or a limit order to sell that is priced less than the Bid Sweep LRP. The limit order size is greater than the size of the bid or offer that it would trade against.

At step 17106, system 100 executes a portion of the limit order at the bid or offer price, taking the size at the bid or offer. At step 17108, system 100 sweeps the limit order against orders on the order display book up to the Sweep LRP, leaving a balance on the limit order. The sweep also leaves a balance on the order display book opposite the limit order. This causes system 100 to lock the order display book at step 17110 because of the orders on both sides at the same price.

At step 17112, system 100 changes the quote from fast to slow and quotes the balance of the limit order at the Sweep LRP. At step 17114, the specialist completes a manual trade, and at step 17116, system 100 automatically changes the quote from slow to fast.

Figure 172:
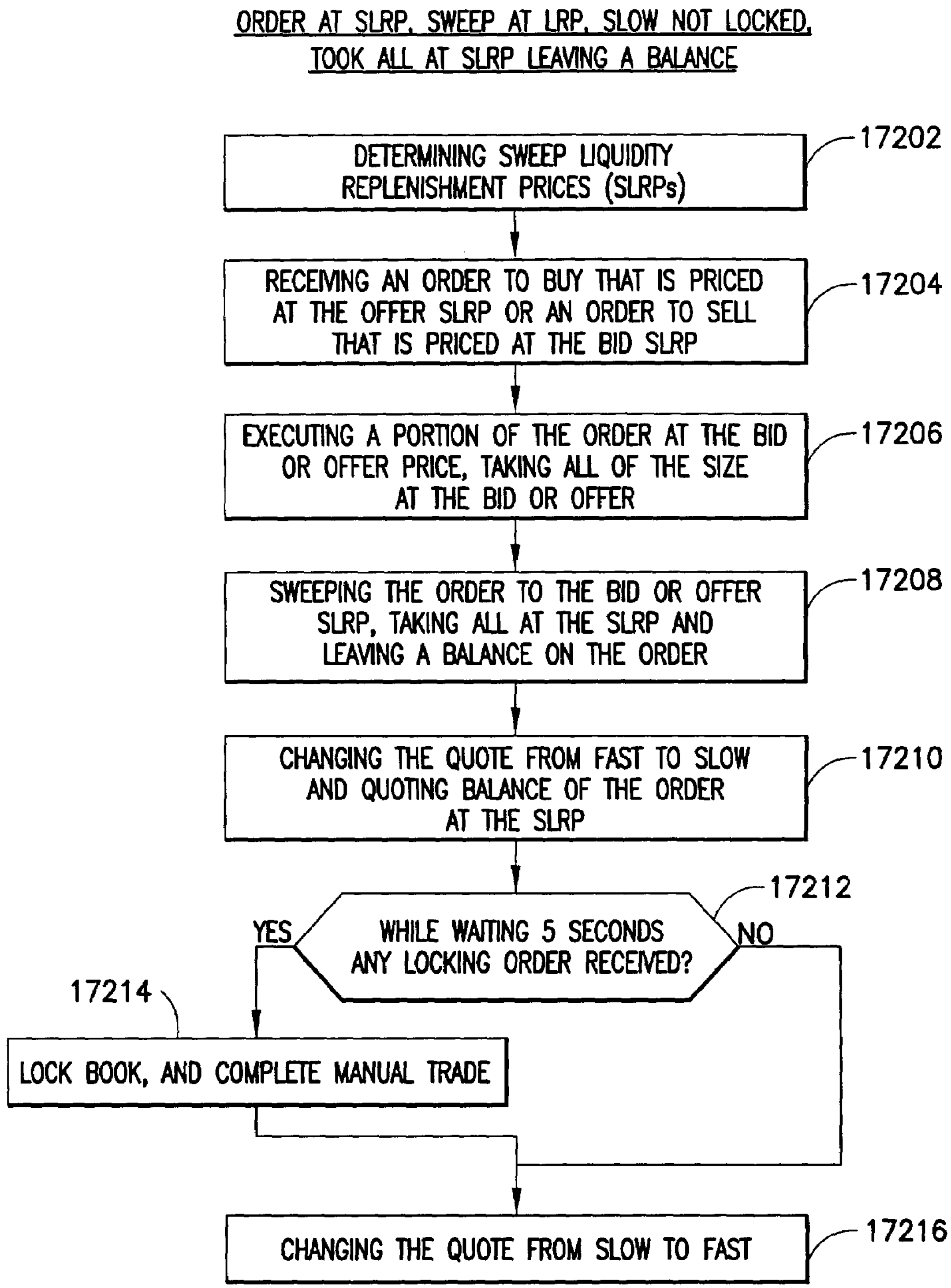

FIG. 172 illustrates an embodiment involving an order priced at the Sweep LRP, a sweep at the Sweep LRP, no lock, with a slow quote. At step 17202, system 100 determines the Sweep LRPs, such as illustrated in FIG. 170. At step 17204, system 100 receives a limit order to buy that is priced at the Offer Sweep LRP, or a limit order to sell that is priced at the Bid Sweep LRP. The limit order size is greater than the size of the bid or offer that it would trade against.

At step 17206, system 100 executes a portion of the limit order at the bid or offer price, taking all of the size at the bid or offer. At step 17208, system 100 sweeps the limit order against orders on the order display book up to the Sweep LRP, taking all of the size at the Sweep LRP, and leaving a balance on the limit order.

At step 17210, system 100 changes the quote from fast to slow and quotes the balance of the limit order at the Sweep LRP. System 100 starts a 5 second clock when the quote is changed from fast to slow, and at step 17212, system 100 determines whether any locking orders are received during the 5 second clock. If so, then at step 17214, system 100 locks the order display book and waits for the specialist to complete a manual trade and then the quote automatically changes from slow to fast. If no locking order is received during the 5 second clock, then at step 17216, system 100 automatically changes the quote from slow to fast.

Figure 173:
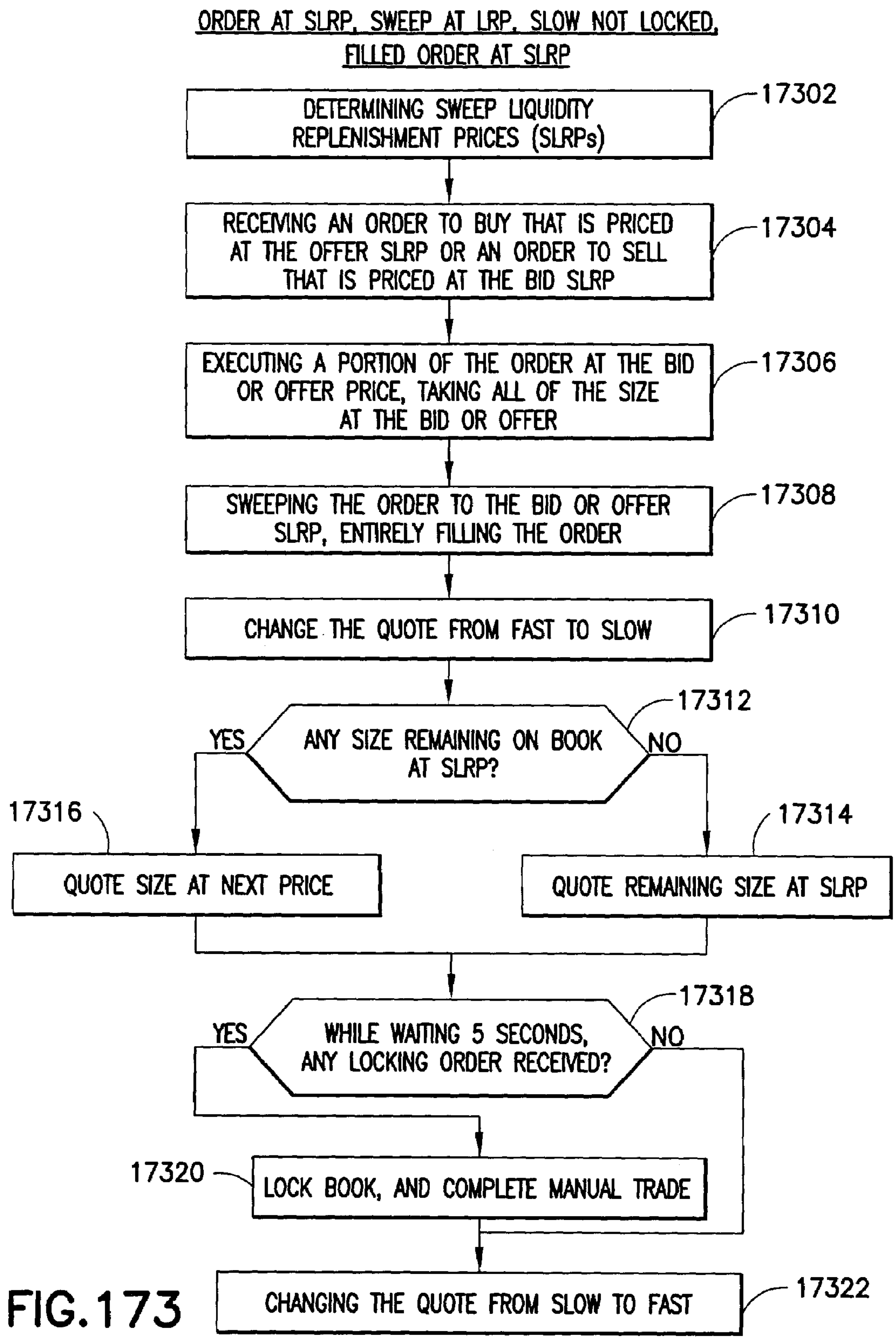

FIG. 173 illustrates an embodiment involving an order at the Sweep LRP, with a sweep to the Sweep LRP, a slow quote and the order filled at the Sweep LRP. At step 17302, system 100 determines the Sweep LRPs, such as illustrated in FIG. 170. At step 17304, system 100 receives a limit order to buy that is priced at the Offer Sweep LRP, or an order to sell that is priced at the Bid Sweep LRP. The limit order size is greater than the size of the bid or offer that it would trade against.

At step 17306, system 100 executes a portion of the limit order at the bid or offer price, taking all of the size at the bid or offer. At step 17308, system 100 sweeps the limit order against orders on the order display book up to the Sweep LRP, completely filling the limit order. At step 17310, system 100 changes the quote from fast to slow.

At step 17312, system 100 determines whether there is any size remaining on the order display book at the Sweep LRP. If so, then at step 17314, system 100 quotes the remaining size at the Sweep LRP, and starts a 5 second clock. If there is no size remaining on the order display book at the Sweep LRP, then at step 17316, system 100 quotes the size at the next best price and starts a 5 second clock.

At step 17318, system 100 determines whether any locking orders are received during the 5 second clock. If so, then at step 17320, system 100 locks the order display book and waits for the specialist to complete a manual trade and then the quote automatically changes from slow to fast. If no locking order is received during the 5 second clock, then at step 17322, system 100 automatically changes the quote from slow to fast.

Figure 174:
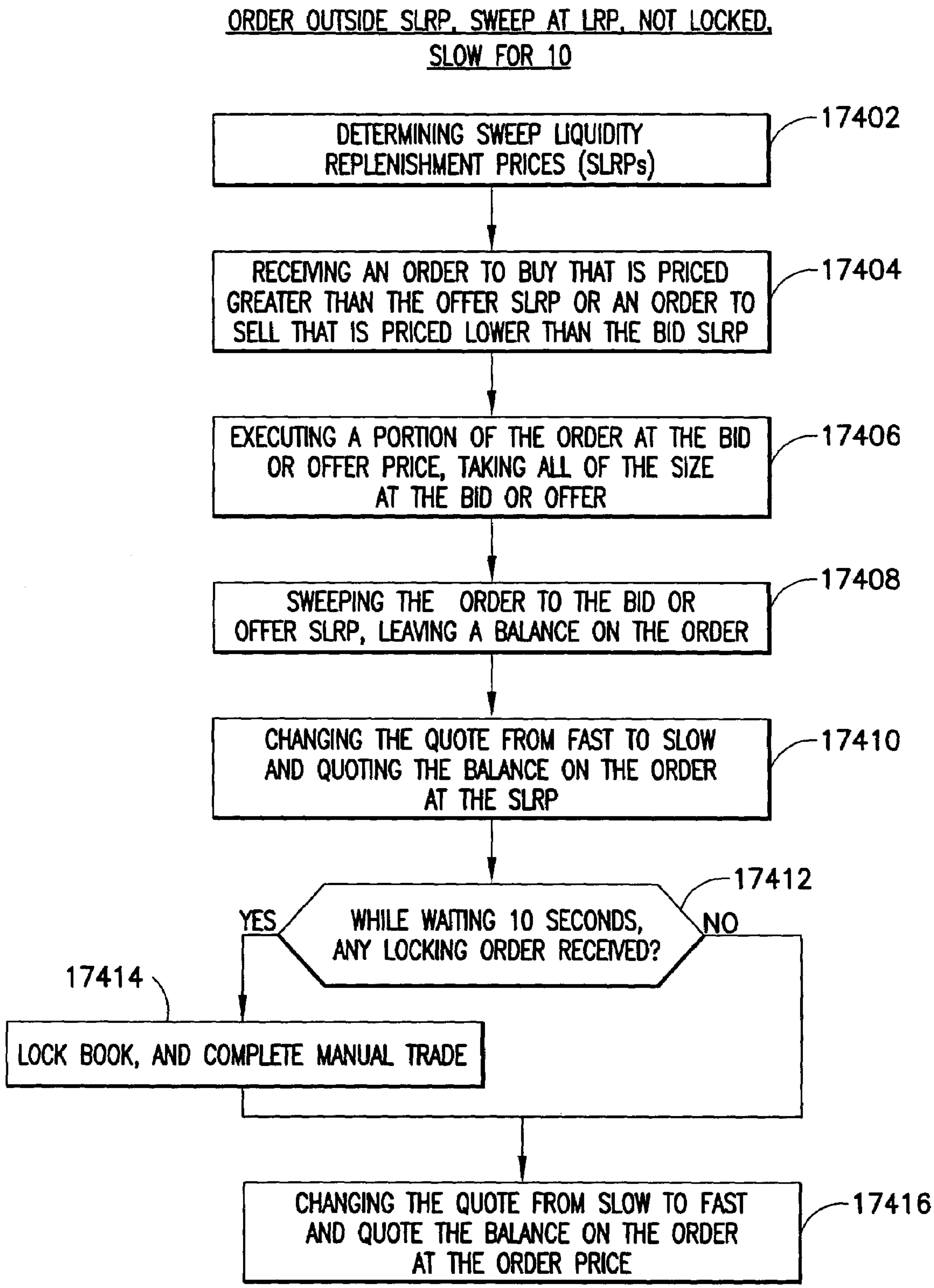

FIG. 174 illustrates an embodiment involving an order outside the Sweep LRP, with a sweep to the Sweep LRP, a slow quote, but no lock. At step 17402, system 100 determines the Sweep LRPs, such as illustrated in FIG. 170. At step 17404, system 100 receives a limit order to buy that is priced greater than the Offer Sweep LRP, or a limit order to sell that is priced less than the Bid Sweep LRP. The limit order size is greater than the size of the bid or offer that it would trade against.

At step 17406, system 100 executes a portion of the limit order at the bid or offer price, taking the size at the bid or offer. At step 17408, system 100 sweeps the limit order against orders on the order display book up to the Sweep LRP, leaving a balance on the limit order. At step 17410, system 100 changes the quote from fast to slow, and quotes the balance of the limit order at the Sweep LRP. This starts a 10 second clock, and at step 17412, while waiting for the 10 second clock to expire, system 100 determines whether any locking orders are received. If so, then at step 17414, system 100 locks the order display book requiring a manual trade by the specialist before the quote is automatically changed from slow to fast, with the balance of the limit order quoted at the limit order price. If no locking order is received, then at step 17416, system 100 automatically changes the quote from slow to fast, and quotes the balance of the limit order at the limit order price.

Figure 175:
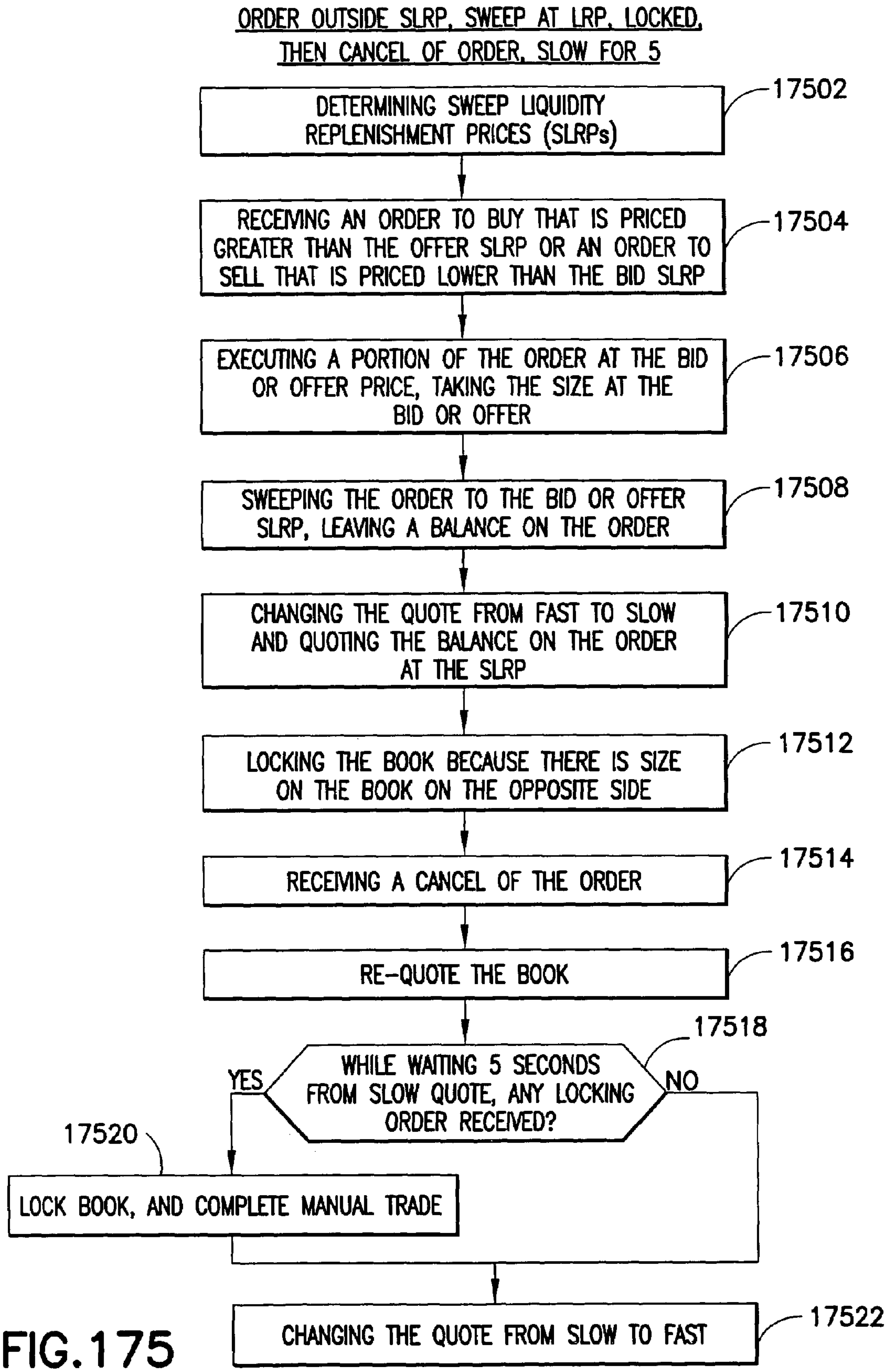

FIG. 175 illustrates an embodiment involving an order outside the Sweep LRP, a sweep at the Sweep LRP, a locked order display book, cancel of the locking order and slow quote. At step 17502, system 100 determines the Sweep LRPs, such as illustrated in FIG. 170. At step 17504, system 100 receives a limit order to buy that is priced greater than the Offer Sweep LRP, or a limit order to sell that is priced less than the Bid Sweep LRP. The limit order size is greater than the size of the bid or offer that it would trade against.

At step 17506, system 100 executes a portion of the limit order at the bid or offer price, taking the size at the bid or offer. At step 17508, system 100 sweeps the limit order against orders on the order display book up to the Sweep LRP, leaving a balance on the limit order. At step 17510, system 100 changes the quote from fast to slow, and quotes the balance of the limit order at the Sweep LRP. This starts a 5 second clock. The sweep also leaves a balance on the order display book opposite the limit order. This causes system 100 to lock the order display book at step 17512 because of the orders on both sides at the same price.

At step 17514, system 100 receives a cancel of the locking order, and at step 17516 automatically re-quotes the order display book. At step 17518, while waiting for the 5 second clock to expire, system 100 determines whether any locking orders are received. If so, then at step 17520, system 100 locks the order display book requiring a manual trade by the specialist before the quote is automatically changed from slow to fast. If no locking order is received, then at step 17522, system 100 automatically changes the quote from slow to fast.

Figure 176:
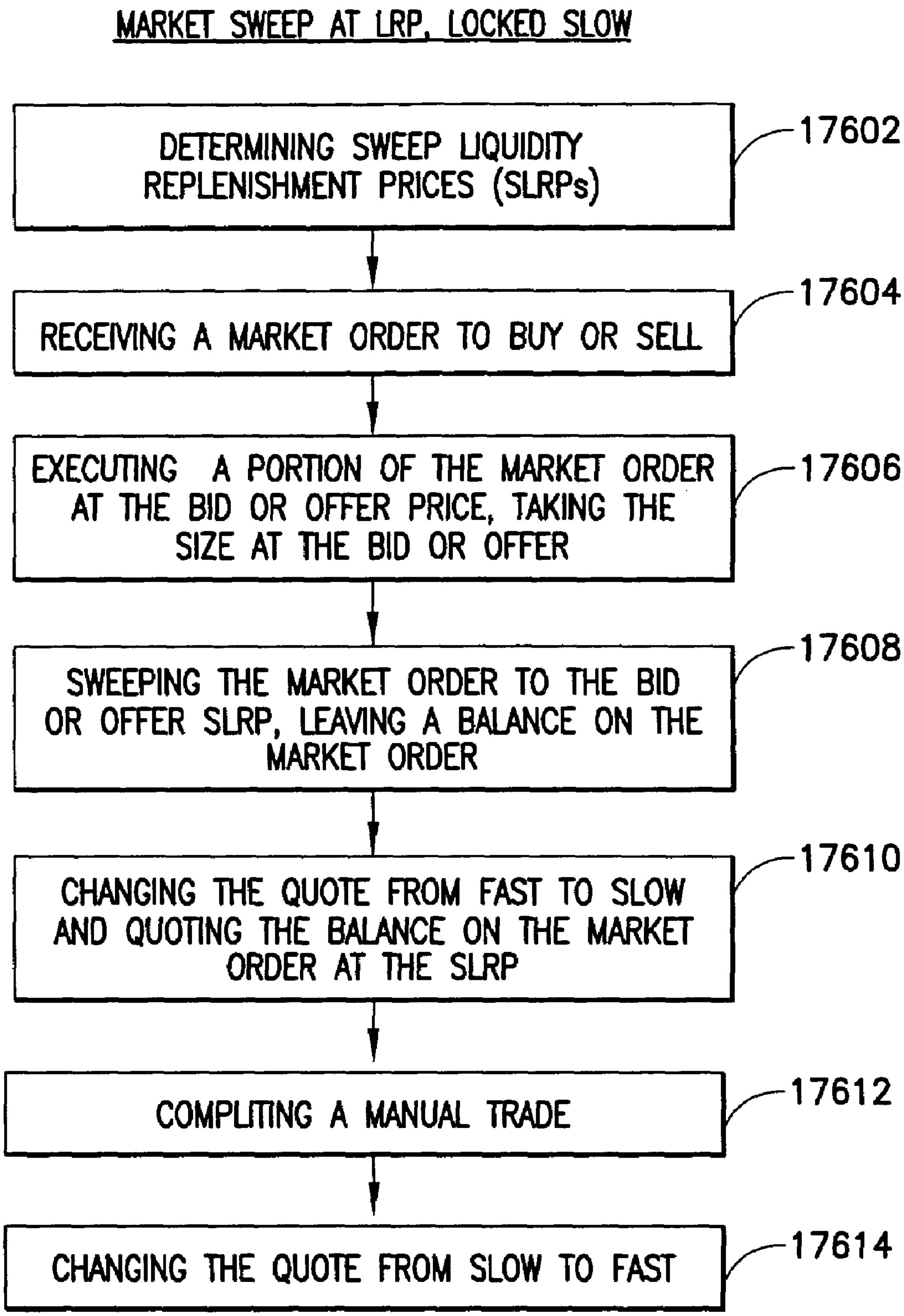

FIG. 176 illustrates an embodiment involving a market order sweep at the Sweep LRP, with a slow quote and locked order display book. At step 17602, system 100 determines the Sweep LRPs, such as illustrated in FIG. 170. At step 17604, system 100 receives a market order to buy or sell. The market order size is greater than the size of the bid or offer that it would trade against.

At step 17606, system 100 executes a portion of the market order at the bid or offer price, taking the size at the bid or offer. At step 17608, system 100 sweeps the market order against orders on the order display book up to the Sweep LRP, leaving a balance on the market order. At step 17610, system 100 changes the quote from fast to slow, and quotes the balance of the market order at the Sweep LRP. There is no timer and after the specialist completes a manual trade at step 17612, system 100 automatically changes the quote from slow to fast at step 17614.

Figure 177:
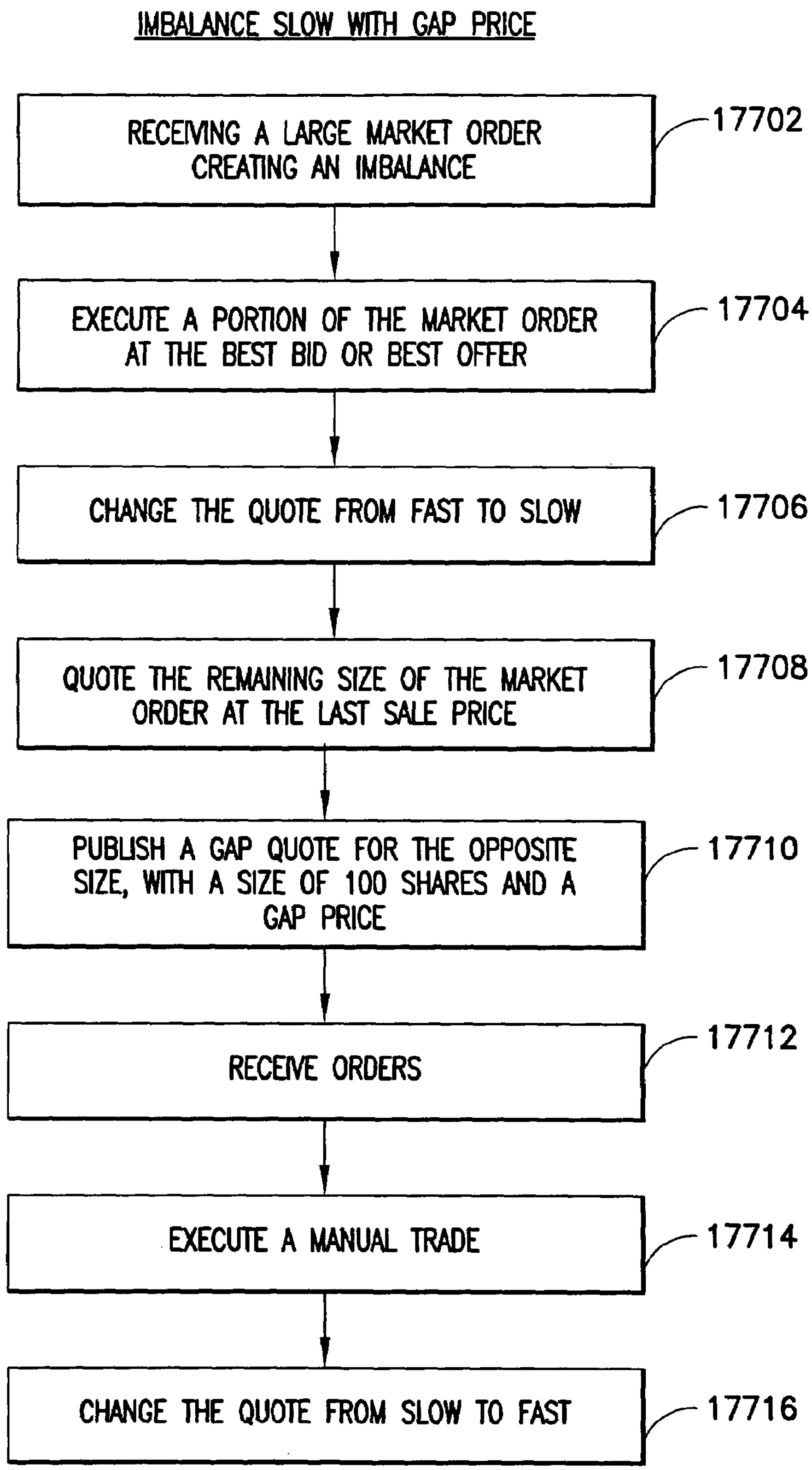

FIG. 177 illustrates an embodiment involving an imbalance and changing the quote from fast to slow with a gap quote. At step 17702, system 100 receives a large market order that creates an imbalance. At step 17704, system 100 executes a portion of the market order at the best bid or best offer, taking all of the size at the bid or offer.

At step 17706, the quote is changed from fast to slow, and at step 17708, the remaining size of the market order is quoted at the last sale price.

At step 17710, the specialist publishes a gap quote for the opposite side, with a size of 100 shares and a gap price.

At step 17712, system 100 receives orders and at step 17714, the specialist executes a manual trade, which causes the quote to automatically change from slow to fast at step 17716.

Figure 178:
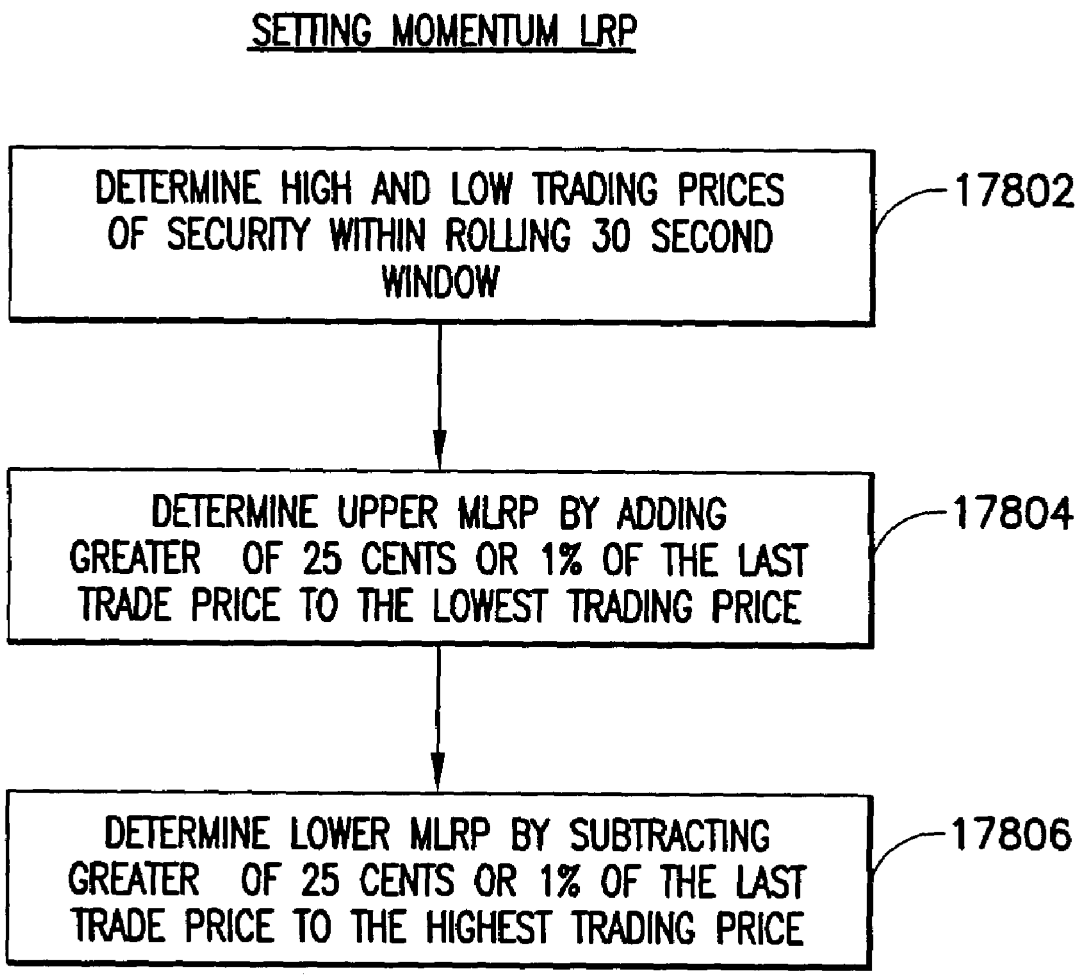

FIG. 178 illustrates an embodiment involving determining a Momentum LRP. At step 17802, system 100 determines the high and low trading prices of the security within a rolling or sliding 30 second window. Using the low trading price, at step 17804, system 100 determines the upper or offer Momentum LRP by adding the greater of 25 cents or 1 percent of the last trade price to the lowest trading price. Using the high trading price, at step 17806, system 100 determines the lower or bid Momentum LRP by subtracting the greater of 25 cents or 1 percent of the last trade price from the highest trading price.

Figure 179:
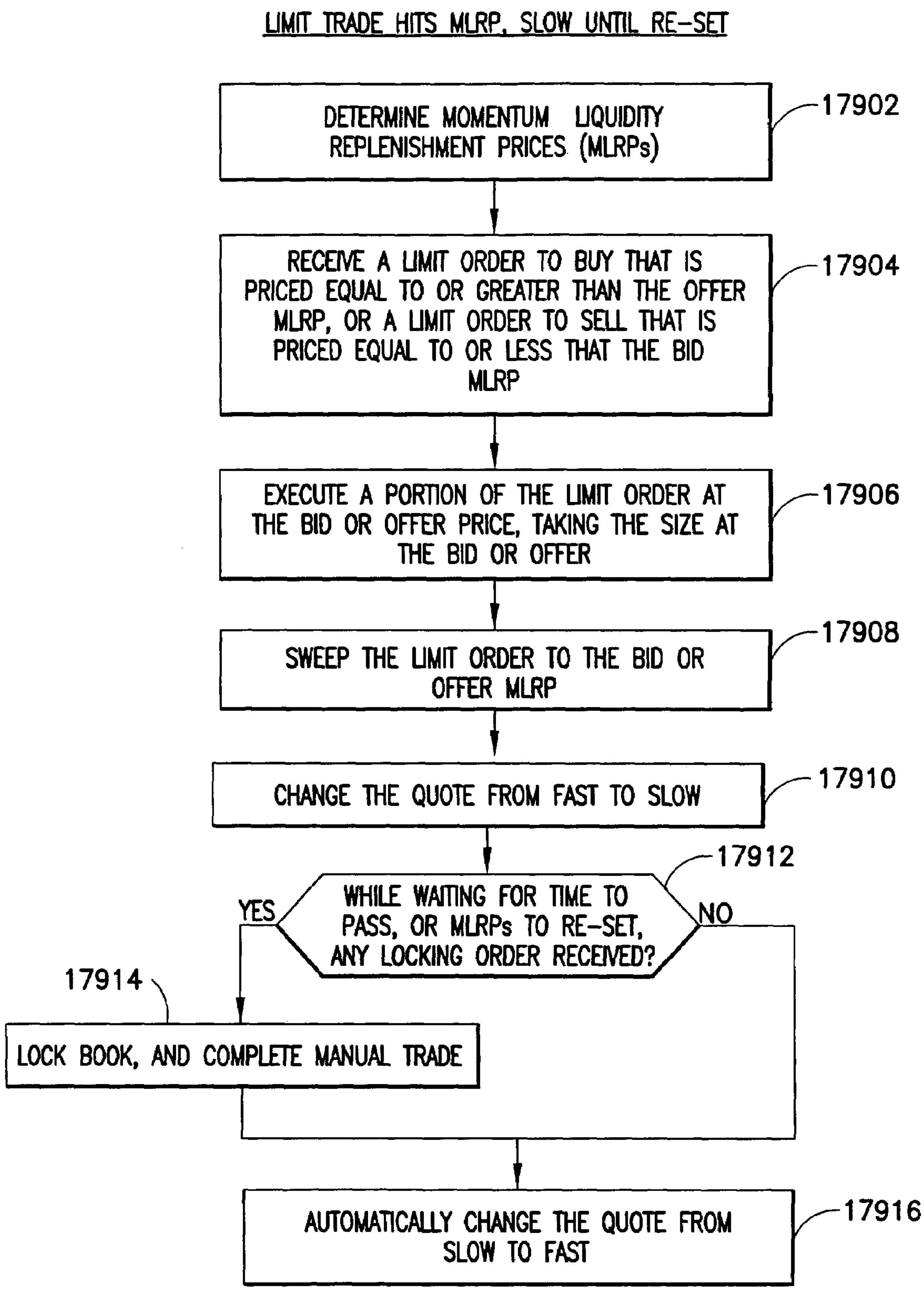

FIG. 179 illustrates an embodiment involving a limit order trade that hits a Momentum LRP with the quote slow until the Momentum LRP resets. At step 17902, system 100 determines the Momentum LRPs, such as illustrated in FIG. 178. At step 17904, system 100 receives a limit order to buy that is priced equal to or greater than the offer (upper) Momentum LRP, or a limit order to sell that is priced equal to or less than the bid (lower) Momentum LRP.

At step 17906, system 100 executes a portion of the limit order at the bid or offer price, taking the size at the bid or offer. At step 17908, system 100 sweeps the limit order against orders on the order display book hitting the Momentum LRP.

At step 17910, system 100 changes the quote from fast to slow, and at step 17912, while waiting for the Momentum LRP to re-set, system 100 determines whether any locking orders are received. If a locking order is received, then at step 17914, system 100 locks the order display book and after the specialist completes a manual trade, automatically changes the quote from slow to fast at step 17916.

If no locking order is received, then after the Momentum LRP resets, system 100 automatically changes the quote from slow to fast at step 17916.

Figure 180:
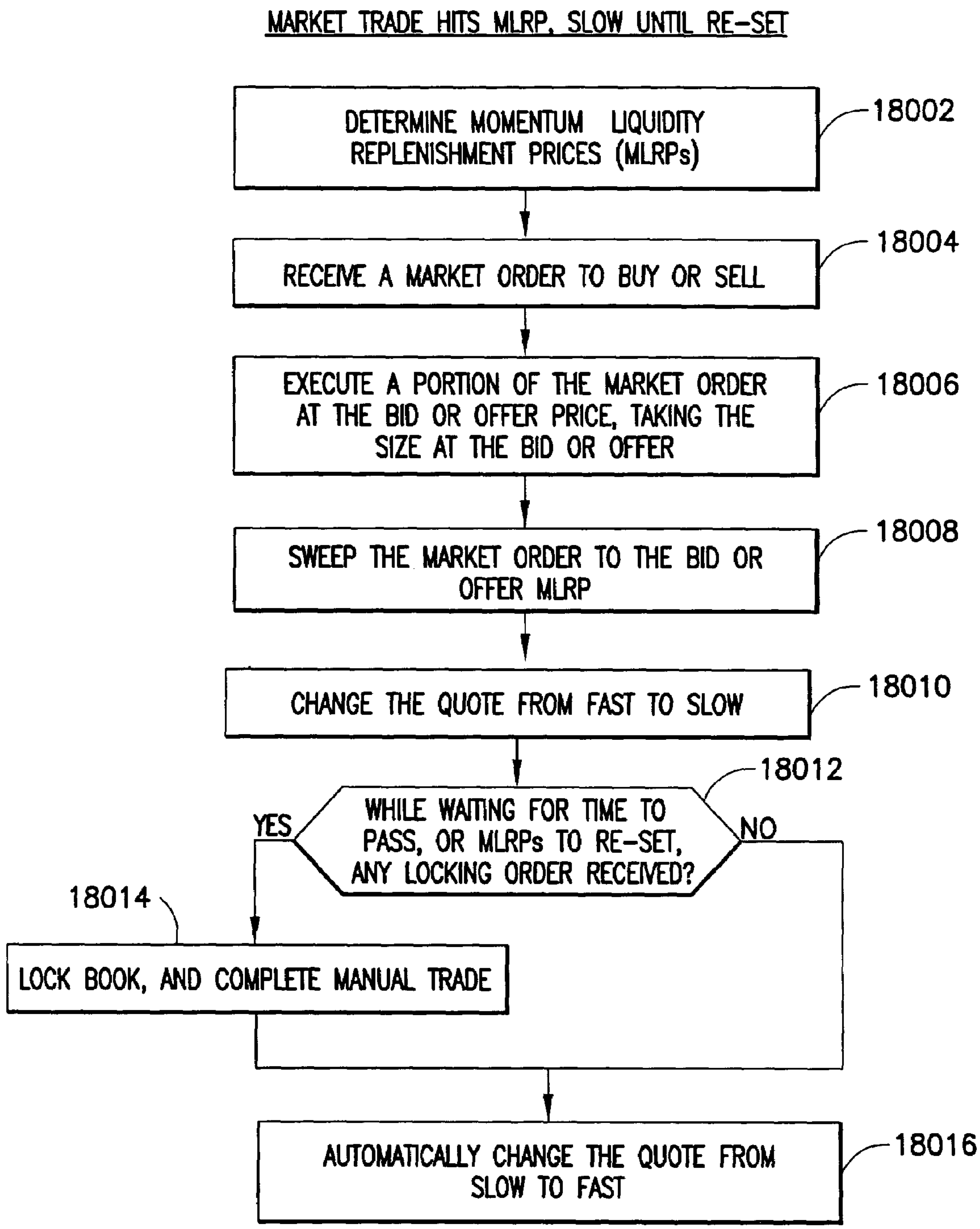

FIG. 180 illustrates an embodiment involving a market order that hits a Momentum LRP with the quote slow until the momentum LRP resets. At step 18002, system 100 determines the Momentum LRPs, such as illustrated in FIG. 178. At step 18004, system 100 receives a market order to buy or sell.

At step 18006, system executes a portion of the market order at the bid or offer price, taking the size at the bid or offer. At step 18008, system 100 sweeps the market order against orders on the order display book hitting a Momentum LRP.

At step 18010, system 100 changes the quote from fast to slow, and at step 18012, while waiting for the Momentum LRP to re-set, system 100 determines whether any locking orders are received. If a locking order is received, then at step 18014, system 100 locks the order display book and after the specialist completes a manual trade, automatically changes the quote from slow to fast at step 18016.

If no locking order is received, then after the Momentum LRP resets, system 100 automatically changes the quote from slow to fast at step 18016.

Figure 181:
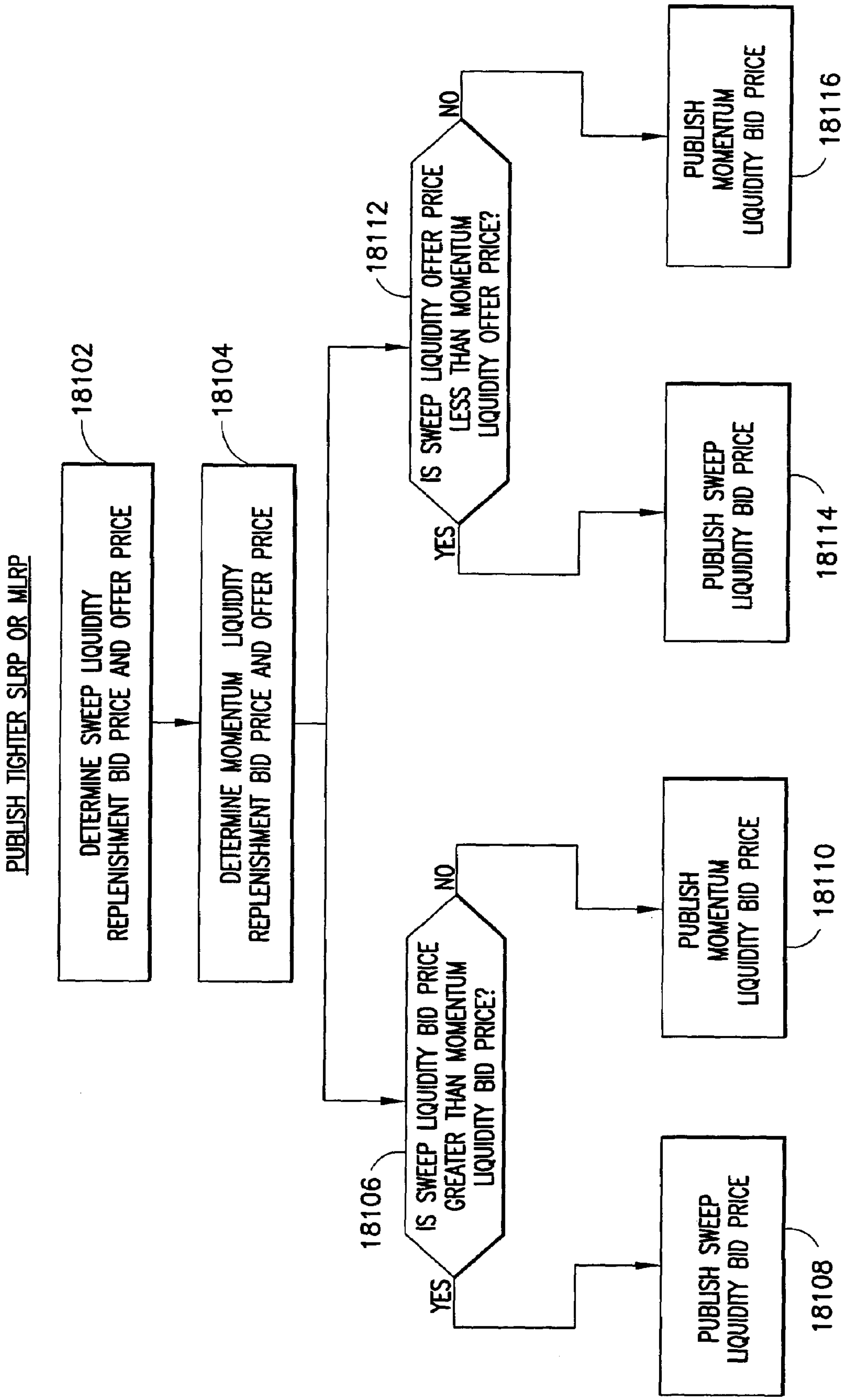

FIG. 181 illustrates an embodiment involving publishing the tighter of the Sweep LRP or the Momentum LRP. At step 18102, system 100 determines the Sweep LRPs, such as illustrated in FIG. 170. At step 18104, system 100 determines the Momentum LRPs, such as illustrated in FIG. 178.

At step 18106, system 100 determines whether the Bid Sweep LRP is greater than the Bid Momentum LRP, and if the Bid Sweep LRP is greater, publishes the Bid Sweep LRP at step 18108. If the Bid Momentum LRP is greater, system 100 publishes the Bid Momentum LRP at step 18110.

At step 18112, system determines whether the Offer Sweep LRP is less than the Offer Momentum LRP, and if the Offer Sweep LRP is less, publishes the Offer Sweep LRP at step 18114. If the Offer Momentum LRP is less, system 100 publishes the Offer Momentum LRP at step 18116.

Figure 182:
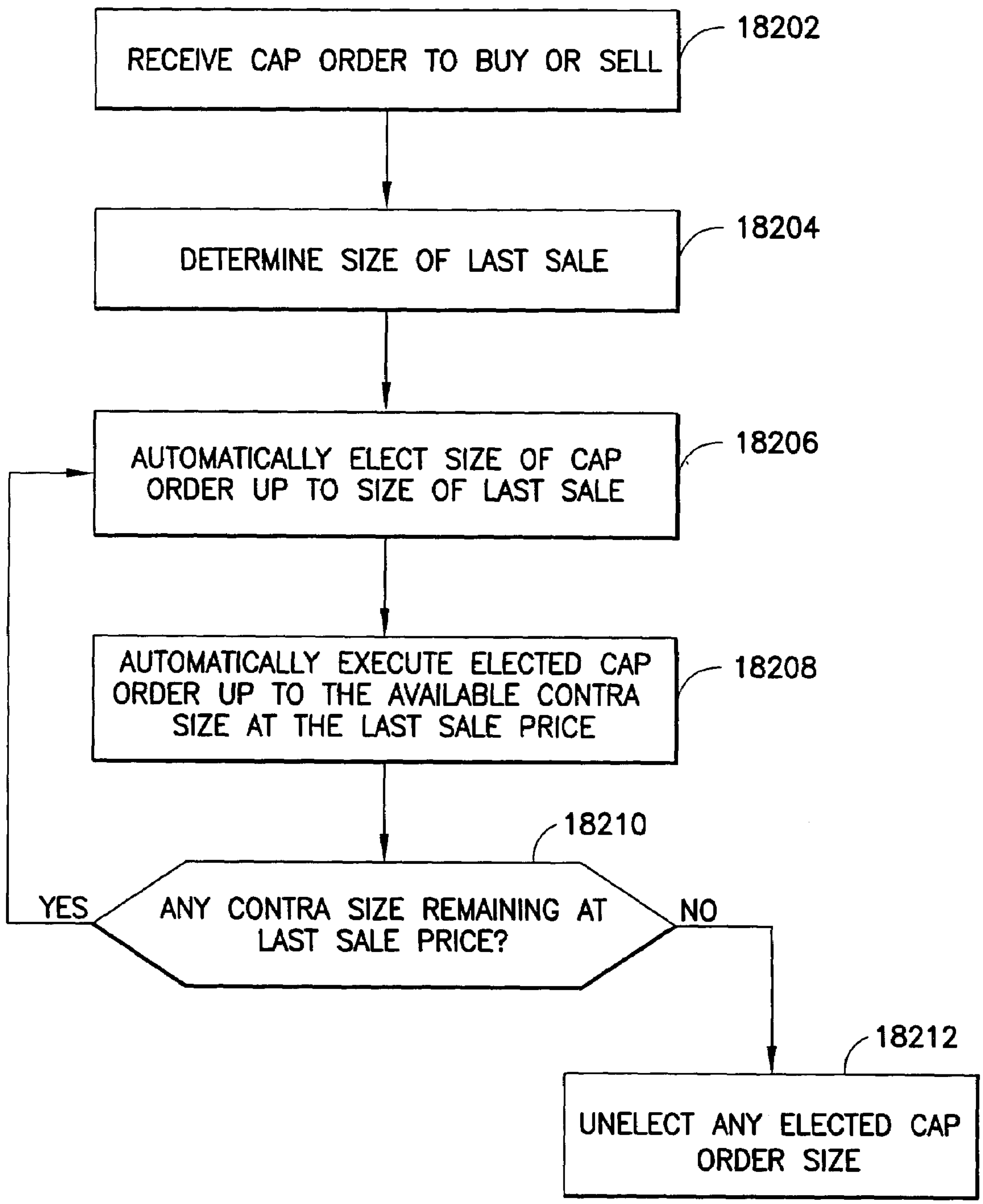

FIG. 182 illustrates an embodiment involving a CAP order, with automatic execution up to the size of the last sale. At step 18202, system 100 receives a CAP order to buy or sell, and at step 18204, determines the size of the last sale.

At step 18206, system 100 automatically elects size of the CAP order up to the size of the last sale. At step 18208, system 100 automatically executes the elected CAP order up to the available contra size at the last sale price.

At step 18210, system 100 determines whether any contra size remains at the last sale price, and if so, loops to step 18206.

If no contra size remains at the last sale price, system 100 automatically unelects any elected CAP order size at step 18212.

Figure 183:
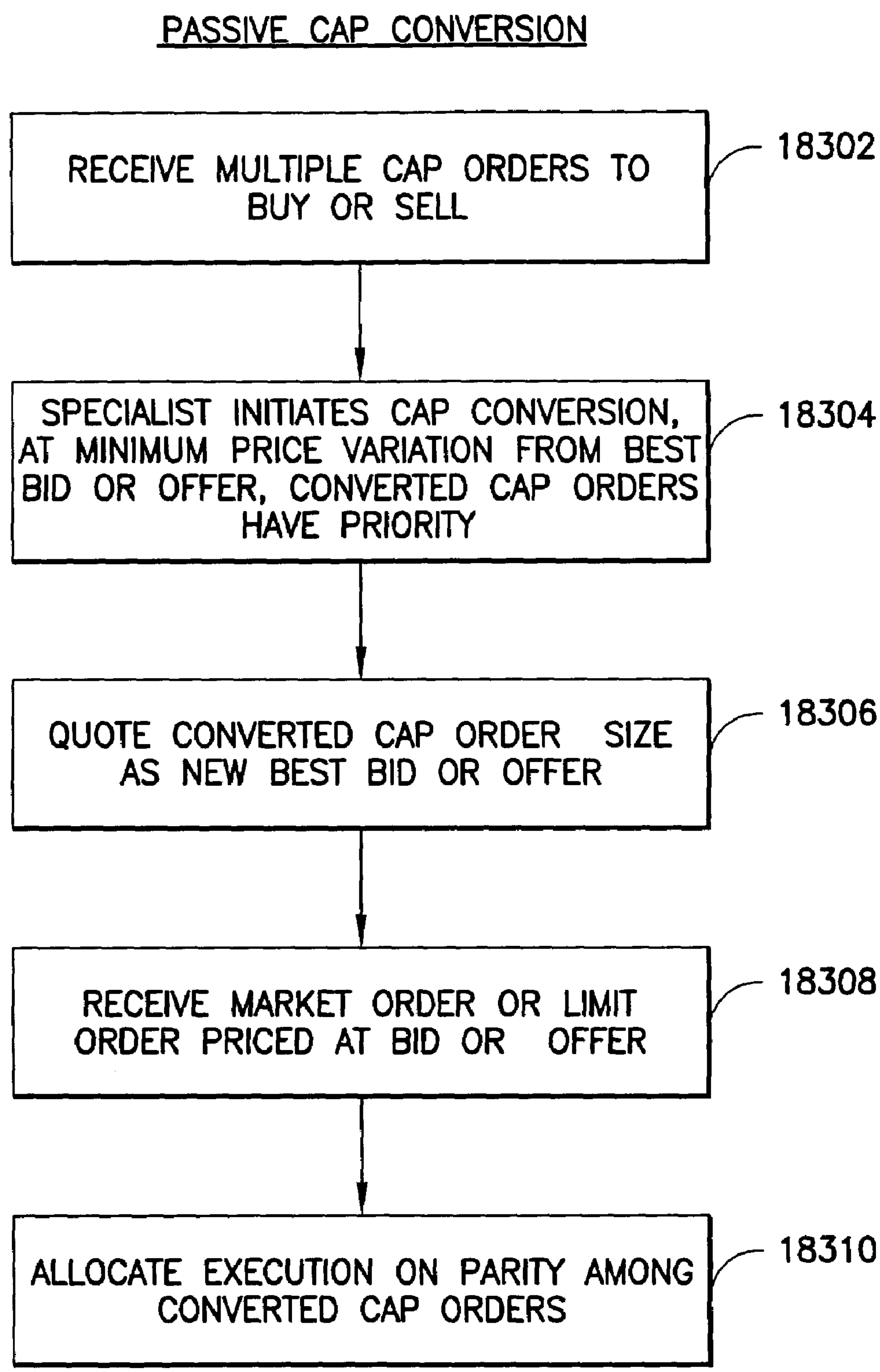

FIG. 183 illustrates an embodiment involving passive CAP conversion. At step 18302, system 100 receives multiple CAP orders to buy or sell.

At step 18304, the specialist initiates CAP conversion at minimum price variation from the best bid or offer. Converted CAP orders have priority. At step 18306, system 100 quotes the converted CAP order size as a new best bid or best offer.

At step 18308, system 100 receives a market order or a limit order priced at the bid or offer, and at step 18310, automatically allocates execution on parity among the converted CAP orders.

Figure 184:
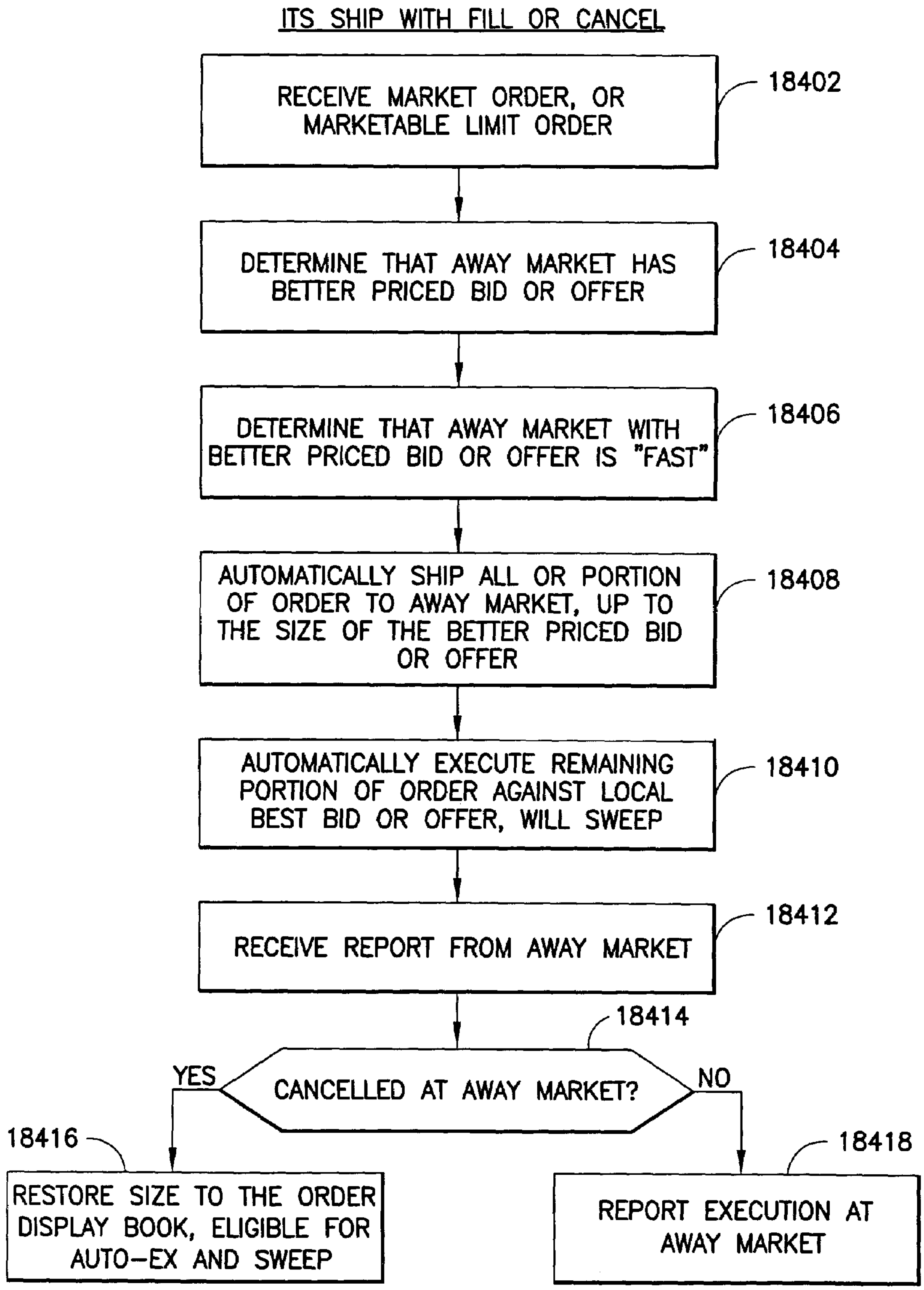

FIG. 184 illustrates an embodiment involving an intermarket ship with fill or cancel. At step 18402, system 100 receives a market order or marketable limit order. At step 18404, system 100 determines that an away market has a better priced bid or offer, and at step 18406, system 100 determines that the away market is "fast," meaning that it will execute immediately or automatically.

At step 18408, system 100 automatically ships all or a portion of the order to the away market up to the size of the better priced away market bid or offer.

At step 18410, system 100 automatically executes any balance of the order against the local best bid or offer, with any required sweep.

At step 18412, system 100 receives a report from the away market, and at step 18414 determines whether the order was executed or cancelled. If the order was cancelled, then at step 18416, system 100 restores the size to the order display book making it eligible for automatic execution and/or sweep.

If the order was executed at the away market, then at step 18418, system 100 reports the away market execution.

Figure 185:
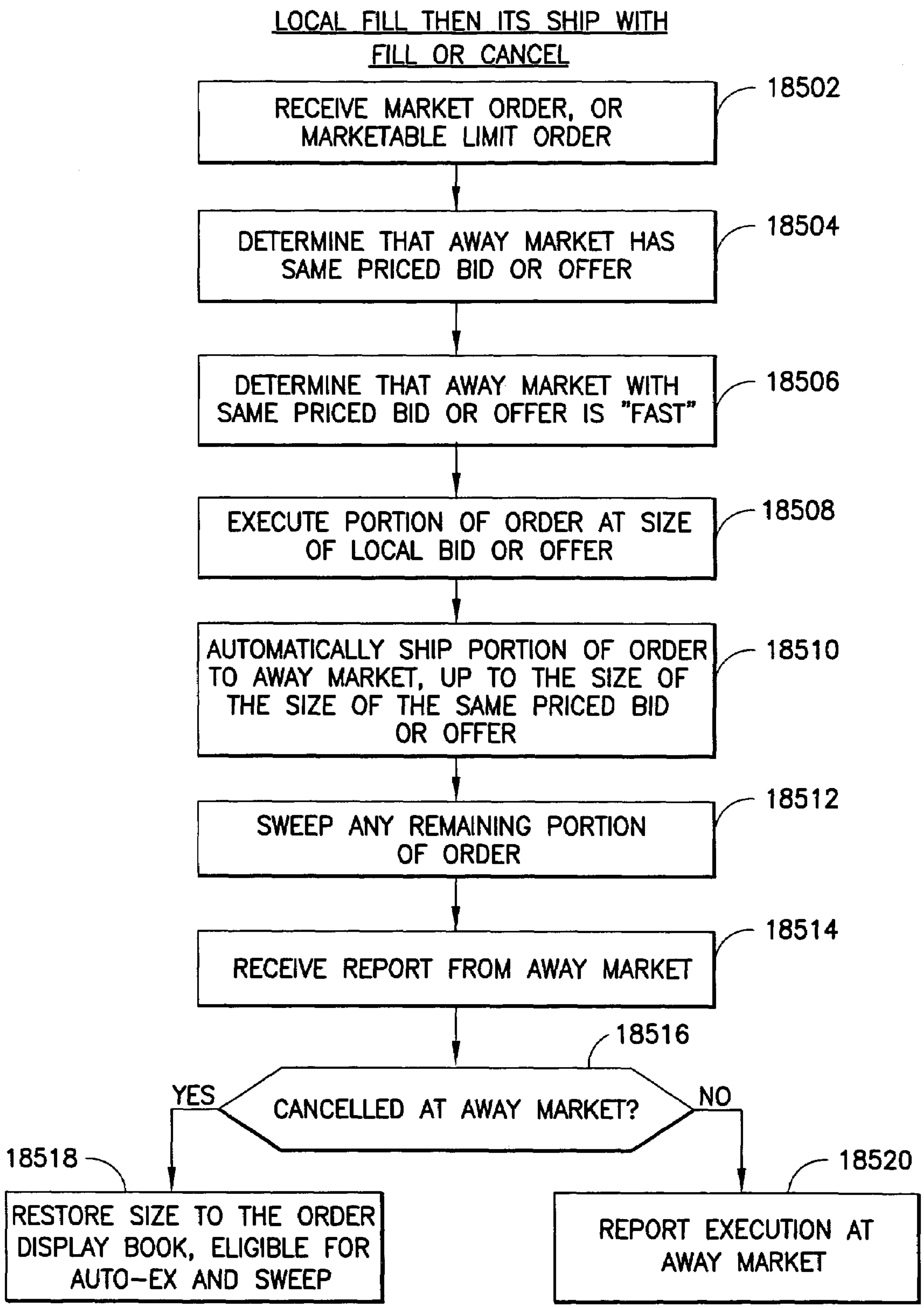

FIG. 185 illustrates an embodiment involving a local fill then ship to an away market. At step 18502, system 100 receives a market order or marketable limit order. At step 18504, system 100 determines that an away market has the same priced bid or offer, and at step 18506, system 100 determines that the away market is "fast."

At step 18508, system 100 automatically executes a portion of the order against the local best bid or offer, up to the size of the local best bid or offer.

At step 18510, system 100 automatically ships all or a portion of the order to the away market up to the size of the better priced away market bid or offer.

At step 18512, system 100 sweeps any remaining portion of the order, and at step 18514, system 100 receives a report from the away market. At step 18516 system 100 determines whether the order was executed or cancelled at the away market. If the order was cancelled, then at step 18518, system 100 restores the size to the order display book making it eligible for automatic execution and/or sweep.

If the order was executed at the away market, then at step 18520, system 100 reports the away market execution.

Figure 186:
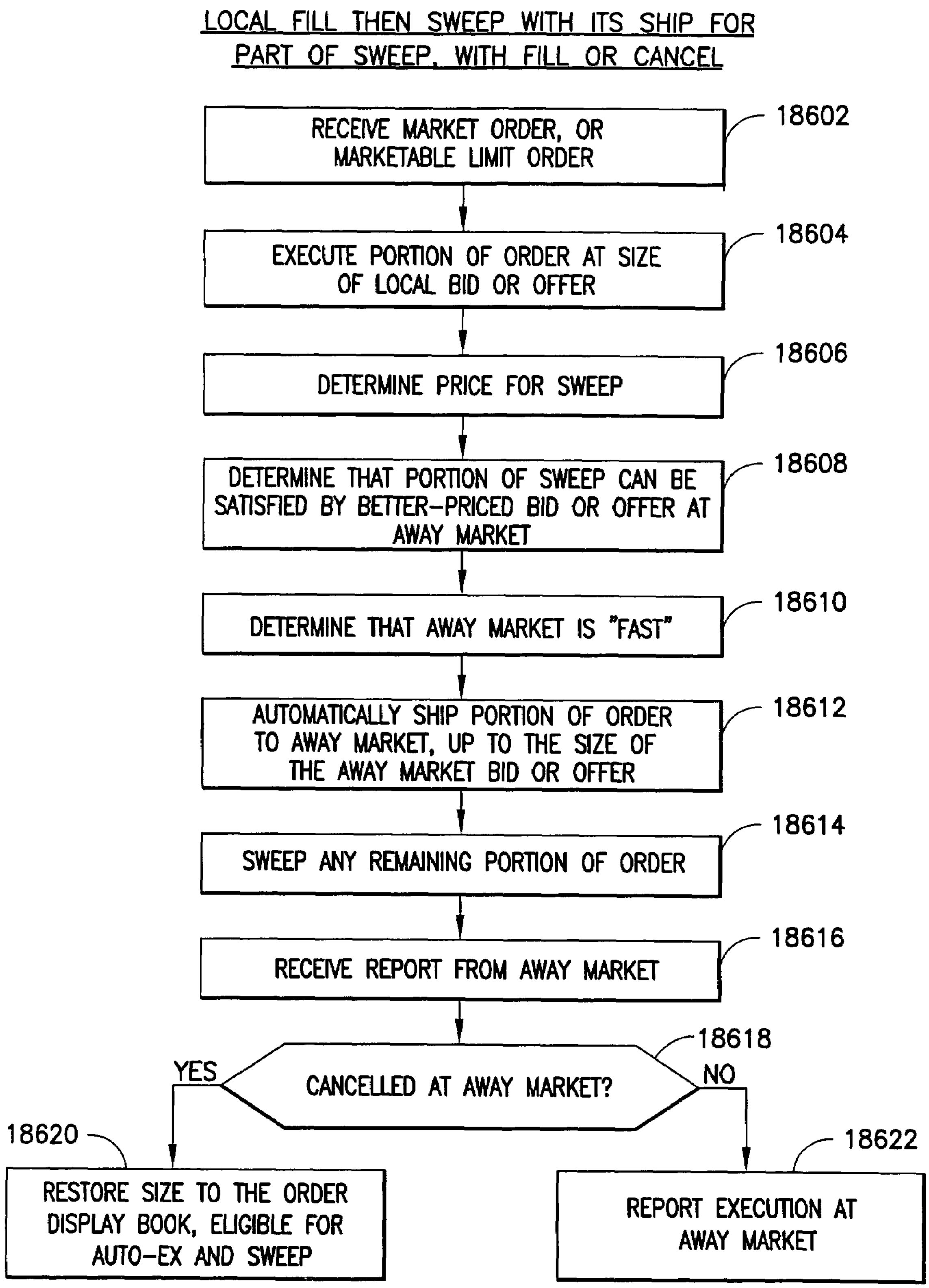

FIG. 186 illustrates an embodiment involving a local fill then sweep with intermarket ship for part of the sweep. At step 18602, system 100 receives a market order or marketable limit order. At step 18604, system 100 automatically executes a portion of the order against the local best bid or offer, up to the size of the local best bid or offer.

At step 18606, system 100 determines the price required to sweep the order.

At step 18608, system 100 determines that a portion of the sweep can be satisfied at an away market that has a better priced bid or offer, and at step 18610 system 100 determines that the away market is "fast."

At step 18612, system 100 automatically ships a portion of the order to the away market up to the size of the better priced away market bid or offer.

At step 18614, system 100 sweeps the remaining portion of the order, and at step 18616, system 100 receives a report from the away market. At step 18618 system 100 determines whether the order was executed or cancelled at the away market. If the order was cancelled, then at step 18620, system 100 restores the size to the order display book making it eligible for automatic execution and/or sweep.

If the order was executed at the away market, then at step 18622, system 100 reports the away market execution.

Figure 187:
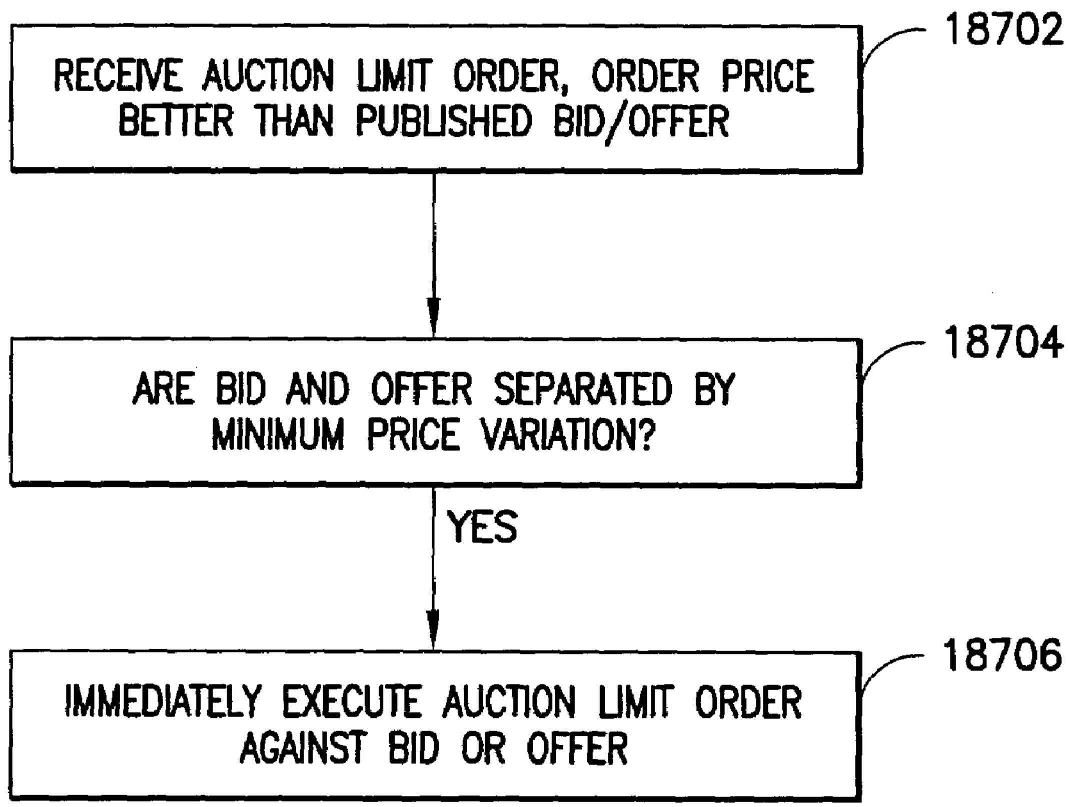

FIG. 187 illustrates an embodiment involving an Auction Limit (AL) order with the bid or offer separated by the minimum variation and immediate execution. At step 18702, system 100 receives an AL order, with an order price better than the published bid or offer. At step 18704, system 100 determines that the bid and offer are separated by a minimum price variation, and at step 18706, immediately executes the AL order against the bid or offer.

Figure 188:
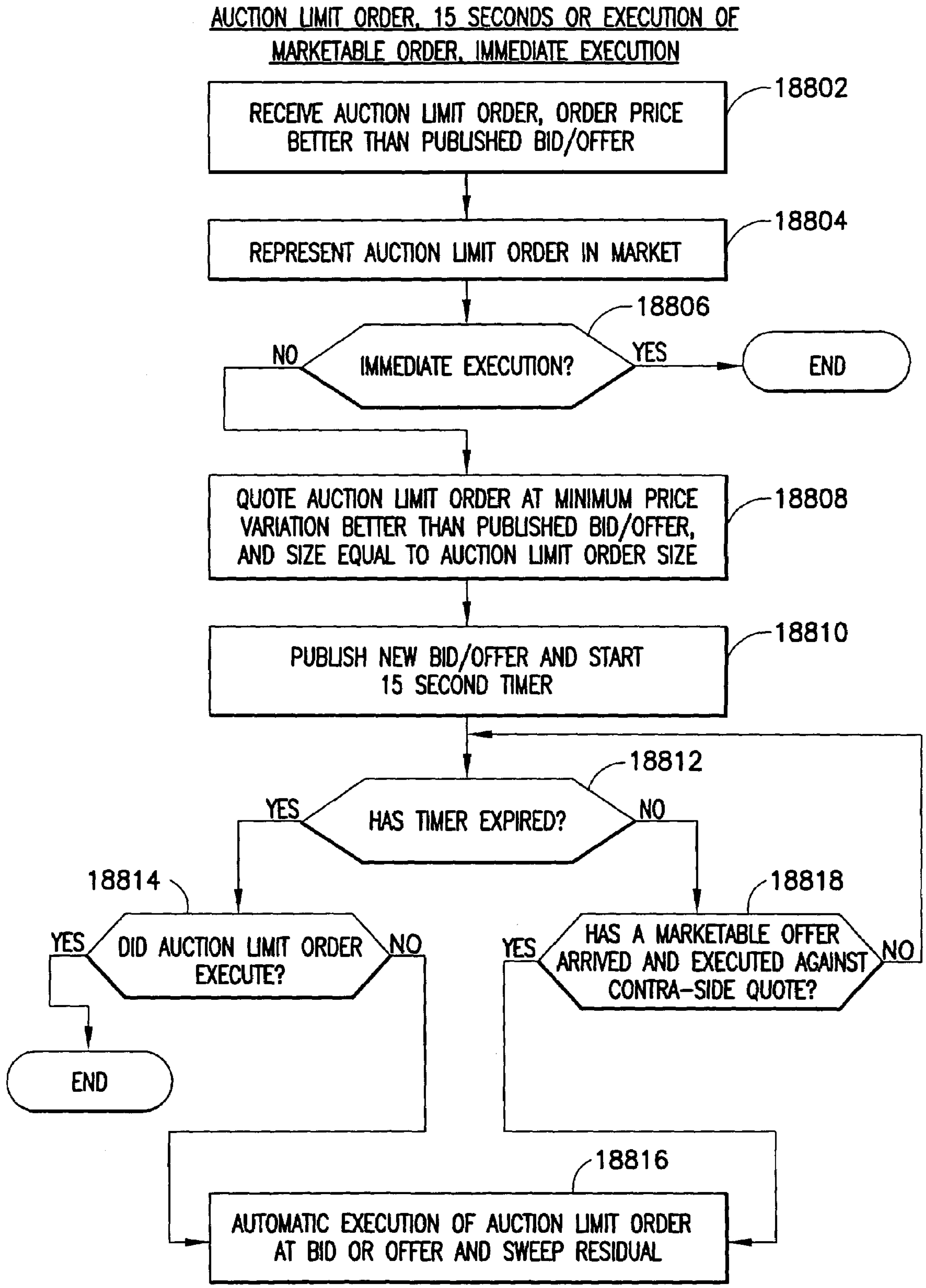

FIG. 188 illustrates an embodiment involving an AL order, execution of a market order or passage of 15 seconds without execution, followed by immediate execution. At step 18802, system 100 receives an AL order, with the order price better than the published bid or offer. At step 18804, system 100 represents the AL order in the market, and at step 18806, system 100 determines whether the AL order is immediately executed. If so, the process ends. If the AL order is not immediately executed, then at step 18808, system 100 quotes the AL order at the minimum price variation better than the published bid or offer, with size equal to the AL order size.

At step 18810, system 100 starts a 15 second timer and publishes the new bid or offer.

At step 18812, system 100 determines whether the timer has expired and if so at step 18814 determines whether the AL order was executed during that time. If so, the process ends. If not, then at step 18816, system 100 automatically executes the AL order at the bid or offer with a sweep of any residual.

If at step 18812, system 100 determines that the timer has not expired, then at step 18818, system 100 determines whether a marketable order has arrived and executed against the contra-side quote. If a marketable order has arrived and executed against the contra-side quote, then at step 18816, system 100 automatically executes the AL order at the bid or offer with a sweep of any residual. If not, then system 100 loops to step 18812 to determine whether the timer has expired.

Figure 189:
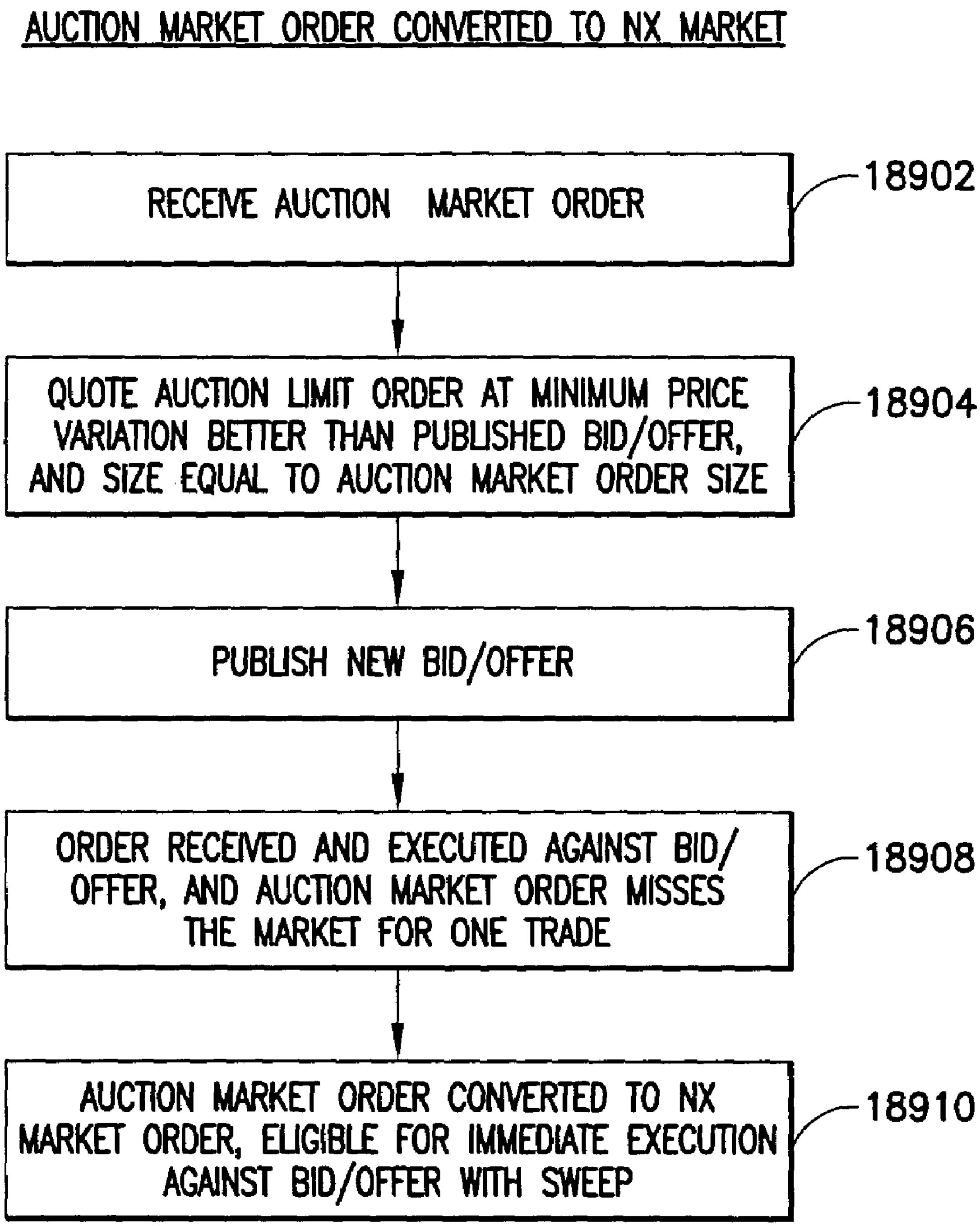

FIG. 189 illustrates an embodiment involving an Auction Market (AM) Order converted to MKT NX order. At step 18902, system 100 receives an AM Order, and at step 18904 quotes the AM Order at the minimum price variation better than the published best bid or offer, with size equal to the AM Order size. At step 18906, system 100 publishes the new bid or offer.

At step 18908, system 100 receives an order that is executed against the bid or offer, causing the AM Order to miss the market for one trade. At step 18910, system 100 converts the AM Order to a MKT NX Order that is eligible for immediate execution against the bid or offer with a sweep of any residual.

Figure 190:
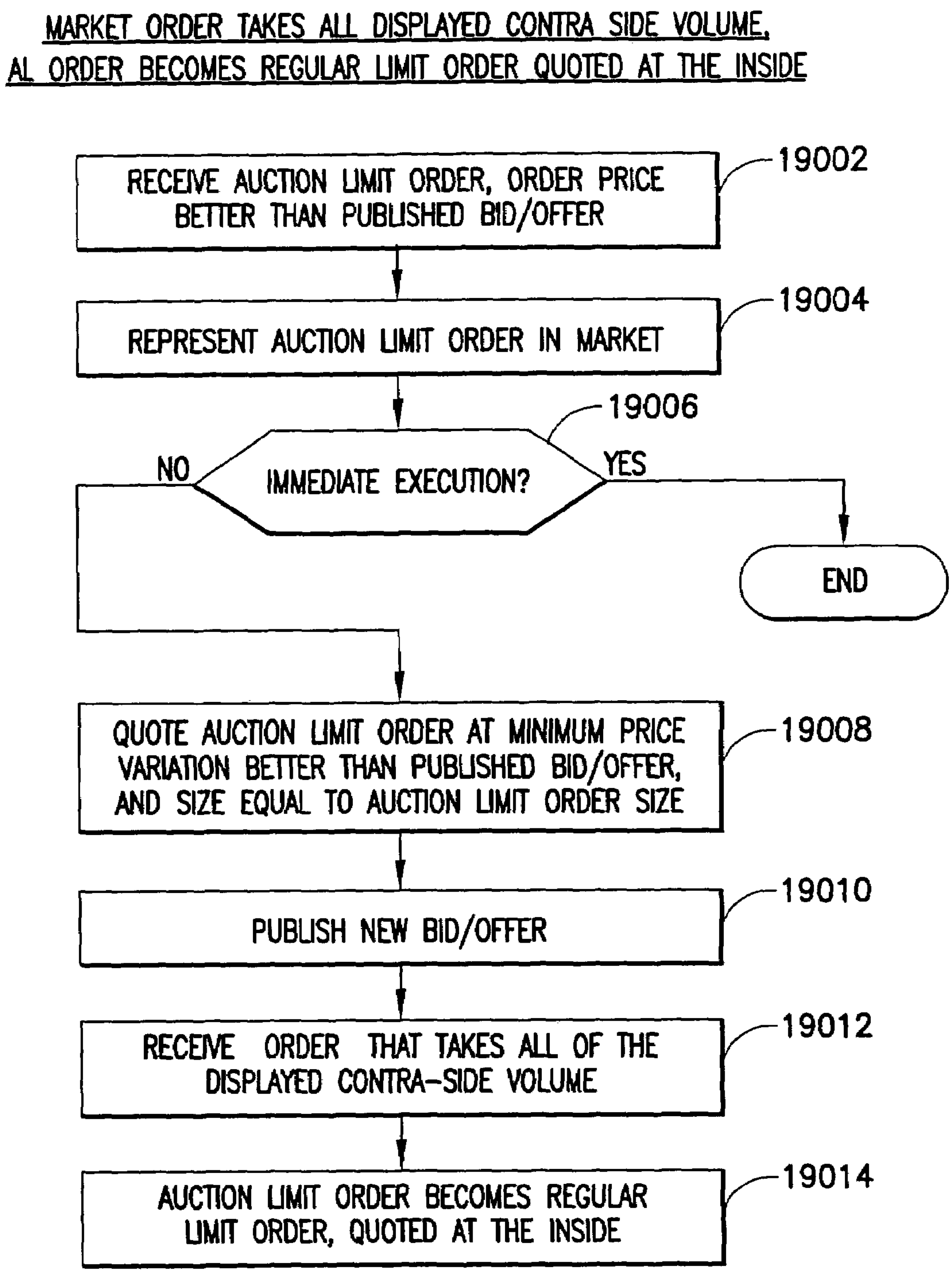

FIG. 190 illustrates an embodiment involving a market order that takes all of the displayed contra side volume, an AL order becomes a regular limit order quoted at the inside. At step 19002, system 100 receives an AL order, with an order price better than the published bid or offer. At step 19004, system 100 represents the AL order in the market for execution. At step 19006, system 100 determines whether the AL order was immediately executed in the market, and if so, the process ends. If the AL order was not immediately executed, then at step 19008, system 100 quotes the AL order at a minimum price variation better than the published bid or offer, with size equal to the AL order size. At step 19010, system 100 publishes the new bid or offer.

At step 19012, system 100 receives an order that takes all of the displayed contra-side volume, and at step 19014, system 100 automatically converts the AL order to a regular limit order, quoted at the inside.

Although illustrative embodiments have been described herein in detail, it should be noted and will be appreciated by those skilled in the art that numerous variations may be made within the scope of this invention without departing from the principle of this invention and without sacrificing its chief advantages.

Many of the examples illustrated in FIGS. 3-42 and 44-190 use a buy or a sell order to illustrate the embodiment. In the interest of brevity, a corresponding opposite example using a sell or buy order is not provided However, there is no intention to limit the inventions to only the examples, and transactions using the opposite type of order are clearly envisioned.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A method implemented at least partially in a programmed computer for executing a securities order sweep, the method comprising:

using the programmed computer to automatically determine a first price and first size of a published offer to sell shares of a security;

using the programmed computer to automatically determine a second price and second size of orders to sell shares of the security;

using the programmed computer to automatically determine a third price and third size of orders to sell shares of the security, wherein the second price is greater than the published offer and the third price is greater than the second price;

using the programmed computer to automatically receive a market order to buy shares of the security with a buy size greater than a sum of the first size and the second size;

using the programmed computer to automatically execute at the first price, a first portion of the market order that is equal to the first size; and using the programmed computer to automatically execute at the third price, a sweep of a second portion of the market order, wherein the sum of the size of the first portion and the size of the second portion equals the buy size.

2. A method according to claim 1, further comprising:

after executing at the third price, a sweep of a second portion of the market order, using the programmed computer to automatically determine whether any orders at the third price remain; and if orders at the third price remain, using the programmed computer to automatically quote the third price as the published offer to sell.

3. A method according to claim 1, further comprising:

after executing at the third price, a sweep of a second portion of the market order, using the programmed computer to automatically determine whether any orders at the third price remain;

if orders at the third price remain, using the programmed computer to automatically determine a new third size; and using the programmed computer to automatically quote the new third size as a size of the published offer to sell.

4. A method implemented at least partially in a programmed computer for executing a securities order sweep, the method comprising:

using the programmed computer to automatically determine a first price and first size of a published bid to buy shares of a security;

using the programmed computer to automatically determine a second price and second size of orders to buy shares of the security;

using the programmed computer to automatically determine a third price and third size of orders to buy shares of the security, wherein the second price is less than the published offer and the third price is less than the second price;

using the programmed computer to automatically receive a market order to sell shares of the security with a sell size greater than a sum of the first size and the second size;

using the programmed computer to automatically execute at the first price, a first portion of the market order that is equal to the first size; and using the programmed computer to automatically execute at the third price, a sweep of a second portion of the market order, wherein the sum of the size of the first portion and the size of the second portion equals the sell size.

5. A method according to claim 4, further comprising:

after executing at the third price, a sweep of a second portion of the market order, using the programmed computer to automatically determine whether any orders at the third price remain; and if orders at the third price remain, using the programmed computer to automatically quote the third price as the published bid to buy.

6. A method according to claim 4, further comprising:

after executing at the third price, a sweep of a second portion of the market order, using the programmed computer to automatically determine whether any orders at the third price remain;

if orders at the third price remain, using the programmed computer to automatically determine a new third size; and using the programmed computer to automatically quote the new third size as a size of the published bid to buy.

7. A method implemented at least partially in a programmed computer for executing a securities order sweep, the method comprising:

using the programmed computer to automatically determine a first price and first size of a published offer to sell shares of a security;

using the programmed computer to automatically determine a second price and second size of orders to sell shares of the security;

using the programmed computer to automatically determine a third price and third size of orders to sell shares of the security, wherein the second price is greater than the published offer and the third price is greater than the second price;

using the programmed computer to automatically receive a limit order to buy shares of the security with a limit price equal to the third price and a limit size greater than a sum of the first size and the second size;

using the programmed computer to automatically execute at the first price, a first portion of the limit order that is equal to the first size; and using the programmed computer to automatically execute at the third price, a sweep of a second portion of the limit order.

8. A method according to claim 7, wherein the sum of the size of the first portion and the size of the second portion equals the limit size.

9. A method according to claim 7, wherein the sum of the size of the first portion and the size of the second portion is less than the limit size, the method further comprising:

using the programmed computer to automatically quote the limit price as a published bid to buy.

10. A method according to claim 7, wherein the sum of the size of the first portion and the size of the second portion is less than the limit size, the method further comprising:

using the programmed computer to automatically determine a new limit size by subtracting the size of the first portion and the size of the second portion from the limit size; and using the programmed computer to automatically quote the new limit size as a published bid to buy.

11. A method implemented at least partially in a programmed computer for executing a securities order sweep, the method comprising:

using the programmed computer to automatically determine a first price and first size of a published bid to buy shares of a security;

using the programmed computer to automatically determine a second price and second size of orders to buy shares of the security;

using the programmed computer to automatically determine a third price and third size of orders to buy shares of the security, wherein the second price is less than the published offer and the third price is less than the second price;

using the programmed computer to automatically receive a limit order to sell shares of the security with a limit price equal to the third price and a limit size greater than a sum of the first size and the second size;

using the programmed computer to automatically execute at the first price, a first portion of the limit order that is equal to the first size; and using the programmed computer to automatically execute at the third price, a sweep of a second portion of the limit order.

12. A method according to claim 11, wherein the sum of the size of the first portion and the size of the second portion equals the limit size.

13. A method according to claim 11, wherein the sum of the size of the first portion and the size of the second portion is less than the limit size, the method further comprising:

using the programmed computer to automatically quote the limit price as a published offer to sell.

14. A method according to claim 11, wherein the sum of the size of the first portion and the size of the second portion is less than the limit size, the method further comprising:

using the programmed computer to automatically determine a new limit size by subtracting the size of the first portion and the size of the second portion from the limit size; and using the programmed computer to automatically quote the new limit size as a published offer to sell.

15. A method implemented at least partially in a programmed computer for executing a securities order sweep, the method comprising:

using the programmed computer to automatically determine a first price and first size of a published offer to sell shares of a security;

using the programmed computer to automatically receive broker interest to sell the security at a second price and second size;

using the programmed computer to automatically determine a third price and third size of orders to sell shares of the security, wherein the second price is greater than the published offer and the third price is greater than the second price;

using the programmed computer to automatically receive a market order to buy shares of the security with a buy size greater than a sum of the first size and the second size;

using the programmed computer to automatically execute at the first price, a first portion of the market order that is equal to the first size; and using the programmed computer to automatically execute at the third price, a sweep of a second portion of the market order, wherein the broker interest is the contra party for at least some of the second portion.

16. A method according to claim 15, further comprising:

after executing at the third price, a sweep of a second portion of the market order, using the programmed computer to automatically determine whether any orders at the third price remain; and if orders at the third price remain, using the programmed computer to automatically quote the third price as the published offer to sell.

17. A method according to claim 15, further comprising:

after executing at the third price, a sweep of a second portion of the market order, using the programmed computer to automatically determine whether any orders at the third price remain;

if orders at the third price remain, using the programmed computer to automatically determine a new third size; and using the programmed computer to automatically quote the new third size as a size of the published offer to sell.

18. A method implemented at least partially in a programmed computer for executing a securities order sweep, the method comprising:

using the programmed computer to automatically determine a first price and first size of a published bid to buy shares of a security;

using the programmed computer to automatically receive broker interest to buy the security at a second price and second size;

using the programmed computer to automatically determine a third price and third size of orders to buy shares of the security, wherein the second price is less than the published bid and the third price is less than the second price;

using the programmed computer to automatically receive a market order to sell shares of the security with a sell size greater than a sum of the first size and the second size;

using the programmed computer to automatically execute at the first price, a first portion of the market order that is equal to the first size; and using the programmed computer to automatically execute at the third price, a sweep of a second portion of the market order, wherein the broker interest is the contra party for at least some of the second portion.

19. A method according to claim 18, further comprising:

after executing at the third price, a sweep of a second portion of the market order, using the programmed computer to automatically determine whether any orders at the third price remain; and if orders at the third price remain, using the programmed computer to automatically quote the third price as the published bid to buy.

20. A method according to claim 18, further comprising:

after executing at the third price, a sweep of a second portion of the market order, using the programmed computer to automatically determine whether any orders at the third price remain;

if orders at the third price remain, using the programmed computer to automatically determine a new third size; and using the programmed computer to automatically quote the new third size as a size of the published bid to buy.

21. A system implemented at least partially in a programmed computer for executing a securities order sweep, the system comprising:

means for determining a first price and first size of a published offer to sell shares of a security;

means for determining a second price and second size of orders to sell shares of the security;

means for determining a third price and third size of orders to sell shares of the security, wherein the second price is greater than the published offer and the third price is greater than the second price;

means for receiving a market order to buy shares of the security with a buy size greater than a sum of the first size and the second size;

means for executing at the first price, a first portion of the market order that is equal to the first size; and means for executing at the third price, a sweep of a second portion of the market order, wherein the sum of the size of the first portion and the size of the second portion equals the buy size.

22. A computer-readable medium having computer executable software code stored thereon, the code for executing a securities order sweep, the code comprising:

code to determine a first price and first size of a published offer to sell shares of a security;

code to determine a second price and second size of orders to sell shares of the security;

code to determine a third price and third size of orders to sell shares of the security, wherein the second price is greater than the published offer and the third price is greater than the second price;

code to receive a market order to buy shares of the security with a buy size greater than a sum of the first size and the second size;

code to execute at the first price, a first portion of the market order that is equal to the first size; and code to execute at the third price, a sweep of a second portion of the market order, wherein the sum of the size of the first portion and the size of the second portion equals the buy size.

23. A programmed computer for executing a securities order sweep, comprising:

a memory having at least one region for storing computer executable program code; and a processor for executing the program code stored in the memory; wherein the program code comprises:

code to determine a first price and first size of a published offer to sell shares of a security;

code to determine a second price and second size of orders to sell shares of the security;

code to determine a third price and third size of orders to sell shares of the security, wherein the second price is greater than the published offer and the third price is greater than the second price;

code to receive a market order to buy shares of the security with a buy size greater than a sum of the first size and the second size;

code to execute at the first price, a first portion of the market order that is equal to the first size; and code to execute at the third price, a sweep of a second portion of the market order, wherein the sum of the size of the first portion and the size of the second portion equals the buy size.

* * * * *